(12) United States Patent
Nix

(10) Patent No.: US 12,732,488 B2
(45) Date of Patent: Sep. 8, 2026

(54) SECURE SESSION RESUMPTION USING POST-QUANTUM CRYPTOGRAPHY

(71) Applicant: Adeia Emerging Technologies Inc., San Jose, CA (US)

(72) Inventor: John A. Nix, Evanston, IL (US)

(73) Assignee: ADEIA EMERGING TECHNOLOGIES INC., San Jose, CA (US)

( * ) Notice: Subject to any disclaimer, the term of this patent is extended or adjusted under 35 U.S.C. 154(b) by 53 days.

(21) Appl. No.: 19/011,281

(22) Filed: Jan. 6, 2025

(65) Prior Publication Data

US 2025/0141853 A1 May 1, 2025

Related U.S. Application Data

(63) Continuation of application No. 18/063,192, filed on Dec. 8, 2022, now Pat. No. 12,192,184.

(60) Provisional application No. 63/287,384, filed on Dec. 8, 2021.

(51) Int. Cl.

| | |
|---|---|
| ***H04L 9/40*** | (2022.01) |
| ***H04L 9/08*** | (2006.01) |
| ***H04L 9/32*** | (2006.01) |

(52) U.S. Cl.

CPC ............ *H04L 63/045* (2013.01); *H04L 9/085* (2013.01); *H04L 9/0852* (2013.01); *H04L 9/0861* (2013.01); *H04L 9/3242* (2013.01)

(58) Field of Classification Search

CPC ..... H04L 63/045; H04L 9/085; H04L 9/0852; H04L 9/0861; H04L 9/3242

See application file for complete search history.

(56) References Cited

U.S. PATENT DOCUMENTS

| | | | |
|---|---|---|---|
| 8,681,996 | B2 | 3/2014 | Sabev |
| 8,782,774 | B1 | 7/2014 | Pahl et al. |
| 9,531,685 | B2 | 12/2016 | Gero et al. |
| 9,673,977 | B1 | 6/2017 | Kalach |

(Continued)

FOREIGN PATENT DOCUMENTS

| | | |
|---|---|---|
| WO | 2022060471 A2 | 3/2022 |

OTHER PUBLICATIONS

Aragon, et al, "BIKE—Bit-Flipping Key Encapsulation", NIST PQC Conference, Apr. 13, 2018.

(Continued)

*Primary Examiner* — Jonathan A Bui

(74) *Attorney, Agent, or Firm* — HG LAW LLP

(57) ABSTRACT

A server and a device can support secure sessions with both (i) post-quantum cryptography (PQC) key encapsulation mechanisms (KEM) and (ii) session resumption. In an initial secure session, the device and server can mutually generate a first shared secret key K1 from a first KEM based on a device PKI key pair. The device and server can mutually generate a second shared secret key K2 from a second KEM based on a server PKI key pair. The device and server can mutually generate a symmetric ciphering key S2 from both K1 and K2. The server can encrypt an identity for a "pre-shared" secret key (PSK-ID) with S2. The device and server can (i) mutually generate a PSK from both K1 and K2 and (ii) close the initial secure session. The device can transmit a message to resume the session, where the message includes the PSK-ID and a MAC value.

11 Claims, 16 Drawing Sheets

(56) References Cited

U.S. PATENT DOCUMENTS

| | | | |
|---|---|---|---|
| 9,819,656 B2 | 11/2017 | Carlson | |
| 9,985,782 B2 | 5/2018 | McCallum | |
| 10,169,587 B1 | 1/2019 | Nix | |
| 10,218,504 B1 | 2/2019 | Kalach et al. | |
| 10,412,063 B1 | 9/2019 | Mandich et al. | |
| 10,516,527 B1 * | 12/2019 | Machani | H04L 9/0625 |
| 11,153,080 B1 | 10/2021 | Nix | |
| 12,047,516 B2 | 7/2024 | Nix | |
| 2002/0166048 A1 | 11/2002 | Coulier | |
| 2009/0049299 A1 | 2/2009 | Jablon et al. | |
| 2013/0051551 A1 | 2/2013 | El Aimani | |
| 2013/0114810 A1 | 5/2013 | Kobayashi et al. | |
| 2014/0089658 A1 | 3/2014 | Raghuram | |
| 2014/0195804 A1 | 7/2014 | Hursti | |
| 2015/0067338 A1 | 3/2015 | Gero et al. | |
| 2015/0271146 A1 | 9/2015 | Holyfield | |
| 2016/0065370 A1 | 3/2016 | Le Saint | |
| 2017/0012974 A1 | 1/2017 | Sierra et al. | |
| 2019/0097794 A1 | 3/2019 | Nix | |
| 2019/0149527 A1 | 5/2019 | John | |
| 2019/0313246 A1 * | 10/2019 | Nix | H04L 9/3247 |
| 2019/0386825 A1 | 12/2019 | Bhattacharya et al. | |
| 2020/0235929 A1 | 7/2020 | Jacobs et al. | |
| 2020/0259647 A1 * | 8/2020 | Goncalves | H04L 9/3093 |
| 2020/0280436 A1 * | 9/2020 | Nix | H04L 9/0869 |
| 2020/0304305 A1 | 9/2020 | Garcia Morchon et al. | |
| 2020/0314115 A1 | 10/2020 | Nabeesa et al. | |
| 2020/0374129 A1 | 11/2020 | Dilles et al. | |
| 2020/0396060 A1 * | 12/2020 | Wu | G06Q 20/0655 |
| 2020/0403978 A1 | 12/2020 | Allen et al. | |
| 2021/0058242 A1 | 2/2021 | Donsomsakunkij et al. | |
| 2021/0083862 A1 | 3/2021 | Pointcheval et al. | |
| 2022/0345298 A1 * | 10/2022 | Cap | H04L 9/14 |
| 2023/0254132 A1 * | 8/2023 | Ramanathan | H04L 9/0869 380/28 |
| 2024/0273221 A1 * | 8/2024 | Shea | G06N 10/00 |

OTHER PUBLICATIONS

Bos, et al, "CRYSTALS—Kyber: a CCA-secure module-lattice-based KEM", NIST PQC Round 1 Submission Package, Nov. 2017.

ETSI Technical Standard 103 465 v.15.0.0, "Smart Cards; Smart Secure Platform (SSP); Requirements Specification", May 2019.

European Telecommunications Standards Institute (ETSI), Technical Report 103 823 V1.1.1, "CYBER;Quantum-Safe Public-Key Encryption and Key Encapsulation", Sep. 2021.

Fischlin, et al, "Multi-Stage Key Exchange and the Case of Google's QUIC Protocol", Association for Computing Machinery Conference on Computer and Communications Security 2014, p. 1193-1204, 2014.

GSM Association, "iUICC POC Group Primary Platform requirements", Release 1.0, May 17, 2017, pp. 1-43.

Guerin, et al., "Method For Exchanging Cryptographic Keys For Quantum-secure Communication Between A Server And A Client", Jul. 22, 2021, DE 102020200726 A 1 (English Translation), pp. 1-29 (Year: 2021).

Internet Engineering Task Force (IETF) Request for Comments (RFC) 8446, "The Transport Layer Security (TLS) Protocol Version 1.3", Aug. 2018.

Jao, et al, "Supersingular Isogeny Key Encapsulation", NIST PQC Round 2 Submission Package, Apr. 17, 2019.

Krawczyk, et al, "HMAC-based Extract-and-Expand Key Derivation Function (HKDF)", Internet Engineering Task Force (IETF), RFC 5869, May 2010.

Krawczyk, et al, "The OPTLS Protocol and TLS 1.3", Proc. IEEE European Symposium on Security and Privacy, 2016.

Wikipedia, "Post-Quantum Cryptography Standardization", Oct. 29, 2021.

* cited by examiner

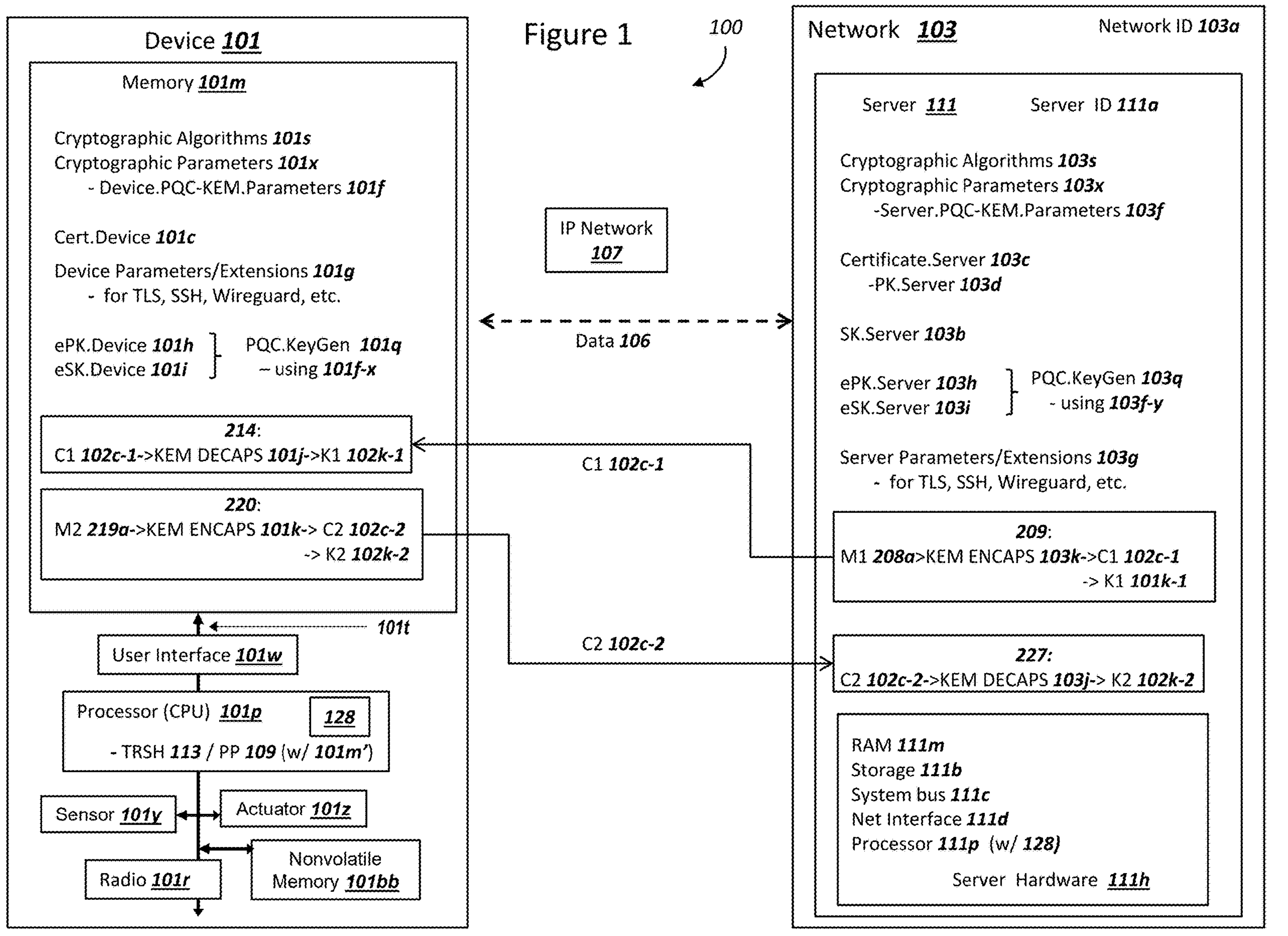
Figure 1
100
Device 101
Memory 101m
Cryptographic Algorithms 101s
Cryptographic Parameters 101x
- Device.PQC-KEM.Parameters 101f
Cert.Device 101c
Device Parameters/Extensions 101g
- for TLS, SSH, Wireguard, etc.
ePK.Device 101h
eSK.Device 101i
PQC.KeyGen 101q
– using 101f-x
214:
C1 102c-1->KEM DECAPS 101j->K1 102k-1
220:
M2 219a->KEM ENCAPS 101k-> C2 102c-2
-> K2 102k-2
101t
User Interface 101w
Processor (CPU) 101p
128
- TRSH 113 / PP 109 (w/ 101m')
Sensor 101y
Actuator 101z
Radio 101r
Nonvolatile Memory 101bb
IP Network 107
Data 106
C1 102c-1
C2 102c-2
Network 103
Network ID 103a
Server 111
Server ID 111a
Cryptographic Algorithms 103s
Cryptographic Parameters 103x
-Server.PQC-KEM.Parameters 103f
Certificate.Server 103c
-PK.Server 103d
SK.Server 103b
ePK.Server 103h
eSK.Server 103i
PQC.KeyGen 103q
- using 103f-y
Server Parameters/Extensions 103g
- for TLS, SSH, Wireguard, etc.
209:
M1 208a>KEM ENCAPS 103k->C1 102c-1
-> K1 101k-1
227:
C2 102c-2->KEM DECAPS 103j-> K2 102k-2
RAM 111m
Storage 111b
System bus 111c
Net Interface 111d
Processor 111p (w/ 128)
Server Hardware 111h

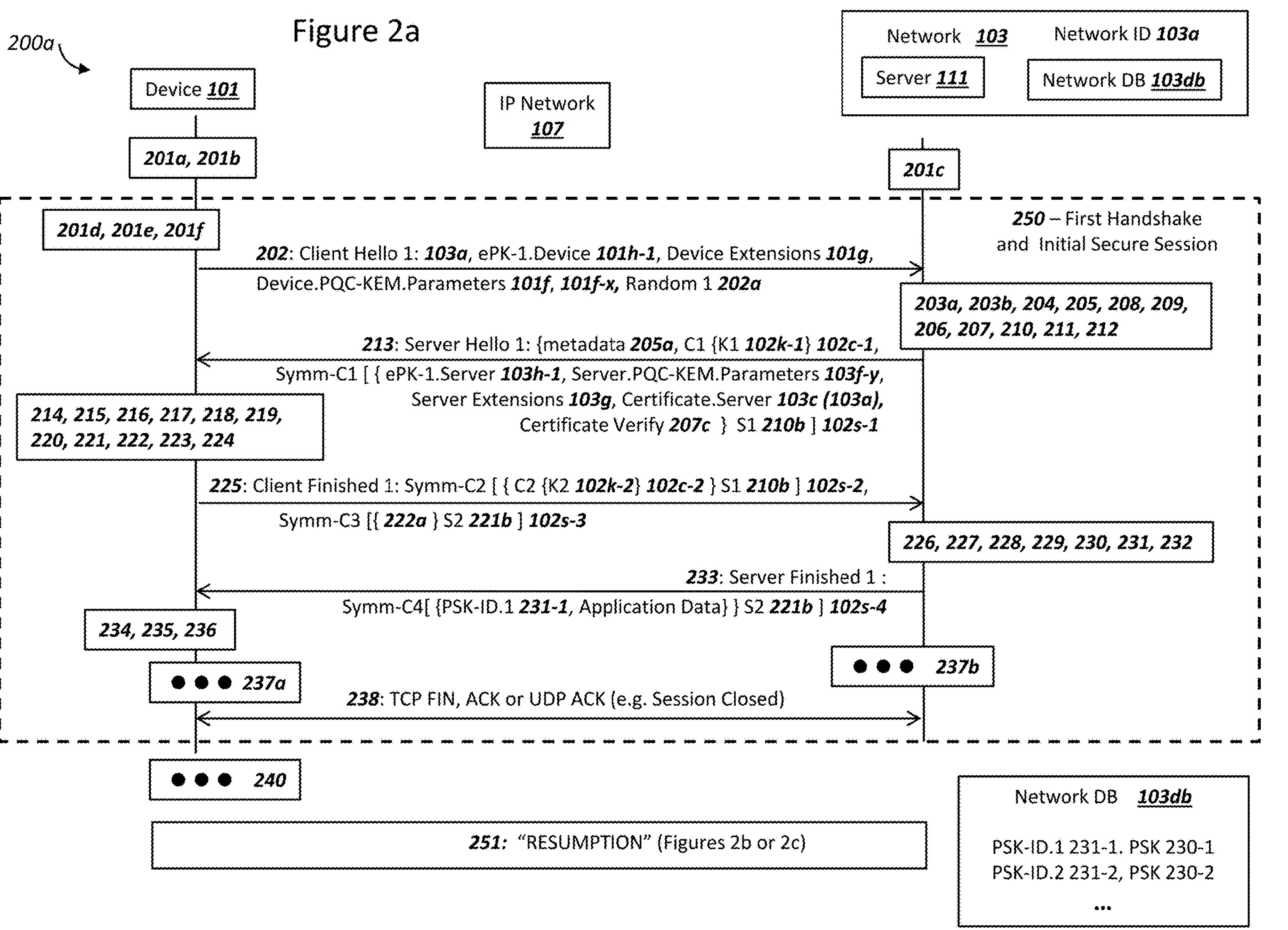
Figure 2a
200a
Device 101
IP Network 107
Network 103
Network ID 103a
Server 111
Network DB 103db
201a, 201b
201c
201d, 201e, 201f
250 – First Handshake and Initial Secure Session
202: Client Hello 1: 103a, ePK-1.Device 101h-1, Device Extensions 101g,
Device.PQC-KEM.Parameters 101f, 101f-x, Random 1 202a
203a, 203b, 204, 205, 208, 209,
206, 207, 210, 211, 212
213: Server Hello 1: {metadata 205a, C1 {K1 102k-1} 102c-1,
Symm-C1 [ { ePK-1.Server 103h-1, Server.PQC-KEM.Parameters 103f-y,
Server Extensions 103g, Certificate.Server 103c (103a),
Certificate Verify 207c } S1 210b ] 102s-1
214, 215, 216, 217, 218, 219,
220, 221, 222, 223, 224
225: Client Finished 1: Symm-C2 [ { C2 {K2 102k-2} 102c-2 } S1 210b ] 102s-2,
Symm-C3 [{ 222a } S2 221b ] 102s-3
226, 227, 228, 229, 230, 231, 232
233: Server Finished 1 :
Symm-C4[ {PSK-ID.1 231-1, Application Data} } S2 221b ] 102s-4
234, 235, 236
237a
237b
238: TCP FIN, ACK or UDP ACK (e.g. Session Closed)
240
251: "RESUMPTION" (Figures 2b or 2c)
Network DB 103db
PSK-ID.1 231-1. PSK 230-1
PSK-ID.2 231-2, PSK 230-2
...

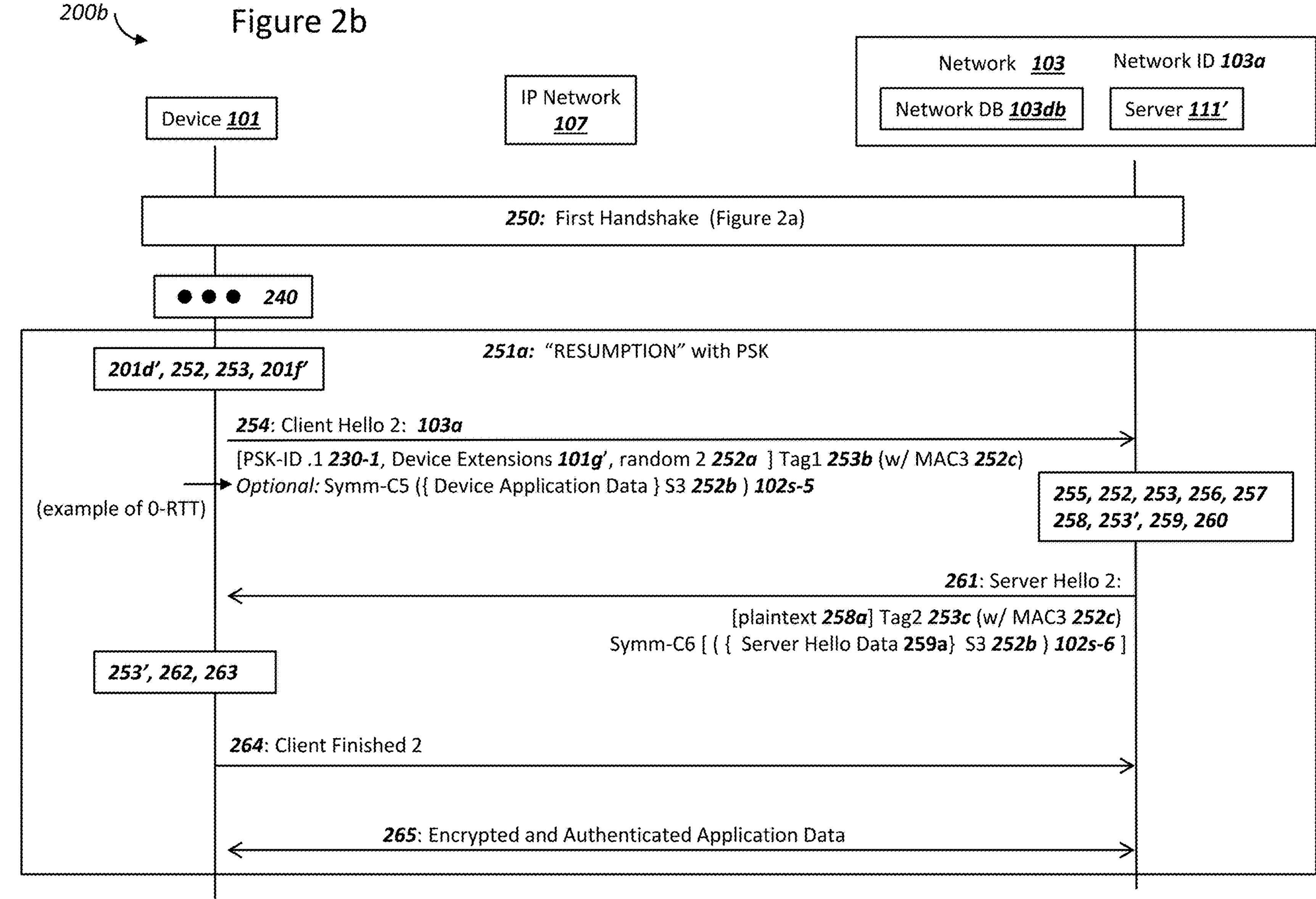

200b
Figure 2b
Device 101
IP Network 107
Network 103
Network ID 103a
Network DB 103db
Server 111'
250: First Handshake (Figure 2a)
240
251a: "RESUMPTION" with PSK
201d', 252, 253, 201f'
254: Client Hello 2: 103a
[PSK-ID .1 230-1, Device Extensions 101g', random 2 252a ] Tag1 253b (w/ MAC3 252c)
Optional: Symm-C5 ({ Device Application Data } S3 252b ) 102s-5
(example of 0-RTT)
255, 252, 253, 256, 257
258, 253', 259, 260
261: Server Hello 2:
[plaintext 258a] Tag2 253c (w/ MAC3 252c)
Symm-C6 [ ( { Server Hello Data 259a} S3 252b ) 102s-6 ]
253', 262, 263
264: Client Finished 2
265: Encrypted and Authenticated Application Data

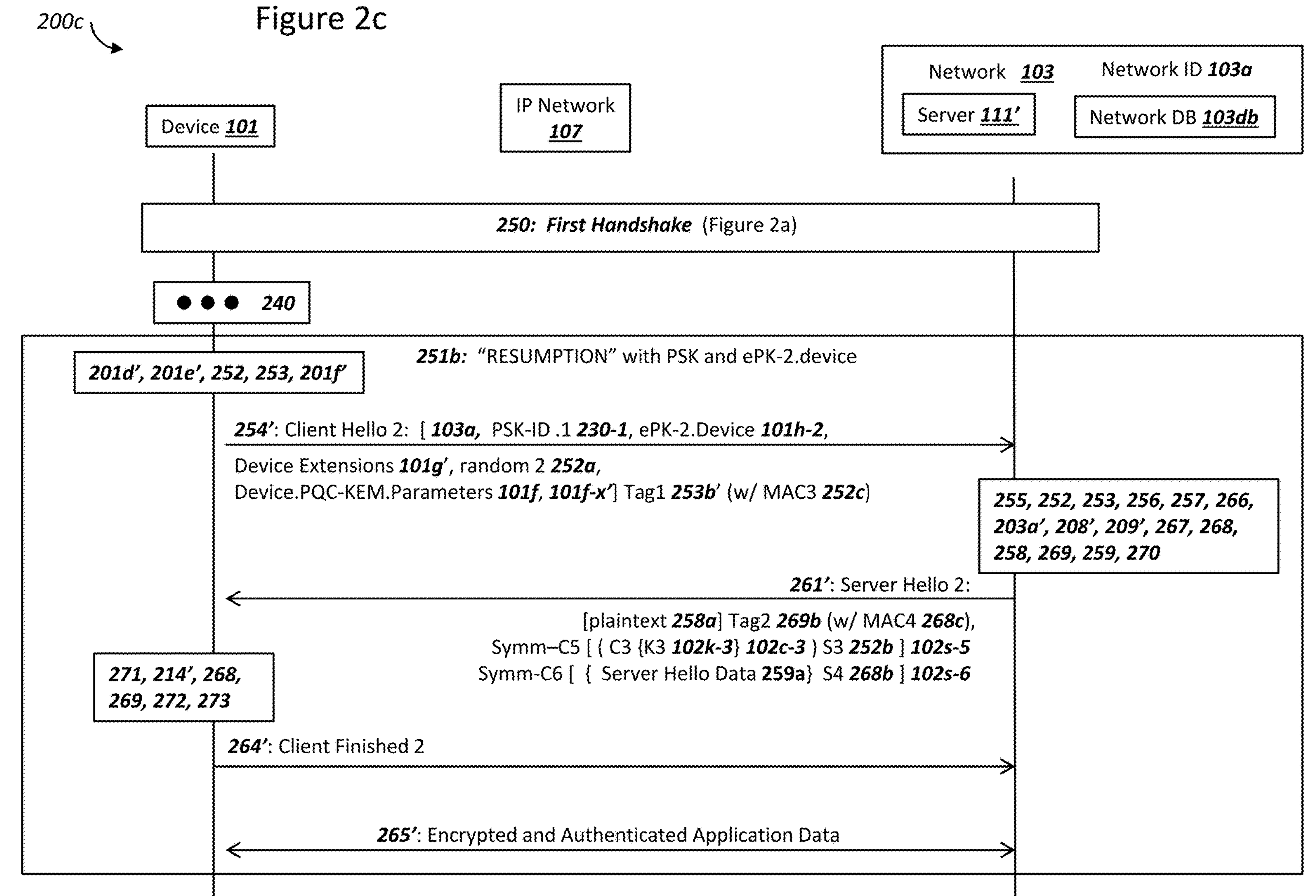
200c
Figure 2c
Device 101
IP Network 107
Network 103
Network ID 103a
Server 111'
Network DB 103db
250: First Handshake (Figure 2a)
240
201d', 201e', 252, 253, 201f'
251b: "RESUMPTION" with PSK and ePK-2.device
254': Client Hello 2: [ 103a, PSK-ID .1 230-1, ePK-2.Device 101h-2,
Device Extensions 101g', random 2 252a,
Device.PQC-KEM.Parameters 101f, 101f-x'] Tag1 253b' (w/ MAC3 252c)
255, 252, 253, 256, 257, 266,
203a', 208', 209', 267, 268,
258, 269, 259, 270
261': Server Hello 2:
[plaintext 258a] Tag2 269b (w/ MAC4 268c),
Symm–C5 [ ( C3 {K3 102k-3} 102c-3 ) S3 252b ] 102s-5
Symm-C6 [ { Server Hello Data 259a} S4 268b ] 102s-6
271, 214', 268,
269, 272, 273
264': Client Finished 2
265': Encrypted and Authenticated Application Data

Figure 4:
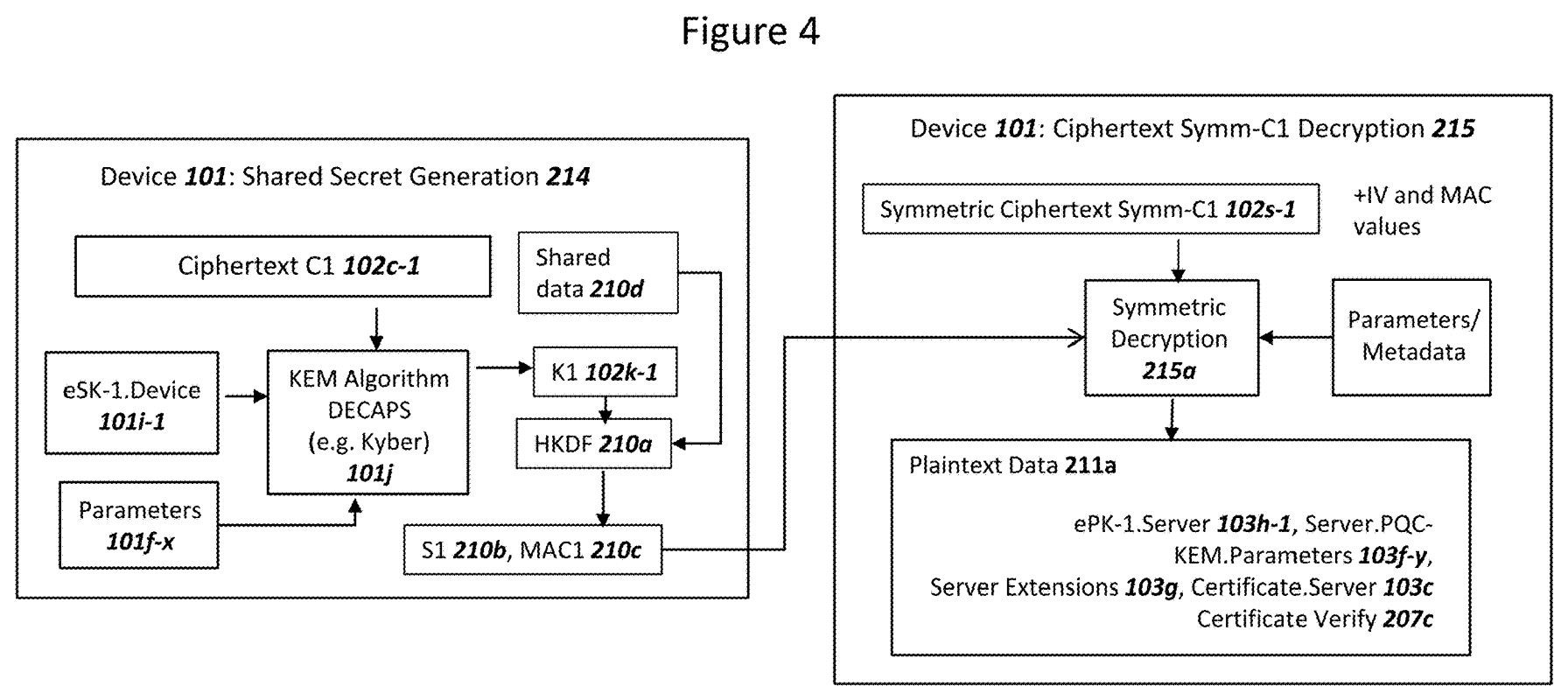

Device 101: Shared Secret Generation 214

Ciphertext C1 102c-1 eSK-1.Device 101i-1

Parameters 101f-x

KEM Algorithm DECAPS (e.g. Kyber) 101j

Shared data 210d

K1 102k-1

HKDF 210a

S1 210b, MAC1 210c

Device 101: Ciphertext Symm-C1 Decryption 215

Symmetric Ciphertext Symm-C1 102s-1

+IV and MAC values

Parameters/ Metadata

Symmetric Decryption 215a

Plaintext Data 211a ePK-1.Server 103h-1, Server.PQC-KEM.Parameters 103f-y, Server Extensions 103g, Certificate.Server 103c Certificate Verify 207c

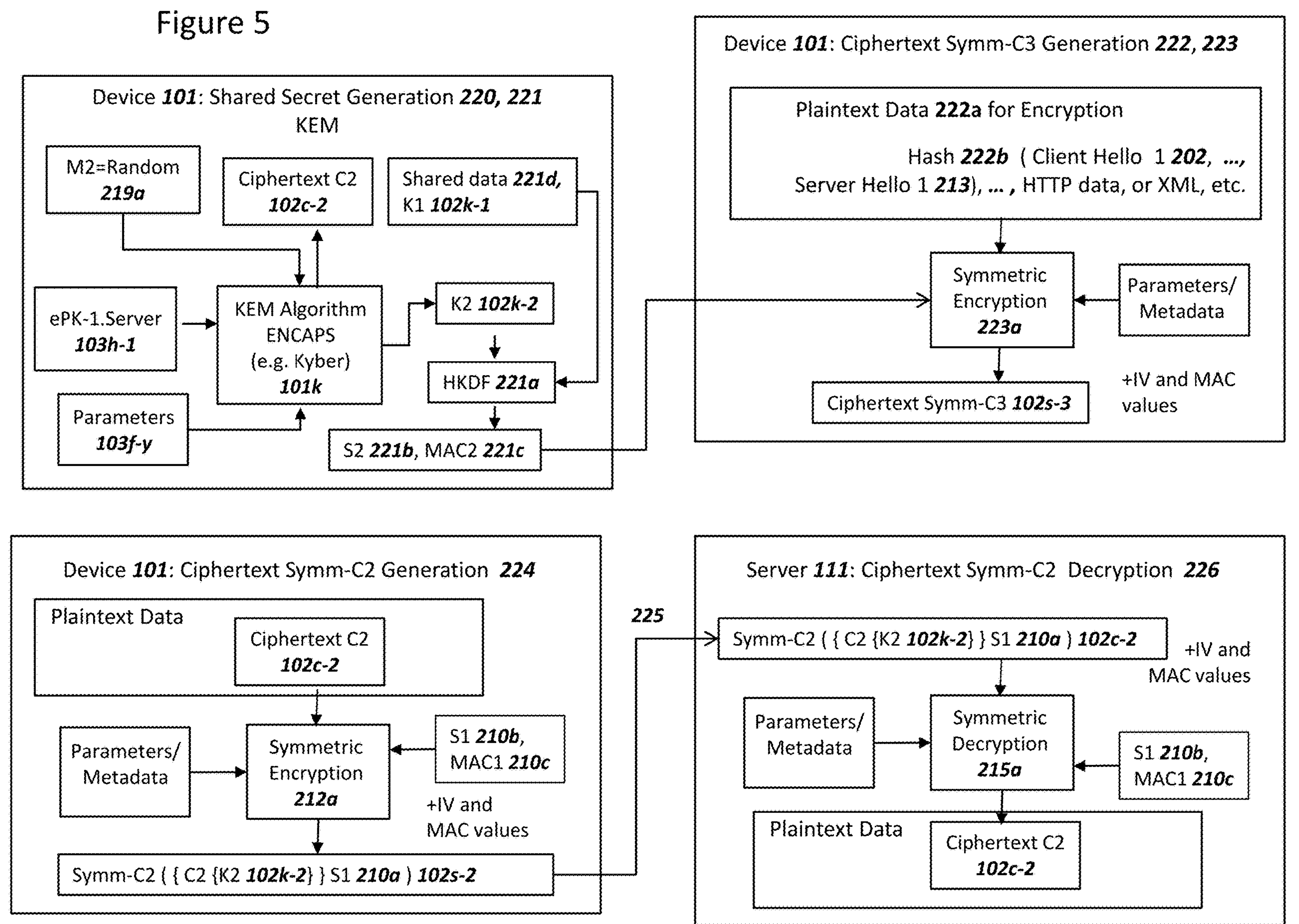
Figure 5
Device 101: Shared Secret Generation 220, 221
KEM
M2=Random 219a
Ciphertext C2 102c-2
Shared data 221d, K1 102k-1
ePK-1.Server 103h-1
KEM Algorithm ENCAPS (e.g. Kyber) 101k
K2 102k-2
HKDF 221a
Parameters 103f-y
S2 221b, MAC2 221c
Device 101: Ciphertext Symm-C3 Generation 222, 223
Plaintext Data 222a for Encryption
Hash 222b ( Client Hello 1 202, ...,
Server Hello 1 213), ... , HTTP data, or XML, etc.
Symmetric Encryption 223a
Parameters/ Metadata
Ciphertext Symm-C3 102s-3
+IV and MAC values
Device 101: Ciphertext Symm-C2 Generation 224
Plaintext Data
Ciphertext C2 102c-2
Parameters/ Metadata
Symmetric Encryption 212a
S1 210b, MAC1 210c
+IV and MAC values
Symm-C2 ( { C2 {K2 102k-2} } S1 210a ) 102s-2
225
Server 111: Ciphertext Symm-C2 Decryption 226
Symm-C2 ( { C2 {K2 102k-2} } S1 210a ) 102c-2
+IV and MAC values
Parameters/ Metadata
Symmetric Decryption 215a
S1 210b, MAC1 210c
Plaintext Data
Ciphertext C2 102c-2

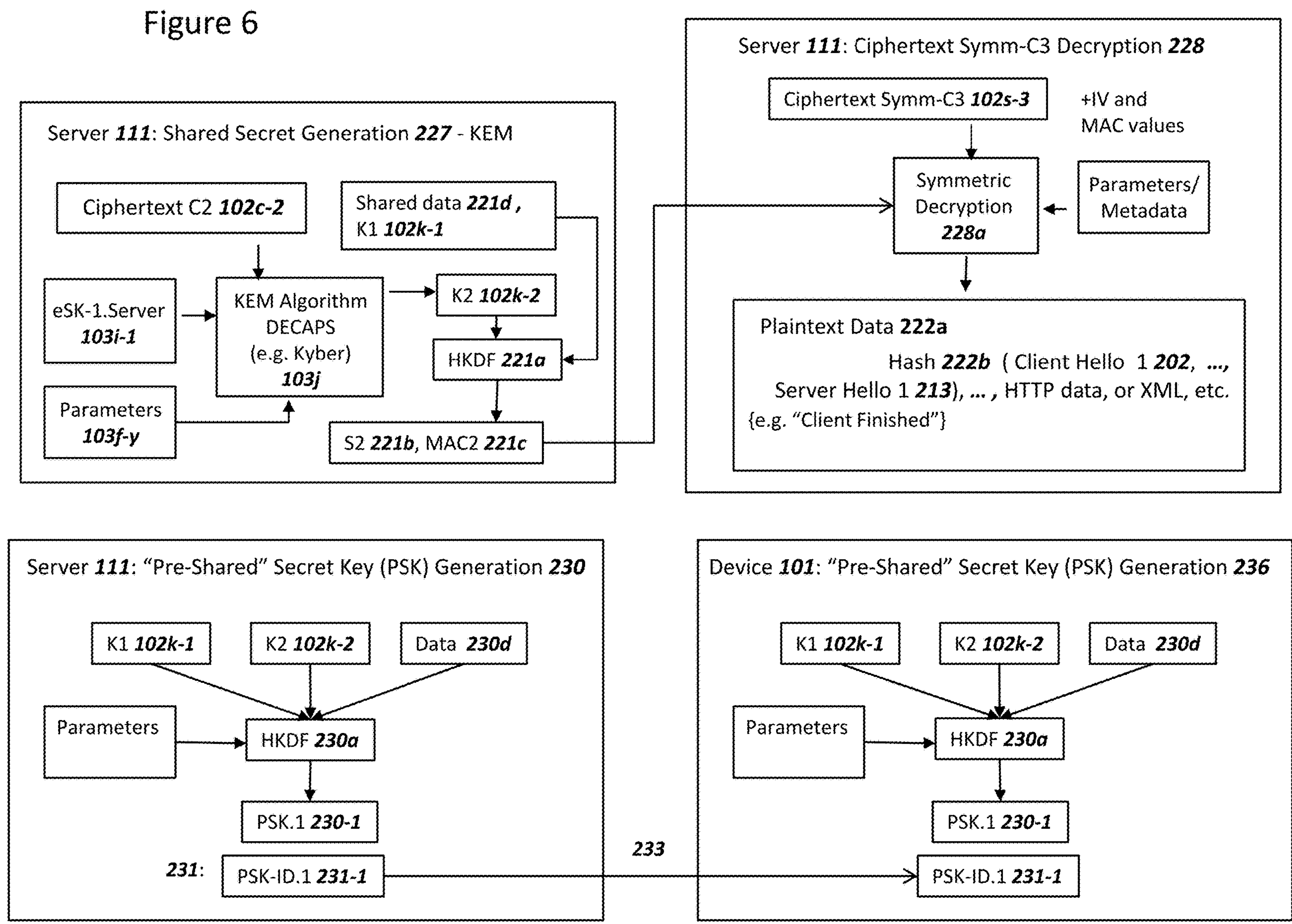

Figure 6
Server 111: Shared Secret Generation 227 - KEM
Ciphertext C2 102c-2
Shared data 221d , K1 102k-1
eSK-1.Server 103i-1
KEM Algorithm DECAPS (e.g. Kyber) 103j
K2 102k-2
HKDF 221a
Parameters 103f-y
S2 221b, MAC2 221c
Server 111: Ciphertext Symm-C3 Decryption 228
Ciphertext Symm-C3 102s-3
+IV and MAC values
Symmetric Decryption 228a
Parameters/ Metadata
Plaintext Data 222a
Hash 222b ( Client Hello 1 202, ..., Server Hello 1 213), ... , HTTP data, or XML, etc.
{e.g. "Client Finished"}
Server 111: "Pre-Shared" Secret Key (PSK) Generation 230
K1 102k-1
K2 102k-2
Data 230d
Parameters
HKDF 230a
PSK.1 230-1
231:
PSK-ID.1 231-1
233
Device 101: "Pre-Shared" Secret Key (PSK) Generation 236
K1 102k-1
K2 102k-2
Data 230d
Parameters
HKDF 230a
PSK.1 230-1
PSK-ID.1 231-1

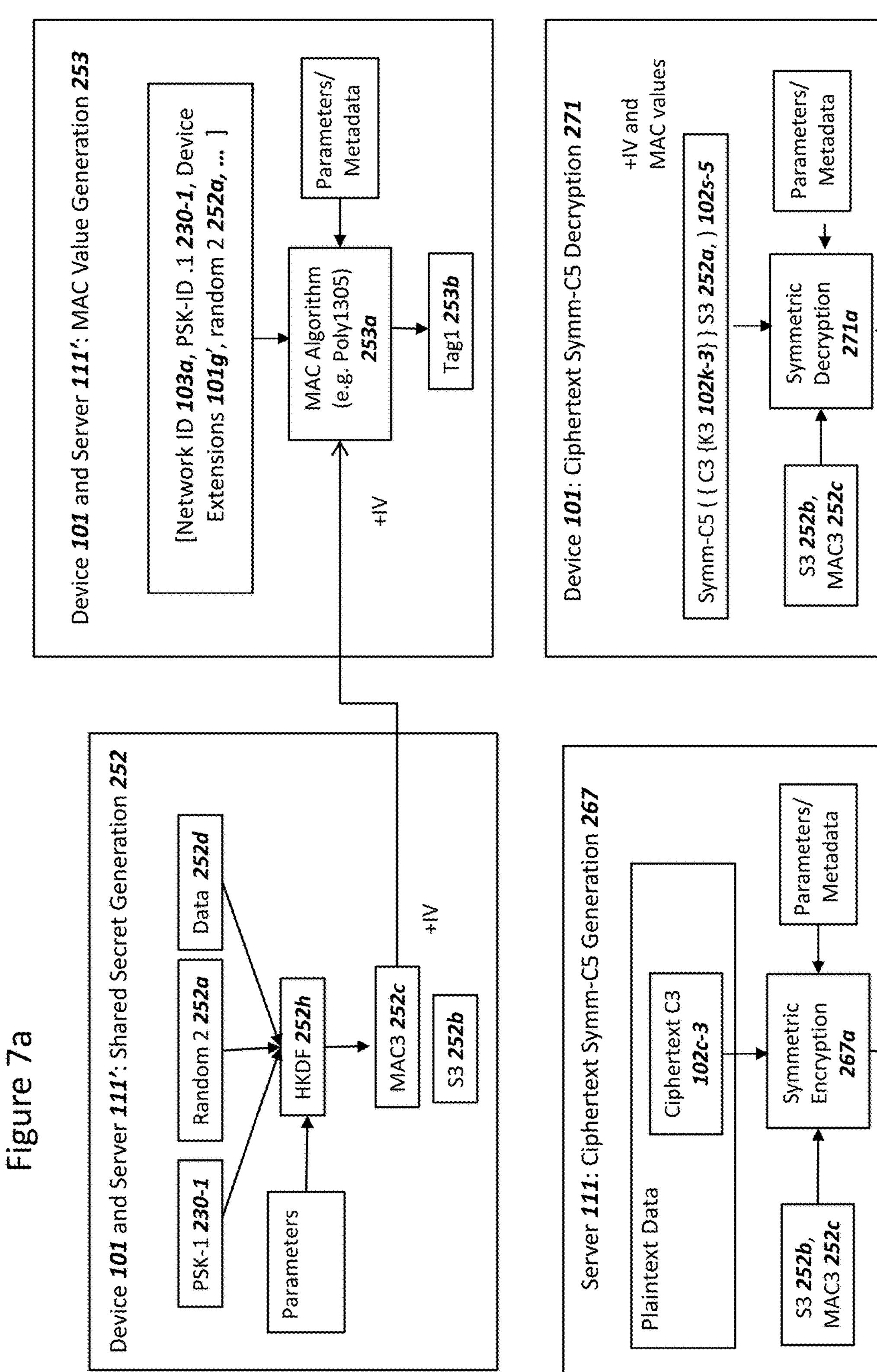
Figure 7a
Device 101 and Server 111': Shared Secret Generation 252
PSK-1 230-1
Random 2 252a
Data 252d
Parameters
HKDF 252h
MAC3 252c
S3 252b
+IV
Device 101 and Server 111': MAC Value Generation 253
[Network ID 103a, PSK-ID .1 230-1, Device Extensions 101g', random 2 252a, ... ]
Parameters/ Metadata
MAC Algorithm (e.g. Poly1305) 253a
Tag1 253b
+IV
Server 111: Ciphertext Symm-C5 Generation 267
Plaintext Data
Ciphertext C3 102c-3
Parameters/ Metadata
Symmetric Encryption 267a
S3 252b, MAC3 252c
Symm-C5 { { C3 {K3 102k-3} } S3 252a, } 102s-5
+IV and MAC values
Device 101: Ciphertext Symm-C5 Decryption 271
+IV and MAC values
Symm-C5 { { C3 {K3 102k-3} } S3 252a, } 102s-5
Parameters/ Metadata
Symmetric Decryption 271a
S3 252b, MAC3 252c
Plaintext Data
Ciphertext C3 102c-3

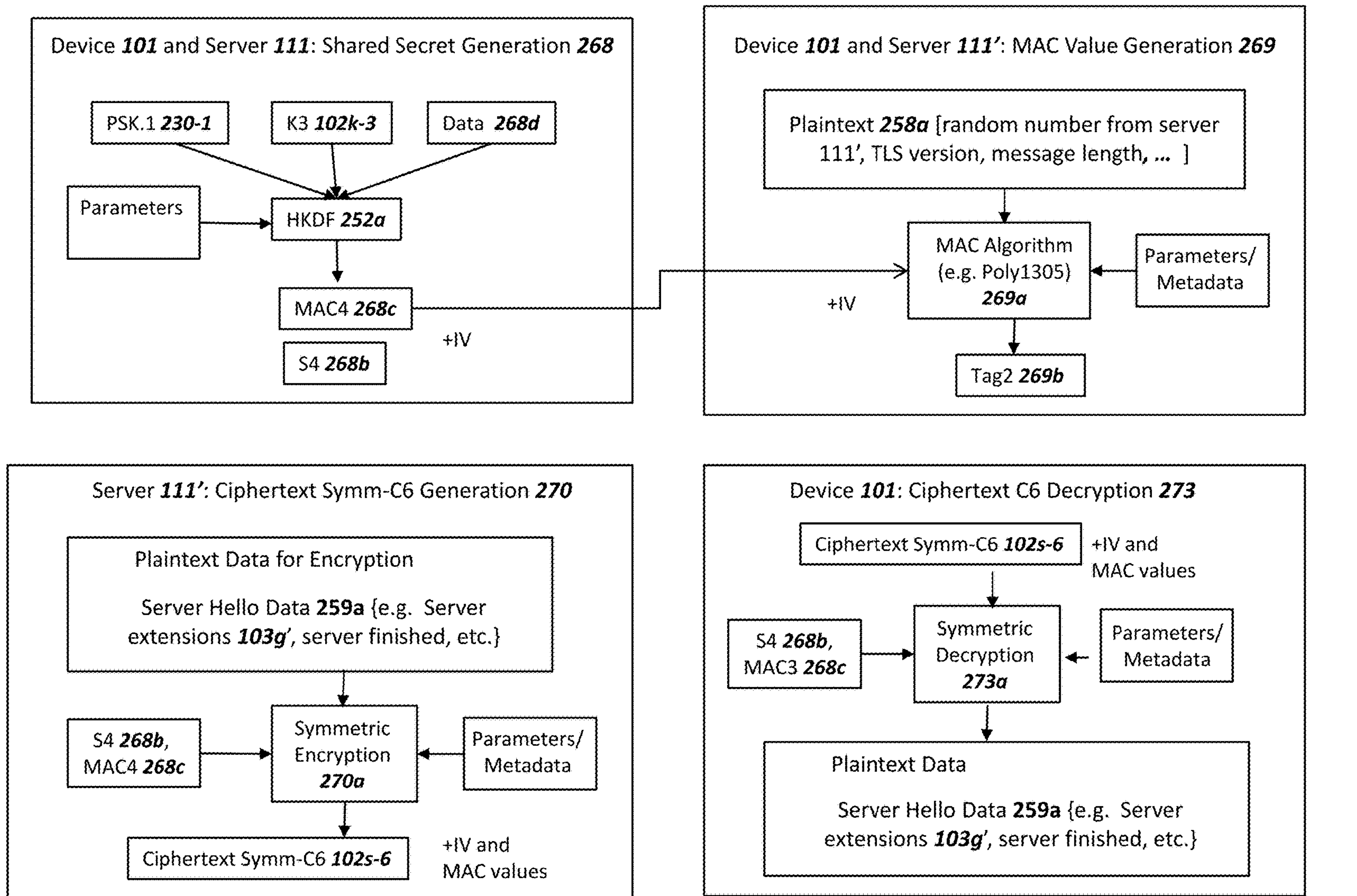
Figure 7b
Device 101 and Server 111: Shared Secret Generation 268
PSK.1 230-1
K3 102k-3
Data 268d
Parameters
HKDF 252a
MAC4 268c
S4 268b
+IV
Device 101 and Server 111': MAC Value Generation 269
Plaintext 258a [random number from server 111', TLS version, message length, ... ]
MAC Algorithm (e.g. Poly1305) 269a
Parameters/ Metadata
+IV
Tag2 269b
Server 111': Ciphertext Symm-C6 Generation 270
Plaintext Data for Encryption
Server Hello Data 259a {e.g. Server extensions 103g', server finished, etc.}
S4 268b, MAC4 268c
Symmetric Encryption 270a
Parameters/ Metadata
Ciphertext Symm-C6 102s-6
+IV and MAC values
Device 101: Ciphertext C6 Decryption 273
Ciphertext Symm-C6 102s-6
+IV and MAC values
S4 268b, MAC3 268c
Symmetric Decryption 273a
Parameters/ Metadata
Plaintext Data
Server Hello Data 259a {e.g. Server extensions 103g', server finished, etc.}

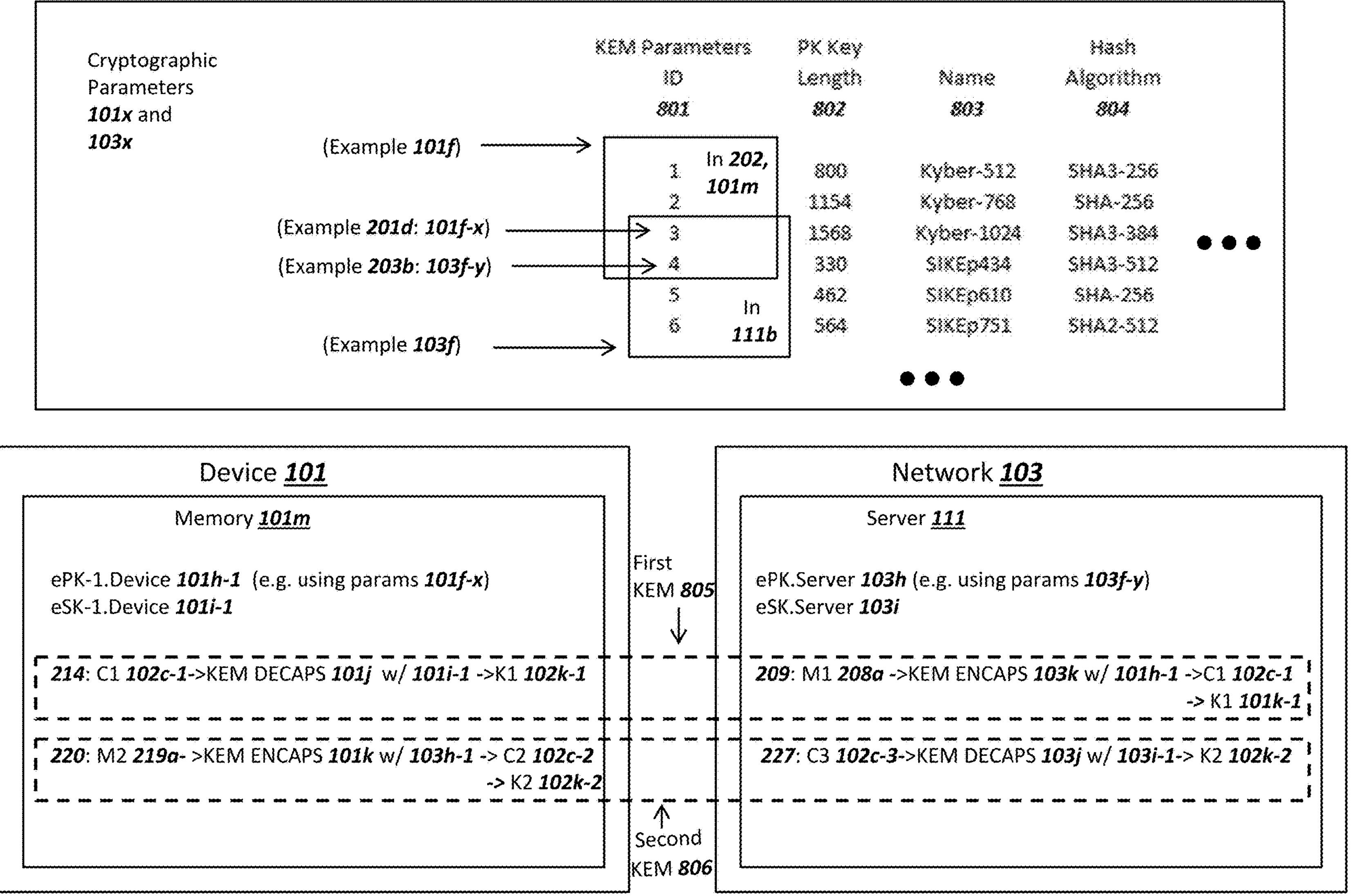
Figure 8
Cryptographic Parameters 101x and 103x
KEM Parameters ID 801
PK Key Length 802
Name 803
Hash Algorithm 804
1 800 Kyber-512 SHA3-256
2 1154 Kyber-768 SHA-256
3 1568 Kyber-1024 SHA3-384
4 330 SIKEp434 SHA3-512
5 462 SIKEp610 SHA-256
6 564 SIKEp751 SHA2-512
In 202, 101m
In 111b
(Example 101f)
(Example 201d: 101f-x)
(Example 203b: 103f-y)
(Example 103f)
Device 101
Memory 101m
ePK-1.Device 101h-1 (e.g. using params 101f-x)
eSK-1.Device 101i-1
214: C1 102c-1->KEM DECAPS 101j w/ 101i-1 ->K1 102k-1
220: M2 219a- >KEM ENCAPS 101k w/ 103h-1 -> C2 102c-2 -> K2 102k-2
First KEM 805
Second KEM 806
Network 103
Server 111
ePK.Server 103h (e.g. using params 103f-y)
eSK.Server 103i
209: M1 208a ->KEM ENCAPS 103k w/ 101h-1 ->C1 102c-1 -> K1 101k-1
227: C3 102c-3->KEM DECAPS 103j w/ 103i-1-> K2 102k-2

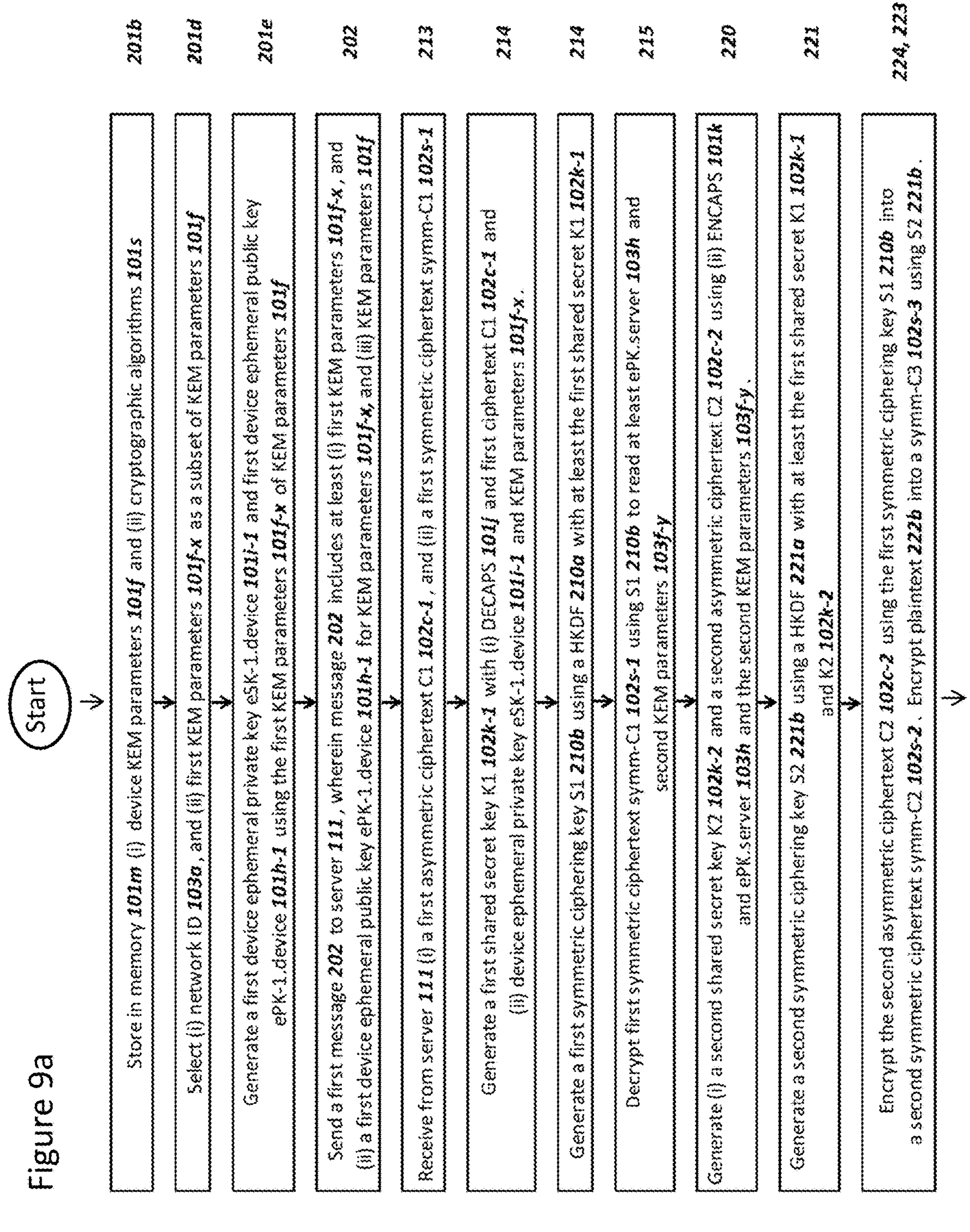
Figure 9a
Start
Store in memory 101m (i) device KEM parameters 101f and (ii) cryptographic algorithms 101s
201b
Select (i) network ID 103a , and (ii) first KEM parameters 101f-x as a subset of KEM parameters 101f
201d
Generate a first device ephemeral private key eSK-1.device 101i-1 and first device ephemeral public key ePK-1.device 101h-1 using the first KEM parameters 101f-x of KEM parameters 101f
201e
Send a first message 202 to server 111 , wherein message 202 includes at least (i) first KEM parameters 101f-x , and (ii) a first device ephemeral public key ePK-1.device 101h-1 for KEM parameters 101f-x, and (iii) KEM parameters 101f
202
Receive from server 111 (i) a first asymmetric ciphertext C1 102c-1 , and (ii) a first symmetric ciphertext symm-C1 102s-1
213
Generate a first shared secret key K1 102k-1 with (i) DECAPS 101j and first ciphertext C1 102c-1 and (ii) device ephemeral private key eSK-1.device 101i-1 and KEM parameters 101f-x .
214
Generate a first symmetric ciphering key S1 210b using a HKDF 210a with at least the first shared secret K1 102k-1
214
Decrypt first symmetric ciphertext symm-C1 102s-1 using S1 210b to read at least ePK.server 103h and second KEM parameters 103f-y
215
Generate (i) a second shared secret key K2 102k-2 and a second asymmetric ciphertext C2 102c-2 using (ii) ENCAPS 101k and ePK.server 103h and the second KEM parameters 103f-y .
220
Generate a second symmetric ciphering key S2 221b using a HKDF 221a with at least the first shared secret K1 102k-1 and K2 102k-2
221
Encrypt the second asymmetric ciphertext C2 102c-2 using the first symmetric ciphering key S1 210b into a second symmetric ciphertext symm-C2 102s-2 . Encrypt plaintext 222b into a symm-C3 102s-3 using S2 221b .
224, 223
Continued in Figure 9b

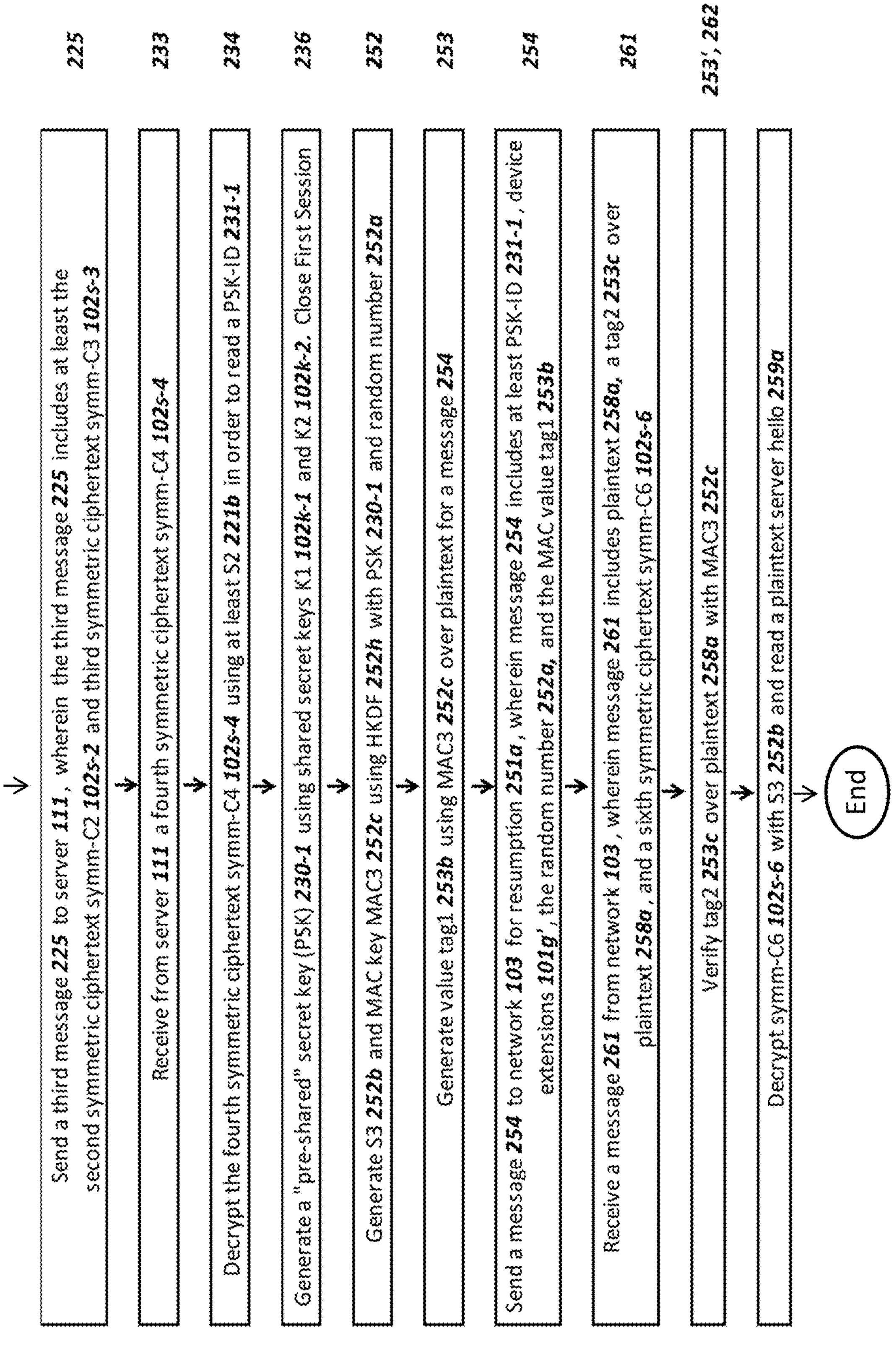
Figure 9b
Continued from Figure 9a
Send a third message 225 to server 111, wherein the third message 225 includes at least the second symmetric ciphertext symm-C2 102s-2 and third symmetric ciphertext symm-C3 102s-3
225
Receive from server 111 a fourth symmetric ciphertext symm-C4 102s-4
233
Decrypt the fourth symmetric ciphertext symm-C4 102s-4 using at least S2 221b in order to read a PSK-ID 231-1
234
Generate a "pre-shared" secret key (PSK) 230-1 using shared secret keys K1 102k-1 and K2 102k-2. Close First Session
236
Generate S3 252b and MAC key MAC3 252c using HKDF 252h with PSK 230-1 and random number 252a
252
Generate value tag1 253b using MAC3 252c over plaintext for a message 254
253
Send a message 254 to network 103 for resumption 251a, wherein message 254 includes at least PSK-ID 231-1, device extensions 101g', the random number 252a, and the MAC value tag1 253b
254
Receive a message 261 from network 103, wherein message 261 includes plaintext 258a, a tag2 253c over plaintext 258a, and a sixth symmetric ciphertext symm-C6 102s-6
261
Verify tag2 253c over plaintext 258a with MAC3 252c
253', 262
Decrypt symm-C6 102s-6 with S3 252b and read a plaintext server hello 259a
End

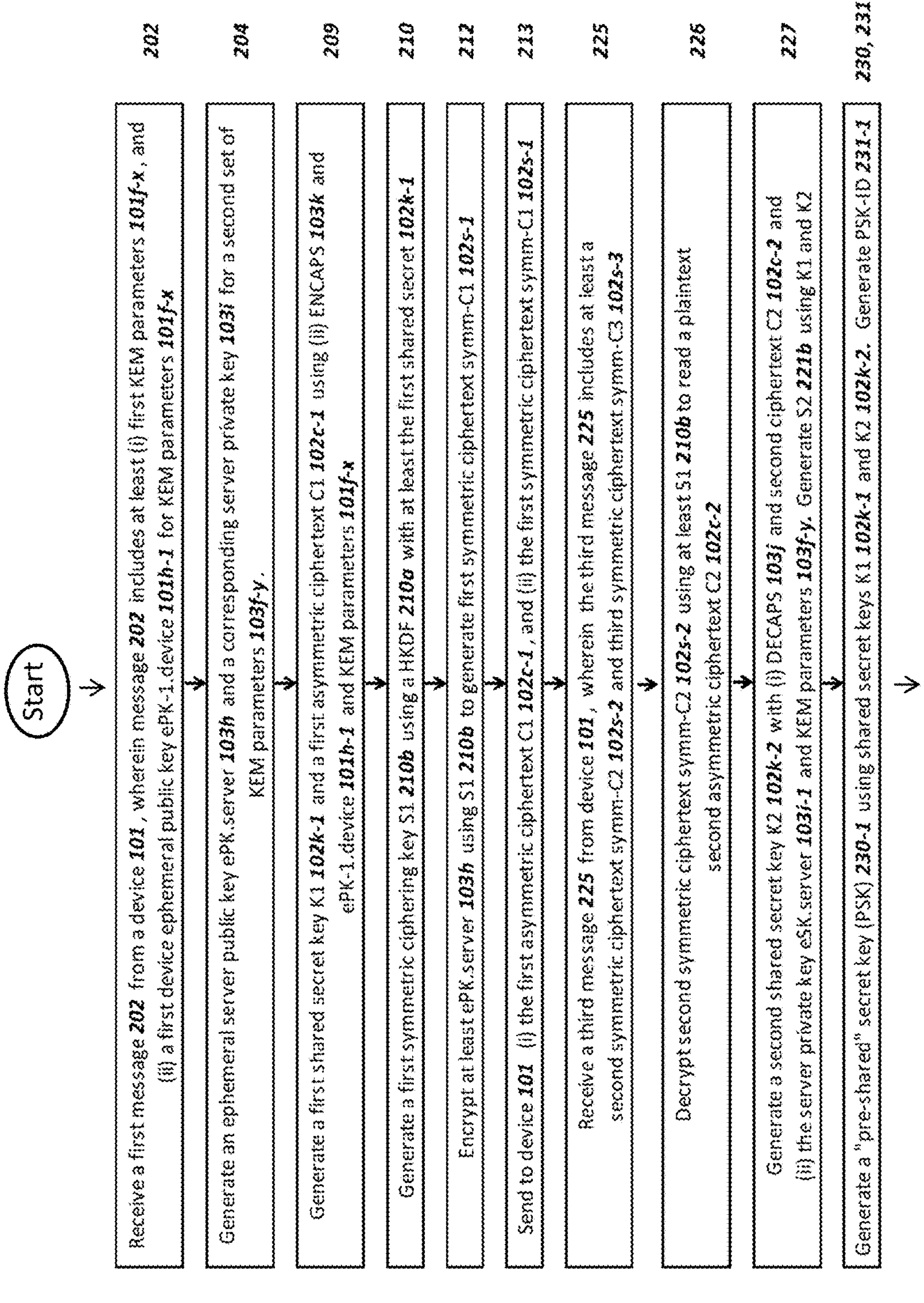
Figure 10a
Start
Receive a first message 202 from a device 101, wherein message 202 includes at least (i) first KEM parameters 101f-x, and (ii) a first device ephemeral public key ePK-1.device 101h-1 for KEM parameters 101f-x
202
Generate an ephemeral server public key ePK.server 103h and a corresponding server private key 103i for a second set of KEM parameters 103f-y.
204
Generate a first shared secret key K1 102k-1 and a first asymmetric ciphertext C1 102c-1 using (ii) ENCAPS 103k and ePK-1.device 101h-1 and KEM parameters 101f-x
209
Generate a first symmetric ciphering key S1 210b using a HKDF 210a with at least the first shared secret 102k-1
210
Encrypt at least ePK.server 103h using S1 210b to generate first symmetric ciphertext symm-C1 102s-1
212
Send to device 101 (i) the first asymmetric ciphertext C1 102c-1, and (ii) the first symmetric ciphertext symm-C1 102s-1
213
Receive a third message 225 from device 101, wherein the third message 225 includes at least a second symmetric ciphertext symm-C2 102s-2 and third symmetric ciphertext symm-C3 102s-3
225
Decrypt second symmetric ciphertext symm-C2 102s-2 using at least S1 210b to read a plaintext second asymmetric ciphertext C2 102c-2
226
Generate a second shared secret key K2 102k-2 with (i) DECAPS 103j and second ciphertext C2 102c-2 and (ii) the server private key eSK.server 103i-1 and KEM parameters 103f-y. Generate S2 221b using K1 and K2
227
Generate a "pre-shared" secret key (PSK) 230-1 using shared secret keys K1 102k-1 and K2 102k-2. Generate PSK-ID 231-1
230, 231
Continued in Figure 10b

Figure 10b

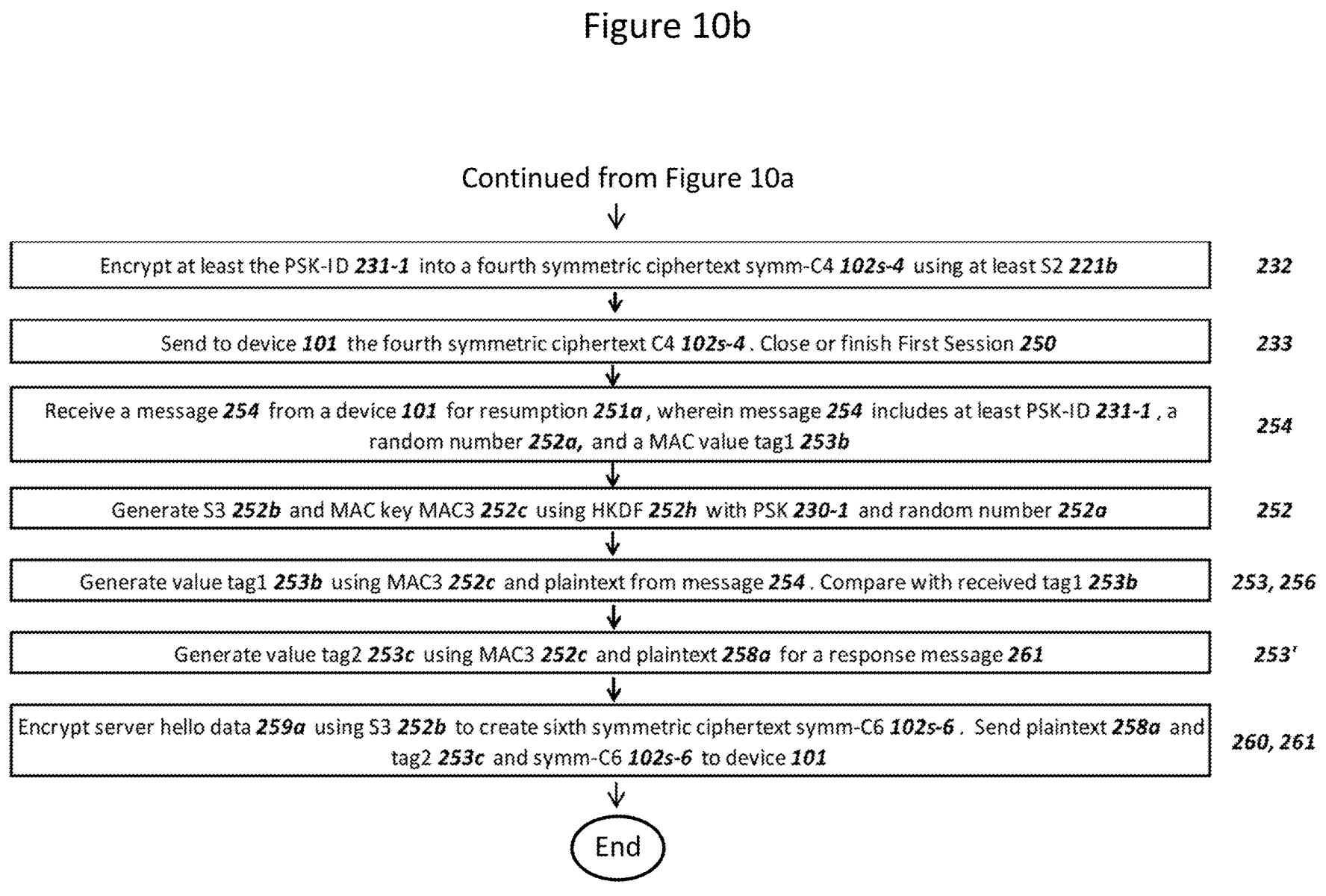

Continued from Figure 10a

Encrypt at least the PSK-ID *231-1* into a fourth symmetric ciphertext symm-C4 *102s-4* using at least S2 *221b* — *232*

Send to device *101* the fourth symmetric ciphertext C4 *102s-4*. Close or finish First Session *250* — *233*

Receive a message *254* from a device *101* for resumption *251a*, wherein message *254* includes at least PSK-ID *231-1*, a random number *252a*, and a MAC value tag1 *253b* — *254*

Generate S3 *252b* and MAC key MAC3 *252c* using HKDF *252h* with PSK *230-1* and random number *252a* — *252*

Generate value tag1 *253b* using MAC3 *252c* and plaintext from message *254*. Compare with received tag1 *253b* — *253, 256*

Generate value tag2 *253c* using MAC3 *252c* and plaintext *258a* for a response message *261* — *253'*

Encrypt server hello data *259a* using S3 *252b* to create sixth symmetric ciphertext symm-C6 *102s-6*. Send plaintext *258a* and tag2 *253c* and symm-C6 *102s-6* to device *101* — *260, 261*

End

Figure 11
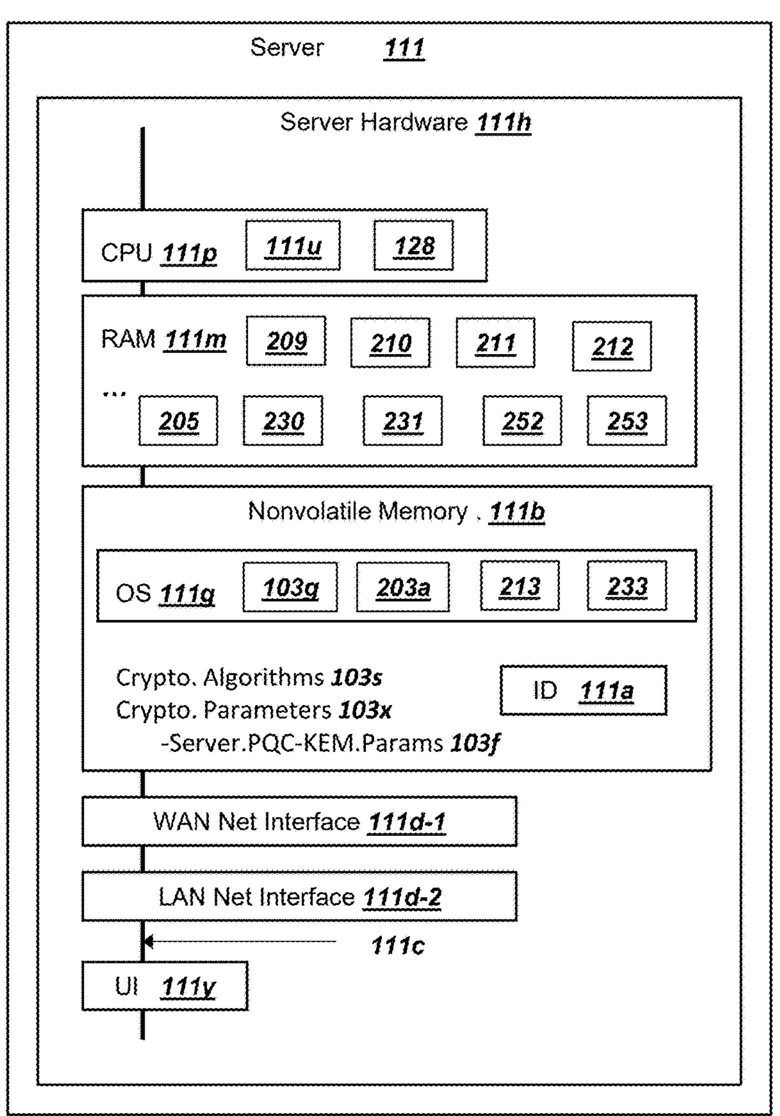
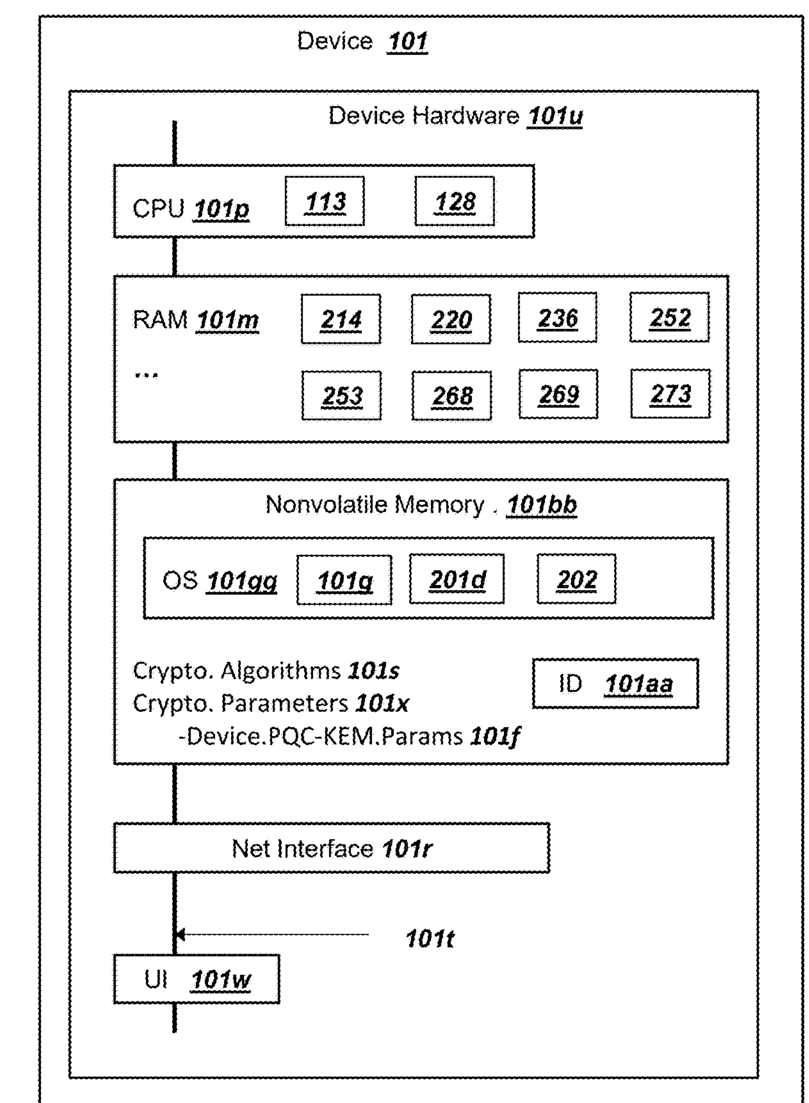

SECURE SESSION RESUMPTION USING POST-QUANTUM CRYPTOGRAPHY

CROSS-REFERENCE TO RELATED APPLICATIONS

This application is a continuation of U.S. patent application Ser. No. 18/063,192, filed on Dec. 8, 2022, which claims the benefit of U.S. Provisional Application Ser. No. 63/287,384, filed on Dec. 8, 2021, both of which are hereby incorporated by reference in their entireties.

BACKGROUND

Technical Field

The present systems and methods relate to devices and servers securing communications using post-quantum cryptography (PQC) key encapsulation mechanisms (KEM) with authentication, and more particularly to generating "pre-shared keys" from a first session handshake for subsequent secure communications, in order to improve efficiency, increase flexibility, and enhance data session security.

Description of Related Art

Many protocols for secure communications through the public Internet depend on classical public key infrastructure (PKI) algorithms of Rivest-Shamir-Adleman (RSA), Diffie-Hellman (DH), or elliptic curve cryptography (ECC). ECC algorithms include elliptic curve Diffie-Hellman (ECDH) key exchanges. Example protocols as of November 2021 include current, published versions of Transport Layer Security (TLS), Secure Shell (SSH), Datagram Transport Layer Security (DTLS), the embedded SIM from the GSMA, the Device Provisioning Protocol (DPP) from the WiFi Alliance™, the Open Firmware Loader from Global Platform, and IP Security (IPSec). Many other examples exist as well. The security of the majority of communications on the public Internet today depend on at least one of RSA, DH, or ECC based algorithms.

Although the use of RSA, DH, and ECC algorithms are included in many different protocols and standards, quantum computers are expected to be able to solve both (i) the elliptic curve discrete logarithm problem (for DH and ECC algorithms) and (ii) the integer factorization problem (for RSA algorithms) in polynomial time, while classical computers solve the problem in exponential time or sub-exponential time. As of mid 2020, estimates for the number of high quality and long coherent logical qubits required to feasibly break a 256 bit ECC public key to determine the private key with a reasonable computation time are approximately 2000-4000 qubits. Estimates for the number of equivalent logical qubits required to break a 3072 bit RSA based PKI public key to determine the private key are approximately 4000-8000 qubits. Current industry projections of the number of qubits for operating quantum computers project this number of qubits could be available for a computing device in approximately 10 years and likely within 15 years. Consequently, a need exists in the art for secure sessions to support cryptographic algorithms based on hard problems for quantum computers that are not based on either the elliptic curve discrete logarithm problem or the integer factorization problem. A need exists in the art for secure sessions to continue using PKI keys for exchanging shared secrets, where a public key can be publicly shared and the corresponding private keys securely stored.

The National Institute of Standards and Technology (NIST) in 2021 continues to conduct a project for Post-Quantum Cryptography (PQC) Standardization. The field of post-quantum cryptography continues to develop with proposed algorithms currently undergoing as of December 2021 detailed evaluation and revisions for standardization. In general, the leading candidates for post-quantum cryptography key exchange or "key encapsulation mechanisms" (KEM) propose using lattice-based algorithms, code-based algorithms, or Supersingular Isogeny Key Encapsulation (SIKE). These proposed algorithms are described by the Wikipedia article for "NIST Post-Quantum Cryptography Standardization" dated Oct. 29, 2021, which is hereby incorporated by reference and referred to as the Wikipedia PQC article. The above KEM algorithms propose, in summary, a first party deriving a PKI key pair, sending a public key to a second party, receiving a ciphertext processed with the public key from the second party, and processing the ciphertext with a private key in order determine a shared secret key for both the first party and the second party.

The exemplary algorithms for PQC KEM standardization generally have less long-term, detailed study and confirmation of security of the associated underlying "hard" problems, compared to integer factoring and calculating discrete logarithms. Consequently, the emergence of cryptographically relevant quantum computers (QRQC) over approximately the coming decade (which may feasibly solve current hard problems for PKI cryptography commonly used) requires the industry to shift to cryptographic algorithms that have potential uncertainty for long-term security. In other words, it is currently not proven that lattice-based cryptography, code-based cryptography, or SIKE problems cannot be solved in polynomial time by either classical computers or quantum computers. A need exists in the art for secure sessions using PQC algorithms to provide security greater than the security provided by any single PQC algorithm (e.g. lattice-based, code-based, or SIKE), in order to reduce concerns and uncertainty about migrating from RSA, ECC, DH algorithms to PQC algorithms.

The most widely deployed standard for secure sessions on the public Internet today is TLS version 1.2 as specified in the Internet Engineering Task Force (IETF) 5246. As one example, the Payment Card Industry Security Standards Council recommends at least TLS v1.2 as of late-2021. TLS version 1.2 normally requires that four handshake messages are exchanged before a device or client can receive server encrypted application data. The four handshake messages result in a single initial shared secret key and symmetric encryption derived from a single algorithm using PKI (e.g. RSA, DH, or ECDH). Many large corporations and web sites are also adding support for TLS version 1.3. TLS version 1.3 supports a device or client sending the server encrypted device application data after two handshake messages (e.g. "Client Hello" and "Server Hello"), but again only supports a single initial shared secret key derived from a single PKI algorithm for key exchange.

If the single PKI algorithm is found weakened with either classical computers or cryptographically relevant quantum computers, then the single initial shared secret key used for encryption may no longer be adequately secured, and the overall secure session for data confidentiality may also no longer be secured. A need exists in the art for secure sessions to use PQC KEM for generating two initial shared secrets that are independently generated based on two different PQC KEM algorithms, such that if one of the initial shared secrets is found weakened with either classical computers or cryptographically relevant quantum computers, then the overall secure session for data confidentiality can still be secured by the other initial shared secret.

A need exists in the art for a device and a server to transmit and receive encrypted application data with both (i) a minimal number of handshake messages, while (ii) simultaneously supporting two distinct PQC KEM algorithms. In other words, new technology is needed for secure communication to be established with the minimum number of messages such that two distinct PQC KEM algorithms could also be utilized. A need exists in the art for both efficiency (from minimal handshake messages) while preferably supporting two distinct PQC KEM algorithms (where overall security is at least the stronger of the two PQC KEM algorithms), such that future potential weaknesses from any single PQC KEM algorithm has minimal impact on the overall security established for the session.

Secure sessions between a device and a server should also preferably support forward secrecy. In general forward secrecy is supported through the use of at least one ephemeral PKI key pair from either the device or the server, which is available with conventional technology. In this manner, shared secret keys and resulting symmetric ciphering keys are generally not compromised from the release or compromise of a static private key used to establish the secure session, such as a static private key for generating. As one example, TLS v 1.3 provides forward secrecy through the use of two ephemeral ECDH PKI key pairs (one for the client and one for the server). However, the two ephemeral ECDH PKI key pairs are used for a single ECDH key exchange which results in both (i) a single initial shared secret key and (ii) security that depends on a single algorithm (e.g. ECC). A need exists in the art for a client/device and a server/host to both (i) obtain forward secrecy through the use of ephemeral PKI keys, and (ii) obtain security for the session from two distinct PQC algorithms (e.g. two algorithms from lattice-based algorithms, code-based algorithms, and SIKE).

With conventional technology, KEM algorithms with openly shared public keys can be subject to "Man in the Middle" (MITM) attackers that can try to substitute public keys such as an unauthenticated device ephemeral public key, and/or a server ephemeral public key with an ephemeral public key for the attacker. Establishing a secure session with KEM algorithms that are resistant to MITM attackers increase complexity as well as potentially requiring additional message and data shared within the handshake messages. A need exists in the art for both a device and a server to efficiently use PQC KEM algorithms with the minimum number of handshake messages and reduced additional data in order to establish secure communications resistant to a MITM attacker.

The use of secure sessions between devices and servers can prefer to use session resumption. After initial handshake messages and the transfer of encrypted application data, session may be closed at the networking layer using transmission control protocol (TCP) or user datagram protocol (UDP) packets. A device and a server can resume the session using keys and identifiers generated during the initial session. The benefit is that bandwidth and computational resources can be conserved with session resumption by avoiding the full set of handshake messages. The benefit of session resumption can include avoiding a second time (i) the derivation of the first and second shared secrets a second time and (ii) generation/verification of digital signatures. Conventional technology for secure sessions, such as TLS version 1.3, supports resumed sessions with a "pre-shared" secret key (from the initial session) and equivalent mechanisms are provided with earlier versions of TLS. However, with TLS 1.3, the only shared secret generated by the device and server is a single shared secret from an (EC)DH key exchange. Increased risks for lower security resulting from a single shared secret are discussed above. A need exists in the art for secure sessions using PQC KEM to support session resumption in a manner that supports deriving a "pre-shared" secret key from previously established shared secret keys. A need exists in the art for the device and the server share identification regarding the "pre-shared" secret key in a manner that is more secure than provided with TLS 1.3 and previous versions. A need exists in the art for the "pre-shared" secret key to be secured against cryptographically relevant quantum computers.

Conventional technology for resuming secure sessions, such as within TLS 1.3, does not support the use of message authentication code (MAC) values over data in a second "Client Hello" message for resuming a secure session. Likewise, conventional technology does not support MAC values that are generated in a manner that is secured against cryptographically relevant quantum computers. A MITM attacker could receive a second "Client Hello" message for resuming secure sessions supporting PQC algorithms. The MITM attacker could feasibly attempt to alter data within the second "Client Hello" message that does not include MAC values. A need exists in the art to securely generate MAC values for a second "Client Hello" message to resume a session, where the MAC values can be generated using data from the first session and also be secured against cryptographically relevant quantum computers.

Many other examples exist as well for needs in the art for devices and servers or networks to support PQC KEM algorithms resistant to quantum computers. The above examples are just a few and intended to be illustrative instead of limiting.

SUMMARY

Methods and systems are provided for a device and a server to establish secure communications based on post-quantum cryptography (PQC) key encapsulation mechanisms (KEM). Methods and systems are provided for a device and a server to securely resume a first session that was based on the PQC KEM. The methods and systems provided herein can address exemplary needs in the art described above and other benefits are available as well, including increasing the security from using both a first KEM and a second KEM during the initial handshake messages for establishing a secure session or secured communications. In exemplary embodiments, a device or client can support a first set of PQC KEM algorithms and a server can support a second set of PQC KEM algorithms. The first and second sets of PQC KEM algorithms can support at least a first mutually shared PQC KEM algorithm and a second mutually shared PQC KEM algorithm. The device can derive a device ephemeral public key and device ephemeral private key for the first mutually shared PQC KEM algorithm.

The device can send the server a first message, which could comprise a "Client Hello" message. The first message can include (i) the device ephemeral public key, (ii) an identifier or code specifying the first mutually shared PQC KEM algorithm for the device ephemeral public key, and (ii) the first set of PQC KEM algorithms supported by the device. The server can receive the first message and select the second mutually shared PQC KEM algorithm from overlap between (i) the first set of PQC KEM algorithms supported by the device and (ii) the second set of PQC KEM algorithms supported by the server. In exemplary embodiments the first mutually shared PQC KEM algorithm selected by the device can support a type comprising one of lattice-based cryptography, code-based cryptography, and SIKE. In exemplary embodiments the second mutually shared PQC KEM algorithm selected by the server can support a type both (i) comprising one of lattice-based cryptography, code-based cryptography, and SIKE, and (ii) different than the type selected by the device. In this manner, two different types of PQC KEM algorithms can be mutually supported and subsequently used by both the device and the server.

An exemplary system can include a computing device and a server. The server can be operated and controlled by a network. The server can include server computing hardware, where computer hardware can comprise electrical components for processing, storing, sending or transmitting, and receiving data, including communication with other nodes via data networks. For some exemplary embodiments, a server can comprise a virtual machine operating on a host server, where the host server includes server computing hardware. Server computing hardware can include at least one processor in order to store and record data as well as communicate with other nodes over an IP network, such as with a computing device operating at a remote location from the server.

The computing device could comprise a smartphone, a laptop computer, a second server, a smart camera, an intelligent sensor for the "internet of things", a tracking device, health monitoring equipment in a hospital, a desktop computer, and other possibilities exist as well. The computing device operates a client program or executable instructions by a processor in the device for communicating with the server. Both the device and the server can store cryptographic algorithms for processing both (i) the first mutually shared PQC KEM algorithm selected by the device and (ii) the second mutually shared PQC KEM algorithm selected by the server. Both the device and the server can store (i) a first set of parameters associated with the first mutually shared PQC KEM algorithm selected by the device and (ii) the second mutually shared PQC KEM algorithm selected by the server.

The server can derive a server ephemeral private key and a corresponding server ephemeral public key using the second mutually shared PQC KEM algorithm selected by the server. The server can conduct a first KEM using a KEM encapsulation function (KEM ENCAPS) with (i) the received device ephemeral public key from the first message and (ii) the first mutually shared PQC KEM algorithm selected by the device. The output of the KEM ENCAPS can be both (i) a first asymmetric ciphertext C1 and (ii) a first shared secret key K1.

The server can store a server certificate and a corresponding server static public key. The server can generate a digital signature over at least (i) the derived server ephemeral public key, and (ii) at least one of the first asymmetric ciphertext C1 and the first shared secret key K1. The server can use a first hash-based key derivation function or an HMAC-based Extract-and-Expand Key Derivation Function (HKDF) with at least the first shared secret key K1 to derive at least a first symmetric ciphering key.

The server can use a symmetric ciphering algorithm and the first symmetric ciphering key to encrypt into a first symmetric ciphertext symm-C1 at least (i) the derived server ephemeral public key, (ii) an identity or code for the second mutually shared PQC KEM algorithm selected by the server, (iii) the server certificate, and (iv) the digital signature. The server can generate a response second message that includes at least (i) metadata for the symmetric ciphering algorithm (e.g. at least an identity or parameters for the symmetric ciphering algorithm), (ii) the first asymmetric ciphertext C1, and (iii) the first symmetric ciphertext symm-C1. The server can send the response second message to the device, and the response second message can comprise a "Server Hello" message.

The device can receive the response second message and conduct a series of steps in order to process the message. The device can conduct the first KEM using a KEM decapsulation function (KEM DECAPS) with the received first asymmetric ciphertext in order to mutually derive or generate the first shared secret key K1. The device can use the first HKDF with at least the first shared secret key K1 to mutually derive at least the first symmetric ciphering key. The device can use (i) the metadata, (ii) the symmetric ciphering algorithm, and (iii) the mutually derived first symmetric ciphering key to decrypt the first symmetric ciphertext symm-C1 into a plaintext. The device can use the server certificate from the plaintext to verify the digital signature. Note that the digital signature can be verified over at least one of the first asymmetric ciphertext C1 and the first shared secret key K1, and in this manner the device can confirm that the first asymmetric ciphertext C1 and the corresponding response second message originated by the server (and not from a potential "Man in the Middle" attacker). The device can verify the server certificate up to a securely stored certificate issuer certificate.

The device can conduct a second KEM using a KEM encapsulation function (KEM ENCAPS) with (i) the received server ephemeral public key from the plaintext (e.g. transmitted within the first symmetric ciphertext symm-CT) and (ii) the second mutually shared PQC KEM algorithm selected by the server also from the plaintext. The output of the KEM ENCAPS can be both (i) a second asymmetric ciphertext C2 and (ii) a second shared secret key K2.

In some exemplary embodiments, the second asymmetric ciphertext C2 can be "double encrypted" into an encrypted second symmetric ciphertext symm-C2 by the device using the first symmetric ciphering key and the symmetric ciphering algorithm. In other words, the second asymmetric ciphertext C2 can be data that is asymmetrically encrypted using the second mutually shared PQC KEM algorithm and the server ephemeral public key. The encrypted second symmetric ciphertext symm-C2 can comprise data that is both (i) asymmetrically encrypted using the KEM and then also (ii) symmetrically encrypted using the first symmetric ciphering key. As contemplated herein, a symmetric ciphering algorithm can use both a symmetric ciphering key and a corresponding message authentication code (MAC) key. The MAC key can be used with a MAC algorithm in order to generate MAC values or tag values for message verification and integrity checks. In other exemplary embodiments, the second asymmetric ciphertext C2 can be "MACed" with a MAC key generated by the first HKDF, and a symmetric encryption of the second asymmetric ciphertext C3 could be omitted. Device can specify second metadata for a third message below that indicates if the device sends to the server the second asymmetric ciphertext C2 as a "double encrypted" second symmetric ciphertext symm-C2, and other possibilities exist as well for a device and a server to specify the use and communication of a "double encrypted" second symmetric ciphertext symm-C2.

The device can use a second HKDF with at least the second shared secret key K2 to derive at least a second symmetric ciphering key. For preferred exemplary embodiments, the device can use at least both (i) the first shared secret key K1 output from the device KEM DECAPS function and also (ii) the second shared secret key K2 output from the device KEM ENCAPS function in order to derive at least the second symmetric ciphering key. In this manner, the second symmetric ciphering key can provide a security level of at least the stronger of the first KEM (e.g. used the KEM DECAPS) and the second KEM (e.g. used with the KEM ENCAPS). Thus, if one KEM is later found compromised or broken in the future, the second symmetric ciphering key can remain secured by the other KEM. This feature provides benefits over conventional technology and addresses needs in the art identified above, where a current PQC algorithm proposed for standardization could have currently unidentified weaknesses identified in the future. In other words, the input of both the first shared secret key K1 and the second shared secret key into the second HKDF to derive the second symmetric ciphering key can provide an overall higher level of security, and other benefits can be achieved as well.

The device can select a second plaintext for encryption to include in a third message, which could comprise data for a "Client Finished" message. The second plaintext could include (i) final handshake data and also potentially (ii) application data from the device to the server. The application data could be sensor data, device configuration data, a registration message, and other possibilities exist as well. The second plaintext could also include a device certificate as well as a digital signature from the device. The device can use (i) the metadata from the response second message, (ii) the symmetric ciphering algorithm, and (iii) the derived second symmetric ciphering key to encrypt the second plaintext into a third symmetric ciphertext symm-C3. The device can send the server the third message, where the third message can include at least the second asymmetric ciphertext C2 (possibly as a "double encrypted" second symmetric ciphertext symm-C2) and the third symmetric ciphertext C3.

The server can receive the third message and conduct a series of steps to process the third message. In preferred exemplary embodiments where the third message includes the "double encrypted" second symmetric ciphertext symm-C2, the server can use the symmetric ciphering algorithm and the first symmetric ciphering key to decrypt the "double encrypted" second symmetric ciphertext symm-C2 into a second asymmetric ciphertext C2. In other words, the second symmetric ciphertext symm-C2 could comprise data that is both (i) asymmetrically encrypted using the second KEM and the server ephemeral public key and (ii) symmetrically encrypted using the first mutually derived symmetric ciphering key. If present, the symmetric encryption for a second symmetric ciphertext symm-C2 could be removed or "unwrapped" using the first mutually derived symmetric ciphering key. After removal of the symmetric encryption, the server can read the second asymmetric ciphertext symm-C2 which comprises data that has been asymmetrically encrypted.

The server can conduct a second KEM using a KEM decapsulation function (KEM DECAPS) with (i) the second asymmetric ciphertext C2, (ii) the second mutually shared PQC KEM algorithm selected by the server, and (iii) the server ephemeral private key. The output of the KEM DECAPS can be the second shared secret key K2. The server can use the second HKDF with at least the second shared secret key K2 to mutually derive at least the second symmetric ciphering key. For preferred exemplary embodiments, the server can use at least both (i) the first shared secret key K1 output from the server KEM ENCAPS function and also (ii) the second shared secret key K2 output from the server KEM DECAPS function in order to derive at least the second symmetric ciphering key. The security benefits for including both the first and second shared secret keys K1 and K2 in the generation of the second symmetric ciphering key are described above for the device generation of the second symmetric ciphering key.

The server can use (i) the symmetric ciphering algorithm, and (ii) the mutually derived second symmetric ciphering key to decrypt the third symmetric ciphertext symm-C3 into the second plaintext. The server can confirm a final device handshake message from the second plaintext. The server can subsequently process server application data and derive additional symmetric ciphering keys using at least the first and second shared secret keys K1 and K2.

Before closing or ending the initial secure session, the server and device can derive a "pre-shared" secret key (PSK) for use with session resumption after a first session with the device has been closed. In other words, the device or server may temporarily end communications from a first session. The device may later prefer and/or request to resume the secure communication without requiring (i) second processing of the full set of PQC KEM algorithm calculations to re-derive the first and second shared secrets, (ii) the bandwidth to share ephemeral public keys, as well as (iii) the bandwidth and processing power required to generate and verify digital signatures. For preferred exemplary embodiments, the server and device can use at least both (i) the first shared secret key K1 output from the first KEM and also (ii) the second shared secret key K2 output from the second KEM in order to derive at least the PSK. The security benefits for including both the first and second shared secret keys K1 and K2 in the generation of the PSK are described above for the device generation of the second symmetric ciphering key. The device can store the PSK in device memory for later use with a resumed session.

The server can also generate an identity or identifier of the PSK comprising a PSK-ID. The PSK-ID could comprise a string and/or a number to uniquely identify the PSK mutually generated in the paragraph above. The server can store both the PSK and the PSK-ID in a network database, where the network database can be connected to the server and also additional servers within a network that can receive a request for a resumed session from device 101. In preferred exemplary embodiments, the server can encrypt at least the PSK-ID into a fourth symmetric ciphertext symm-C4 using the second symmetric ciphering key. The server can transmit the fourth symmetric ciphertext symm-C4 to the device and the device can receive the fourth symmetric ciphertext symm-C4. The device can decrypt the fourth symmetric ciphertext symm-C4 using the second symmetric ciphering key and read the plaintext value for the PSK-ID. The device can store the PSK-ID in device memory for use with a resumed session. The device and/or the server can end the initial secure session by exchanging a close or finish message. The device and server can flush, delete, or write over cryptographic keys in memory related to the first session, including the deletion of keys K1, K2, ephemeral secret keys, and related values generated or used during the first and second KEM. In this manner, future security of encrypted data from the first session can be enhanced.

After a period of time, which can depend on the application for the device using the initial secure session, the device can prepare a message for the server for session resumption using the PSK generated in the initial secure session. As described above, session resumption can conserve resources while providing sufficient security that was achieved during the initial secure session. The device can generate a third symmetric ciphering key and a corresponding third MAC key using a HKDF with at least the PSK. The device can also generate a random number for use with the resumed session. In some embodiments, the device can generate the third symmetric ciphering key using the HKDF with at least the PSK and the random number. The device can select updated device extensions for the resumed session. The device can generate a tag value over the PSK-ID, the updated device extensions, and the random number using a MAC algorithm and the third MAC key. The device can send a message comprising a second "Client Hello" message to request session resumption, where the message can comprise the PSK-ID, the updated device extensions, the random number, and the tag value.

A benefit of the tag value is that a MITM attacker could not feasibly alter or substitute the PSK-ID (such as trying to use a different PSK-ID the MITM attacker generated with the network in a different initial secure session than the one described above). In addition, the MITM attacker could not feasibly alter the updated device extensions for the resumed session, such as attempting a "downgrade" attack by inserting false updated device extensions with reduced security or deprecated algorithms. Also, the random number generated by the device for the second "Client Hello" message could also not be feasibly altered through the use of the tag value based on the third MAC key.

The server can receive the second "Client Hello" message and perform steps to process the message. The server can use the PSK-ID from the message to query the network database to select and receive the corresponding PSK. The server can generate a third symmetric ciphering key and a corresponding third MAC key using a HKDF with at least the PSK. The server can also receive the random number for use with the resumed session in the second "Client Hello" message. In some embodiments, the server can generate the third symmetric ciphering key using the HKDF with at least the PSK and the random number. The server can generate the tag value over the PSK-ID, the device extensions, and the random number using a MAC algorithm and the third MAC key. The server can compare the generated tag value with the received tag value from the second "Client Hello" message. If the generated tag value and the received tag value match, the server can authenticate or verify that the second "Client Hello" message has been generated by the device that performed the initial secure session (e.g. the device has mutually derived the PSK). The server can then generate a sixth symmetric ciphertext comprising server hello data that is encrypted with the third symmetric ciphering key. The server can transmit the sixth symmetric ciphertext to the device and the device can decrypt the sixth symmetric ciphertext using the mutually derived third symmetric ciphering key. The device and server can then take additional steps using the PSK to transfer encrypted and authenticated application data.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1 is a graphical illustration of an exemplary system, where a device and a network process and communicate data in order to establish secure communications, in accordance with exemplary embodiments;

FIG. 2*a* is a simplified message flow diagram illustrating an exemplary system with exemplary data transmitted and received by a device and a network, in accordance with exemplary embodiments;

FIG. 2*b* is a simplified message flow diagram illustrating an exemplary system with exemplary data transmitted and received by a device and a network for resuming a secure session, in accordance with exemplary embodiments;

FIG. 2*c* is a simplified message flow diagram illustrating an exemplary system with exemplary data transmitted and received by a device and a network for resuming a secure session, in accordance with exemplary embodiments;

FIG. 3 is a flow chart illustrating exemplary steps for (i) a server conducting a key encapsulation mechanism to mutually derive a first symmetric ciphering key, and (ii) the server conducting symmetric ciphering using the derived first symmetric ciphering key, in accordance with exemplary embodiments;

FIG. 4 is a flow chart illustrating exemplary steps for a device conducting (i) a key encapsulation mechanism to mutually derive the first symmetric ciphering key, (ii) symmetric ciphering using the derived first symmetric ciphering key, in accordance with exemplary embodiments;

FIG. 5 is a flow chart illustrating exemplary steps for (i) a device conducting a key encapsulation mechanism to mutually derive a second symmetric ciphering key, (ii) the device conducting symmetric ciphering using the derived second symmetric ciphering key, and (iii) the device and a server conducting symmetric ciphering of asymmetric ciphertext with the first symmetric ciphering key, in accordance with exemplary embodiments;

FIG. 6 is a flow chart illustrating exemplary steps for (i) a server conducting a key encapsulation mechanism to mutually derive the second symmetric ciphering key, (ii) the server conducting symmetric ciphering using the derived second symmetric ciphering key, and (iii) a device and the server mutually deriving a pre-shared secret key for session resumption, in accordance with exemplary embodiments;

FIG. 7*a* is a flow chart illustrating exemplary steps for a device and a server (i) mutually generating a third symmetric ciphering key using a "pre-shared" secret key (PSK) and (ii) mutually generating a message authentication code (MAC) value, the server generating a fifth symmetric ciphertext using the third symmetric ciphering key, and the device decrypting the fifth symmetric ciphertext using the third symmetric ciphering key, in accordance with exemplary embodiments;

FIG. 7*b* is a flow chart illustrating exemplary steps for a device and a server (i) mutually generating a fourth symmetric ciphering key using a third shared secret key and (ii) mutually generating a message authentication code (MAC) value, the server generating a sixth symmetric ciphertext using the fourth symmetric ciphering key, and the device decrypting the sixth symmetric ciphertext using the fourth symmetric ciphering key, in accordance with exemplary embodiments;

FIG. 8 is an illustration of (i) an exemplary set of cryptographic parameters for a key encapsulation mechanism stored and used by a device and a server, and (ii) conducting two KEM for the cryptographic parameters in accordance with exemplary embodiments;

FIG. 9*a* is a flow chart illustrating exemplary steps for a device to use multiple key encapsulation mechanisms (KEM) and resume a secure session with a "pre-shared" secret key, in accordance with exemplary embodiments;

FIG. 9*b* is a flow chart illustrating exemplary steps for a device to conduct multiple key encapsulation mechanisms (KEM) and resume a secure session with a "pre-shared" secret key, in accordance with exemplary embodiments;

FIG. 10*a* is a flow chart illustrating exemplary steps for a server to conduct multiple key encapsulation mechanisms (KEM) and resume a secure session with a "pre-shared" secret key, in accordance with exemplary embodiments;

FIG. 10*b* is a flow chart illustrating exemplary steps for a server to conduct multiple key encapsulation mechanisms (KEM) and resume a secure session with a "pre-shared" secret key, in accordance with exemplary embodiments; and FIG. 11 is a graphical illustration of hardware, firmware, and software components for a server and a device, in accordance with exemplary embodiments.

DETAILED DESCRIPTION OF EXEMPLARY EMBODIMENTS OF THE INVENTION

FIG. 1

FIG. 1 is a graphical illustration of an exemplary system, where a device and a network process and communicate data in order to establish a secure communications, in accordance with exemplary embodiments. The system 100 can include a device 101, an Internet Protocol (IP) network 107, and a network 103. The depicted nodes or entities can communicate data 106 over the IP network 107. Although a single device 101 and a single network 103 are depicted in FIG. 1, a system 100 can comprise a plurality of each of the depicted nodes or entities. A system 100 as depicted in FIG. 1 can support secure sessions between the device 101 and the network 103 such as, but not limited to, using a protocol for Transport Layer Security (TLS), Datagram Transport Layer Security (DLTS), a virtual private network (VPN), IP Security (IPSec), Secure Shell (SSH), and Wireguard VPN tunnels. Although the standardized protocols listed in the previous sentence as of November, 2021 do not normally include support for post-quantum cryptographic algorithms, these protocols in the future are expected to include support for post-quantum cryptographic algorithms, including key encapsulation mechanisms using PKI and the use of quantum safe digital signatures. Other possibilities exist as well for secure protocols supported between device 101 and network 103, without departing from the scope of the present disclosure.

Device 101 and network 103 can utilize a variety of wireless wide area network (WAN) and wireless local area network (LAN) wireless and technologies to communicate data 106 between the nodes, including Low Power Wide Area (LPWA) technology, 3rd Generation Partnership Project (3GPP) technology such as, but not limited to, 4G Long-Term Evolution (LTE), or 4G LTE Advanced, NarrowBand-Internet of Things (NB-IoT), LTE Cat M, and 5G or subsequent wireless technologies. In addition, the wireless technology used by device 101 and network 103 could support or implement wireless LAN technologies such as WiFi and the related series of standards from IEEE 802.11 standards, such as 802.11ac, 802.11ax, etc. Other examples exist as well for wireless WAN technology and/or wireless LAN technology used for communications between device 101 and network 103 without departing from the scope of the present disclosure.

Network 103 can also connect to the IP network 107 and send/receive data 106 other via a wired connection such as, but not limited to, an Ethernet connection or a fiber optic connection. In other words, for some exemplary embodiments, network 103 can connect to IP network 107 using a wired connection, and device 101 can connect to IP network 107 using a wireless connection. IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses. A private IP network overlayed on IP network 107 could utilize private IP addresses which could also be referred to as an Intranet. Other possibilities for device 101 and network 103 to communicate data through an IP network 107 exist as well without departing from the scope of the disclosure.

Device 101 can be a computing device for sending and receiving data using a radio 101*r*. Device 101 can take several different embodiments, such as a general purpose personal computer, a laptop computer, a mobile phone or mobile handset based on the Android® or Fuchsia from Google® or the IOS operating system from Apple®, a tablet, a device with a sensor or actuator for the "Internet of Things", a module for "machine to machine" communications, a device that connects to a wireless Wide Area Network (WAN) operated by a mobile network operator, a router, and/or a server, and other possibilities exist as well for the embodiments of a device 101 without departing from the scope of the present disclosure. In other words, for some embodiments, device 101 could include and use a network interface such as, but not limited to, a radio 101*r* for sending and receiving data with the network 103 through IP network 107.

The electrical components within device 101 can include a memory 101*m*, a processor 101*p*, a radio 101*r*, a sensory 101*y*, an actuator 101*z*, and a user interface 101*w*. As depicted in FIG. 1, a data bus 101*t* or a system bus 101*t* could internally electrically connect the depicted components within a device 101. Additional components to support the operation of device 101 can include a battery to store electrical power, and an antenna to transmit and receive RF signals. The sensor 101*y* can collect data external or internal to the device 101, such as temperature, motion, position, pressure, etc. A device 101 could also include the actuator 101*z* to convert electrical signals into physical actions, such as a motor for moving components, a relay for opening or closing a circuit, a speaker for outputting sound, a screen for displaying information to a user of device 101, etc. Additional details regarding the operation of electrical components within device 101 are depicted and described in connection with FIG. 11 below.

Memory 101*m* can comprise combinations of (i) volatile random access memory and (ii) nonvolatile memory. The volatile memory can include random access memory (RAM) for relatively fast read and write operations, such as SRAM or DRAM compared, to nonvolatile memory. RAM for memory 101*m* could also include persistent RAM or nonvolatile RAM (NVRAM), such that data in a persistent RAM memory or nonvolatile RAM is stored when power is removed. Nonvolatile memory can include storage memory such as a flash memory and record or store data when power is removed from device 101. In general, different forms and electrical components for memory 101*m* can be used without departing from the scope of the present disclosure. Processor 101*p* can comprise a central processing unit (CPU) or a "system on a chip" and be similar to a processor 111*p* for a server 111 described below, but with reduced capabilities for a device 101 compared to a processor 111*p* for a server 111. For some embodiments, processor 101*p* can include the volatile memory or RAM memory portion of memory 101*m*, such as with the current, commercial M1 series of processors from Apple Inc.

In exemplary embodiments, processor 101*p* can include a hardware random number generator 128, which can generate a random number or pseudo random number using sensor data within processor 101*p*. As one example, hardware random number generator 128 could collect electrical or thermal noise values from sensors within processor 101*p*, and generate a random number from noise values. Although the hardware random number generator 128 is depicted within processor 101*p* and external to TRSH 113, for some embodiments the hardware random number generator 128 can be within TRSH 113. The random number output from hardware random number generator can be used to (i) generate a private key corresponding to a public key for a PKI algorithm, (ii) generate an random number or value for M2 219*a* in a KEM ENCAPS function 101*k*, or (iii) generate a random number included within data for a secure session between device 101 and network 103, such as random 252*a* from a step 252 for device 101 below. For descriptions where cryptographic algorithms 101*s* include a random number generators, the cryptographic algorithms 101*s* could read a random number or value from the hardware random number generator 128 and use and process the value with additional steps, such as inputting the value from the hardware random number generator into a secure hash algorithm in order to obtain or read a random number. Or, the cryptographic algorithms 101*s* could use directly a random number from a hardware random number generator 128.

Tamper resistant secure hardware (TRSH) 113 can comprise a secure processing environment as described in the GlobalPlatform document, titled "Open Firmware Loader for Tamper Resistant Secure Hardware", Release 1.3.0.14 dated April, 2021, which is hereby incorporated by reference in its entirety ("GlobalPlatform OFL"). TRSH 113 can also comprise the secure element as described in the ETSI SSP Requirements document ETSI TS 103 465 V15.0.0 (2019-05) titled "Smart Cards; Smart Secure Platform (SSP); Requirements Specification" ("ETSI SSP Requirements"), which is hereby incorporated by reference in its entirety. Tamper resistant secure hardware 113 can comprise a silicon enclave within a tamper resistant chip such as a "system on chip" operating within processor 101*p*. In addition, processor 103*p* for network 103 can include a TRSH and a primary platform 109. Other possibilities exist as well for the specifications supported by TRSH 113 without departing from the scope of the present disclosure.

TRSH 113 can include a primary platform (PP) 109, where a primary platform is also described in both the GSMA PP Requirements document and the SSP Requirements document. TRSH 113 could also comprise a "Smart Secure Platform" (SSP) as described in the SSP Requirements document, such as the SSP depicted in FIG. 2 of the "Architecture" section 9.2.1. Primary platform 109 can comprise a secure operating environment, a secure enclave, a secure element, and include a secure processing core within a processor for device 101. Primary platform 109 can also operate in a Trusted Execution Environment (TEE) within a processor for device 101. Primary platform 109 can also comprise a SSP as contemplated by ETSI documents and draft specifications for 5G networks. PP 109 can include memory 101*m*' equivalent to device memory 101*m*, where memory 101*m*' can be dedicated to PP 109 and comprise a reduced number of memory cells compared to general device memory 101*m*. Memory 101*m*' can prevent applications on device 101 from reading or writing directly to memory 101*m*', such that PP 109 has sole access to the memory 101*m*'. For some embodiments, memory 101*m*' can include cryptographic algorithms 101*s* and cryptographic parameters 101*x*.

TRSH 113 and PP 109 can support a variety of applications. TRSH 113 can comprise the physical device such as a dedicated processing core or silicon area within a processor 101*p* in FIG. 1, and a primary platform 109 can comprise a secure processing environment operating within the TRSH 113. With appropriate configured secondary platform bundle or firmware, TRSH 113 and PP 101 could operate as an "integrated universal integrated circuit card" (iUICC), an "embedded universal integrated circuit card" (eUICC), a secure element for banking applications or payments from mobile phones, an radio-frequency identity (RFID) card, a secure bootstrap environment for device 101, a virtual key for cars or door locks, an secure environment for recording an identity and secret or private keys for drivers licenses, passports, online or web-site access, etc.

For some exemplary embodiments, the steps and data processing conducted by device 101 to establish a secure session such as the steps and data processing depicted and described for a device 101 in FIG. 2*a* and FIGS. 9*a* and 9*b* below can be conducted by a secondary platform bundle operating within a primary platform 109 within a processor 101*p*. In other exemplary embodiments, the use of a TRSH 113 and PP 109 could be omitted or substituted with similar secure enclave or secure processing environment technology. For these embodiments, the processor 101*p* within device 101 could perform the steps and data processing depicted and described for a device 101 in FIG. 2*a* and FIGS. 9*a* and 9*b* below without the use of a TRSH 113 and PP 109. Note that the use of a TRSH 113 and PP 109 could be omitted for some embodiments of a device 101, and the steps and data processing for a device 101 depicted in FIG. 2*a* and FIGS. 9*a* and 9*b* below (as well as subsequent Figures herein) could be conducted using the processor 101*p* and other depicted electrical components for a device 101.

Device 101 may include radio 101*r* support radio-frequency (RF) communications with networks including a MNO 102 via standards such as LTE, LTE Advanced, 5G, and/or other mobile-network technologies. In a wireless configuration, the radio 101*r* may also provide connectivity to local networks such as 802.11 WLAN, Bluetooth, Zigbee, LoRa, or an IEEE 802.15.4 network, among other possibilities. In exemplary embodiments, a radio 101*r* is connected to an antenna, which could be either internal to device 101 or external to device 101. Device 101 may also include nonvolatile memory 101*bb*, where nonvolatile memory 101*bb* is also depicted and described in connection with FIG. 11 below.

Note that device 101 may also optionally include user interface 101*w* which may include one or more devices for receiving inputs and/or one or more devices for conveying outputs. User interfaces are known in the art and thus user interfaces are not described in detail here. User interface 101*w* could comprise a touch screen if device 101 operates as a smartphone or mobile phone. Device 101 can optionally omit a user interface 101*w*, since no user input may be required for many M2M applications such as networked sensors, although a user interface 101*w* could be included with device 101. LED lights or a display of LEDs could also comprise a user interface 101*w*.

Memory 101*m* within device 101 can store cryptographic algorithms 101*s*, cryptographic parameters 101*x*, a device ephemeral public key infrastructure (PKI) key pair comprising an device ephemeral private key 101*i* and a corresponding device ephemeral public key 101*h*, an optional device certificate 101*c*, a set of supported device PQC KEM parameters device.PQC-KEM.parameters 101*f*, device parameters or device extensions 101*g*, a key encapsulation mechanism (KEM) decapsulation function 101*j*, and a KEM encapsulation function 101*k*. In general, the depicted data within memory 101*m* can be stored within a nonvolatile memory 101*bb* such as flash memory or a solid state drive or hard drive when power from device 101 is removed or the device is powered off. When power is supplied to device 101 or device 101 operates, for some embodiments, the device ephemeral private key 101*i* and the corresponding device ephemeral public key 101*h* may optionally only be stored in volatile memory such as RAM. When power is supplied to device 101 or device 101, the depicted data for memory 101*m* can be copied by processor 101*p* using a bus 101*t* from a nonvolatile memory 101*bb* for device 101 into a volatile memory 101*m*.

Cryptographic algorithms 101*s* can include the steps and logic for processor 101*p* in device 101 to conduct in order for device 101 to securely communicate with network 103 and a server 111. Cryptographic algorithms 101*s* can include at least symmetric ciphering algorithms, a random number generator, a key pair generation algorithm, digital signature algorithms, asymmetric ciphering algorithms, secure hash algorithms, and key encapsulation mechanisms (KEM). Cryptographic algorithms 101*s* can use libraries associated with cryptographic suites such as OpenSSL, crypto++, BouncyCastle, or Mozilla, and other possibilities exist as well without departing from the scope of the present disclosure, including the future update of those libraries to support post-quantum cryptography. Cryptographic algorithms 101*s* can use inputs of keys such as public keys, private keys, and/or symmetric keys along with cryptographic parameters 101*x* in order to for device 101 to process cryptographic data including secure hash values, ciphertext, key exchanges, and digital signatures.

Cryptographic parameters 101*x* can specify values or settings for (i) processing a KEM that supports post-quantum cryptographic algorithms such as KEM decapsulation (DECAPS) 101*j* and KEM encapsulation (ENCAPS) 101*k*, (ii) mutually deriving a shared secret, (iii) mutually deriving a symmetric ciphering key from the shared secret using a hash-based key derivation function or an HMAC-based Extract-and-Expand Key Derivation Function (HKDF), (iv) using a symmetric ciphering algorithm with the symmetric ciphering key, (v) using a digital signature algorithm, and (vi) the generation of message authentication code (MAC) or tag values for symmetric ciphertext. As contemplated herein, cryptographic parameters 101*x* may also be referred to as parameters 101*x*. Each of device 101 and network 103 can record at least compatible subset of parameters within a set of cryptographic parameters 101*x*. Parameters 101*x* can specify values for key length, key formatting (e.g. compressed or uncompressed), encoding rules, constants, numbers or variables for a post-quantum cryptography algorithm of a key encapsulation mechanism, etc. Parameters 101*x* can specify values for a post-quantum cryptography algorithm of a digital signature algorithm.

In exemplary embodiments, cryptographic parameters 101*x* and cryptographic algorithms 101*s* (as well as cryptographic parameters 103*x* and cryptographic algorithms 103*x* for a network 103) can support post-quantum cryptography key exchanges or "key encapsulation mechanisms" (KEM) using lattice-based, code-based, or Supersingular Elliptic Curve Isogeny algorithms. These proposed algorithms are described by the Wikipedia article for "NIST Post-Quantum Cryptography Standardization" dated Oct. 29, 2021, which is hereby incorporated by reference. In other words, cryptographic parameters 101*x* and cryptographic algorithms 101*s* can support (i) classical cryptographic functions such as secure hash algorithms (e.g. SHA256 or SHA3-256, etc.) and symmetric ciphering (e.g. AES, Blowfish, XChaCha, etc.), while also including (ii) support for PQC algorithms identified in Round 3 of the National Institute of Standards and Technology (NIST) project for Post-Quantum Cryptography (PQC) Standardization.

In general, as contemplated herein, keys, cryptographic algorithms 101*s* or 103*s*, and parameters 101*x* or 103*x* supporting post-quantum cryptography (PQC) key encapsulation mechanisms (KEM) can be based on any of (i) lattice based algorithms, such as learning with errors, (ii) code based algorithms such as classic McEliece or BIKE, and (iii) ECC algorithms that based on Supersingular Elliptic Curve Isogeny, and other possibilities exist as well without departing from the scope of the present disclosure. In exemplary embodiments, keys, cryptographic algorithms 101*s* or 103*s*, and parameters 101*x* or 103*x* supporting post-quantum cryptography (PQC) key encapsulation mechanisms (KEM) are not based on (i) the integer factorization problem, (ii) the discrete logarithm problem, or (iii) the elliptic curve discrete logarithm problem.

In exemplary embodiments, the depicted KEM parameters of Device.PQC-KEM.Parameters 101*f* can comprise a set of parameters that comprise a subset of the cryptographic parameters 101*x*, where the depicted KEM parameters of Device.PQC-KEM.Parameters 101*f* pertain to parameters for different PQC key encapsulation mechanisms. Exemplary values of the depicted KEM parameters of Device-.PQC-KEM.Parameters 101*f* are also depicted and described in connection with FIG. 8 below. Device 101 can select a subset of 101*f-x* of the set of KEM parameters 101*f* in order to generate a PKI key pair and conduct a first KEM with a network. As contemplated herein, the subset 101*f-x* of the set of KEM parameters 101*f* can also be referred to as KEM parameters 101*f-x* and also a first KEM algorithm.

Device 101 using the processor 101*p* can select a subset 101*f-x* of the set of KEM parameters 101*f* stored in memory 101*m* in order to generate a PKI key pair and conduct a first KEM with a network 103 using a server 111. In an exemplary embodiment, subset 101*f-x* of the KEM parameters of Device.PQC-KEM.Parameters 101*f* or could specify the selection of Kyber-512 for approximately 128 bit of security with symmetric encryption, or Kyber-768 for approximately 192 bits of security with symmetric encryption, or Kyber-1024 for approximately 256 bits of security with symmetric encryption. In other words, Device.PQC-KEM.Parameters 101*f* could specify families or groups of parameters for multiple different PQC KEM such as, but not limited to, Kyber, SIKE, BIKE, etc., and the subset 101*f-x* could comprise the parameters for using a specific KEM for the family or group (such as subset 101*f-x* specifying values for one of the equivalent levels of 128, 192, or 256 bits of security for a symmetric ciphering algorithms). Other post-quantum cryptographic algorithms and parameters could be supported as well for both the KEM parameters of Device-.PQC-KEM.Parameters 101*f* and a subset 101*f-x*.

A device 101 could store one or a plurality of different device certificates cert.device 101*c*. Each of the different device certificates 101*c* could use different values for (i) a device identity such as a user name, (ii) a device static public key for verifying digital signatures generated by device 101, (iii) a different certificate issuer for generating a digital signature for the device certificate 101*c*, and/or (iv) a subset of cryptographic parameters 101*s* and cryptographic algorithms 101*x* for use with the device certificate 101*c*. In exemplary embodiments, the device certificate 101*c* can be formatted according to X.509v3 standards. The device identity in a device certificate 101*c* can be an international mobile subscriber identity (IMSI), a subscription permanent identifier (SUPI) according to 5G standards, or a network access identifier (NAI) as specified in IETF RFC 7542, and other possibilities exist as well without departing from the scope of the present disclosure.

Although not depicted in FIG. 1, device 101 can also store a static private key corresponding to the public key in each device certificate cert.device 101*c*. In exemplary embodiments, the subset of cryptographic parameters 101*s* and cryptographic algorithms 101*x* for a device certificate cert.device 101*c* can support any of the digital signature algorithms as specified in Round 3 of the NIST PQC project, which are also identified in the Wikipedia PQC article. The device certificate cert.device 101*c* can be stored in nonvolatile memory such as a storage memory for memory 101*m* when device 101 is powered off or inactive, and then moved into volatile memory such as a RAM memory for memory 101*m* when device 101 operates.

Device 101 can include a set of device parameters or device extensions 110*g* for conducting a secure session with a network 103 and a server 111. The secure session and device extensions 101*g* could be for a standard protocol supporting PQC such as future versions of TLS, SSH, Wireguard, etc. The device extensions 110*g* can include supported cipher suites supported by device 101 in establishing secure communications with network 103 and server 111. The device extensions 110*g* can also be used for the "Extensions" fields within a "Client Hello" or equivalent message such as a first message 202 as depicted and described in connection with FIG. 2*a* below. The device extensions 110*g* can include supported symmetric ciphering algorithms and modes, such as the Advanced Encryption Standard (AES) with a ciphertext chaining mode such as Electronic Code Book mode (ECB), Galois/Counter Mode (GCM), XChaCha20 for encryption, etc. Device extensions could also include values or parameters for algorithms to generate MAC or tag values for symmetric ciphertext, such as specifying the use of the Poly1305 algorithm for the generation of MAC or tag values. An example for standards describing the use of Poly1305 includes IETF RFC 7539, which is hereby incorporated by reference.

Device extensions 110*g* can include supported secure hash algorithms, key lengths, and supported digital signature algorithms from cryptographic algorithms 101*s*. Device extensions 101*g* can also include supported cryptographic parameters 101*x* for use with the cryptographic algorithms 101*s*. In general, device extensions 110*g* can be associated with a secure communications protocol supported by device 101 when communicating with a network 103 and server 111. In other words, a device 101 can support both cryptographic algorithms 101*s* and cryptographic parameters 101*x*, and device extensions 101*g* can be a subset of the cryptographic algorithms 101*s* and cryptographic parameters 101*x* that are specified for a particular secure communications protocol between device 101 and server 111. Device extensions 110*g* could also include supported digital signature algorithms as well as names or identifiers of certificate authority certificates or root certificates stored by device 101 in order to authenticate a server certificate 103*c* received from server 111.

A first protocol, such as TLS, supported by device 101 could use first device extensions 101*g* as a first subset of cryptographic algorithms 101*s* and cryptographic parameters 101*x*, and a second protocol, such as Wireguard could use second device extensions 101*g* as a second subset of cryptographic algorithms 101*s* and cryptographic parameters 101*x*. As one example, the first device extensions 101*g* could specify the use of AES-GCM with 256 bit keys and the SHA-2 algorithm, and the second device extensions 101*g* could specify the use of XChaCha-Poly1305 with the SHA-3 algorithm. Other possibilities exist as well for device extensions 101*g* to support different subsets of cryptographic algorithms 101*s* and cryptographic parameters 101*x* without departing from the scope of the present disclosure.

Device 101 can include a PQC key pair generation algorithm PQC.KeyGen 101*q* from cryptographic algorithms 101*s* and the selected first subset 101*f-x* (or first KEM algorithm) of KEM parameters 101*f*. The PQC key pair generation algorithm PQC.KeyGen 101*q* from cryptographic algorithms 101*s* can comprise computer executable instructions for a processor 101*p* in device 101 to generate an ephemeral private key and corresponding ephemeral public key. Network 103 can include a compatible PQC key pair generation algorithm 103*q* from cryptographic algorithms 103*s* described below. A PQC key pair generation algorithm 101*q* can use the selected first subset 101*f-x* (or first KEM algorithm) of KEM parameters 101*f* in order to generate (i) a random number from a random number generator 128 in order to derive a device ephemeral PKI private key eSK.device 101*h* and (ii) a corresponding device ephemeral PKI public key ePK.device 101*i*. Although FIG. 1 depicts a single device ephemeral public key ePK.device 101*h* and a single device ephemeral private key eSK.device 101*i*, a device 101 could generate, store, and use a plurality of the ephemeral PKI key pairs. A first device ephemeral public key could comprise an ePK-1.device 101*h*-1, and a second device ephemeral public key could comprise an ePK-2.device 101*h*-2.

The device ephemeral private key eSK.device 101*i* can comprise a first private key for an exemplary lattice-based algorithm of Kyber768. In other words, the selected subset 101*f-x* could specify use of Kyber768. The KEM parameters 101*f-x* could specify values of the device ephemeral private key eSK.device 101*i* of n=256 and q=7681 in an exemplary embodiment. The KEM parameters 101*f-x* that define keys and ciphertext could be set to du=11, dv=3 and dt=11. For Kyber768, the values of k could be 3 and n could be 4. Other values for KEM parameters 101*f-x* are possible as well without departing from the scope of the present disclosure, such as an exemplary lattice-based algorithm of Kyber1024. With Kyber 1024, the values associated KEM parameters 101*f-y* could be the same as above, except for the use of k=4 and n=5.

In an exemplary embodiments that use Kyber algorithms, PQC.KeyGen 101*q* can comprise "Algorithm 1 Kyber:CPA: KeyGeno: key generation" from the paper "CRYSTALS—Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 101*q* can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 3 of the NIST PQC project could be used for a PQC.KeyGen 101*q* function as well, without departing from the scope of the present disclosure. A PQC.KeyGen 101*q* within the present disclosure could include any of the KeyGen functions described within the ETSI TR 103 823 V1.1.1 titled "CYBER; Quantum-Safe Public-Key Encryption and Key Encapsulation", which is herein incorporated by reference and referred to herein as the ETSI PQC Summary.

Device 101 can store or record in memory 101*m* a KEM DECAPS function 101*j* in both (i) nonvolatile memory 101*bb* or storage memory when device 101 is powered off and (ii) volatile memory such as RAM when device 101 is operating. In summary, the selected first subset of parameters 101*f-x* and the generated or derived device ephemeral private key eSK.Device 101*i* can be used with the KEM DECAPS function 101*j* in order to convert a first received asymmetric ciphertext C1 102*c*-1 into a first shared secret key K1 102*k*-1. Example parameters and values used with the KEM DECAPS function 101*j* are depicted and described for a step 214 in FIG. 2*a* below and also in FIG. 4 below and also FIG. 8 below. The KEM DECAPS function 101*j* can be included in cryptographic algorithms 101*s* and support a plurality of different PQC key encapsulation mechanisms (KEM), such as any of the PQC KEM in Round 3 of the NIST PQC project. In addition, KEM DECAPS function 101*j*, KEM ENCAPS function 101*k*, and KEM parameters 101*f* can support any of the algorithms and associated parameter sets identified in section 5.5 of the ETSI PQC Summary.

Device 101 can store or record in memory 101*m* a KEM ENCAPS function 101*k* in both (i) nonvolatile memory or storage memory when device 101 is powered off and (ii) volatile memory such as RAM when device 101 is operating. A received subset of parameters Device.PQC-KEM.Parameters 101*f*, such as the second subset 103*f-y* (discussed in FIG. 2*a* below for a second KEM algorithm) could be used with KEM ENCAPS function 101*k*. The selected subset of parameters Device.PQC-KEM.Parameters 101*f* and a received server ephemeral public key ePK.server 103*h* can be used with the KEM ENCAPS function 101*k* in order to convert number such as, but not limited to, a random number for M2 219*a* into both (i) a second asymmetric ciphertext C2 102*c*-2 and a second shared secret key K2 102*k*-2. Device 101 may receive and process a first symmetric ciphertext symm-C1 102*s*-1 second asymmetric ciphertext C2 (as depicted in a message 213 below in FIG. 2) before conducting the KEM ENCAPS function 101*k*. The parameters and values used with the KEM ENCAPS function 101*k* are depicted and described for a step 220 in FIG. 2*a* below and also in FIG. 5 below and also FIG. 8 below. The KEM ENCAPS function 101*k* can be included in cryptographic algorithms 101*s* and support a plurality of different PQC key encapsulation mechanisms (KEM), such as any of the PQC KEM in Round 3 of the NIST PQC project.

Network 103 can comprise a collection of servers and also operate as a cloud service. As depicted for system 100 in FIG. 1, network 103 can communicate with device 101 through IP network 107. Network 103 can include a network identity of network ID 103*a*, which could comprise a domain name, a name, or a string to uniquely identify network 103 in a system 100. In exemplary embodiments, at least a portion of network ID 103*a* can comprise a network access identifier for network 103. Network 103 can include at least one server 111 as depicted in FIG. 1. Although a single server 111 is depicted for a network 103 in FIG. 1, a network 103 could include a plurality of servers 111, where each server 111 can be identified using a different server identity of server ID 111*a*.

Server 111 can include hardware components similar to those of a device 101 depicted in FIG. 1, except generally with larger capacities appropriate for a server 111. Server 111 can also operate as a host computing environment with physical hardware for a virtual machine to operate as a guest computing environment. Server 111 can include a server identity of server ID 111*a*, which could comprise a domain name, a name, or a string to uniquely identify server 111 in a system 100. In exemplary embodiments, at least a portion of server ID 111*a* can comprise a network access identifier for server 111.

A server 111 can include server hardware 111*h* comprising random access memory (RAM) 111*m*, storage memory 111*b*, at least one system bus 111*c*, at least one network interface 111*d*, and at least one processor 103*p*. For a server 111 operating in a network 103, server 111 can include at least one processor 111*p* in order to store and record data as well as communicate with other nodes over an IP network 107, such as device 101 through an IP network 107. Processor 111*p* can also be referred to as a central processing unit (CPU) 111*p*. Processor 111*p* can comprise a general purpose processor appropriate for the computational requirements for a server 111, and may operate with multiple different processor cores, including field programmable gate arrays (FPGA).

A processor 111*p* can comprise exemplary ARM® based processors or an Intel® based processor such as belonging to the XEON® family of processors, and other possibilities exist as well. Processor 111*p* can utilize the system bus 111*c* to fetch instructions from RAM memory 111*m* or storage memory 111*b* within a server 111 and operate on the instruction. A processor 111*p* or 101*p* can include components such as registers, accumulators, and logic elements to add, subtract, multiply, and divide numerical values and record the results in memory. In exemplary embodiments, at least one processor 111*p* within server 111 can be used to conduct the steps and message flows depicted in FIG. 2*a* below, as well as the steps for a server 111 in FIGS. 10*a* and 10*b* below. For some embodiments, the network 103 could operate a plurality of processors 111*p*, where the plurality of processors 111*p* can operate either within a single server 111 or the plurality of processors can be distributed across a plurality of server 111. A processor system can comprise either the plurality of processors or a single processor with a plurality of processing cores. As depicted in FIG. 1, processor 111*p* can also include a hardware random number generator 128, which can be equivalent to the hardware random number generator 128 described above for a processor 101*p* within device 101.

RAM 111*a* may comprise a random access memory for Server 111. RAM 111*a* can be a volatile memory providing rapid read/write memory access to processor 111*p*. RAM 111*a* could be located on a separate integrated circuit in server 111. The system bus 111*c* may be any of several types of bus structures including a memory bus or memory controller, a peripheral bus, and a local bus using any of a variety of bus architectures including a data bus. System bus 111*c* connects components within server 111, such as transferring electrical signals between the components illustrated for a server 111. Server 111 can include multiple different versions of bus 111*c* to connect different components, including a first system bus 111*c* between CPU 111*p* and RAM 111*a* (which could be a memory bus), and a second system bus 111*c* between CPU 111*p* and network interface 111*d*, which could be a SPI bus, a PCI bus, or similar data busses.

Server 111 may also operate a network interface 111*d*, where network interface 111*d* can be used to connect and communicate with other nodes such as depicted in FIG. 1 and also FIG. 2*a* below. Network interface 111*d* can comprise a physical interface connected to system bus 111*c* for server 111. In exemplary embodiments, network interface 111*d* can comprise an Ethernet or fiber optic wired connection. Network interface 111*d* can connect server 111 to plurality of computing devices and other servers through networks such as the globally routable public Internet.

Nonvolatile memory 111*b* or "storage" 111*b* (which can also be referred to herein as "storage memory 111*b*") within server 111 can comprise a non-volatile memory for long-term storage of data, including times when server 111 may be powered off Storage memory 111*b* may be a NAND flash memory or a NOR flash memory and record firmware for server 111, such as a bootloader program and an operating system. Storage memory 111*b* can record long-term and non-volatile storage of data or files for server 111. In exemplary embodiments, the network identity 103*a* is recorded in storage memory 111*b* when server 111 is powered off, and the network identity 103*a* is copied by CPU 111*p* into RAM 111*a* when server 111 powers on.

Storage memory 111*b* can operate as a traditional hard disk drive or a solid state drive (SSD), or as a storage area network (SAN). Storage memory 111*b* can also comprise a plurality of spinning hard disk drives in a redundant array of independent disks (RAID) configuration. Storage memory 111*b* may also be referred to as "server storage" and can include exemplary file systems of FAT16, FAT 32, NTFS, ext3, ext4, UDF, or similar file systems. As contemplated herein, the terms "memory 111*b*", "storage memory 111*b*", and "nonvolatile memory 111*b*" can be considered equivalent.

Cryptographic algorithms 103*s* can include the steps and logic for processor 103*p* in server 111 to conduct in order for server 111 and network 103 to securely communicate with device 101. Cryptographic algorithms 101*s* can include at least symmetric ciphering algorithms, a random number generator, a key pair generation algorithm, digital signature algorithms, asymmetric ciphering algorithms, secure hash algorithms, and key encapsulation mechanisms. Cryptographic algorithms 103*s* can use libraries associated with cryptographic suites such as OpenSSL, crypto++, BouncyCastle, or Mozilla, and other possibilities exist as well without departing from the scope of the present disclosure, including the future update of those libraries to support post-quantum cryptography. Cryptographic algorithms 103*s* can use inputs of keys such as public keys, private keys, and/or symmetric keys along with cryptographic parameters 103*x* in order to for server 111 and network 103 to process cryptographic data including secure hash values, ciphertext, key exchanges, and digital signatures.

Cryptographic parameters 103*x* can specify values or settings for (i) processing a KEM that supports post-quantum cryptographic algorithms such as KEM DECAPS 103*j* and KEM ENCAPS 103*k*, (ii) mutually deriving a shared secret, (iii) mutually deriving a symmetric ciphering key from the shared secret using a hash-based key derivation function or an HMAC-based Extract-and-Expand Key Derivation Function (HKDF), (iv) using a symmetric ciphering algorithm with the symmetric ciphering key, (v) using a digital signature algorithm, and (vi) the generation of message authentication code (MAC) or tag values for symmetric ciphertext. As contemplated herein, cryptographic parameters 103*x* may also be referred to as parameters 103*x*. Each of device 101 and network 103 can record at least compatible subset of parameters within a set of cryptographic parameters 103*x*. Parameters 103*x* can specify values for key length, key formatting (e.g. compressed or uncompressed), encoding rules, constants, numbers or variables for a post-quantum cryptography algorithm of a key encapsulation mechanism, etc. Parameters 103*x* can specify values for a post-quantum cryptography algorithm of a digital signature algorithm.

In exemplary embodiments, cryptographic parameters 103*x* and cryptographic algorithms 103*s* (as well as cryptographic parameters 101*x* and cryptographic algorithms 101*x* for a device 101) can support post-quantum cryptography key exchanges or "key encapsulation mechanisms" (KEM) using lattice, code-based, or Supersingular Elliptic Curve Isogeny algorithms. These proposed algorithms are described by the Wikipedia article for "NIST Post-Quantum Cryptography Standardization" dated Oct. 29, 2021, which is hereby incorporated by reference. In other words, cryptographic parameters 103*x* and cryptographic algorithms 103*s* can support (i) classical cryptographic functions such as secure hash algorithms (e.g. SHA256 or SHA3-256, etc.) and symmetric ciphering (e.g. AES, Blowfish, XChaCha, etc.), while also including (ii) support for PQC algorithms identified in Round 3 of the National Institute of Standards and Technology (NIST) project for Post-Quantum Cryptography (PQC) Standardization.

In exemplary embodiments, the depicted KEM parameters of Server.PQC-KEM.Parameters 103*f* can comprise a set of parameters that comprise a subset of the cryptographic parameters 103*x*, where the depicted KEM parameters of Server.PQC-KEM.Parameters 103*f* pertain to parameters for different PQC key encapsulation mechanisms (KEM). Exemplary values of the depicted KEM parameters of Server.PQC-KEM.Parameters 103*f* are also depicted and described in connection with FIG. 8 below. Note that Server-.PQC-KEM.Parameters 103*f* can be different than Device-.PQC-KEM.Parameters 101*f*, but in exemplary embodiments, at least one subset of parameters (or a first KEM algorithm) is commonly shared between a server 111 and a device 101, such as the exemplary subset 101*f-x* as depicted and described in connection with FIG. 2*a* and FIG. 8 below. In addition, in some exemplary embodiments a second subset of parameters (or a second KEM algorithm) is commonly shared between a server 111 and a device 101, such as the exemplary subset 103*f-y* as depicted and described in connection with FIG. 2*a* and FIG. 8 below.

A server 111 could store one or a plurality of different server certificates cert.server 103*c*. Each of the different server certificates 103*c* could use different values for (i) a server identity such as a server name or server ID 111*a*, (ii) a static server static public key PK.server 103*d* for verifying digital signatures generated by server 111, (iii) a different certificate issuer for generating a digital signature for the server certificate 103*c*, and/or (iv) a subset of cryptographic parameters 103*s* and cryptographic algorithms 103*x* for use with the server certificate 103*c*. In exemplary embodiments, the server certificate 103*c* can be formatted according to X.509v3 standards. The server identity in a device certificate 101*c* can be a server ID 111*a*, or a network access identifier (NAI) as specified in IETF RFC 7542, and other possibilities exist as well without departing from the scope of the present disclosure.

As depicted in FIG. 1, server 111 and network 103 can also store a static private key SK.server 103*b* corresponding to the public key PK.server 103*d* in each server certificate cert.server 103*c*. In exemplary embodiments, the subset of cryptographic parameters 103*s* and cryptographic algorithms 103*x* for a server certificate cert.server 103*c* can support any of the digital signature algorithms as specified in Round 3 of the NIST PQC project, which are also identified in the Wikipedia PQC article. The server certificate cert.server 103*c* can be stored in nonvolatile memory such as a storage memory 111*b* when server 111 is powered off or inactive, and then moved into volatile memory such as a RAM memory 111*m* for memory 101*m* when server 111 operates or is connected to IP network 107.

Server 111 can select a subset 103*f-y* (or a second KEM algorithm) of the set of KEM parameters 103*f* in order to generate a PKI key pair and for conducting or performing a second KEM 101*k*/103*j* with a device 101. In an exemplary embodiment, subset 103*f-y* of the KEM parameters of Server.PQC-KEM.Parameters 103*f* could specify the selection of Kyber-512 for approximately 128 bit of security with symmetric encryption, or Kyber-768 for approximately 192 bits of security with symmetric encryption, or Kyber-1024 for approximately 256 bits of security with symmetric encryption. In other words, Server.PQC-KEM.Parameters 103*f* could specify a family or group of parameters for a PQC KEM such as, but not limited to, Kyber, SIKE, BIKE, etc., and the subset 103*f-y* could comprise the parameters for using a specific KEM for the family or group (such as subset 103*f-y* (or second KEM algorithm) specifying values for one of the equivalent levels of 128, 192, or 256 bits of security for a symmetric ciphering algorithms). Other post-quantum cryptographic algorithms and parameters could be supported as well for both the KEM parameters of Server.PQC-KEM.Parameters 103*f* and a subset 103*f-y* for a second KEM algorithm.

For some preferred exemplary embodiments and as depicted in FIG. 8 below, the subset 103*f-y* of parameters for the second KEM algorithm selected by server 111 can be different than the subset 101*f-x* for the first KEM algorithm selected by device 101, such as supporting a different KEM algorithm, including a different type or family. For other existing embodiments, the subset 103*f-y* can be the same as the subset 101-*x*, such as both server 111 and device 101 using the same KEM algorithm and parameters for both the first KEM and second KEM.

Server 111 can include a PQC key pair generation algorithm PQC.KeyGen 103*q* from cryptographic algorithms 103*s* and the selected subset 103*f-x* (or second KEM algorithm) of KEM parameters 103*f*. A PQC key pair generation algorithm 103*q* can use the selected subset 103*f-y* (or second KEM algorithm) of KEM parameters 103*f* in order to generate (i) a random number from a random number generator in order to derive or generate a server ephemeral PKI private key eSK.server 103*h* and (ii) a corresponding server ephemeral PKI public key ePK.server 103*i*. Although FIG. 1 depicts a single server ephemeral public key ePK-.server 103*h* and a single server ephemeral private key eSK.server 103*i*, a server 111 could generate, store, and use a plurality of the ephemeral PKI key pairs. A first server ephemeral public key could comprise an ePK.server 103*h*, and a second server ephemeral public key could comprise an ePK-2.server 103*h*-2.

In an exemplary embodiments that use Kyber algorithms, PQC.KeyGen 103*q* can comprise "Algorithm 1 Kyber:CPA: KeyGeno: key generation" from the paper "CRYSTALS—Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 103*q* can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 3 of the NIST PQC project could be used for a PQC.KeyGen 103*q* function as well, without departing from the scope of the present disclosure. A PQC.KeyGen 103*q* within the present disclosure could include any of the KeyGen functions described within the ETSI PQC Summary.

Figure 3:
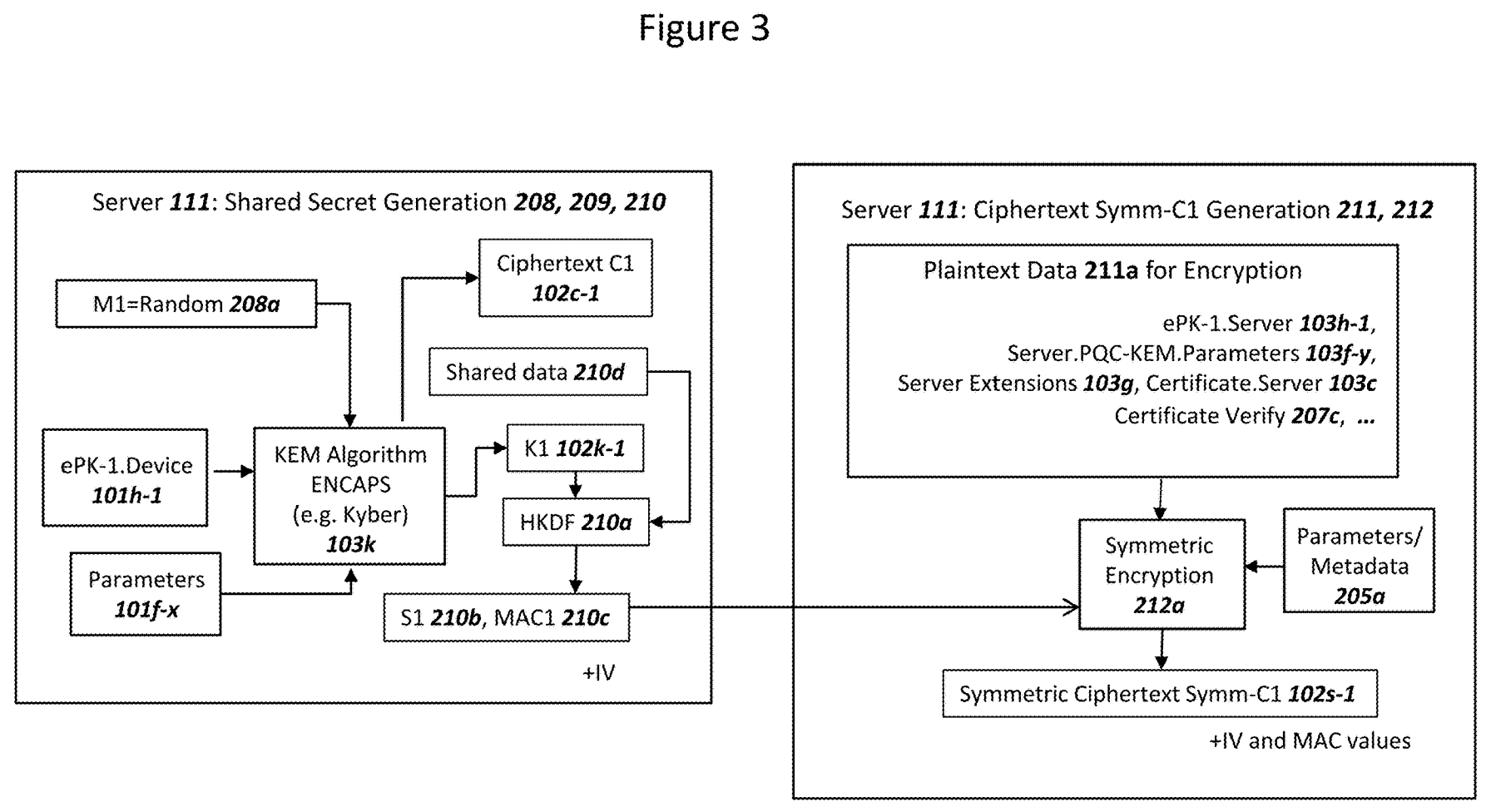

Server 111 can store or record in nonvolatile memory or storage memory 111*b* when server 111 is powered off and (ii) volatile memory such as RAM 111*m* when operating a KEM ENCAPS function 103*k*. A received subset of parameters Server.PQC-KEM.Parameters 103*f*, such as subset 101*f-x* (or first KEM algorithm) could be used with KEM ENCAPS function 103*k*. The received subset (or first KEM algorithm) of parameters Server.PQC-KEM.Parameters 103*f* and a received device ephemeral public key ePK-1.device 101*h*-1 can be used with the KEM ENCAPS function 103*k* in order to convert number such as, but not limited to, a random number for M1 208*a* into both (i) a first asymmetric ciphertext C1 102*c*-1 and (ii) a first shared secret key K1 102*k*-1. The parameters and values used with the KEM ENCAPS function 103*k* are depicted and described for a step 209 in FIG. 2*a* below and also in FIG. 3 below and also FIG. 8 below. The KEM ENCAPS function 103*k* can be included in cryptographic algorithms 103*s* and support a plurality of different PQC key encapsulation mechanisms (KEM), such as any of the PQC KEM in Round 2 of the NIST PQC project.

Server 111 can store or record in nonvolatile memory or storage memory 111*b* when server 111 is powered off and (ii) volatile memory such as RAM 111*m* when operating a KEM DECAPS function 103*j*. In summary, the selected second subset of KEM parameters 103*f-y* (or the second KEM algorithm) and the generated or derived server ephemeral private key eSK.server 103*i* can be used with the KEM DECAPS function 103*j* in order to convert a received second asymmetric ciphertext C2 102*c*-2 into a second shared secret key K2 102*k*-2. The parameters and values used with the KEM DECAPS function 103*j* are depicted and described for a step 225 in FIG. 2*a* below and also in FIG. 5 below and also FIG. 8 below. The KEM DECAPS function 103*j* can be included in cryptographic algorithms 103*s* and support a plurality of different PQC key encapsulation mechanisms (KEM), such as any of the PQC KEM in Round 3 of the NIST PQC project.

Server 111 can include a set of server parameters or server extensions 103*g* for conducting a secure session with a device 101. The secure session and server extensions 103*g* could be for a standard protocol supporting PQC such as future versions of TLS, SSH, Wireguard, etc. The server parameters 103*g* can include supported cipher suites supported by server 111 in establishing secure communications with a device 101. The server extensions 103*g* can also be used for the "Extensions" fields within a "Server Hello" or equivalent message such as a second message 213 as depicted and described in connection with FIG. 2*a* below. The server extensions 103*g* can include supported symmetric ciphering algorithms and modes, such as the Advanced Encryption Standard (AES) with a ciphertext chaining mode such as Electronic Code Book mode (ECB), Galois/Counter Mode (GCM), etc. Server extensions could also include values or parameters for algorithms to generate MAC or tag values for symmetric ciphertext, such as specifying the use of the Poly1305 algorithm for the generation of MAC or tag values. An example for standards describing the use of Poly1305 includes IETF RFC 7539, which is hereby incorporated by reference.

Server extensions 103*g* can include supported secure hash algorithms, key lengths, and supported digital signature algorithms from cryptographic algorithms 103*s*. Server extensions 103*g* can also include supported cryptographic parameters 103*x* for use with the cryptographic algorithms 103*s*. In general, server extensions 103*g* can be associated with a secure communications protocol supported by server 111 when communicating with a device 101. In other words, a server 111 can support both cryptographic algorithms 103*s* and cryptographic parameters 103*x*, and server extensions 103*g* can be a subset of the cryptographic algorithms 103*s* and cryptographic parameters 103*x* that are specified for a particular secure communications protocol between device 101 and server 111.

A first protocol, such as TLS, supported by server 111 could use first server extensions 103*g* as a first subset of cryptographic algorithms 103*s* and cryptographic parameters 103*x*, and a second protocol, such as Wireguard could use second server extensions 103*g* as a second subset of cryptographic algorithms 103*s* and cryptographic parameters 103*x*. As one example, the first server extensions 103*g* could specify the use of AES-GCM with 256 bit keys and the SHA-2 algorithm, and the second server extensions 103*g* could specify the use of XChaCha-Poly1305 with the SHA-3 algorithm. Other possibilities exist as well for server extensions 103*g* to support different subsets of cryptographic algorithms 103*s* and cryptographic parameters 103*x* without departing from the scope of the present disclosure.

FIG. 2*a*

FIG. 2*a* is a simplified message flow diagram illustrating an exemplary system with exemplary data transmitted and received by a device and a network, in accordance with exemplary embodiments. System 200*a* can include a device 101, IP network 107, a network 103, and a server 111 operating within network 103. The nodes or entities within system 200*a* were also depicted and described in connection with FIG. 1 above, where FIG. 2*a* depicts exemplary steps for the nodes and exemplary message flows between the nodes. Although a single device 101, IP network 107, and network 103 are depicted in a system 200*a*, a system 200*a* could include a plurality of each of the depicted nodes connected via different IP networks 107. In addition, data recorded for device 101 and network 103 depicted and described above in FIG. 1 can be received and stored in the device 101 and network 103 depicted in FIG. 2*a* during the steps and message flows depicted in FIG. 2*a*.

A network 103 in FIG. 2*a* can also include a network database 103*db* to store "pre-shared" secret keys and identifiers or identities of the "pre-shared" secret keys. As contemplated herein, a "pre-shared" secret key does not need to be shared between device 101 and network 103 before the device 101 sends a first message 202 below. The "pre-shared" secret key can be mutually generated by device 101 and network 103 and server 111 based on data exchanged during a first handshake or initial session 250 and the "pre-shared" secret key can be used for resumption or continuing a secure session after the first handshake. In this manner, the use of a "pre-shared" secret key can be equivalent to a "pre-shared" secret key used for resumption as described in the TLS 1.3 specification.

At step 201*a*, device 101 could be manufactured. The electrical components depicted for device 101 in FIG. 2*a* could be assembled and connected, such as (i) mounting both RAM memory for device 101 memory 101*m* onto a circuit board and then also (ii) mounting flash memory or storage memory for device 101 memory 101*m* onto a circuit board for device 101. For some embodiments, RAM memory for device 101 memory 101*m* may be within processor 101*p* operating as a "System on a Chip". Sensors 101*y* and actuators 101*z* could be connected to a device 101 in a step 201*a* as well. Some firmware could be loaded into device 101 at a step 201*a*, such as storing a boot loader firmware within memory 101*m* in order for device 101 to being operating after power up. Some drivers could be loaded or stored within device 101 at a step 201*a* as well.

At step 201*b*, firmware and software can be stored or recorded in device 101 during manufacturing or a device distribution step. The firmware and software can be stored within nonvolatile memory or storage memory for memory 101*m* within device 101. The firmware and software can include device drivers used by processor 101*p* within device 101. Memory 101*m* may include a flash memory and record firmware and/or an operating system for device 101. Memory 101*m* can record or store long-term and non-volatile storage of data or files for device 101. Device 101 could also be distributed to end users during a step 201*b* after the loading of firmware and configuration data for device 101.

In an exemplary embodiment, an operating system with configuration settings is recorded in memory 101*m* in a step 201*b*. The operating system can include cryptographic algorithms 101*s* and cryptographic parameters 101*x*, where cryptographic algorithms 101*s* and cryptographic parameters 101*x* were depicted and described in connection with FIG. 1 above. Note that the set of parameters Device.PQC-KEM.Parameters 101*f* as first subset of cryptographic parameters 101*x* can be stored in device 101 at a step 201*b*. The firmware, operating system, and application software loaded in device 101 in a step 201*b* can include machine executable instructions for processor 101*p* in order for processor 101*p* to conduct the subsequent series of steps and message flows depicted for device 101 in FIG. 2*a* and also subsequent figures below.

A step 201*b* can include device 101 selecting a protocol for establishing a secure session with a network 103. As contemplated herein, a secure session can comprise communications between device 101 and network 103 where the data is both encrypted and at least authenticated using a certificate and digital signature for the server. In preferred exemplary embodiments, the encryption of data between device 101 and network 103 supports forward secrecy through the use of ephemeral PKI key pairs. The secure session could support any of TLS, DTLS, SSH, a VPN, IPSec, and other protocols are possible as well without departing from the scope of the present disclosure. A set of device extensions 110*g* can be selected for each of the protocols for secure sessions supported by device 101 in a step 201*b*.

A step 201*b* can include device 101 selecting a protocol for establishing a secure session and then using subsequent steps and message flows as depicted herein in order to conduct the protocol for the secure session. The message flows depicted in FIG. 2*a* support structures for TLS, but other protocols could be supported in a system 200*a* as well. The software or firmware loaded in a step 201*b* can include client software or firmware for device 101 to conduct the subsequent steps depicted herein, such as generating a Transport Layer Security (TLS) "client hello" message for message 202, receiving and processing a TLS "server hello" message for message 213, etc. A network interface within device 101, such as, but not limited to, radio 101*z*, could communicate the messages depicted in FIG. 2*a* including sending a first message 202, receiving a second message 213, etc.

At a step 201*c*, server 111 within network 103 can conduct a step equivalent to a step 201*b* by device above, where server 111 is loaded is an operating system and configuration settings or parameters. The data could be stored within storage memory 111*b*. Prior to a step 201*c*, the electrical components for a server 111 depicted as server hardware 111*h* in FIG. 1 above could be assembled and connected. A network 103 could perform the step 201*c* for a server 111, such as a network administrator connecting to server 111 and performing the steps. The operating system and associated application software for server 111 can include cryptographic algorithms 103*s* and cryptographic parameters 103*x*. A step 201*c* could include server 111 loading and operating a server package for processing secure sessions and messages such as OpenSSL, BouncyCastle, Secure Shell (SSH), an IP Security (IPSec) server, a VPN such as Wireguard, and other possibilities exist as well for the server packages and application software loaded in a step 201*c*. In exemplary embodiments, server 111 conducting the steps in FIG. 2*a* can comprise a virtual server operating on a host server, where the host server includes computing hardware 111*h*.

Note that the set of parameters Server.PQC-KEM.Parameters 103*f* as first subset of cryptographic parameters 103*x* can be stored in server 111 at a step 201*c*. The firmware, operating system, and application software loaded in server 111 in a step 201*c* can include machine executable instructions for processor 111*p* in order for processor 111*p* to conduct the subsequent series of steps and message flows depicted for server 111 in FIG. 2*a* and also subsequent figures below. The software or firmware loaded in a step 201*c* can include host software or firmware for server 111 to conduct the subsequent steps depicted herein, such as received and processing a Transport Layer Security (TLS) "client hello" message for message 202, processing and sending a TLS "server hello" message for message 213, etc.

At step 201*c*, server 111 can also load the cryptographic algorithms 103*s* with a server process for conducting transport layer security such as TLS, where the server process could comprise software such as OpenSSL, Microsoft Server, etc. In addition, although TLS is described as a technology or protocol for a secure session in FIG. 2*a*, other and related protocols could be used as well for processing digital signatures in the current disclosure, including IP Security (IPSec), Datagram Transport Layer Security (DTLS) with UDP messages, Secure Shell (SSH), and other possibilities exist as well.

At step 201*c*, server application software for conducting a secure session with device 101 such as a TLS server could be configured to support the use of a KEM ENCAPS function 103*k* and also the KEM DECAPS function 103*j*, which is depicted and described in connection with FIG. 1 above. Note that the configuration step 201*c* could also specify a preference for the use of different cryptographic algorithms 101*s* for the KEM ENCAPS function 103*k* and the KEM DECAPS function 103*j*.

At steps 201*d* through 201*f*, device 101 can begin operating and process data in order to generate a first message 202 for server 111, where the first message 202 could comprise a "Client Hello" message. Steps 201*d* and subsequent steps in FIG. 2*a* can use the computing hardware in device 101 as depicted in FIG. 1 above, as well as the operating system and stored parameters within device 101 stored in a step 201*b* above. At step 201*d*, device 101 can power on or wake from a sleep state and then select either a network ID 103*a* or a server ID 111*a* for sending a first message 202. The IDs 103*a* or 111*a* could comprise domain names or IP addresses for connecting to the network 103.

Step 201*d* can include device 101 selecting device parameters 101*g* for use with a secure session between device 101 and server 111. In some protocols such as TLS, the device parameters 101*g* can be referred to as extensions, such the device or client data for the section "4.2—Extensions" within IETF RFC 8446. Device extensions 101*g* were also described above in connection with FIG. 1, and can include identifiers or values for supported by both (i) cryptographic algorithms 101*s* and cryptographic parameters 101*x*, and (ii) a protocol for secure communications with network 103 and server 111. Device extensions 101*g* can include supported cipher suites such as names or values identifying supported symmetric ciphering algorithms, secure hash algorithms, digital signature algorithms, etc.

Device extensions 101*g* selected in a step 201*d* can include an identity for a certificate issuer or certificate authority of supported by device 101. The identity for the certificate issuer can comprise a name or string recorded in a certificate issuer certificate root certificate or possibly an intermediate certificate issuer certificates stored within device 101. A value or field for device parameters 101*g* processed by device 101 in a step 201*d* can include a certificate request, such that a "Client Hello" message 202 can request certificates and at least one digital signature from server 111 that supports other fields or values in device parameters 101*g* such as specified supported digital signature algorithms in cryptographic algorithms 101*s* in addition to the an identity of a supported certificate issuer by device 101.

At step 201*d*, device 101 can select a subset of the cryptographic parameters 101*x* for conducting a first KEM 103*k*/101*j*, where the selected subset can comprise Device.PQC-KEM.Parameters 101*f*. An exemplary selected subset of parameters Device.PQC-KEM.Parameters 101*f* are also depicted and described in connection with FIG. 8 below. During a step 201*d*, device 101 could also select KEM parameters 101*f-x* (or a first KEM algorithm) from the subset of parameters Device.PQC-KEM.Parameters 101*f* In other words, at a step 201*d*, the parameters Device.PQC-KEM.Parameters 101*f* can include different supported families of PQC KEM, such as Kyber, BIKE, SIKE, NRTU, HQC, Classic McEliece, etc., where the KEM parameters 101*f-x* (or the first KEM algorithm) can comprise a specific, identified KEM such as one of (i) Kyber-768 or (ii) SIKEp434 or (iii) BIKE security level 3, etc. Device.PQC-KEM.Parameters 101*f* for device 101 are also depicted and described in connection with FIG. 8 below.

At step 201*e*, device 101 can use a PQC.KeyGen function 101*q* in FIG. 1 to generate a device ephemeral PKI key pair comprising a first device ephemeral public key ePK-1.device 101*h*-1 and a first device ephemeral private key eSK-1.device 101*i*-1. The algorithm used to generate the ephemeral PKI key pair can be specified in KEM parameters 101*f-x* selected by device 101 in a step 201*d* above. In a step 201*e*, the device ephemeral PKI key pair can comprise a key pair supporting key encapsulation mechanisms specified in Round 3 of the NIST "Post Quantum Cryptography" (PQC) project. Each KEM provides details for a KeyGen function, which could be used for a PQC.KeyGen function 101*q* in a step 201*e*. The first device ephemeral public key ePK-1.device 101*h*-1 generated in a step 201*e* can comprise the value of "Key Share" within a "Client Hello" message for a first message 202 below. Device 101 can also generate a random number for inclusion in the "Client Hello" message 202 below in a step 201*e*.

After the conclusion of a step 201*e* by device 101, device 101 can then conduct a step 201*f* to process a first message 202 as depicted in FIG. 2*a*. A step 201*f* can use firmware or application software within device 101 in order to perform steps as specified in a protocol for a secure session between device 101 and network 103. The first message 202 can comprise a "Client Hello" or equivalent first message according to the protocol for the secure session selected by device in a step 201*d*. Device 101 can send a first message 202 comprising a "Client Hello" message (or equivalent for a different protocol than TLS) to the server 111 operating in network 103 in a step 201*f*. A domain name for server 111 or an IP address for server 111, such as a server ID 111*a*, could be (i) stored in device 101 at a step 201*e* and (ii) used by device 101 to send the first message 202 to network 103 and server 111. A step 201*f* can comprise processor 101*p* writing the data for the first message 202 to a radio 101*r* (or equivalently a network interface if device 101 does not include a radio 101*r*). As depicted in FIG. 2*a*, the first message 202 can comprise a first "Client Hello 1" message, where a second "Client Hello 2" message depicted in FIGS. 2*b*, 2*c*, and 2*d* below can comprise a message for use with resumption of the secure session.

As depicted in FIG. 2*a*, the first message 202 from device 101 to server 111 can comprise a network ID 103*a*, the first device ephemeral public key ePK-1.Device generated in a step 201*e*, device parameters 101*g* selected in a step 201*d*, a set of parameters for conducting a PQC KEM of Device-.PQC-KEM.Parameters 101*f*, and the subset of parameters 101*f-x* for the first device ephemeral public key ePK-1.Device 101*h*-1 and conducting a first KEM 103*k*/101*j* between device 101 and server 111. In other words, Device.PQC-KEM.Parameters 101*f* can include multiple different KEM parameters and algorithms supported by device 101, such as those depicted for a Device.PQC-KEM.Parameters 101*f* in FIG. 8 below. As contemplated herein, Device.PQC-KEM.Parameters 101*f* can also be referred to as parameters 101*f* Message 202 can include headers or values specifying the message is for a "Client Hello" according to the secure session protocol selected by the device 101. The first message 202 can also include a random number 202*a* read by device 101 from a random number generator 128.

Server 111 can receive the first message as a "Client Hello" message 202 via a network interface 111*d* in server hardware 111*h* (depicted for server 111 in FIG. 1 above). Server 111 can use application software such as, but not limited to, OpenSSL with cryptographic algorithms 103*s* and cryptographic parameters 103*x* and server hardware 111*h* to process the received first message 202.

At step 203*a*, server 111 can conduct a first step to process the "Client Hello" message 202. Server 111 can confirm the "Client Hello" message 202 is supported by server 111 using the values within device parameters 101*g*, 101*f*, and 101*f-x*. Server 111 can validate that the first device ephemeral public key ePK-1.device 101*h*-1 received is properly structured and consistent with KEM parameters 101*f-x*. The first device ephemeral public key ePK-1.device 101*h*-1 can also be referred to as a key share. For example, if KEM parameters 101*f-x* state the key 101*h*-1 supports the Kyber-786 algorithm, then in a step 203*a* server 111 could at least verify the ePK-1.device 101*h*-1 is 1184 bytes long and also can be successfully input into a KEM ENCAPS function 103*k* for sever 111.

At a step 203*a*, server 111 can also verify that KEM parameters 101*f-x* is supported by Server.PQC-KEM.Parameters 103*f* In other words, in a step 203*a*, server 111 can determine the selected KEM parameters 101*f-x* for the first KEM 103*k*/101*j* and ePK-1.device 101*h*-1 are supported by server 111 by cryptographic algorithms 103*s* and cryptographic parameters 103*x*. The first KEM 103*k*/101*j* associated with received KEM parameters 101*f-x* can be for (i) KEM ENCAPS 103*k* by server 111 and (ii) KEM DECAPS 101*j* by device 101 as depicted and described in connection with FIG. 1 above.

In a preferred exemplary embodiment, for a step 203*b*, server 111 can select a second set of KEM parameters 103*f-y* that are both (i) different than the first set of KEM parameters 101*f-x* received in message 202 and (ii) supported by or included within the set of KEM parameters 101*f* also received in a message 202. The selection of a second set of KEM parameters 103*f-y* in a step 203*b* is also depicted and described in connection with FIG. 8 below. In summary, for a step 203*b* and in a preferred exemplary embodiment, server 111 selects KEM parameters 103*f-y* for a second KEM 101*k*/103*j*, where the second KEM comprises (i) KEM ENCAPS 101*k* by device 101 and (ii) KEM DECAPS 103*j* by server 111 as depicted and described in connection with FIG. 1 above. Note that the above sentence also describes a second KEM 806 which is depicted and described in connection with FIG. 8 below.

In a preferred exemplary embodiment, the KEM parameters 103*f-y* selected in a step 203*b* support at least the following criteria for KEM parameters 103*f-y*. (i) are included within a list or set of parameters 101*f* for device 101 received in message 202, (ii) are included within a list or set of parameters 103*f* for server 111 as supported by server 111, and (iii) support a different family or type of PQC algorithms than KEM parameters 101*f-x*. In other words if (x) device 101 signals support of Kyber and SIKE algorithms in parameters 101*f* and selects Kyber for KEM parameters 101*f-x* and ePK-1.device 101*h*-1, and (y) server 111 also supports Kyber and SIKE algorithms parameters 103*f* and cryptographic algorithms 103*s*, then for a step 203*b* server 111 in preferred embodiments can select a SIKE algorithm for KEM parameters 103*f-y* to use with the second KEM 101*k*/103*j* comprising KEM ENCAPS 101*k* and KEM DECAPS 103*j*. Other possibilities exist as well for the specific families of algorithms that could be specified in parameters 101*f* and 103*f*, received in 101*f-x*, and the selected in a step 203*b* by server 111 for KEM parameters 103*f-x* without departing from the scope of the present disclosure.

At step 204, server 111 can use a PQC.KeyGen function 103*q* to generate a server ephemeral PKI key pair comprising a server ephemeral public key ePK.server 103*h* and a server ephemeral private key eSK.server 103*i*. The algorithm used to generate the ephemeral PKI key pair can be specified in KEM parameters 103*f-y* selected by server 111 in a step 203*b* above. In a step 204, the device ephemeral PKI key pair can comprise a key pair supporting key encapsulation mechanisms specified in Round 2 of the NIST "Post Quantum Cryptography" (PQC) project. Each KEM provides details for a KeyGen function, which could be used for a PQC.KeyGen function 103*q* from FIG. 1 in a step 204. The server ephemeral public key ePK.server 103*h* generated in a step 204 can comprise the value of "Key Share" within a "Server Hello" message for a second message 213 below.

In some exemplary embodiments, the set of KEM parameters 103*f-y* (i) used in step 204 to generate a server ephemeral public key ePK.server 103*h* and a server ephemeral private key eSK.server **103*i* can be (ii) equal to or equivalent to KEM parameters 101*f-x* received in a message 202. In other words, some exemplary embodiments support device 101 and server 111 using the exact same algorithm for both (i) a first KEM 103*k*/101*j* initiated by a device through KeyGen and sending a first public key of ePK-1.device 101*h*-1, and (ii) a second KEM 101*k*/103*j* initiated by a server through KeyGen and sending a second public key of ePK.server 103*h*. In other exemplary embodiments, device 101 and server 111 use completely different algorithms for both (i) the first KEM 103*k*/101*j* initiated by a device through KeyGen and sending a first public key of ePK-1.device 101*h*-1, and (ii) the second KEM 101*k*/103*j* initiated by a server through KeyGen and sending a second public key of ePK.server 103*h***.

The selection and use of the same KEM algorithm for both the first KEM **103*k*/101*j* and second KEM 101*k*/103*j* can depend on the processing capabilities and security requirements for device 101 and server 111/network 103. For lower security requirements and/or lower processing capabilities for device 101 and server 111/network 103, both nodes could use the same KEM algorithm for both the first and second KEM. For higher security requirements and/or higher processing capabilities for the device 101 and server 111/network 103, the server 111 in a step 203*b*** can select a different KEM algorithm than the first KEM algorithm for the first device ephemeral public key and for the sever ephemeral PKI key pair. For this example of higher security requirements, then the first KEM algorithm for the first device ephemeral public key and the second KEM algorithm for the server ephemeral public key can be different and also support different types of algorithms (e.g. first KEM algorithm supporting lattice-based cryptography and the second KEM algorithm supporting code-based cryptography or SIKE).

In a first exemplary embodiment, (i) the first KEM **103*k*/101*j* initiated or selected by device 101 using ePK-1.device 101*h*-1 supports lattice based algorithms, and (ii) the second KEM 101*k*/103*j* initiated or selected by server 111 using ePK.server 103*h* supports Supersingular Isogeny Key Encapsulation (SIKE). In a second exemplary embodiment, (i) the first KEM 103*k*/101*j* initiated or selected by device 101 using ePK-1.device 101*h*-1 supports lattice based algorithms, and (ii) the second KEM 101*k*/103*j* initiated or selected by server 111 using ePK.server 103*h* supports code based algorithms. In a third exemplary embodiment, (i) the first KEM 103*k*/101*j* initiated or selected by device 101 using ePK-1.device 101*h*-1 supports code based algorithms, and (ii) the second KEM 101*k*/103*j* initiated or selected by server 111 using ePK.server 103*h*** supports lattice based algorithms.

In a fourth exemplary embodiment, (i) the first KEM **103*k*/101*j* initiated by device 101 using ePK-1.device 101*h*-1 supports code based algorithms and (ii) the second KEM 101*k*/103*j* initiated by server 111 using ePK.server 103*h* supports Supersingular Isogeny Key Encapsulation. In a fifth exemplary embodiment, (i) the first KEM 103*k*/101*j* initiated by device 101 using ePK-1.device 101*h*-1 supports Supersingular Isogeny Key Encapsulation and (ii) the second KEM 101*k*/103*j* initiated by server 111 using ePK-.server 103*h* supports code based algorithms. In a sixth exemplary embodiment, (i) the first KEM 103*k*/101*j* initiated by device 101 using ePK-1.device 101*h*-1 supports Supersingular Isogeny Key Encapsulation and (ii) the second KEM 101*k*/103*j* initiated by server 111 using ePK-.server 103*h*** supports lattice based algorithms.

For the six embodiments described above in the previous two paragraphs, lattice based algorithms could comprise any of CRYSTALS-KYBER, FrodoKEM, NTRU Prime, and SABER. For the six embodiments described above in the previous two paragraphs, code based algorithms could comprise any of BIKE, Classic McEliece, and HQC. The algorithms described in the previous sentence are specified in "Round 3" of the Wikipedia PQC article.

At step 205, server 111 can select a server certificate of cert.server **103*c* which supports the device extensions 101*g* received in a message 202. At one example, different cert-.server 103*c* could support both (i) different digital signature algorithms, and (ii) different certificate issuers (such that cert.server 103*c* could be verified by device 101 using the same certificate issuer). At the conclusion of a step 205, server 111 can identify and store a cert.server 103*c* for subsequent steps and messages in FIG. 2*a* that would be compatible with device 101. In exemplary embodiments, the server certificate of cert.server 103*c* supports at least a subset of both device extensions 101*g* and server extensions 103*g***.

At step 205, server 111 can also select metadata **205*a*, where metadata 205*a* can include parameters or values used for the subsequent generation of both a first asymmetric ciphertext C1 102*c*-1 and a first symmetric ciphertext symm-C1 102*s*-1. As one example, metadata 205*a* could include values or a name for (i) KEM parameters 101*f-x* that specify the first asymmetric ciphertext C1 102*c*-1 supports the KEM parameters 101*f-x*, and (ii) a symmetric ciphering algorithm used to generate a first symmetric ciphertext symm-C1 102*s*-1. As a second example, the metadata 205*a* could include an initialization vector for the first symmetric ciphertext C1 102*s*-1 and also an identity of the symmetric ciphering algorithm (such as "AES") and a chaining mode (e.g. ECB, CBC, etc.). For some embodiments, initialization vectors could be mutually derived using shared secret keys and HKDF, and the initialization vectors could be omitted from metadata for messages. In exemplary embodiments, the metadata 205*a* selected by a server 111 in a step 205 can be a selected subset of device extensions 101*g* received in a message 202**.

As contemplated herein, the depicted numeral values of "**102*c*" designate an asymmetric ciphertext and the depicted numeral values for "102*s*" designate a symmetric ciphertext. A first asymmetric ciphertext is depicted with a numeral of 102*c*-1 and a second asymmetric ciphertext is depicted with a numeral of 102*c*-2. Likewise, a first symmetric ciphertext is depicted with a numeral of 102*s*-1 and a second symmetric ciphertext is depicted with a numeral of 102*s*-2**, etc.

At step 205, server 111 can also select server extensions **103*g* used by the server in generating a subsequent "Server Hello" message. Note that server extensions 103*g* can be a subset of the supported server extensions 103*g* described in FIG. 1 above. Server 111 can use both (i) the received device extensions 101*g* from a "Client Hello" message 202 and (ii) stored parameters and algorithms from for server extensions 103*g* in order to select a compatible and preferred set of server extensions 103*g* that would also be supported by device 101. Server extensions 103*g* can select subsets of algorithms or parameters offered or proposed by device 101 in the "Client Hello" message 202. In other words, in exemplary embodiments, server extensions 103*g* can be a subset of device extensions 103*g* received by server 111 in a message 202**.

A portion of the subsets of subsets of algorithms or parameters offered or proposed by device 101 in the "Client Hello" message 202 can also be included in metadata **205*a*, such as specifying a specific symmetric ciphering algorithm and parameters for the first symmetric ciphertext symm-C1 102***s*-1. In other words, device 101 could use metadata 205*a* in order to process and decrypt the first symmetric ciphertext symm-C1 102*s*-1 (where metadata 205*a* would normally be plaintext in order to device 101 to process the symmetric ciphertext). For embodiments of the present invention, the server extensions 103*g* selected by a server 111 in a step 205 can include both (i) a digital signature algorithm for generating a digital signature in a "Certificate Verify" 207*c* and (ii) symmetric ciphering parameters for processing a first symmetric ciphertext symm-C1 102*s*-1. In addition, metadata 205*a* can include an algorithm for generation of MAC or tag values in order to ensure message integrity, such as metadata 205*a* specifying the use of Poly1305 for MAC or tag values of symmetrically encrypted data. Other algorithms for MAC or tag values could be specified as well.

At step 208, server 111 can derive or generate a random number M1 208*a* for use in a first KEM 103*k*/101*j* between server 111 and device 101. At step 209, server 111 can use both (i) the received device ephemeral public key of ePK-1.device 101*h*-1 and (ii) the specified subset of KEM parameters 101*f*-*x* for the device ephemeral public key and the first KEM 103*k*/101*j* in order to generate both (x) a first asymmetric ciphertext C1 102*c*-1 and (y) a first shared secret key K1 102*k*-1.

At step 209, server 111 can use a KEM ENCAPS function 103*k* with both (i) and (ii) from the previous sentence as well as M1 208*a* in order to generate both (x) a asymmetric ciphertext C1 102*c*-1 and (y) a first shared secret key K1 102*k*-1. A summary of the step 209 by server 111 with a KEM ENCAPS function 103*k* was also depicted and described in connection with FIG. 1 above. A server 111 can use both cryptographic algorithms 103*s* and cryptographic parameters 103*x* in order to conduct the step 209. The function and use of a step 209 and a KEM ENCAPS function 103*k* is also depicted and described in FIG. 3 below. In exemplary embodiments, both the value of M1 208*a* comprising a random number and the device ephemeral public key can be stored within RAM memory 111*m* of server 111 within network 103.

At step 206, server 111 can select data and values for processing a "Server Hello" message 213. In exemplary embodiments the data or values for a "Server Hello" message 213 selected in a step 206 can include at least (i) a first server ephemeral public key ePK.server 103*h*, (ii) the second set of KEM parameters for the server ephemeral public key ePK.server 103*h* of 103*f*-*y*, (iii) the server certificate cert.server 103*c* selected in a step 205 above, (iv) server extensions 103*g* from a step 205, and (v) the first asymmetric ciphertext C1 102*c*-1 output from a step 209. The values for (i) through (v) in the previous sentence can comprise a "data for signature" which can be input into a PQC digital signature algorithm such as Dilithium in order to generate a "Certificate Verify" 207*c* value for inclusion in plaintext 211*a*. Note (i) the second set of KEM parameters 103*f*-*y* can be values for a subset of Server.PQC-KEM.Parameters 103*f* and (y) the first set of KEM parameters 101*f*-*x* can be for the device ephemeral public key ePK-1.device 101*h*-1. At step 206, server 111 can also include the data and values selected for a "Server Hello" message in a "data for signature". Consequently, as depicted in FIG. 2*a*, a step 206 can normally be conducted after a step 208 and 209 in order to select and use the first asymmetric ciphertext C1 102*c*-1 output from a step 209 for inclusion in the "data for signature".

At step 206, server 111 can select a digital algorithm and conduct digital signature generation step in order to generate a digital signature which can comprise a "Certificate Verify" 207*c* value. The algorithm for digital signature generation could be specified or identified by the supported digital signature algorithm in both device extensions 110*g* and server extensions 103*g*. In other words, the digital signature algorithm selected in a step 206 can be a selected subset supported by both device extensions 110*g* and server extensions 103*g*, and can comprise the digital signature algorithm within server extensions 103*g* from a step 205 above.

At step 207, server 111 can use the selected digital signature algorithm from a step 206 and conduct digital signature generation step in order to generate a digital signature which can comprise a "Certificate Verify" 207*c* value. The step 207 can occur after a step 209, because the output of a step 209 comprising at least a first asymmetric ciphertext C1 102*c*-1 can be used for "data to sign" in a step 207 to generate a digital signature comprising the "Certificate Verify" 207*c* value. The "data for signature" selected for input into a digital signature algorithm can include the following: the random number 202*a* received in a message 202, metadata 205*a* selected or processed in a step 205 (and transmitted to device 101 in a message 213 below), the first asymmetric ciphertext C1 102*c*-1 generated in a step 209, the first server ephemeral public key ePK.server 103*h*, server extensions 103*g*, and the server certificate cert.server 103*c*.

Variations for the data for signature selected by server 111 in a step 207 are possible without departing from the scope of the present disclosure. As one example, the data for signature in order to generate a digital signature of a "Certificate Verify" 207*c* value could be over the first shared secret key K1 102*k*-1 instead of the first asymmetric ciphertext 102*c*-1. Alternatively, the generation of digital signature for a "Certificate Verify" 207*c* could include both the first asymmetric ciphertext 102*c*-1 and the shared secret K1 102*k*-1 as input into the "data to sign" in a step 207. For some embodiments, the parameters 103*f*-*y* for the first server ephemeral public key of ePK.server 103*h* and Server.PQC-KEM.Parameters could be include in the "data to sign" to generate the digital signature of "Certificate Verify" 207*c*.

Note that the inclusion of at least one of (i) the first asymmetric ciphertext C1 102*c*-1 generated in a step 209 and/or (ii) the first shared secret key K1 102*k*-1 in a "data to sign" by a server 111 in a step 207 can be important for security against a MITM attacker located between device 101 and server 111 in an IP network 107. The device 101 has sent a first device ephemeral public key ePK-1.device 101*h*-1 as plaintext in a message 202. An attacker could attempt to (i) generate a substitute and "fake" first device ephemeral public key ePK-1.device 101*h*-1' with a corresponding fake device ephemeral private key, and then (ii) receive the first asymmetric ciphertext C1 102*c*-1 for the "fake" first device ephemeral public key ePK-1.device 101*h*-1', (iii) use the corresponding fake device ephemeral private key with the first asymmetric ciphertext C1 102*c*-1 to generate the first shared secret K1 102*k*-1, and (iv) substitute a "fake" first asymmetric ciphertext C1 102*c*-1' for the first device ephemeral public key ePK-1.device 101*h*-1 in a response message 213' to device 101 by the MITM attacker.

By server 111 including at least one of (i) the first asymmetric ciphertext C1 102*c*-1 generated in a step 209 and/or (ii) the first shared secret key K1 102*k*-1 in a "data to sign" by a server 111 in a step 207, then the digital signature of "Certificate Verify" 207*c* over at least (i) or (ii) can be used by device 101 in a signature verification step 217 below in order to verify the server 111 generated the first asymmetric ciphertext C1 102*c*-1. In other words, the verification of the digital signature in a "Certificate Verify" 207*c* by device 101 in a step 217 below can fail if a MITM attacker substitutes a "fake" first asymmetric ciphertext C1 102*c*-1' for the first device ephemeral public key ePK-1.device 101*h*-1.

At step 210, server 111 can use a hash-based key derivation function or an HMAC-based Extract-and-Expand Key Derivation Function (HKDF) 210*a* (depicted and described in FIG. 3 below) with at least the first shared secret key K1 102*k*-1 output from KEM ENCAPS function 103*k* in order to generate both (i) a first symmetric ciphering key of S1 210*b* and a first message authentication code (MAC) key MAC1 210*c*. As described below, HKDF 210*a* can comprise a HMAC-based Extract-and-Expand Key Derivation Function (HKDF). In other words, a HMAC-based Extract-and-Expand Key Derivation Function can be a subset of a hash-based key derivation function. Note that in some exemplary embodiments, additional data mutually shared between device 101 and server 111 besides the first shared secret key K1 102*k*-1 can also be input into the HKDF 210*a* in a step 210 in order to generate S1 210*b* and MAC1 210*c*. The additional data input into HKDF 210*a* can comprise data from the message 202, such as, but not limited to, the device ephemeral public key ePK-1.device 101*h*-1 from device 101, device extensions 101*g*, and/or parameters 101*f* and 101*f-x*. A protocol for conducting the secure session between device 101 and network 103 could also specify text values or a text value for input into the HKDF 210*a*, where both the device 101 and server 111 would use the same text value or text values for input into the HKDF 210*a*.

A step 210 by server 111 can also generate two values for each of the first symmetric ciphering key of S1 210*b* and a first message authentication code (MAC) key MAC1 210*c*. A first portion of the first symmetric ciphering key of S1 210*b* could be used with a symmetric encryption step 212*a* by server 111 in step 212 below (also depicted in FIG. 3), and a second portion of the first symmetric ciphering key of S1 210*b* could be used with a symmetric decryption step 215*a* by server 111 in a step 226 below (depicted in FIG. 5). Likewise, a first portion of the first MAC key MAC1 210*c* could be used with the generation of MAC values with the symmetric encryption step 212*a* by server 111 in step 212 below (also depicted in FIG. 3), and a second portion of the first MAC key MAC1 210*c* could be used with a symmetric decryption step 215*a* by server 111 in a step 226 below (depicted in FIG. 5). The corresponding use to two portions of both the first symmetric ciphering key of S1 210*b* and the first message authentication code (MAC) key MAC1 210*c* by device 101 is also described below for device 101 in a step 215.

Other data from a message 202 can be used for input into a HKDF 210*a*, in addition to the first shared secret key K1 102*k*-1, without departing from the scope of the present disclosure, such as, but not limited to, (i) a network ID 103*a* or a server ID 111*a* that can be included in a message 202, as well as plaintext data from a message 213 such as (ii) portions or all of metadata 205*a*, and/or the first asymmetric ciphertext C1 102*c*-1. For other embodiments, the input of additional data from a message 202 into a HKDF 210*a* besides K1 102*k*-1 could be omitted, and S1 210*b* and MAC1 210*c* could be derived from K1 102*k*-1. The function and use of a step 210 using output from KEM ENCAPS function 103*k* of at least K1 102*k*-1 and a HKDF 210*a* is also depicted and described in FIG. 3 below.

A step 207 for conducting digital signature generation is also depicted and described in connection with FIG. 3 of PCT patent application PCT/US21/43603 filed Jul. 29, 2021 in the name of John Nix and titled "Secure Communication with Two Post-Quantum Cryptography Key Encapsulations and Authentication", which is herein incorporated by reference in its entirety. The "Certificate Verify" 207*c* value can be generated using the server static private key SK.server 103*b* for the public key PK.server 103*d* in the server certificate cert.server 103*c*, where the keys are also depicted and described in connection with FIG. 1 above.

At step 211, server 111 can select and process a plaintext 211*a* for encryption into a first symmetric ciphertext symm-C1 102*s*-1. A step 211 is also depicted and described in connection with FIG. 3 below. Note that the first asymmetric ciphertext C1 102*c*-1 could be previously output from the KEM ENCAPS function 103*k* (where device 101 uses the first asymmetric ciphertext C1 102*c*-1 for the first KEM 103*k*/101*j*). In exemplary embodiments the data or values for the plaintext 211*a* selected in a step 211 can include at least (i) the server ephemeral public key ePK.server 103*h*, (ii) the second set of KEM parameters 103*f-y* for the server ephemeral public key ePK.server 103*h* for a second KEM algorithm, (iii) the server certificate cert.server 103*c* selected in a step 205 above, (iv) server extensions 103*g* from a step 205, and (v) the digital signature generated in a step 207 of a "Certificate Verify" 207*c*. Additional data could be included in plaintext 211*a* or some data listed above could be omitted from plaintext 211*a* without departing from the scope of the present disclosure. The plaintext 211*a*, the server ephemeral public key ePK.server 103*h*, and the server ephemeral private key eSK.server 103*i* can be stored within RAM memory 111*a* for server 111 and network 103. The KEM parameters 103*f-y* and the server certificate cert.server 103*c* as well as the server static private key SK.server 103*b* can be stored within nonvolatile memory or storage memory 111*b*.

At step 212, server 111 can use symmetric encryption 212*a* with the plaintext 211*a* from a step 211 in order to generate the first symmetric ciphertext symm-C1 102*s*-1. A step 212 is also depicted and described in connection with FIG. 3 below. The symmetric encryption 212*a* can be included within cryptographic algorithms 103*s* for server 111. The symmetric encryption 212*a* can include input of the parameters specified in metadata 205*a* from a step 205 above and the symmetric ciphering key S1 210*b* and MAC key MAC1 210*c* from a step 210 above. In a step 212, server 111 can also use an initialization vector for the symmetric encryption 212*a*, where the initialization vector can be included with metadata 205*a* or derived from HKDF 210*a*. As contemplated herein, an initialization vector for use with symmetric encryption or decryption can also be referred to as a nonce or a nonce value.

As depicted in FIG. 2*a*, server 111 can then send device 101 a response second message 213, where the response second message can also comprise a "Server Hello" message. As depicted in FIG. 2*a*, the response second message 213 can comprise a first "Server Hello 1" message, where a second "Server Hello 2" message depicted in FIGS. 2*b*, 2*c*, and 2*d* below can comprise a response message for use with resumption of the secure session. The response second message 213 can include (i) metadata 205*a* from a step 205 above, (ii) the first asymmetric ciphertext C1 102*c*-1 output from the KEM ENCAPS function 103*k* in a step 209, and (iii) the first symmetric ciphertext symm-C1 102*s*-1 output from step 212. Additional data could be included in a response second message 213 without departing from the scope of the present disclosure. Note that although a message 213 with a depicted asymmetric ciphertext of C1 102*c*-1 shows the value K1 102*k*-1 within brackets, the actual first shared secret key K1 102*k*-1 may normally not be included within the ciphertext. In other words, the depicted asymmetric ciphertext of C1 102*c*-1 includes sufficient data for device 101 to use the C1 102*c*-1 with the KEM DECAPS 101*j* function and a device ephemeral private key to generate the first shared secret key K1 102*k*-1. The previous two sentences regarding the use of brackets to indicate an asymmetric ciphertext corresponds to a shared secret key K also apply for the second asymmetric ciphertext C2 102*c*-2 for a message 225 below.

For some embodiments, the portions of data for a response second message 213 of metadata 205*a*, the first ciphertext 102*c*-1, and the first symmetric ciphertext symm-C1 102*s*-1 could be sent as separate segments, portions, or sub-messages, where the aggregate delivery of the data for metadata 205*a*, the first asymmetric ciphertext C1 102*c*-1, and the first symmetric ciphertext symm-C1 102*s*-1 can represent the response second message 213. Note the first message 202 and the messages 225, 231, etc. below could likewise be separated into different segments, where the collective segments for each message represent the full message. In addition, although the response second message 213 depicts the use of symmetrically encrypted data with the use of brackets "{ }" followed by the key S1 210*b* used to generated the symmetrically encrypted data, the symmetrically encrypted data can also include a tag value or message authentication code (MAC) value for the symmetrically encrypted data. The inclusion of a MAC value for confirming message integrity is shown by the "MAC value" with the first symmetric ciphertext 102*s*-1 for a step 212 in FIG. 3 below, where the MAC value would be generated with the MAC key 210*c*. Likewise, other symmetric ciphertext in FIG. 2*a*, such as symm-C2 102*s*-2, symm-C3 102*s*-3, etc. can include MAC values generated using MAC keys.

The first symmetric ciphertext symm-C1 102*s*-1 in a response second message 213 can include encrypted data for (i) the server ephemeral public key ePK.server 103*h*, (ii) the KEM parameters 103*f*-*y* for the server ephemeral public key ePK.server 103*h* which can be selected in a step 203*b* above, (iii) selected server extensions 103*g* which were selected in a step 205 above, (iv) the server certificate cert.server 103*c*, which can also be selected in a step 205 above, and (iv) a digital signature for server 111 comprising "Certificate Verify" 207*c*, which can be generated in a step 207. Note that the plaintext data for generating and verifying the "Certificate Verify" 207*c* digital signature can include the data for (i) through (iv) in the previous sentence, in addition to "Certificate Verify" 207*c* being over the first asymmetric ciphertext C1 102*c*-1.

Device 101 can receive the response second message 213 and conduct a series of steps in order to process the message and securely send application data from the device to the server. At step 214, device 101 can use (i) the specified KEM parameters 101*f*-*x* transmitted in message 202 along for the first KEM algorithm with (ii) cryptographic algorithms 101*s* to conduct the KEM DECAPS 101*j* function with the received first asymmetric ciphertext C1 102*c*-1. The device 101 can use the first device ephemeral private key of eSK-1.device 101*i*-1 with the KEM DECAPS 101*j* and the received first ciphertext 102*c*-1 in order to generate the first shared secret key K1 102*k*-1. A step 214 for device 101 is also depicted and described in connection with FIG. 4 below, and also summarized for the step 214 for device 101 in FIG. 1 above. Note that for some PQC algorithms, the KEM DECAPS 101*j* function could fail for a small frequency of messages 202 and 213, such as less than one failure per million or billion KEM messages, and if a step 214 fails, then device 101 could send server 111 an error message and then return to a step 201*d* to repeat the generation of a different message 202.

A step 214 can also include device 101 using the first shared secret key K1 102*k*-1 with the HKDF 210*a* (depicted in FIG. 4 below) in order to generate the first symmetric ciphering key S1 210*b* and the first MAC key MAC1 210*c*. Note that the HKDF 210*a* can also include input data from message 202 in addition to the first shared secret key K1 102*k*-1, which was described for a HDKF 210*a* for server 111 above, and also for the step 214 below in FIG. 4. Other data from a message 202 can be used for input into a HKDF 210*a*, in addition to the first shared secret key K1 102*k*-1, without departing from the scope of the present disclosure, such as, but not limited to, (i) a network ID 103*a* or a server ID 111*a* that can be included in a message 202, as well as plaintext data from a message 213 such as (ii) portions or all of metadata 205*a*, and/or the first asymmetric ciphertext C1 102*c*-1. The data input into HKDF 210*a* by device 101 and server 111 (in step 210) would be identical in exemplary embodiments in order for the HKDF 210*a* to output the same values for device 101 and server 111. At the conclusion of a step 214, device 101 can store the first symmetric ciphering key S1 210*b* and first MAC key MAC1 210*c*, which are mutually and secretly shared between device 101 and server 111.

A step 214 can include device 101 calculating two values for the symmetric ciphering key S1 210*b*, where a first S1 210*b*-1 can be for use by device 101 for symmetric encryption of plaintext data into ciphertext for transmission to server 111, and a second S1 210*b*-2 can be for use by device 101 for symmetric decryption of ciphertext data from server 111 into plaintext data. The first S1 210*b*-1 can be referred to as a first portion of the symmetric ciphering key S1. The second S1 210*b*-2 can be referred to as a second portion of the symmetric ciphering key.

Likewise, device 101 in a step 214 can generate two values for MAC key MAC1 210*c*, where the first MAC1 is used by device 101 to generate MAC codes for server 111 and the second MAC1 is used by device 101 to verify MAC codes for server 111. The first MAC1 210*c* can be referred to as a first portion of MAC1 210*c*, and the second MAC1 210*c* can be referred to as a second portion of MAC1 210*c*. A server 111 can likewise use the HKDF 210*a* in a step 210 to generate all of the same first S1 210*b*-1, the second S2 210*b*-2, the first MAC1 201*c*-1 and the second MAC 210*c*-2. In addition, HKDF 210*a* for device 101 (depicted and described in connection with FIG. 4 below) and server 111 (depicted and described in connection with FIG. 3 below) can generate nonce values or initialization vectors for use with symmetric encryption 212*a* (depicted in FIG. 3 below) and symmetric decryption 215*a* (depicted in FIG. 4 below).

In the exemplary embodiment for the step 224 below for device 101, the device 101 can use the first S1 210*b*-1 for encryption, and for the step 215 below device 101 could use the second S2 210*b*-2 for decryption. In other words, although the present disclosure uses the term "first symmetric ciphering key S1 210*b*", the "first symmetric ciphering key S1 210*b*" output from a HKDF 210*a* can comprise two components of key S1 210*b*-1 for symmetric encryption by device and key S2 210*b*-2 for symmetric decryption by device 101. Likewise, the server 111 can output from the same HKDF 210*a* during a step 210 the key S1 210*b*-1 for symmetric decryption by server 111 and the key S1 210*b*-2 for symmetric encryption by server 111. Thus, in exemplary embodiments and as contemplated herein, the term "symmetric ciphering key S1 210*b*" can comprise two related keys of S1 210*b*-1 and S1 210*b*-2.

At step 215, device 101 can use symmetric decryption 215*a* with the first symmetric ciphertext symm-C1 102*s*-1 from a message 213 in order to read the plaintext 211*a*. A step 215 is also depicted and described in connection with FIG. 4 below. The symmetric decryption 215*a* can be included within cryptographic algorithms 101*s* for device 101. The symmetric decryption 215*a* can include input of the parameters specified in metadata 205*a* from a message 213 and the first symmetric ciphering key S1 210*b* and MAC key MAC1 201*c* from a step 214 above.

At step 216, device 101 can select from the plaintext 211*a* from the step 215 a "message to verify". The message to verify can comprise the data for input into a digital signature verification step and comprise plaintext data. Some data for the "message to verify" 216*a* could be within the second message 213 and external to the first symmetric ciphertext symm-C1 102*s*-1. In exemplary embodiments, the "message to verify" can be equal to or the same as the "data for signature" from a step 206 above for server 111, since both server 111 and device 101 could read the plaintext values for each of the fields in both the "message to verify" and the "data for signature". The "message to verify" selected for input into a digital signature algorithm can include the following: the random number 202*a* transmitted in a message 202, metadata 205*a* received in a message 213, the first asymmetric ciphertext C1 102*c*-1 received in a message 213, the first server ephemeral public key ePK.server 103*h*, server extensions 103*g*, and the server certificate cert.server 103*c*. The parameters for the first server ephemeral public key ePK.server 103*h* of Server.PQC-KEM.Parameters 103*f*-*y* could also be includes in the "message to verify".

In another embodiment, the "message to verify" can include at least (i) the server ephemeral public key ePK.server 103*h*, (ii) the second set of KEM parameters 103*f*-*y* for the server ephemeral public key ePK.server 103*h*, (iii) the server certificate 103*c* read from plaintext 211*a* in a step 216 above, (iv) server extensions 103*g* from a step 205, and (v) the first asymmetric ciphertext C1 102*c*-1 received in a message 213. Additional data could be included in the "message to verify", such as a random number 202*a* generated by device 101 during steps 201*d*-201*f* and transmitted by device 101 in a message 202. Server 111 could also optionally include the random number 202*a* form a message 202 in the "data for signature" 206*a*.

Variations for the data for the "message to verify" by device 101 in a step 216 are possible without departing from the scope of the present disclosure. As one example, the "message to verify" in order to verify a digital signature of a "Certificate Verify" 207*c* value could be over the value K1 102*k*-1 instead of the first asymmetric ciphertext 102*c*-1. Alternatively, the verification of digital signature for a "Certificate Verify" 207*c* could include both the first asymmetric ciphertext 102*c*-1 and the shared secret K1 102*k*-1. For some embodiments, the parameters 103*f*-*y* for the first server ephemeral public key of ePK.server 103*h* and Server.PQC-KEM.Parameters could be include in the "message to verify" to verify the digital signature of "Certificate Verify" 207*c*.

At step 217, device 101 can use (i) cryptographic algorithms 101*s* and (ii) server certificate cert.server 103*c*, including parameters within the server certificate, and (iii) the "message to verify" from a step 216 above for device 101 in order to verify the digital signature of "Certificate Verify" 207*c*. Upon successful comparison of an internally calculated value for "Certificate Verify" 207*c* with the received value for the digital signature of "Certificate Verify" 207*c* from the message 213, then device 101 can trust that server 111 holds or operates with the private key SK.server 103*b* corresponding to the server static public key PK.server 103*d* in the server certificate cert.server 103*c*. In addition, device 101 can also trust or determine that the data within the "message to verify" and the message 213 was transmitted by and originated by server 111.

A step 217 for conducting digital signature verification of the "Certificate Verify" value 207*c* is also depicted and described in connection with FIG. 4 of PCT patent application PCT/US21/43603 filed Jul. 29, 2021 in the name of John Nix and titled "Secure Communication with Two Post-Quantum Cryptography Key Encapsulations and Authentication", which is herein incorporated by reference in its entirety. The "Certificate Verify" 207*c* value can be verified using the server static public key PK.server 103*d* in the server certificate cert.server 103*c* received in a message 213 and decrypted in a step 215.

At step 218, device 101 can verify the server certificate cert.server 103*c* using (i) cryptographic algorithms 101*s* and (ii) a trusted root or intermediate certificate issuer certificate stored within device 101. In this manner, device 101 can confirm the cert.server 111103*c* is signed by a trusted certificate issuer. The digital signature verification steps for a step 218 on a digital signature within the cert.server 103*c* can be equivalent to the digital signature verification for the "Certificate Verify" 207*c* in step 217 above, except the data being verified for the equivalent "message to verify" for a step 218 can be data within the server certificate cert.server 103*c*. Note that a step 218 can include multiple levels of verifying certificates or digital signatures for the Online Certificate Status Protocol (OSCP) through a stored root or intermediate certificate in device 101. Although not depicted in FIG. 2*a*, message 213 can include OSCP data and signatures for device 101 to verify current authentication status of cert.server 103*c*, such as determining that cert.server 103*c* has not been revoked.

At step 219, device 101 can derive or generate a random number M2 219*a* for use in a second KEM 101*k*/103*j* between device 101 and server 111. At step 220, device 101 can use both (i) the received first server ephemeral public key of ePK.server 103*h* and (ii) the specified subset of parameters 103*f*-*y* for the server ephemeral public key and the second KEM 101*k*/103*j* in order to generate both (x) a second asymmetric ciphertext C2 102*c*-2 and (y) a second shared secret key K2 102*k*-2. At step 220, device 101 can use a KEM ENCAPS function 101*k* with both (i) and (ii) from the previous sentence in order to generate both (x) the second asymmetric ciphertext C2 102*c*-2 and (y) the second shared secret key K2 102*k*-2. The function and use of a step 220 and a KEM ENCAPS function 101*k* is also depicted and described in FIG. 5 below. A summary of the step 220 by device 101 with a KEM ENCAPS function 101*k* was also depicted and described in connection with FIG. 1 above. A device 101 can use both cryptographic algorithms 101*s* and cryptographic parameters 101*x* in order to conduct the step 220.

At step 221, device 101 can use a hash-based key derivation function or an HMAC-based Extract-and-Expand Key Derivation Function (HKDF) 221*a* (depicted and described in FIG. 5 below) with at least the second shared secret key K2 102*k*-2 output from KEM ENCAPS function 101*k* in order to generate at least both (i) a second symmetric ciphering key of S2 221*b* and (ii) a second message authentication code (MAC) key MAC2 221_c_. Note that in some exemplary embodiments, additional data mutually shared between device 101 and server 111 besides the second shared secret key K2 102_k_-2 can also be input into the HKDF 221_a_ in a step 221 in order to generate S2 221_b_ and MAC2 221_c_. The additional data input into HKDF 221_a_ can comprise data from the message 202 and the message 213, such as, but not limited to, the device ephemeral public key ePK-1.device 101_h_-1 from device 101, device extensions 101_g_, parameters 101_f_ and 101_f-x_, the server ephemeral public key ePK.server 103_h_ from server 111, server extensions 103_g_, parameters 103_f-y_, metadata 205_a_, and server certificate cert.server 103_c_. Note that not all the data from the previous sentence are required to be input into HKDF 221_a_ in a step 221, and a subset of the example data could be selected for input into HKDF 221_a_.

In preferred exemplary embodiments, in a step 221, at least both the first shared secret key K1 102_k_-1 and the second shared secret key K2 102_k_-2 are input in the HKDF 221_a_ in order to generate keys S2 221_b_ and MAC2 221_c_. In this manner, the second symmetric ciphering key S2 and MAC key MAC2 can be mutually derived with server 111 more securely by including input from two separate shared secrets (e.g. K1 and K2, which can be derived by separate KEM algorithms), compared to deriving the key S2 and MAC2 using only a single KEM algorithm. In other words, the combination of K1 and K2 for HKDF 221_a_ provides security equal to at least the stronger of the first KEM (for KEM ENCAPS 103_k_) and the second KEM (for KEM ENCAPS 101_k_). As discussed above for the generation of S1 210_b_ from a first HKDF 210_a_, the second symmetric ciphering key S2 221_b_ output from a HKDF 221_a_ can comprise a first key S2 221_b_-1 for encryption by device 101 and a second key S2 221_b_-2 for decryption by device 101. Likewise, the output of a HDKF 221_a_ and also HKDF 210_a_ above can include the generation of a nonce value or initialization vector for input into symmetric ciphering algorithms. A first nonce value or initialization vector could be used with a first symmetric ciphering key S1 221_b_-1 for encryption by device 101 (and decryption by server 111) and a second nonce value or initialization vector could be use with a second symmetric ciphering key S2 221_b_-2 for decryption by device 101 (and encryption by server 111).

In an exemplary embodiment, the KEM parameters 101_f-x_ for ePK-1.device and KEM parameters 103_f-y_ for ePK.server can be the same, and the first KEM 103_k_/101_j_ and the second KEM 101_k_/103_j_ could be conducted using the same PQC KEM algorithm. Although the benefits of increased security from conducting two different types of PQC KEM algorithms for the first KEM and the second KEM are not provided in this embodiment described within this paragraph, several benefits of the present disclosure are achieved to address the identified needs in the art. First, both the device and server can generate ephemeral PKI key pairs, such that the security after the first and second KEM depends on more than one KEM ENCAPS/DECAPS step. Second, even with the same KEM parameters for both 101_f-x_ and 103_f-y_, two distinct shared secret keys K1 and K2 can be generated and both keys K1 and K2 can be used for HKDF 221_a_. In general, the use of two distinct shared secret keys K1 and K2 compared to the use of a single shared secret key will provide a higher level of security for deriving a second symmetric ciphering key S2 221_b_.

At step 222, device 101 can select and process a plaintext 222_a_ for encryption into a third symmetric ciphertext symm-C3 102_s_-3. A step 222 for a device is also depicted and described in connection with FIG. 5 below. In some exemplary embodiments for mutual authentication between device 101 and server 111, then the plaintext 222_a_ can also include a device certificate of cert.device 101_c_, as well as a digital signature over plaintext 222_a_ (but excluding the digital signature itself) using the private key corresponding to the public key in cert.device 101_c_. For a step 222, device 101 can also (i) calculate a hash value 222_b_ (depicted in FIG. 5 below) over data in both the first message 202 and the response second message 213, and (ii) include the hash value 222_b_ in the plaintext 222_a_.

At step 223, device 101 can use symmetric encryption 223_a_ with the plaintext 222_a_ from a step 222 in order to generate the third symmetric ciphertext symm-C3 102_s_-3. A step 223 is also depicted and described in connection with FIG. 5 below. The symmetric encryption 223_a_ can be included within cryptographic algorithms 101_s_ for device 101. The symmetric encryption 223_a_ can include input of at least (i) the parameters specified in metadata 205_a_ from a step 205 above for server 111 and received in a message 213, and (ii) the symmetric ciphering key S2 221_b_ and MAC key MAC2 221_c_ from a step 221 above. A step 223 can also include device 101 processing metadata 223_b_, where metadata 223_b_ can include handshake headers, parameters 103_f-y_, an initialization vector, etc. Metadata 223_b_ can include a portion of the metadata 205_a_ received in a message 205. For some embodiments, the initialization vector as a parameter for a symmetric ciphering algorithm and symmetric encryption 223_a_ can also be generated using the HKDF, Device 101 could conduct an additional encryption step 224, where device 101 can encrypt the second asymmetric ciphertext C2 102_c_-2 output from a step 220 into a "double encrypted" second symmetric ciphertext symm-C2 102_s_-2. In other words, data for the second asymmetric ciphertext C2 102_c_-2, such as a value generated with M2 219_a_, can have a first level of encryption as the second asymmetric ciphertext C2 102_c_-2. By symmetrically encrypting the second asymmetric ciphertext C2 102_c_-2 into the second symmetric ciphertext symm-C2 102_s_-2, the data for the second asymmetric ciphertext C2 102_c_-2 would then be "double encrypted" from both the asymmetric encryption and then the symmetric encryption. The step 224 can be equivalent to the encryption step 212 performed by server 111 above using the symmetric encryption 212_a_ with the first symmetric ciphering key S1 210_b_ and MAC key MAC1 201_c_. In other words, the PQC KEM algorithms proposed in the NIST Round 3 standardization project propose the use of an asymmetrically encrypted ciphertext such as the second asymmetric ciphertext C2 102_c_-2 in order to conduct a KEM. The original asymmetric ciphertext output from the KEM (such as KEM ENCAPS 101_k_ in FIG. 5) could provide the first level of asymmetric encryption.

Although the ciphertext from the party conducting an ENCAPS function (e.g. device 101 using the server ephemeral public key ePK.server 103_h_) is normally secure with the first level of asymmetric encryption, additional levels of security could be obtained for the system 200_a_ in FIG. 2_a_ by device 101 conducting a step 224 to "double encrypt" data for the second asymmetric ciphertext C2 102_c_-2 output from KEM ENCAPS 101_k_ also using symmetric encryption. A step 224 by device 101 is depicted and described in connection with FIG. 5 below.

One reason to conduct a step 224 by device 101 for message 225 is that a potential attacker could exist between device 101 and server 111. Without "double encrypting", an attacker could attempt to substitute (i) an original second asymmetric ciphertext C2 102_c_-2 from device 101 with (ii) a different, "fake" ciphertext asymmetric ciphertext C2

102*c*-2. The different, "fake" asymmetric ciphertext C2 102*c*-2 could feasibly be validly created using the server ephemeral public key ePK.server 103*h*. The use of a "double encrypted" second symmetric ciphertext symm-C2 102*s*-2 by device 101 increases resistance to an attacker substituting a fake second asymmetric ciphertext C2 102*c*-2.

Or, in some embodiments, (i) the second symmetric ciphertext symm-C2 102*s*-2 could omit the use of the symmetric ciphering key S1 210*b* by device 101 and encryption in a step 224 and (ii) the second asymmetric ciphertext C1 102*c*-2 could be processed in a step 212*a* with only the first MAC key MAC1 210*c* to generate a MAC value. For these embodiments, the MAC values for message integrity with the second asymmetric ciphertext C2 102*c*-2 could be verified by server 111 using the MAC key MAC1 210*c* derived by the server in a step 210.

In other words, a second symmetric ciphertext symm-C2 102*s*-2 depicted in FIG. 2*a* could comprise a plaintext value of the second asymmetric ciphertext C2 102*c*-2 with MAC values generated using the first MAC key MAC1 210*c* by device 101, such that server 111 could verify the second asymmetric ciphertext C2 102*c*-2 was generated by device 101 that (i) conducted the KEM DECAPS 101*j* and (ii) operates with the first shared secret key K1 102*k*-1. For the embodiments described within this paragraph, the first asymmetric ciphertext C1 102*c*-1 is not "double encrypted", but the MAC value generated with the first MAC key MAC1 210*c* in step 224 (depicted in FIG. 5 below but without use of symmetric ciphering key S1 210*b*), can be used to authenticate and verify the second asymmetric ciphertext C2 102*c*-2 was generated by a device that stores and operates with the first shared secret key K1 102*k*-1. For these embodiments, instead of the data depicted for a message 225 shown as "Symm-C2 [{C2 {K2 102*k*-2} 102*c*-2}S1 210*b*] 102*s*-2", the data depicted for message 225 could be [{C2 {K2 102*k*-2} 102*c*-2} Tag value (MAC1 210*c*)".

As depicted in FIG. 2*a*, device 101 can then send server 111 a third message 225, where the third message 225 can also comprise a "Client Finished" message. The third message 225 can include plaintext metadata or parameters for processing symmetric ciphertext (such as a nonce value or initialization vector), (ii) the second symmetric ciphertext symm-C2 102*s*-2 output from a step 224, and (iii) the third symmetric ciphertext symm-C3 102*s*-3 output from a step 223. As depicted in FIG. 2*a*, the second symmetric ciphertext symm-C2 102*s*-2 can comprise the second asymmetric ciphertext C2 102*c*-2 output from the KEM ENCAPS function 101*k* with an additional layer of symmetric encryption using the first symmetric ciphering key S1 210*b*. For some embodiments, the use of the additional layer of symmetric encryption for the second asymmetric ciphertext C2 102*c*-2 could be omitted and a message 225 could include the second asymmetric ciphertext C2 102*c*-2 with a MAC value generated using an algorithm like Poly1305 with the first MAC key 210*c*.

As described for a step 224 above, the second symmetric ciphertext symm-C2 102*s*-2 could comprise the second asymmetric ciphertext C2 102*c*-2 from a step 220 by device 101 that has been either (i) encrypted and tagged with the first symmetric ciphering key S1 210*b* and MAC key MAC1 210*c*, or (ii) "MACed" only with the first MAC key MAC1 210*c* (such as for authentication only from device 101). For other embodiments, the second asymmetric ciphertext C2 102*c*-2 could be sent in a message 225 as directly output from a step 220 in FIG. 5 below and without any additional processing with S1 210*b* and MAC1 210*c*.

Additional data could be included in a third message 225 without departing from the scope of the present disclosure. For some embodiments, the portions of data for the third message 225 of plaintext metadata, the second symmetric ciphertext symm-C2 102*s*-2, and the third symmetric ciphertext symm-C2 102*s*-3 could be sent as separate segments, portions, or sub-messages, where the aggregate delivery of the data for metadata, the second symmetric ciphertext symm-C2 102*s*-2, and the third symmetric ciphertext symm-C3 102*s*-3 can represent the third message 225.

Server 111 can receive the third message 225 and conduct a series of steps in order to process the message and securely receive application data from the device to the server. For embodiments with where the third message 225 includes a second symmetric ciphertext symm-C2 102*s*-2 (such as a "double encrypted" data for the second asymmetric ciphertext C2 102*c*-2), then the server 111 could conduct a decryption step 226 as depicted and described in connection with FIG. 5 below in order to convert the second symmetric ciphertext symm-C2 102*s*-2 into a second asymmetric ciphertext C2 102*c*-2. In other words, the server 111 could (i) use the first symmetric ciphering key S1 210*b* and MAC key MAC1 210*c* (from a step 210) in order to (ii) decrypt the second symmetric ciphertext symm-C2 102*s*-2 into a second asymmetric ciphertext C2 102*c*-2. For some embodiments, the use of a first symmetric ciphering key S1 210*b* could be omitted in a step 226 (and also corresponding step 224 by device 101), and the depicted second symmetric ciphertext symm-C2 102*s*-2 could comprise the second asymmetric ciphertext C2 102*c*-2 with MAC values that could be verified with the first MAC key MAC1 210*c*. In other words, for some embodiments, the second symmetric ciphertext symm-C2 102*s*-2 may not be "double encrypted" and could simply include MAC values for verification with the MAC key MAC1 210*c*.

At step 227, server 111 can use the specified KEM parameters 103*f-y* transmitted in message 213 along with cryptographic algorithms 103*s* to conduct the KEM DECAPS 103*j* function with the received second asymmetric ciphertext C2 102*c*-2. The server can use the server ephemeral private key of eSK.server 103*i* with the KEM DECAPS 103*j* and the received second asymmetric ciphertext C2 102*c*-2 in order to generate the second shared secret key K2 102*k*-2. A step 227 for server 111 is also depicted and described in connection with FIG. 6 below. Note that for some PQC algorithms, the KEM DECAPS 103*j* function could fail for a small frequency of messages 225, such as less than one failure per million or billion KEM, and if a step 227 fails, then server 111 could send device 101 an error message.

A step 227 can also include server 111 using at least the second shared secret key K2 102*k*-2 with the HKDF 221*a* (depicted in FIG. 5 below) in order to generate the second symmetric ciphering key S2 221*b* and the second MAC key MAC1 221*c*. In some exemplary embodiments, the HKDF 221*a* can also include input of at least the first shared secret key K1 102*k*-1 in addition to the second shared secret key K2 102*k*-2 in order to generate the second symmetric ciphering key S2 221*b* and the MAC key MAC1 221*c*. In this manner and by including the first shared secret key K1 102*k*-1, the symmetric ciphering key S2 and MAC key MAC2 can be mutually derived with device 101 more securely by including input from two separate shared secrets (e.g. K1 and K2, which can also be derived by separate KEM algorithms), compared to deriving the key S2 and MAC2 using only a single KEM algorithm (e.g. using either (i) K2 only or (ii) a single KEM algorithm for K1 and K2). In other words, the combination of (x) K1 output from a first KEM **103*k*/101*j* and K2 output from a second KEM 101*k*/103*j* for (y) HKDF 221*a* provides security equal to at least the stronger of the first KEM (for KEM ENCAPS 103*k*) and the second KEM (for KEM ENCAPS 101*k*). At the conclusion of a step 227, server 111 can store the second symmetric ciphering key S2 221*b* and MAC key MAC2 221*c*, which are mutually and secretly shared between device 101 and server 111. An HKDF 221*a* and an HKDF 210*a*** can also generate nonce values or initialization vectors for use with symmetric ciphering algorithms and generation of message authentication codes or tag values.

At step 228, server 111 can use symmetric decryption **228*a* with the third symmetric ciphertext symm-C3 102*s*-3 from a third message 225 in order to read the plaintext 222*a*. A step 228 for server 111 is also depicted and described in connection with FIG. 6 below. The symmetric decryption 226*a* can be included within cryptographic algorithms 103*s* for server 111. The symmetric decryption 226*a* can include input of the parameters specified in plaintext metadata from the third message 225 and the second symmetric ciphering key S2 221*b* and second MAC key MAC2 221*b* from a step 227** above.

At step 229, server 111 can verify a digital signature for a client "Certificate Verify" from plaintext **222*a* for embodiments where device 101 uses a device certificate cert.device 101*c*. Note that the use of a device certificate by device 101 could be omitted for some embodiments depicted in FIG. 2*a*, such that a one-way authentication of a server 111 and/or network 103 is performed by device 101 in the message flows and steps shown. Other steps such as passwords used with subsequent device application data could provide authentication of the device with the server. A step 229 could also include server 111 verifying a certificate chain for device certificate cert.device 101*c* up through a stored root certificate or trusted intermediate certificate in server 111 or network 103. At step 229, server 111 could also calculate a value for "Client Finished" equivalent to a "Client Finished" segment within plaintext 222*a*, where the plaintext 222*a* data can be read from the output of the symmetric decryption function 228*a* in a step 228 above. Server 111 could compare the calculated "Client Finished" value for the received "Client Finished" value and determine that device 101 has successfully completed the handshake for a secure session. Both device 101 and server 111 could subsequently securely process, encrypt and decrypt, and transmit and receive application data. For some embodiments, plaintext 222*a* could also include data from device 101 in addition to a "Client Finished" message such as application data At step 230, server 111 can generate a "pre-shared" secret key (PSK) for device 101 and server 111 based on prior steps and the set of messages 202, 213, and 225. The generation or derivation of a "pre-shared" secret key (PSK) for device 101 and server 111 is also depicted and described in connection with FIG. 6 below. Although the "pre-shared" secret key (PSK) was not shared between device 101 and server 111 before the first "Client Hello 1" message in FIG. 2*a*, the PSK would be considered "pre-shared" before a second "Client Hello 2" message in (i) a secure session resumption 251*a* depicted in FIG. 2*b* and described below or (ii) a secure session resumption 251*b* depicted in FIG. 2*b* and described below. In other words, a first secure session established using the messages "Client Hello 1" 202 through "Server Finished 1" 233 could be used to establish a PSK shared between device 101 and server 111, where the PSK can be used to secure resumption or continuation of the first secure session. In this manner, a PSK can be mutually generated by both nodes during a first handshake and initial secure session 250. The PSK can both reduce the number of steps required to establish both encrypted and authenticated communications in session resumption 251 after a period of time transpires between the first handshake and initial secure session 250 and the session resumption 251**.

The use of securely mutually deriving a PSK by both nodes can address the need in the art discussed in the Description of Related Art, where a PSK can reduce the number of steps and bandwidth/message sizes required to securely resume a previously established session 250. In other words, without session resumption 251, a device 101 and server 111 may need to again conduct the same steps and messages as the first handshake and initial secure session 250, which requires more processing time and resources and more bandwidth compared to session resumption 251. Note that conventional technology, such as with TLS version 1.3 and prior versions, also supports session resumption with a PSK in order to achieve the same overall goal. However, the use of a first handshake and initial secure session 250 supporting PQC KEM and the session resumption **251*a*** described below will provide many differences and benefits compared to conventional technology, where the differences and benefits are not contemplated and are not feasible with conventional technology for securely resuming secure sessions. As one example, the use of PSK with TLS version 1.3 and prior versions, as well as similar conventional technology for session resumption based on PKI, will not support secure session resumption in a manner that is secured against quantum computers with an advantage or "supremacy" over classical computers for calculating integer factorization or discrete logarithms.

At step 230 server 111 can use at least the first shared secret key of K**1 102*k*-1 from a step 209, the second shared secret key K2 102*k*-2 from a step 227, and additional data (depicted as "data 230*d*" below in FIG. 6) with a HKDF 230*a* (depicted in FIG. 6 below) in order to generate the "pre-shared" secret key (PSK) 230-1 for use with session resumption 251. A step 230 is also depicted and described in connection with FIG. 6 below. The additional data can include plaintext data transmitted in the first message 202, the response second message 213, and the third message 225. The additional data could also include plaintext data from the fourth message 235 described below. A protocol for the First Handshake and Initial Secure Session 250, such as TLS, SSH, etc., could specify some text values outside of the message flow between device 101 and server 111 for use as input of additional data in a step 230 with a HKDF 230*a* to generate a PSK 230-1. In exemplary embodiments, at least the first shared secret key of K1 102*k*-1 and the second shared secret key K2 102*k*-2 are used in a step 230 with a HDKF 230*a* to generate or derive the "pre-shared" secret key (PSK) 230-1 for use with session resumption 251. Note that device 101 will also be able to mutually derive the PSK 230-1 in a step 236 below. Since a server 111 may generate multiple different PSK for different devices 101 over time, an example of the specific PSK for device 101 resulting from the first session 250 is depicted with the designation of "PSK 230-1" in FIG. 2*a*. A second PSK for either device 101 or a different device would have the designation of "PSK 230-2**."

At step 231, server 111 can generate an identity or identifier for the PSK 230-1 of PSK-ID 231-1. The PSK-ID 231-1 can be unique for the PSK 230-1 and also with sufficient information entropy and "randomness" to not feasibly be guessed by a potential attacker. Although the PSK-ID 231-1 is referred to herein as an identity for a "pre-shared" secret key (PSK), the PSK-ID 231-1 could alternatively be referred to as a "session ticket" or a "session identity" corresponding to the initial session 250 from FIG. 2*a*. In general, the PSK-ID 231-1 can be a number, value, or string that uniquely identifies or corresponds to the first session 250, in order for data from the first session 250, such as the PSK 230-1, can be selected based on the identifier for the first session of PSK-ID 231-1. As one example, the PSK-ID 231-1 could be a secure hash value over the PSK 230-1, such as the SHA3-256 value of the PSK 230-1. Other possibilities exist as well for the generation of an identity of PSK-ID 231-1 for PSK 230-1 without departing from the scope of the present disclosure.

A network 103 and/or server 111 in a step 231 could also store both the PSK 230-1 generated from a step 230 and the PSK-ID 231-1 in a network database 103*db*, as depicted in FIG. 2*a*. A network database 103*db* could record a plurality of PSK and PSK-ID values, such that both the PSK and PSK-ID would be available for use in subsequent communications with device 101 and other devices, including the session resumption 251*a* depicted in FIG. 2*a*. Network database 103*db* could preferably be securely isolated from devices 101 and other nodes on the public Internet 107, and a separate secure session could be established between network database 103*db* and server 111.

Note that storing the PSK 230-1 in a network database 103*db*, instead of the first and second shared secret keys K1 and K2, provides security for the first session 250, where a hash value over at least the first and second shared secret keys K1 and K2 is stored instead of the original keys K1 and K2. Other nodes within a network 103 may have access to the network database 103*db*, such as a server 111' supporting a resumed session 251 below. By storing the PSK 230-1 in the network database 103*db*, other nodes within network 103 would not feasibly be able to determine the shared secret keys K1 and K2 from the first session 250 and consequently data within the first session 250 can remain secured against later analysis or attempts to decrypt data within the first session 250. As noted below, in exemplary embodiments, a server 111 also "flushes" or clears relevant keys and data from RAM memory 111*m* for the first session 250 upon a session close message 238 below.

At step 232, server 111 can select a plaintext comprising at least the PSK-ID 231-1 from a step 231 for encryption into a fourth symmetric ciphertext symm-C4 102*s*-4. The plaintext selected in a step 232 could also include additional data for device 101, such as the "application data" depicted in FIG. 2*a* within a message 233. The additional data for device 101 could comprise response data from server 111 for the plaintext data 222*a* transmitted in a message 225 above, such as a response to an HTTP request, a response JSON message, response XML data, and other possibilities exist as well for the additional data selected by a server 111 in a step 232 for the plaintext, in addition to the PSK-ID 231-1. The plaintext selected in a step 232 could also include a secure hash value for a "server finished" field within the message 233, similar to the "client finished" hash value 222*b* in a step 228 in FIG. 6. As step 232, server 111 can encrypt the plaintext and generate a MAC value or tag value using symmetric encryption and the second mutually derived symmetric ciphering key S2 221*b* and MAC key MAC 221*c*. The encryption in a step 232 with keys S2 221*b* and MAC key 221*c* can be equivalent to a step 228 by server 111 depicted in FIG. 5 below, except using the keys for symmetric encryption and MAC value generation instead of symmetric decryption and MAC value verification. The output from the encryption and MAC value generation in a step 232 can comprise the fourth symmetric ciphertext symm-C4 102*s*-4.

Server 111 can then send device 101 a fourth message 233 as depicted in FIG. 2*a*, where the fourth message 233 can comprise a "Server Finished 1". The fourth message 233 can be transmitted by server 111 to IP network 107 using the network interface 111*d*. The fourth message 233 could include plaintext metadata and also at least the fourth symmetric ciphertext symm-C4 102*s*-4. Device 101 can receive the fourth message 233 from the IP network 107 using a network interface which could comprise the radio 101*r*. Device 101 can then conduct steps to process the fourth message 233, which can comprise the "Server Finished 1" message.

At step 234, device 101 can verify MAC values for the fourth symmetric ciphertext symm-C4 102*s*-4 using the MAC key MAC 221*c* for device 101. Note the description in the previous sentence supports "encrypt-then-MAC" operations, where MAC values can be verified before conducting a decryption step. Device 101 can then decrypt the fourth symmetric ciphertext symm-C4 102*s*-4 using the second symmetric ciphering key S2 221*b* for device 101. As step 234, device 101 can decrypt the fourth symmetric ciphertext symm-C4 102*s*-4 using the second mutually derived symmetric ciphering key S2 221*b*. The decryption in a step 234 with keys S2 221*b* and MAC key 221*c* can be equivalent to a step 228 by server 111 depicted in FIG. 5 below, except using the keys for symmetric encryption and MAC value generation in a step 234 by device 101 instead of symmetric decryption and MAC value verification in a step 228 by device 101. The output from the symmetric decryption in a step 234 can comprise the plaintext selected by server 111 in a step 232. An example of the plaintext is depicted in FIG. 2*a* as the depicted data within the brackets "{ }" for the fourth symmetric ciphertext symm-C4 102*s*-4 in message 233 within FIG. 2*a*.

At step 235, device 101 can read and process the plaintext data from message 233 output from a step 234. The device 101 can read the identity of the PSK comprising PSK-ID 231-1. Device 101 can store the PSK-ID 231-1 in memory 101*m*, where memory 101*m* for device 101 is depicted and described on connection with FIG. 1 above. Device 101 can store the PSK-ID in volatile memory such as RAM memory or nonvolatile memory 101*bb* such as storage memory. For embodiments where the session resumption 251*a* by device 101 is expected to be longer than a day, then device 101 preferably stores PSK-ID 231-1 in nonvolatile memory 101*bb*. Other possibilities exist as well for the duration between the first session 250 and session resumption 251*a* to determine the location of storage for PSK-ID 231-1 without departing from the scope of the present disclosure. A step 235 can also include device 101 processing additional data from the plaintext (in addition to PSK-ID 231-1), such as application data from the server. The application data could comprise HTTP data, XML, MTTQ, JSON, and other possibilities exist as well.

At step 236, device 101 can use at least the first shared secret key of K1 102*k*-1, the second shared secret key K2 102*k*-2, and additional data (depicted as "data 228*d*" below in FIG. 6) with a HKDF 230*a* (depicted in FIG. 6 below) in order to generate the "pre-shared" secret key (PSK) 230-1 for use with session resumption 251. A step 236 is also depicted and described in connection with FIG. 6 below. The additional data can include plaintext data transmitted in the first message 202, the response second message 213, and the third message 225. The additional data could also include plaintext data from the fourth message 235 described above. A protocol for the First Handshake and Initial Secure Session 250, such as TLS, SSH, etc., could specify some text values outside of the message flow between device 101 and server 111 for use as input of additional data in a step 230 with a HKDF 230*a* to generate a PSK 230-1. In exemplary embodiments, at least the first shared secret key of K1 102*k*-1 and the second shared secret key K2 102*k*-2 are used in a step 236 with a HDKF 230*a* to generate or derive the "pre-shared" secret key (PSK) 230-1 for use with session resumption 251. Note that server 111 was also able to mutually derive the PSK 230-1 in a step 230 above. For embodiments where device 101 derives PSK 230-1 without using data from message 235 in data 230*d*, then device 101 could conduct step 236 before receipt of message 235, such as before device 101 sends the third message 225. In a step 236, device 101 can then store the PSK 230-1 along with the identifier of PSK-ID 231-1 in memory 101*m*. Device 101 can use either or both of RAM memory and nonvolatile storage memory 101*bb* to store the PSK 230-1 along with the identifier of PSK-ID 23101 in a step 236. In exemplary embodiments, the PSK 230-1 is stored by device 101 in the same physical memory as PSK-ID 231-1 in a step 236.

Device 101 could then transmit and receive additional encrypted application data with server 111 in a step 237*a*. Server 111 could transmit and receive additional encrypted application data with device 101 in a step 237*b*. Note that the transfer of The encrypted application data can encrypted with symmetric ciphering keys derived at least from the first shared secret key K1 102*k*-1 and the second shared secret key K2 102*k*-1. The encrypted application data can also be verified with MAC values, where the MAC values are generated and verified with MAC keys derived at least from the first shared secret key K1 102*k*-1 and the second shared secret key K2 102*k*-1.

Upon conclusion of the transfer of additional encrypted application data between device 101 and a server 111 in steps 237*a* and 237*b*, (i) either device 101 or server 111, or (ii) both device 101 and server 111 can transmit a fifth message 238 to close the initial secure session 250. As depicted in FIG. 2*a*, the fifth message 238 can comprise TCP FIN,ACK message or a final UDP ACK message. Or, the fifth message 238 could comprise a TCP RESET message or equivalent UDP message indicating the TCP or UDP session at the transport layer is being closed by either server 111 or device 101, or possibly closed by an intermediate firewall or router between device 101 and server 111 in the IP network 107.

As noted above for a step 231 by server 111, in exemplary embodiments, a server 111 also "flushes" or clears relevant keys and data from RAM memory 111*m* for the first session 250 upon a session close message 238. The data deleted or overwritten from RAM memory 111*m* can include at least the first and second shared secret keys K1 and K2, the server ephemeral secret key, random number M2 219*a*, as well as any intermediate data or values for conducting a KEM ENCAPS 103*j* and KEM DECAPS 103*k*. A device 101 could also delete the equivalent data for the first session 250 after successful transfer of the message 238. As depicted in FIG. 2*a*, the sequence of steps and message flows beginning with a step 201*d* and concluding with a message 238 can comprise the First Handshake and Initial Secure Session 250.

After the closing or conclusion of the First Handshake and Initial Secure Session 250, device 101 can perform a wait 240 before staring a session resumption 251. The wait 240 could be brief, such as on the order of seconds or less, or the wait 240 could be longer, such as on the order of minutes, hours, or even longer than a day. As one example, device 101 could use a web browser, where the data transactions via the web browser are paused for the wait 240 period (such as a user of device 101 selecting and using a different application or web session for a period of time during the wait 240 period). Upon user's return to the web browser for communicating with the network 103, the secure session could be resumed by device 101 with session resumption 251.

As another example, device 101 could be for "machine to machine" (M2M) communications, and send in environmental data or location data periodically, such as at each reporting interval which could be every hour. The first session 251*a* reporting first data could be closed with a message 238. After the wait 240 period of time, which could be for the time of the reporting interval, the device 101 could initiate a session resumption 251*a* in order to securely communicate new data with network 103. Other possibilities exist as well without departing from the scope of the present disclosure. As another example, a web browser may prefer to quickly switch to the use of PSK for subsequent communication after a first session 250 has been established, and the session resumption 251*a* could be initiated by the web browser and device 101 within milliseconds after the fifth message 238 to close the first session 251.

A device 101 and server 111 could use the PSK 230-1 and PSK-ID 231-1 in several different manners to securely conduct session resumption 251, where examples of the different options are depicted in FIGS. 2*b* and 2*c* below. As described above and also with the Description of Related Art, the session resumption 251 using the PSK 230-1 and PSK-ID 231-1 can allow data to be securely transferred between device 101 and network 103 without requiring a second time the full set of steps and messages shown for a first handshake and initial secure session 250.

FIG. 2*b*

FIG. 2*b* is a simplified message flow diagram illustrating an exemplary system with exemplary data transmitted and received by a device and a network for resuming a secure session, in accordance with exemplary embodiments. System 200*b* can include a device 101, IP network 107, a network 103, and a server 111' operating within network 103. Server 111' can be the same as server 111 from FIG. 1 and FIG. 2*a* above, or server 111' could be a different physical server but equivalent to server 111 as depicted and described for network 103 in FIGS. 1 and 2*a* above. Server 111' can communicate with network database 103*db* within network 103 in order to access information regarding pre-shared keys for devices that were generated during a first session 250.

The nodes or entities within system 200*b* were also depicted and described in connection with FIG. 1 and FIG. 2*a* above, where FIG. 2*b* depicts exemplary steps for the nodes and exemplary message flows between the nodes after a first session 250 depicted and described in connection with FIG. 2*a* above. Although a single device 101, IP network 107, and network 103 are depicted in a system 200*b*, a system 200*b* could include a plurality of each of the depicted nodes connected via different IP networks 107. In addition, data recorded for device 101 and network 103 depicted and described above in FIG. 1 and FIG. 2*a* can be received and stored in the device 101 and network 103 depicted in FIG. 2*b* during the steps and message flows depicted in FIG. 2*b*.

At steps 201*d'* through 201*f* device 101 can begin operating and process data in order to securely resume a first session 250 between device 101 and a network 103. Device 101 can generate a message 254 for server 111', where the message 254 could comprise a second "Client Hello 2" message. Steps 201*d*' and subsequent steps in FIG. 2*b* can use the computing hardware in device 101 as depicted in FIG. 1 above, as well as the operating system and stored parameters within device 101 stored in a step 201*b* above in FIG. 2*a*. At step 201*d*', device 101 can power on or wake from a sleep state or idle state and then select either a network ID 103*a* or a server ID 111*a* for sending a message 254. The IDs 103*a* or 111*a* could comprise domain names or IP addresses for connecting to the network 103. At step 201*d*', device 101 could read the identity of a "pre-shared" secret key PSK-ID 231-1 stored in memory 101*m* of device 101 during the first session 250. The device 101 could store both the PSK-ID 231-1 and the PSK 230-1 in a step 236 in FIG. 2*a* above.

Step 201*d*' can include device 101 selecting updated device extensions 101*g*' for use with a resumed secure session between device 101 and server 111'. In other words, device extensions 101*g* selected by device 101 in a step 201*d* in FIG. 2*a* could be for a first session 250 and updated device extensions 101*g*' could be for a resumed session 251*a*. Device extensions 101*g* were also described above in connection with FIG. 1, and can include identifiers or values for supported by both (i) cryptographic algorithms 101*s* and cryptographic parameters 101*x*, and (ii) a protocol for secure communications with network 103 and server 111. Device extensions 101*g* can include supported cipher suites such as names or values identifying supported symmetric ciphering algorithms, secure hash algorithms, digital signature algorithms, etc. Device extensions 101*g*' could be equivalent to device extensions 101*g*, except that device extensions 101*g*' could also specify values, parameters, and settings for the use of PSK 230-1 by device 101 and server 111'. In other words, device 101 in a step 201*d* may not have a PSK available for communication with network 103 and subsequently selects device extensions 101*g*, while device 101 can have a PSK available for communication with network 103 in a step 201*d*' and can select extensions 101*g*' that support the use of the PSK 230-1.

At step 252, device 101 can use the PSK 230-1 for the PSK-ID 231-1 selected in a step 201*d*' to generate a third symmetric ciphering key S3 252*b* and a third MAC key MAC3 252*c*. Note that the PSK 230-1 can be stored by device 101 in a step 236. Exemplary details for a step 252 by device 101 are also depicted and described in connection with FIG. 7*a* below. At step 252, device 101 can generate a second random number 252*a* for use in the resumed session 251*a*. At step 252, device 101 can use at least the PSK 230-1 and additional data (depicted as "data 252*d*" below in FIG. 7*a*) with a HKDF 252*h* (depicted in FIG. 7*a* below) in order to generate the third symmetric ciphering key S3 252*b* and a third MAC key MAC3 252*c*. A nonce or initialization vector could also be generated in a step 252. In addition, the third symmetric ciphering key S3 252*b* could comprise a first portion S3 252*b*-1 for encryption by device 101 and a second portion S3 252*b*-2 for decryption by device 101. Likewise, the third MAC key MAC3 252*c* can comprise two portions, where a first portion is for generation of MAC or tag values by device 101 and a second portion is for verification of MAC values or tag values received from server 111'.

At step 253, device 101 can select data for generation of MAC values in order send data to server in an authenticated manner with message integrity. Exemplary details for a step 253 by device 101 are also depicted and described in connection with FIG. 7*a* below. The selected data in a step 253 can comprise the identity of the PSK, which is PSK-ID 231-1 stored in a step 235 above, the device extensions 101*g*' selected from a step 201*d*' above, and the second random number random 2 252*a* from a step 252. Additional data could be selected in a step 253 for the generation of MAC values. Parameters from device extensions 101*g* or 101*g*' could also be selected in a step 253 for the generation of MAC values and generation of symmetric ciphertext (such as a list of supported cipher suites), or the parameters could be specified in a protocol for resuming the secure session. Device 101 could select a MAC algorithm 253*a* in a step 253 (depicted in FIG. 7*a* below), such as examples of Poly1305, HMAC algorithm, or AES with a mode such as CGM (to generate MAC values but not encrypt). Other possibilities exist as well for a MAC algorithm 253*a* used in a step 253 and for the generation of MAC values herein without departing from the scope of the present disclosure.

At step 253, device 101 can input the selected data into the MAC algorithm 253*a* along with parameters and the third MAC key MAC3 252*c* generated in a step 252 in order to generate the MAC value tag1 253*b*. Note that the generation of the MAC value tag1 253*b* over the plaintext data for a message 254 below can provide security against downgrade attacks from a MITM attacker. In other words, plaintext data for the message 254 can include the PSK-ID 231-1, device extensions 101*g*' for resumed session 251*a*, and a second random number random 2 252*a*. By including the MAC value tag1 253*b* over the plaintext data, the plaintext data cannot be feasibly altered (in a manner where MAC value tag1 253*b* remains valid or verifiable by server 111') without also holding the shared secret MAC key MAC3 252*c*. As one example, the device extensions 101*g*' could include a list of supported cipher suites where some cipher suites may be found insecure in the future (e.g. after device 101 is configured with a protocol for a secure session 250 and resumed session 251). Examples of downgrade attacks for previous versions of TLS such as TLS 1.0 and TLS 1.1 are well known. Without a MAC value tag1 over the device extensions 101*g* with the list of supported cipher suites, a MITM attacker could alter the device extensions 101*g*' since device extensions 101*g*' can be plaintext in a message 254 below.

As a second example, the PSK-ID 231-1 can also be protected against a MITM attacker with the use of the MAC value tag1 253*b* as described in the paragraph above. A MITM attacker could also have previously conducted a different first session 250 with server 111 than the first session 250 between device 101 and server 111. The MITM attacker could have both generated a different PSK and PSK-ID and attempt to substitute the different PSK-ID in the second "Client Hello" message. A MAC value tag1 253*c* for the device 101 using the PSK 230-1 for device 101 could not feasibly be generated over the different PSK-ID substituted in a second "Client Hello" message.

After the conclusion of a step 253 by device 101, device 101 can then conduct a step 201*f* to process a message 254 as depicted in FIG. 2*b*. A step 201*f* in FIG. 2*b* can be equivalent to a step 201*f* in FIG. 2*a*, with the difference being step 201*f* can be for session resumption 251*a* and step 201*f* can be for a first session 250. At step 201*f*, device can use firmware or application software within device 101 in order to perform steps as specified in a protocol for resumption of a secure session between device 101 and network 103. The message 254 can comprise a second "Client Hello" or equivalent second message according to the protocol for the secure session selected by device 101 in a step 201*d*' in FIG. 2*a*. Device 101 can send a second message 254 comprising a second "Client Hello" message (or equivalent for a different protocol than TLS) to the server 111' operating in network 103 in a step 201*f*. A step 201*f* can comprise processor 101*p* writing the data for the message 254 to a radio 101*r* (or equivalently a network interface if device 101 does not include a radio 101*r*). As depicted in FIG. 2*b*, the message 254 can comprise a second "Client Hello" message, where the first "Client Hello" message was depicted and described above in FIG. 2*a* for the first session 250.

For some embodiments, device 101 and server 111' can support zero round trip time resumption (0-RTT). For these embodiments, device 101 can use the third symmetric ciphering key S3 252*b* generated in a step 252 to encrypt device application data into a fifth symmetric ciphertext symm-C5 102*s*-5. The encryption can be equivalent to the encryption step 223 by device 101 described above in FIG. 2*a* and also FIG. 5 below, except with the use of both (i) the third symmetric ciphering key S3 252*b* and (ii) different plaintext comprising device application data.

Note that the use of 0-RTT is optional, and the fifth symmetric ciphertext symm-C5 102*s*-5 may be omitted from a message 254. For embodiments that support 0-RTT and include the fifth symmetric ciphertext in a message 254, then the encrypted device application data can preferably be idempotent and not change the state of the server, such as with an HTTP GET request. In other words, 0-RTT data may be subject to replay attacks, where the exact same data could be retransmitted, so this risk, if significant, can be averted by device 101 not including 0-RTT data within message 254.

In addition, the fifth symmetric ciphertext symm-C5 102*s*-5 can include a second device ephemeral public key ePK-2.device 101*h*-2 and associated KEM parameters 101*f*-*x*' for the second device ephemeral public key. An updated or new device ephemeral public key ePK-2.device 101*h*-2 in a system 200*b* may be preferred for forward secrecy, such that a third shared secret key K3 102*k*-3 could be generated using the second device ephemeral public key ePK-2.device 101*h*-2. Exemplary steps to use the second device ephemeral public key ePK-2.device 101*h*-2 include steps 208' and 209' by server 111' in FIG. 2*c* below, in order to generate a third shared secret key K3 102*k*-3. By including the second device ephemeral public key ePK-2.device 101*h*-2 within the fifth symmetric ciphertext symm-C5 102*s*-5, then the second device ephemeral public key ePK-2.device 101*h*-2 can be protected from attackers or potential listeners within IP network 107. In other words, by encrypting the second device ephemeral public key ePK-2.device 101*h*-2 in a the fifth symmetric ciphertext symm-C5 102*s*-5, then only a server 111' could feasibly be able to generate an asymmetric ciphertext using the second device ephemeral public key ePK-2.device 101*h*-2.

As depicted in FIG. 2*b*, the message 254 from device 101 to server 111' can comprise the identity of the PSK, which is PSK-ID 231-1 stored in a step 235 above, the device extensions 110*g*' selected from a step 201*d*' above, the second random number random 2 252*a* from a step 252, and the tag value 253*b*. The message 254 can also optionally include the fifth symmetric ciphertext symm-C5 102*s*-5. Message 254 can include headers or values specifying the message is for a "Client Hello" for a resumed session 251*a* according to the secure session protocol selected by the device 101. The inclusion of the tag1 253*b* value increases security compared to conventional technology, since server 111' can verify the tag value 253*b* below in a step 256 before deciding how to respond to the message 254. In one example, if the tag value 253*b* cannot be confirmed by server 111', then server 111 could either remain silent, or send a detailed error message (as opposed to a "general" failure), or the server 111 could request device return to sending a first "Client Hello" message 202 from FIG. 2*a*.

A message 254 to begin a resumed session 251*a* provides several benefits over conventional technology and also addresses needs identified in the Description of Related Art discussed above. First, the PSK can be generated from two separate shared secret keys (e.g. K1 102*k*-1 and K2 102*k*-2), whereas conventional technology such as with TLS 1.3 generates a PSK with a single shared secret key. Additional, mutually shared data may be used with TLS 1.3 along with the single shared secret key, but a first TLS 1.3 session still results in a single, "top-level" shared secret key. As discussed above, the two separate shared secret keys can use different types of cryptographic algorithms, and thus the PSK in the present disclosure can be protected by two different cryptographic algorithms, whereas TLS 1.3 protects the PSK with only a single cryptographic algorithm, and specifically one of the ECDH or DH algorithm, which are both based on the discrete logarithm problem. In addition, the communication of the PSK-ID 231-1 from server 111 to device 101 can be secured by both a first and second shared secret keys (e.g. K1 102*k*-1 and K2 102*k*-2), whereas the communication of the PSK-ID with TLS 1.3 is also protected with one shared secret key resulting from an ECDH (or DH) key exchange.

Server 111' can receive the message 254 as second "Client Hello" in order to conduct a resumed session 251*a*. Server 111' can receive the message 254 via a network interface 111*d* in server hardware 111*h* (depicted for server 111' in FIG. 1 above). Server 111' can use application software such as, but not limited to, OpenSSL with cryptographic algorithms 103*s* and cryptographic parameters 103*x* and server hardware 111*h* to process the received message 254.

At step 255, server 111' can use the received PSK-ID 231-1 from the message 254 to securely query the network database 103*db* for the corresponding PSK 230-1. The storing of multiple values of the PSK and PSK-ID for a network 103 was depicted and described in connection with FIG. 2*a* above. If a corresponding PSK 230-1 for the PSK-ID 231-1 is not found or has expired, then the server 111' may optionally send device 101 an error message. For some embodiments, server 111' may prefer to remain silent and not respond to message 254 if the PSK-ID 230-1 is not found or if subsequent errors occur in the processing of message 254, such as tag value 253*b* not being verified. After a step 255 and upon success of the query to network database 103*db*, server 111' can store the corresponding PSK 230-1 for the PSK-ID 231-1.

Server 111' can then conduct a step 252, where a step 252 by server 111' can be equivalent or the same as a step 252 conducted by device 101. A step 252 is depicted and described above for a device 101 and a server 111' can conduct the same step in order use the PSK 230-1 from a step 255 and mutually derive with device 101 the third symmetric ciphering key S3 252*b* and a third MAC key MAC3 252*c*. Exemplary details for a step 252 by server 111' are also depicted and described in connection with FIG. 7*a* below. At step 252, server 111' can use the second random number 252*a* received from a message 254 with a HKDF 252*h*. At step 252, server 111' can use at least the PSK 230-1 and additional data (depicted as "data 252*d*" below in FIG. 7*a*) with a HKDF 252*h* (depicted in FIG. 7*a* below) in order to mutually derive the third symmetric ciphering key S3 252*b* and a third MAC key MAC3 252*c*. A nonce or initialization vector could also be generated in a step 252. In addition, the third symmetric ciphering key S3 252*b* could comprise a first portion S3 252*b*-1 for decryption by server 111' and a second portion S3 252*b*-2 for encryption by server 111'. Likewise, the third MAC key MAC3 252*c* can comprise two portions, where a first portion is for verification of MAC or tag values received from device 101 and a second portion is for generation of MAC values or tag values by server 111'

Server 111' can conduct a verification of the tag value 253*b* received in the message 254 using the third MAC key MAC3 253*c*. Server 111' can conduct a step 253 in order to generate the same tag value 253*b*. Exemplary details for a step 253 by server 111' are also depicted and described in connection with FIG. 7*a* below. At step 253, server 111' can select data for internal generation of MAC values in order receive data from device 101 in an authenticated manner with message integrity. The selected data in a step 253 can be received in a message 254 and comprise (i) the identity of the PSK, which is PSK-ID 231-1, (ii) the device extensions 101*g*', and (iii) the second random number random 2 252*a*. For some embodiments, the inclusion of a second random number 2 252*a* could be omitted from a message 254 and also omitted from a step 253 for both device 101 and server 111'.

Additional data could be selected in a step 253 for the generation of MAC values. Parameters from device extensions 101*g* or 101*g*' could also be selected in a step 253 for the generation of MAC values, or the parameters could be specified in a protocol for resuming the secure session. Server 111' could select a MAC algorithm 253*a* in a step 253 (depicted in FIG. 7*a* below), such as examples of Poly1305, HMAC algorithm, or AES with a mode such as CGM (to generate MAC values but not encrypt). Other possibilities exist as well for a MAC algorithm 253*a* used in a step 253 and for the generation of MAC values herein without departing from the scope of the present disclosure. At step 253, server 111' can input the selected data into the MAC algorithm 253*a* along with parameters and the third MAC key MAC3 252*c* generated by server 111' in a step 252 in order to generate the MAC value of tag1 253*b*.

At step 256, server 111' can compare the generated MAC value of tag1 253*b* from a step 253 by server 111' with the received MAC value of tag1 253*b* from message 254. If the generated MAC value of tag1 253*b* from a step 253 by server 111' is equal to or the same as the received MAC value of tag1 253*b* from message 254, then the server 111' can verify and authenticate that the plaintext data in message 254 (such as PSK-ID 231-1 and/or device extensions 101*g*') was transmitted by the device 101, where the device 101 also stores and operates with the PSK 230-1 mutually derived by server 111' in a step 230 and a device 101 in step 236 during the first session 250. If the verification of tag1 253*b* by server 111' in a step 256 fails, then server 111' can optionally send device 101 an error message.

Note that the verification of plaintext data in message 254 by server 111' can be important for securing a system 200*b*, since plaintext data in message 254 can be used to process subsequent symmetric ciphertext. As one example, device extensions 101*g*' in message 254 can be used by server 111' as parameters to generate a sixth symmetric ciphertext symm-C6 102*s*-6. For example, the device extensions 101*g*' could include metadata specifying a type or parameters for a symmetric ciphering algorithm. Without authentication of device extensions 101*g*', then the device extensions 101*g*' could be altered in a manner to attempt a "downgrade" attack such as changing device extensions 101*g*' to specify the use of weaker parameters for a symmetric ciphering algorithm. Other possibilities exist as well for the benefits of device 101 receiving plaintext data in message 254 in an authenticated manner through the verification of MAC value tag1 253*b* without departing from the scope of the present disclosure.

At step 257, for embodiments where device 101 and server 111' support zero round trip time resumption (0-RTT), server 111' can decrypt the fifth symmetric ciphertext symm-C5 102*s*-5. For these embodiments, server 111' can use the third symmetric ciphering key S3 252*b* generated in a step 252 by server 111' to decrypt the fifth symmetric ciphertext symm-C5 102*s*-5 from message 254 into a plaintext value for device application data. The decryption can be equivalent to the decryption step 228 by server 111' described above in FIG. 2*a* and also FIG. 5 below, except with the use of both (i) the third symmetric ciphering key S3 252*b* and (ii) different symmetric ciphertext comprising the fifth symmetric ciphertext symm-C5 102*s*-5. Note that the use of 0-RTT is optional, and the fifth symmetric ciphertext symm-C5 102*s*-5 may be omitted from a message 254. For embodiments that support 0-RTT and include the fifth symmetric ciphertext in a message 254, then the decrypted device application data can preferably be idempotent and not change the state of the server, such as with an HTTP GET request. In other words, 0-RTT data may be subject to replay attacks, where the exact same data could be retransmitted, so this risk, if significant, can be averted by server 111' rejecting 0-RTT data within message 254. Although a tag for a MAC value is not depicted with the fifth symmetric ciphertext symm-C5 102*s*-5 in a message 254, the message 254 can also include a tag value using MAC3 252*c* calculated by device 101 during encryption of the fifth symmetric ciphertext symm-C5 102*s*-5.

At step 258, server 111' can select plaintext data 258*a* for inclusion in a second response "Server Hello" message 261. The plaintext data 258*a* could comprise (i) a random number generated by server 111' for use with the resumed session 251*a*, (ii) a session identifier for the resumed session 251*a*, and/or (iii) data specified by the protocol for the resumed session 251*a* and a "Server Hello" message using a PSK. As one example the data specified by the protocol could include a version number specifying TLS version 1.4 or TLS version 2.0, etc., and the length of the "Server Hello" message 261. Other possibilities exist as well for the plaintext 258*a* selected in a step 258 for inclusion in the second "Server Hello" message 261 without departing from the scope of the present disclosure.

At step 253' server 111' can use the step 253 depicted and described in FIG. 7*a* for server 111' in order to generate a second MAC value or tag 2 253*c*. The plaintext for use in a step 253' can be the plaintext data 258*a* selected in a step 258. Parameters from device extensions 110*g* or 101*g*' could also be selected in a step 253' for the generation of MAC values, or the parameters could be specified in a protocol for resuming the secure session. Server 111' could select a MAC algorithm 253*a* (depicted in FIG. 7*a*) in a step 253', such as examples of Poly1305, HMAC algorithm, or AES with a mode such as CGM (to generate MAC values but not encrypt). Other possibilities exist as well for a MAC algorithm 253*a* used in a step 253' and for the generation of MAC values herein without departing from the scope of the present disclosure. At step 253', server 111' can input the plaintext data 258*a* into the MAC algorithm 253*a* along with parameters and the third MAC key MAC3 252*c* generated in a step 252 in order to generate the second MAC value tag2 253*c*.

At step 259, server 111' can select server hello data 259*a* for responding to the second "Client Hello" message 254. The server hello data 259*a* could include server extensions

103*g*', where server extensions 103*g*' can be similar to server extensions 103*g* described in FIG. 1 above, except that server extensions 103*g*' can be used for a resumed session 251*a* with the use of the PSK 230-1 and PSK-ID 231-1. Server hello data 259*a* in FIG. 2*b* could include a "server finished" message equivalent to the "client finished" message depicted in a step 228 for server 111. The server hello data 259*a* in FIG. 2*b* could include a "change cipher spec" command to indicate that subsequent data will be encrypted with an updated or different symmetric ciphering key. Other possibilities exist as well for the data included in the server hello data 259*a* without departing from the scope of the present disclosure. For some exemplary embodiments, encrypted server hello data 259*a* could include a second server ephemeral public key ePK-2.server 103*h*-2 generated by a server using a step 204 depicted and described for a server 111 in FIG. 2*a* above. For these embodiments, then a step 204 to generate the server ephemeral public key ePK-2.server 103*h*-2 can be conducted after receipt of the message 254' and before the step 270.

At step 260, server 111' can use symmetric encryption 260*a* with the plaintext server hello data 259*a* from a step 259 in order to generate a sixth symmetric ciphertext symm-C6 102*s*-6. A step 260 can correspond to a step 212 by server 111 as depicted and described in connection with FIG. 3 below, except with the use of (i) plaintext server hello data 259*a*, (ii) the third symmetric ciphering key S3 252*b* and MAC key MAC3 252*c* from a step 252 above (instead of keys S1 210*b* and MAC1 201*c* in step 212), and the output can be the sixth symmetric ciphertext symm-C6 102*s*-6 (instead of symm-C1 102*s*-1 for step 212 in FIG. 3). The symmetric encryption for a step 260 can be included within cryptographic algorithms 103*s* for server 111'. The symmetric encryption for a step 260 can include input of at least (i) the parameters or metadata mutually shared between device 101 and server 111', and (ii) the third symmetric ciphering key S3 252*b* and MAC key MAC3 252*c* from a step 252 above. Server 111' can then use the network interface 111*d* to transmit or send the second "Server Hello" message 261 to device 101, where the message 261 can include at least plaintext data 258*a*, the second MAC value of the tag2 253*c*, and the sixth symmetric ciphertext symm-C6 102*s*-6 as encrypted server hello data 259*a*.

Device 101 can receive the second "Server Hello" message 261 using a network interface such as radio 101*r*. Device 101 can perform a series of steps in order to process the data received. At step 253' device 101 can use the step 253 depicted and described in FIG. 7*a* for device 101 to generate the second MAC value or tag 2 253*c*. Note that the step 253' by both device 101 and server 111' can be the same, since both device 101 and server 111' should each internally generate the same MAC value tag2 253*c*. The plaintext for use in a step 253' can be the plaintext data 258*a* received in a message 261. Parameters from device extensions 101*g* or 101*g*' could also be selected in a step 253' for the generation of MAC values, or the parameters could be specified in a protocol for resuming the secure session. Device 101 could select a MAC algorithm 253*a* (depicted in FIG. 7*a*) in a step 253', such as examples of Poly1305, HMAC algorithm, or AES with a mode such as CGM (to generate MAC values but not encrypt). Other possibilities exist as well for a MAC algorithm 253*a* used in a step 253' and for the generation of MAC values herein without departing from the scope of the present disclosure. At step 253', device 101 can input the plaintext data 258*a* into the MAC algorithm 253*a* along with parameters and the third MAC key MAC3 252*c* generated in a step 252 in order to generate the second MAC value tag2 253*c*.

Note that the benefit of the use of the second MAC value tag 253*c* over the plaintext data 258*a* is that the plaintext data 258*a* in a second "Server Hello" can be received in an authenticated and verified manner. An attacker or other intermediate node such as a firewall in IP network 107 could not feasibly alter the plaintext data 258*a*, since generation of the second MAC value tag 253*c* requires the PSK 230-1 (as shown in step 252 in FIG. 7*a*), where the PSK 230-1 is only securely available to device 101 and network 103/server 111'. In addition, the generation of the PSK 230-1 can require the derivation and use of both the first shared secret key K1 102*k*-1 and the second shared secret key K2 102*k*-2.

At step 262, device 101 can compare the generated MAC value of tag2 253*c* from a step 253' by device 101 with the received MAC value of tag2 253*c* from message 261. If the generated MAC value of tag2 253*c* from a step 253' by device 101 is equal to or the same as the received MAC value of tag2 253*c* from message 261, then the device 101 can verify and authenticate that the plaintext data 258*a* in message 261 was transmitted by the server 111', where the server 111' also stores and operates with the PSK 230-1 mutually derived by server 111' in a step 230 and a device 101 in step 236. If the verification of tag2 253*c* by device 101 in a step 262 fails, then device 101 can optionally send server 111 an error message.

Note that the verification of plaintext data 258*a* by device 101 can be important for securing a system 200*b*, since plaintext data 258*a* can be used to process subsequent symmetric ciphertext, such as the sixth symmetric ciphertext symm-C6 102*s*-6. For example, the plaintext data 258*a* could include metadata specifying a type or parameters for a symmetric ciphering algorithm and without authentication of plaintext data 258*a*, then the plaintext data 258*a* could be altered in a manner to attempt a "downgrade" attack such as changing plaintext data 258*a* to specify the use of weaker parameters for a symmetric ciphering algorithm. Other possibilities exist as well for the benefits of device 101 receiving plaintext data 258*a* in an authenticated manner through the verification of MAC value tag2 253*c* without departing from the scope of the present disclosure.

At step 263, device 101 can use symmetric decryption 263*a* with the received sixth symmetric ciphertext symm-C6 102*s*-6 from a message 261 in order to read the plaintext server hello data 259*a*. A step 263 can be equivalent to a decryption step 215 for device 101 depicted and described in connection with FIG. 4 below, except with the use of (i) the sixth symmetric ciphertext symm-C6 102*s*-6 from a message 261 instead of symm-C1 102*s*-1, and (ii) the use of the third symmetric ciphering key S3 252*b* and MAC key MAC3 252*c* from a step 252 above instead of S1 210*b* and MAC1 210*c*. The symmetric decryption for a step 263 can be included within cryptographic algorithms 101*s* for device 101. The symmetric decryption for a step 253 can include input of at least (i) the parameters or metadata mutually shared by device 101 and server 111', and (ii) the third symmetric ciphering key S3 252*b* and MAC key MAC3 252*c* from a step 252 above. The output of a step 263 can comprise plaintext server hello data 259*a* with a MAC value verified by MAC3 252*c*. Device 101 can then process the plaintext server hello data 259*a*, such using the data in order to generate a second "Client Finished" message 264.

Device 101 can then send server 111' the second "Client Finished" message 264. Server 111' can receive and process the "Client Finished" message 264. The "Client Finished"

message 264 can include symmetric ciphertext, where the symmetric ciphertext was generated using the PSK 230-1. For example, the PSK 230-1 and additional data could be used with a HKDF in order for both device 101 and server 111' to mutually derive a symmetric ciphering key and MAC key. Server 111' could process the "Client Finished" message 264 and then both device 101 and server 111' could transmit and receive in messages 265 encrypted and authenticated application data. The encrypted and authenticated application data can be generated using at least the PSK 230-1. The PSK 230-1 can be input into a HDKF in order to generate symmetric ciphering keys and MAC keys, where the keys are used with symmetric ciphering algorithms to generate the encrypted and authenticated application data. As depicted in FIG. 2*b*, a step 251*a* for session resumption can comprise the series of steps and messages starting with step 201*d'* by device 101 and concluding with messages 265 with encrypted and authenticated application data.

Note that the authentication of handshake messages and application data using the PSK 230-1 in a system 200*b* does not require the use of digital certificates and digital signatures in the resumed session 251*a*. Certificates of public keys and digital signatures supporting PQC algorithms in NIST Round 3 typically require more bandwidth for significantly larger sizes of the digital signatures, compared to classical algorithms. Consequently, the resumed session 251*a* provides an efficient system by avoiding the use of PQC digital certificates and digital signatures for authentication.

System 200*b* also provides a higher level of security compared to conventional technology for session resumption from the use of both (i) the PSK 230-1 can be derived from two derived shared secrets (e.g. K1 102*k*-1 and K2 102*k*-2), which can be derived from two different PQC algorithms for each of device 101 and server 111 (e.g. both an ENCAPS and a DECAPS), and (ii) the identity or identifier for the PSK of PSK-ID 231-1 can be protected by both the two shared secrets for device 101 and network 103. With conventional technology for TLS 1.3, a "pre-shared" secret key is protected with a single mutually derived shared secret that results from an (EC)DHE key exchange. In addition, and as discussed in FIG. 2*b* above, the plaintext data shared in a message 254 and message 261 can be authenticated using the PSK 230-1. Conventional technology such as with TLS 1.3 does not support the use of MAC values over unencrypted plaintext data transmitted in a "Client Hello" or a "Server Hello" message.

FIG. 2*c*

FIG. 2*c* is a simplified message flow diagram illustrating an exemplary system with exemplary data transmitted and received by a device and a network for resuming a secure session, in accordance with exemplary embodiments. System 200*c* can include a device 101, IP network 107, a network 103, and a server 111' operating within network 103. Server 111' can be the same as server 111 from FIG. 1 and FIG. 2*a* above, or server 111' could be a different physical server but equivalent to server 111 as depicted and described for network 103 in FIGS. 1 and 2*a* above. Server 111' can communicate with network database 103*db* within network 103 in order to access information regarding pre-shared keys for devices that were generated during a first session 250. A difference between FIG. 2*c* and the above FIG. 2*b* can be FIG. 2*c* includes the use of a second device ephemeral public key ePK-2.device 101*h*-2 and a corresponding second device ephemeral private key of eSK-2.device 101*i*-2.

The nodes or entities within system 200*c* were also depicted and described in connection with FIG. 1 and FIG. 2*a* above, where FIG. 2*c* depicts exemplary steps for the nodes and exemplary message flows between the nodes after a first session 250 depicted and described in connection with FIG. 2*a* above. Although a single device 101, IP network 107, and network 103 are depicted in a system 200*c*, a system 200*c* could include a plurality of each of the depicted nodes connected via different IP networks 107. In addition, data recorded for device 101 and network 103 depicted and described above in FIG. 1 and FIG. 2*a* can be received and stored in the device 101 and network 103 depicted in FIG. 2*c* during the steps and message flows depicted in FIG. 2*c*.

At steps 201*d'* through 201*f* device 101 can process data in order to securely resume a first session 250 between device 101 and a network 103. Device 101 can generate a message 254' for server 111', where the message 254 could comprise a second "Client Hello 2" message. Steps 201*d'* and subsequent steps in FIG. 2*c* can use the computing hardware in device 101 as depicted in FIG. 1 above and FIG. 11 below, as well as the operating system and stored parameters within device 101 stored in a step 201*b* above in FIG. 2*a*. At step 201*d'*, device 101 can power on or wake from a sleep state or idle state and then select either a network ID 103*a* or a server ID 111*a* for sending a message 254. The IDs 103*a* or 111*a* could comprise domain names or IP addresses for connecting to the network 103. At step 201*d'*, device 101 could read the identity of a "pre-shared" secret key PSK-ID 231-1 stored in memory 101*m* of device 101 during the first session 250.

Step 201*d'* can include device 101 selecting updated device extensions 101*g'* for use with a resumed secure session between device 101 and server 111'. In other words, device extensions 101*g* selected by device 101 in a step 201*d* in FIG. 2*a* could be for a first session 250 and updated device extensions 101*g'* could be for a resumed session 251*b*. Device extensions 101*g* were also described above in connection with FIG. 1, and can include identifiers or values for supported by both (i) cryptographic algorithms 101*s* and cryptographic parameters 101*x*, and (ii) a protocol for secure communications with network 103 and server 111. Device extensions 101*g* can include supported cipher suites such as names or values identifying supported symmetric ciphering algorithms, secure hash algorithms, digital signature algorithms, etc. Device extensions 101*g'* could be equivalent to device extensions 101*g*, except that device extensions 101*g'* could also specify values, parameters, and settings for the use of PSK 230-1 and a resumed session 250 by device 101 and server 111'. In other words, device 101 in a step 201*d* in FIG. 2*a* may not have a PSK available for communication with network 103 and subsequently selects device extensions 101*g*, while device 101 can have a PSK available for communication with network 103 in a step 201*d'* and can select extensions 101*g'* that support the use of the PSK 230-1.

At step 201*d'*, device 101 can select a subset of the cryptographic parameters 101*x* for conducting a third KEM 103*k*/101*j*. The selected parameters could be KEM parameters 101*f-x* used with the first KEM 103*k*/101*j*. From the successful first session 250 above, device 101 can reasonable expect that server 111' supports the KEM parameters 101*f-x*, since KEM parameters 101*f-x* were used with the first session 250. For some embodiments, the KEM parameters selected in a step 201*d'* can be different than KEM parameters 101*f-x*, and these different KEM parameters could be within the Device.PQC-KEM.Parameters 101*f* depicted and described in connection with FIG. 1 above and also with FIG. 8 below. For the purposes of the session resumption 251*b* depicted in FIG. 2*c*, the parameters selected by device 101 in a step 201*d*' are depicted as KEM parameters 101*f-x*' (indicating they could be updated and different from KEM parameters 101*f-x*). At a step 201*d*', the parameters Device.PQC-KEM.Parameters 101*f* can include different supported families of PQC KEM, such as Kyber, BIKE, SIKE, NRTU, HQC, Classic McEliece, etc., where the KEM parameters 101*f-x*' (or the third KEM algorithm) can comprise a specific, identified KEM such as one of (i) Kyber-768 or (ii) SIKEp434 or (iii) BIKE security level 3, etc. Device.PQC-KEM.Parameters 101*f* for device 101 are also depicted and described in connection with FIG. 8 below.

At step 201*e*', device 101 can use a PQC.KeyGen function 101*q* in FIG. 1 to generate a second device ephemeral PKI key pair comprising a second device ephemeral public key ePK-2.device 101*h*-2 and a second device ephemeral private key eSK-2.device 101*i*-2. The algorithm used to generate the ephemeral PKI key pair can be specified in KEM parameters 101*f-x*' selected by device 101 in a step 201*d*' above. In a step 201*e*', the device ephemeral PKI key pair can comprise a key pair supporting key encapsulation mechanisms specified in Round 3 of the NIST "Post Quantum Cryptography" (PQC) project. Each KEM provides details for a KeyGen function, which could be used for a PQC.KeyGen function 101*q* in a step 201*e*'. The second device ephemeral public key ePK-2.device 101*h*-2 generated in a step 201*e*' can comprise the value of "Key Share" within a second "Client Hello" message for resumed session 251*b* and message 245' below.

At step 252, device 101 can use the PSK 230-1 to generate a third symmetric ciphering key S3 252*b* and a third MAC key MAC3 252*c*. Exemplary details for a step 252 by device 101 are also depicted and described in connection with FIG. 6 below. At step 252, device 101 can generate a second random number 252*a* for use in the resumed session 251*b*. At step 252, device 101 can use at least the PSK 230-1 and additional data (depicted as "data 252*d*" below in FIG. 7*a*) with a HKDF 252*h* (depicted in FIG. 7*a* below) in order to generate the third symmetric ciphering key S3 252*b* and a third MAC key MAC3 252*c*. A nonce or initialization vector could also be generated in a step 252. In addition, the third symmetric ciphering key S3 252*b* could comprise a first portion S3 252*b*-1 for encryption by device 101 and a second portion S3 252*b*-2 for decryption by device 101. Likewise, the third MAC key MAC3 252*c* can comprise two portions, where a first portion is for generation of MAC or tag values by device 101 and a second portion is for verification of MAC values or tag values received from server 111'.

At step 253, device 101 can select data for generation of MAC values in order send data to server in an authenticated manner with message integrity. Exemplary details for a step 253 by device 101 are also depicted and described in connection with FIG. 6 below. The selected data in a step 253 can comprise (i) the identity of the PSK, which is PSK-ID 231-1 stored in a step 235 above, (ii) the second device ephemeral public key ePK-2.device 101*h*-2 derived in a step 201*e*' above, (iii) the device extensions 101*g*' selected from a step 201*d*' above, (iv) the second random number random 2 252*a* from a step 252, (v) the Device.PQC-KEM.Parameters 101*f*, and (vi) the KEM parameters for the second device ephemeral public key ePK-2.device 101*h*-2 of 101*f-x*'. Additional data could be selected in a step 253 for the generation of MAC values. Parameters from device extensions 101*g* or 101*g*' could also be selected in a step 253 for the generation of MAC values, or the parameters could be specified in a protocol for resuming the secure session. Device 101 could select a MAC algorithm 253*a* in a step 253 (depicted in FIG. 7*a* below), such as examples of Poly1305, HMAC algorithm, or AES with a mode such as CGM (to generate MAC values but not encrypt). Other possibilities exist as well for a MAC algorithm 253*a* used in a step 253 and for the generation of MAC values herein without departing from the scope of the present disclosure. At step 253, device 101 can input the selected data into the MAC algorithm 253*a* along with parameters and the third MAC key MAC3 252*c* generated in a step 252 in order to generate the MAC value tag1 253*b*'. The MAC value tag1 253*b*' can be similar to the MAC value tag1 253*b* in FIG. 2*b*, except that the MAC value tag1 253*b* can also be over the second device ephemeral public key ePK-2.device 101*h*-2 derived in a step 201*e*' above After the conclusion of a step 253 by device 101, device 101 can then conduct a step 201*f* to process a message 254' as depicted in FIG. 2*b*. A message 254' can be similar to a message 254 depicted and described in connection with FIG. 2*b*, with the primary difference between the two messages 254 and 254' being a message 254' can include (i) the second device ephemeral public key ePK-2.device 101*h*-2, (ii) the Device.PQC-KEM.Parameters 101*f*, and (iii) the KEM parameters for the second device ephemeral public key ePK-2.device 101*h*-3 of 101*f-x*. A step 201*f* in FIG. 2*b* can be equivalent to a step 201*f* in FIG. 2*a*, with the difference being step 201*f* can be for session resumption 251*b* and step 201*f* can be for a first session 250.

Note that the message 254' in FIG. 2*a* for the second "Client Hello" can include all of the equivalent information and data for a first "Client Hello" message 202 in FIG. 2*a* above. The message 254' can also include the PSK-ID 231-1 and the MAC value tag1 253*b*'. By including at least all of the equivalent information and data for a first "Client Hello" message 203 in FIG. 2*a* above, server 111' in a subsequent step 266 below could (i) select not to perform a resumed session 251*b* depicted in FIG. 2*c*, but rather use the message 254' as a message 202 depicted and described in connection with FIG. 2*a* and instead (ii) have server 111' conduct the full set of steps for a first secure session 250 depicted and described in connection with FIG. 2*a*. As one example of the benefits of a message 254' including at least all of the data for a first message 202 in FIG. 2*a*, if server 111' cannot find the PSK-ID 231-1 in a network database 103*db* (or the PSK 230-1 for the PSK-ID 231-1 has expired), then server 111' can use all of the information in the message 254' to conduct the series of steps 203*a* through 212 in FIG. 2*a* in order to respond with a message 213 for a new first session 250. In other words, a message 254' depicted in FIG. 2*c* allows a server proceed in a step 266 described below with either (i) continuing with the resumed session 251*b* or (ii) conducting a new first session 250 without requiring the additional round-trip of messages to (i) reject the message 254' and then (ii) force device 101 to resend an entirely new message 202 to start the new first session 250.

At step 201*f*, device can use firmware or application software within device 101 in order to perform steps as specified in a protocol for resumption of a secure session between device 101 and network 103. The message 254' can comprise a second "Client Hello" or equivalent second message according to the protocol for the secure session selected by device 101 in a step 201*d* in FIG. 2*a*. Device 101 can send or transmit a second message 254' comprising a second "Client Hello" message (or equivalent for a different protocol than TLS) to the server 111' operating in network 103 in a step 201*f*. A step 201*f* can comprise processor 101*p* writing the data for the message 254' to a radio 101*r* (or equivalently a network interface if device 101 does not include a radio 101*r*). As depicted in FIG. 2*b*, the message 254' can comprise a second "Client Hello" message, where the first "Client Hello" message was depicted and described above in FIG. 2*a* for the first session 250.

At step 255, server 111' can use the received PSK-ID 231-1 from the message 254' to securely query the network database **103*db* for the corresponding PSK 230-1. The storing of multiple values of the PSK and PSK-ID for a network 103 was depicted and described in connection with FIG. 2*a* above. If a corresponding PSK 230-1 for the PSK-ID 231-1 is not found or has expired, then the server 111' may optionally send device 101 an error message. For some embodiments, server 111' may prefer to remain silent and not respond to message 254' if the PSK-ID 230-1 is not found or if subsequent errors occur in the processing of message 254', such as tag value 253*b*' not being verified. After a step 255 and upon success of the query to network database 103*db*, server 111' can store the corresponding PSK 230-1 for the PSK-ID 231-1**.

Server 111' can then conduct a step 252, where a step 252 by server 111' can be equivalent or the same as a step 252 conducted by device 101. A step 252 is depicted and described above for a device 101 and a server 111' can conduct the same step in order use the PSK 230-1 from a step 255 and mutually derive with device 101 the third symmetric ciphering key S3 **252*b* and a third MAC key MAC3 252*c*. Exemplary details for a step 252 by server 111' are also depicted and described in connection with FIG. 7*a* below and also for a server 111' in FIG. 2*a* above. At step 252, server 111' can use at least the PSK 230-1 and additional data (depicted as "data 252*d*" below in FIG. 7*a*) with a HKDF 252*h* (depicted in FIG. 7*a* below) in order to mutually derive the third symmetric ciphering key S3 252*b* and a third MAC key MAC3 252*c***.

Server 111' can conduct a verification of the tag value **253*b*' received in the message 254 using the third MAC key MAC3 253*c*. Server 111' can conduct a step 253 in order to generate the same tag value 253*b*'. Exemplary details for a step 253 by server 111' are also depicted and described in connection with FIG. 7*a* below. At step 253, server 111' can select data for internal generation of MAC values in order receive data from device 101 in an authenticated manner with message integrity. The selected data in a step 253 can be received in a message 254' and comprise (i) the identity of the PSK, which is PSK-ID 231-1, (ii) the device extensions 101*g*', (iii) the second random number random 2 252*a*, (iv) the second device ephemeral public key ePK-2.device 101*h*-2 derived in a step 201*e*' above, (v) the Device.PQC-KEM.Parameters 101*f*, and (vi) the KEM parameters for the second device ephemeral public key ePK-2.device 101*h*-3 of 101*f*-*x*'. For some embodiments, the inclusion of a second random number 2 252*a* could be omitted from a message 254 and also omitted from a step 253 for both device 101 and server 111'. The description of a step 253 performed by server 111' in FIG. 2*b* above also applies to the step 253 performed by a server 111' in FIG. 2*c*. At step 253, server 111' can input the selected data into the MAC algorithm 253*a* along with parameters and the third MAC key MAC3 252*c* generated by server 111' in a step 252 in order to generate the MAC value of tag1 253*b*'**.

At step 256, server 111' can compare the generated MAC value of tag1 **253*b*' from a step 253 in FIG. 2*c* by server 111' with the received MAC value of tag1 253*b*' from message 254'. If the generated MAC value of tag1 253*b*' from a step 253 by server 111' in FIG. 2*c* is equal to or the same as the received MAC value of tag1 253*b*' from message 254', then the server 111' can verify and authenticate that the plaintext data in message 254' (such as PSK-ID 231-1 and/or device extensions 101*g*' and/or the second device ephemeral public key ePK-2.device 101*h*-2) was transmitted by the device 101, where the device 101 also stores and operates with the PSK 230-1 mutually derived by server 111' in a step 230 and a device 101 in step 236 during the first session 250. The benefits described for the verification of a MAC value tag1 253*b* described for a system 200*b* also apply for a system 200*c* depicted in FIG. 2*c***.

At step 266 in FIG. **2*c*, if the verification of tag1 253*b*' by server 111' in a step 256 fails, then server 111' can optionally (i) send device 101 an error message, or (ii) chose to re-start a first session 250 and use the message 254' as a message 202 in FIG. 2*a* in order to process the message 254'. In addition, if a step 255 fails, such as server 111' cannot receive or locate a PSK 230-1 for the PSK-ID 231-1 or the PSK 230-1 for the PSK-ID 231-1 has expired, then steps 252 and 253 could be omitted and in a step 266 server 111' could select to re-start a first new session 250 using the message 254' as first "Client Hello" message 202 in FIG. 2*a*. For the embodiments described in the previous two sentences, at a step 266, server 111' could use the message 254' as a message 202 in FIG. 2*a* and then conduct the steps 203*a* through 212 depicted and described in connection with FIG. 2*a* and respond to the message 254' with a message 213 for a new first session 250. For these embodiments, then the PSK-ID 231-1 in the message 254' and the MAC value tag1 253*b*' can be ignored for the purposes of conducting the steps 203*a* through 212 in FIG. 2*a* to generate the "Server Hello" message 213**.

In other words, a message 254' depicted in FIG. **2*c* allows a server proceed in a step 266 described below with either (A) continuing with the resumed session 251*b* (when steps 255, 252, 253, and 256 are successful) or (B) conducting a new first session 250. The sequence of steps and message flows depicted in FIG. 2*c* are for the case (A) in the previous sentence. For the case of (B), then the second device ephemeral public key ePK-2.device 101*h*-2 can be used by server 111' as a first device ephemeral public key ePK-1.device 101*h*-1 and the second random number random 2 252*a* can be used as a first random number random 1 202*a***.

At step **203*a*', server 111' can validate that the second device ephemeral public key ePK-2.device 101*h*-2 received is properly structured and consistent with KEM parameters 101*f*-*x*. For example, if KEM parameters 101*f*-*x* state the key 101*h*-2 supports the Kyber-786 algorithm, then in a step 203*a*' server 111' could at least verify the ePK-2.device 101*h*-2 is 1184 bytes long and also can be successfully input into a KEM ENCAPS function 103*k* for sever 111'. At a step 203*a*', server 111' can also verify that KEM parameters 101*f*-*x* is supported by Server.PQC-KEM.Parameters 103*f*. In other words, in a step 203*a*', server 111 can determine the selected KEM parameters 101*f*-*x* for the KEM 103*k*/101*j* and ePK-2.device 101*h*-2 are supported by server 111' by cryptographic algorithms 103*s* and cryptographic parameters 103*x***.

At step 208', server 111' can derive or generate a random number M1 **208*a*' for use in a KEM 103*k*/101*j* between server 111' and device 101. At step 209', server 111' can use (i) the received second device ephemeral public key of ePK-2.device 101*h*-2 and (ii) the specified subset of KEM parameters 101*f*-*x* for the device ephemeral public key and the KEM 103*k*/101*j* and (iii) random number M1 208*a*' in order to generate both (x) a third asymmetric ciphertext C3 102*c*-3 and (y) a third shared secret key K3 102*k*-3. A server 111' can use both cryptographic algorithms 103*s* and cryptographic parameters 103*x* in order to conduct the step 209'. The function and use of a step 209' can be equivalent to the use of a step 209 and a KEM ENCAPS function 103*k* as depicted and described in FIG. 3 below, where a step 209' in FIG. 2c can use as input (i) the received second device ephemeral public key of ePK-2.device 101h-2, and (ii) the random number M1 208a'. In exemplary embodiments, both the value of M1 208a' comprising a random number and the second device ephemeral public key can be stored within RAM memory 111m of server 111' within network 103**.

At step 267, server 111' could conduct an additional encryption step, where server 111' can encrypt the third asymmetric ciphertext C3 102c-3 output from a step 209' above into a "double encrypted" fifth symmetric ciphertext symm-C5 102s-5. In other words, the PQC KEM algorithms proposed in the NIST Round 3 standardization project propose the use of an asymmetrically encrypted ciphertext such as the third asymmetric ciphertext C3 102c-3 in order to conduct a KEM. The original ciphertext output from the KEM and a step 209' (such as KEM ENCAPS 103k in FIG. 3 but using ePK.device 101h-2 and M1 208a') could provide the first level of asymmetric encryption.

Although the ciphertext from the party conducting an ENCAPS function (e.g. server 111' using the device public key ePK-2.device 101h-2) is normally secure with the first level of asymmetric encryption, additional levels of security could be obtained for the system 200c in FIG. 2c by server 111' conducting a step 267 to "double encrypt" the third asymmetric ciphertext C3 102c-3 output from KEM ENCAPS 101k in step 209' by also using symmetric encryption. The "double encryption" of the third asymmetric ciphertext C3 102c-3 in a step 267 can be equivalent to a step 224 by device 101 in FIG. 5, except with the input of third asymmetric ciphertext C3 102c-3 and the use of keys S3 252b and MAC3 252c.

One reason to conduct a step 267 by server 111' for message 261' is that a potential attacker could exist between device 101 and server 111'. From the plaintext second device ephemeral public key ePK-2.device 101h-2, an attacker could attempt to substitute (i) an original third asymmetric ciphertext C3 102c-3 from server 111' with (ii) a different, "fake" ciphertext C3 102c-3'. The different, "fake" ciphertext C3 102c-3' could feasibly be validly created using the second device ephemeral public key ePK-2.device 101h-2 (under certain plausible circumstances). The use of a "double encrypted" third asymmetric ciphertext C3 102c-3 (in the form of the fifth symmetric ciphertext symm-C5 102s-5 in FIG. 2c) by device server 111' increases resistance to an attacker substituting a fake third asymmetric ciphertext C3 102c-3'.

Or, in some embodiments, (i) the fifth symmetric ciphertext symm-C2 102s-5 could omit the use of the symmetric ciphering key S3 252b by server 111' in a step 267 and (ii) the fifth symmetric ciphertext symm-C5 102s-5 could be processed in a step 267a (depicted and described in connection with FIG. 7b below) with only the third MAC key MAC3 252c and a MAC algorithm such as Poly1305. For these embodiments, the MAC values for a plaintext third asymmetric ciphertext C3 102c-3 transmitted in a message 261' in FIG. 2c could be verified by device 101 using the MAC key MAC3 252c. In other words for the embodiments described within this paragraph, a the depicted "fifth symmetric ciphertext symm-C5 102s-5" could comprise a third asymmetric ciphertext C3 102c-3 with MAC values generated using the third MAC key MAC3 252c by server 111', such that device 101 could verify the third asymmetric ciphertext C3 102c-3 was generated by server 111' that (i) conducted the KEM ENCAPS 103j in a step 209' and (ii) operates with PSK 230-1 (since MAC3 252c can be derived from PSK 230-1 in a step 252). For the embodiments described in this paragraph, then the data depicted in FIG. 2c for "symm-C5 102s-5" could be transmitted as plaintext with MAC values using (i) the MAC key MAC3 252c from a HKDF 252h and (ii) the symmetric encryption step 267a in a step 267 but only for generating MAC values and not ciphering or encrypting data.

At step 268, server 111' can use (i) the PSK 230-1 for the PSK-ID 231-1 and (ii) the third shared secret key K3 102k-3 generated in a step 209' above in order to generate a fourth symmetric ciphering key S4 268b and a fourth MAC key MAC4 268c. Note that the PSK 230-1 can be stored by server 111' in a step 230. Exemplary details for a step 268 by server 111' are also depicted and described in connection with FIG. 7b below. At step 268, server 111' can use at least the PSK 230-1, the third shared secret key K3 102k-3 generated in a step 209', and additional data (depicted as "data 268d" below in FIG. 7b) with a HKDF 268a (depicted in FIG. 7b below) in order to generate the fourth symmetric ciphering key S4 268b and a fourth MAC key MAC4 268c. A nonce or initialization vector could also be generated in a step 268 by the HKDF 268a. In addition, the fourth symmetric ciphering key S4 268b could comprise a first portion S4 268b-1 for encryption by server 111' and a second portion S4 268b-2 for decryption by server 111'. Likewise, the fourth MAC key MAC4 268c can comprise two portions, where a first portion is for generation of MAC or tag values by server 111' and a second portion is for verification of MAC values or tag values received by server 111'.

At step 258, server 111' can select plaintext data 258a for inclusion in a second response "Server Hello" message 261'. The plaintext data 258a could comprise (i) a random number generated by server 111' for use with the resumed session 251b, (ii) a session identifier for the resumed session 251b, and/or (iii) data specified by the protocol for the resumed session 251b and a "Server Hello" message using a PSK. As one example the data specified by the protocol could include a version number specifying TLS version 1.4 or TLS version 2.0, etc., and the length of the "Server Hello" message 261'. Other possibilities exist as well for the plaintext 258a selected in a step 258 for inclusion in the second "Server Hello" message 261' without departing from the scope of the present disclosure.

At step 269 server 111' can use the step 269 depicted and described in FIG. 7b for server 111' in order to generate a second MAC value or tag2 269b. The plaintext for use in a step 269 can be the plaintext data 258a selected in a step 258. Parameters from device extensions 101g or 101g' could also be selected in a step 269 for the generation of MAC values, or the parameters could be specified in a protocol for resuming the secure session. Server 111' could select a MAC algorithm 269a (depicted in FIG. 7b) in a step 269, such as examples of Poly1305, HMAC algorithm, or AES with a mode such as CGM (to generate MAC values but not encrypt). Other possibilities exist as well for a MAC algorithm 269a used in a step 269 and for the generation of MAC values herein without departing from the scope of the present disclosure. At step 269, server 111' can input the plaintext data 258a into the MAC algorithm 269a along with parameters and the fourth MAC key MAC3 268c generated in a step 268 in order to generate the second MAC value tag2 269b.

At step 259, server 111' can select server hello data 259a for responding to the second "Client Hello" message 254 for a resumed session 251b. The server hello data 259a could include server extensions 103g', where server extensions 103g' can be similar to server extensions 103g described in FIG. 1 above, except that server extensions 103g' can be used for a resumed session 251*b* with the use of the PSK 230-1 and PSK-ID 231-1 and the second device ephemeral public key ePK-2.device 101*h*-2. Server hello data 259*a* in FIG. 2*c* could include a "server finished" message equivalent to the "client finished" message depicted in a step 228 for server 111. The server hello data 259*a* in FIG. 2*c* could include a "change cipher spec" command to indicate that subsequent data will be encrypted with an updated or different symmetric ciphering key. Other possibilities exist as well for the data included in the server hello data 259*a* without departing from the scope of the present disclosure. For some exemplary embodiments, encrypted server hello data 259*a* could include a second server ephemeral public key ePK-2.server 103*h*-2 generated by a server using a step 204 depicted and described for a server 111 in FIG. 2*a* above. For these embodiments, then a step 204 to generate the server ephemeral public key ePK-2.server 103*h*-2 can be conducted after receipt of the message 254' and before the step 270.

At step 270, server 111' can use symmetric encryption 270*a* with the plaintext server hello data 259*a* from a step 259 in order to generate a sixth symmetric ciphertext symm-C6 102*s*-6. A step 270 is also depicted and described in connection with FIG. 7*b* below. The symmetric encryption 270*a* can be included within cryptographic algorithms 103*s* for server 111'. The symmetric encryption 270*a* can include input of at least (i) the parameters or metadata mutually shared between device 101 and server 111', (ii) the fourth symmetric ciphering key S4 268*b* and MAC key MAC4 268*c* from a step 262 above, and (iii) the plaintext server hello data 259*a*.

Server 111' can then use the network interface 111*d* to transmit or send the second "Server Hello" message 261' to device 101, where the message 261' can include at least plaintext data 258*a*, the second MAC value of the tag2 269*b*, the fifth symmetric ciphertext symm-C5 102*s*-5 from a step 267, and the sixth symmetric ciphertext symm-C6 102*s*-6 as encrypted server hello data 259*a*. Although MAC values or tags for the fifth symmetric ciphertext symm-C5 102*s*-5 and the sixth symmetric ciphertext symm-C6 102*s*-6, both the fifth symmetric ciphertext symm-C5 102*s*-5 and the sixth symmetric ciphertext symm-C6 102*s*-6 could include MAC values generated by MAC keys corresponding to the symmetric ciphering keys depicted for the fifth symmetric ciphertext symm-C5 102*s*-5 and the sixth symmetric ciphertext symm-C6 102*s*-6 shown for message 261'.

Device 101 can receive the second "Server Hello" message 261' for a resumed session 251*b* using a network interface such as radio 101*r*. Device 101 can perform a series of steps in order to process the data received. At step 271, device 101 can use symmetric decryption 271*a* with the fifth symmetric ciphertext symm-C5 102*s*-5 from the message 261', in order to read a plaintext value for the third asymmetric ciphertext C3 102*c*-3. A step 271 for device 101 can be equivalent to the step 226 for server 111 depicted and described in connection with FIG. 5, with the difference being the input of the fifth symmetric ciphertext symm-C5 102*s*-5 and the use of the third symmetric ciphering key S3 252*b* and third MAC key MAC3 252*c* from a step 252 for decryption. The symmetric decryption 271 can be included within device cryptographic algorithms 101*s* for device 101. The symmetric decryption 271 can include input of the parameters or metadata shared between device 101 and server 111' (such as specifying a type of algorithm and associated parameters) and the third symmetric ciphering key S3 252*b* and third MAC key MAC3 252*c* from a step 252 above for device 101.

At step 214', device 101 can use (i) the specified KEM parameters 101*f-x* transmitted in message 254' along with (ii) cryptographic algorithms 101*s* to conduct a KEM DECAPS 101*j* function with the received third asymmetric ciphertext C3 102*c*-3. The third asymmetric ciphertext C3 102*c*-3 could be output from the step 271 above. In a step 214', the device 101 can use the second device ephemeral private key of eSK-2.device 101*i*-2 derived in step 201*e'* with the KEM DECAPS 101*j* and the received third asymmetric ciphertext 102*c*-3 and KEM parameters 101*f-x'* in order to generate the third shared secret key K3 102*k*-3. A step 214 for device 101 is also depicted and described in connection with FIG. 4 below, and also summarized for the step 214 for device 101 in FIG. 1 above. A difference between step 214 depicted in FIG. 4 and the step 214' performed in FIG. 2*c* is that step 214' can use both (i) the third asymmetric ciphertext C3 102*c*-3 instead of the first asymmetric ciphertext C1 102*c*-1, and (ii) the second device ephemeral private key of eSK-2.device 101*i*-2 derived in step 201*e'* instead of the first device ephemeral private key of eSK-1.device 101*i*-1 derived in step 201*e*. Likewise, a difference between step 214 depicted in FIG. 4 and the step 214' performed in FIG. 2*c* is that step 214' can output a third shared secret key K3 102*k*-3 instead of the first shared secret key K1 102*k*-1.

At step 268, device 101 can use (i) the PSK 230-1 for the PSK-ID 231-1 read from a step 201*d'* and (ii) the third shared secret key K3 102*k*-3 generated in a step 214' above in order to generate a fourth symmetric ciphering key S4 268*b* and a fourth MAC key MAC4 268*c*. Note that the PSK 230-1 can be stored by device 101 in a step 236. Exemplary details for a step 268 by device 101 are also depicted and described in connection with FIG. 7*b* below. At step 268, device 101 can use at least the PSK 230-1, the third shared secret key K3 102*k*-3 generated in a step 214', and additional data (depicted as "data 268*d*" below in FIG. 7*b*) with a HKDF 268*a* (depicted in FIG. 7*b* below) in order to generate the fourth symmetric ciphering key S4 268*b* and a fourth MAC key MAC4 268*c*. A nonce or initialization vector could also be generated in a step 268 by the HKDF 268*a*. In addition, the fourth symmetric ciphering key S4 268*b* could comprise a first portion S4 268*b*-1 for decryption by device 101 and a second portion S4 268*b*-2 for encryption by device 101. Likewise, the fourth MAC key MAC4 268*c* can comprise two portions, where a first portion is for generation of MAC or tag values by device 101 and a second portion is for verification of MAC values or tag values received by device 101.

At step 269 device 101 can use the step 269 depicted and described in FIG. 7*b* for device 101 to generate the second MAC value or tag 2 269*b*. Note that the step 269 by both device 101 and server 111' can be the same, since both device 101 and server 111' should each internally generate the same MAC value tag2 269*b*. The plaintext for use in a step 269 can be the plaintext data 258*a* received in a message 261'. Parameters from device extensions 101*g* or 101*g'* could also be selected in a step 269 for the generation of MAC values, or the parameters could be specified in a protocol for resuming the secure session. Device 101 could select a MAC algorithm 269*a* (depicted in FIG. 7*b*) in a step 269, such as examples of Poly1305, HMAC algorithm, or AES with a mode such as CGM (to generate MAC values but not encrypt). Other possibilities exist as well for a MAC algorithm 269*a* used in a step 269 and for the generation of MAC values herein without departing from the scope of the present disclosure. At step 269, device 101 can input the plaintext data 258*a* into the MAC algorithm 269*a* along with parameters and the third MAC key MAC3 268*c* generated in a step 268 in order to generate the second MAC value tag2 269*b*.

Note that the benefit of the use of the second MAC value tag 269*b* over the plaintext data 258*a* is that the plaintext data 258*a* in a second "Server Hello" can be received in an authenticated and verified manner without requiring the use of digital certificates and digital signature algorithms using PKI keys. An attacker or other intermediate node such as a firewall in IP network 107 could not feasibly alter the plaintext data 258*a*, since generation of the second MAC value tag 269*b* requires the fourth MAC key MAC4 268*c*. The fourth MAC key M4 268*c* can require both the PSK 230-1 and the third shared secret key K3 102*k*-3, as depicted in a step 268 in FIG. 7*b*. In other words, the PSK 230-1 and the third shared secret key K3 102*k*-3 are only securely available to device 101 and network 103/server 111'. In addition, the generation of the PSK 230-1 can require the derivation and use of both the first shared secret key K1 102*k*-1 and the second shared secret key K2 102*k*-2 during a first session 250.

At step 272, device 101 can compare the generated MAC value of tag2 269*b* from a step 269 by device 101 with the received MAC value of tag2 269*b* from message 261'. If the generated MAC value of tag2 269*b* from a step 269 by device 101 is equal to or the same as the received MAC value of tag2 269*b* from message 261', then the device 101 can verify and authenticate that the plaintext data 258*a* in message 261' was transmitted by the server 111', where the server 111' also stores and operates with both (i) the PSK 230-1 mutually derived by server 111' in a step 230 and a device 101 in step 236 and (ii) the third shared secret key K3 102*k*-2 from a KEM with the second device ephemeral public key ePK-2.device 102*h*-2. If the verification of tag2 269*b* by device 101 in a step 272 fails, then device 101 can optionally send server 111' an error message.

Note that the verification of plaintext data 258*a* by device 101 can be important for securing a system 200*c*, since plaintext data 258*a* can be used to process subsequent symmetric ciphertext, such as the sixth symmetric ciphertext symm-C6 102*s*-6. For example, the plaintext data 258*a* could include metadata specifying a type or parameters for a symmetric ciphering algorithm, and without authentication of plaintext data 258*a*, then the plaintext data 258*a* could be altered in a manner to attempt a "downgrade" attack such as changing plaintext data 258*a* to specify the use of weaker parameters for a symmetric ciphering algorithm. Other possibilities exist as well for the benefits of device 101 receiving plaintext data 258*a* in an authenticated manner through the verification of MAC value tag2 269*b* without departing from the scope of the present disclosure.

At step 273, device 101 can use symmetric decryption 273*a* with the received sixth symmetric ciphertext symm-C6 102*s*-6 from a message 261' in order to read the plaintext server hello data 259*a*. A step 273 is also depicted and described in connection with FIG. 7*b* below. The symmetric decryption 273*a* can be included within cryptographic algorithms 101*s* for device 101. The symmetric decryption 273*a* can include input of at least (i) the parameters or metadata mutually shared by device 101 and server 111', (ii) the fourth symmetric ciphering key S4 268*b* and MAC key MAC4 268*c* from a step 268 above, and (iii) the received sixth symmetric ciphertext symm-C6 102*s*-6 from a message 261'. Device 101 can then process the plaintext server hello data 259*a*, such using the data in order to generate a second "Client Finished" message 264'.

Device 101 can then send server 111' the second "Client Finished" message 264'. Server 111' can receive and process the "Client Finished" message 264'. The "Client Finished" message 264' can include symmetric ciphertext, where the symmetric ciphertext was generated using the PSK 230-1 and the third shared secret key K3 102*k*-3 from the KEM using the second device ephemeral public key ePK-2.device 101*h*-2. For example, the PSK 230-1 and third shared secret key K3 102*k*-3 and additional data could be used with a HKDF in order for both device 101 and server 111' to mutually derive a symmetric ciphering key and MAC key. Server 111' could process the "Client Finished" message 264' and then both device 101 and server 111' could transmit and receive in messages 265' encrypted and authenticated application data. The encrypted and authenticated application data can be generated using at least the PSK 230-1 and third shared secret key K3 102*k*-3. The PSK 230-1 and third shared secret key K3 102*k*-3 can be input into a HDKF in order to generate symmetric ciphering keys and MAC keys, where the keys are used with symmetric ciphering algorithms to generate the encrypted and authenticated application data. As depicted in FIG. 2*c*, a step 251*b* for session resumption can comprise the series of steps and messages starting with step 201*d'* by device 101 and concluding with messages 265' with encrypted and authenticated application data.

Note that the authentication of handshake messages and application data using the PSK 230-1 in a system 200*c* does not require the use of digital certificates and digital signatures in the resumed session 251*b*. Certificates of public keys and digital signatures supporting PQC algorithms in NIST Round 3 typically require more bandwidth for significantly larger sizes of the digital signatures, compared to classical algorithms. Consequently, the resumed session 251*b* provides an efficient system by avoiding the use of PQC digital certificates and digital signatures for authentication.

System 200*c* also provides a higher level of security compared to conventional technology for session resumption from all of (i) the PSK 230-1 can be derived from two derived shared secrets (e.g. K1 102*k*-1 and K2 102*k*-2), which can be derived from two different PQC algorithms for each of device 101 and server 111 (e.g. both an ENCAPS and a DECAPS), (ii) the identity or identifier for the PSK of PSK-ID 231-1 can be protected by both the two shared secrets for device 101 and network 103, and (iii) a third shared secret key K3 102*k*-3 can be securely derived in the resumed session 251*b* and used with the PSK 230-1. With conventional technology for TLS 1.3, a "pre-shared" secret key is protected with a single mutually derived shared secret that results from an (EC)DHE key exchange. In addition, and as discussed in FIG. 2*c* above, the plaintext data shared in a message 254' can be authenticated using the PSK 230-1. The plaintext data in a message 261' can be authenticated from a fourth MAC key MAC4 268*c* that can be derived from both the PSK 230-1 and a third shared secret key K3 102*k*-3. The third shared secret key K3 102*k*-3 can be protected by both (i) a KEM algorithm and (ii) symmetric encryption of a third asymmetric ciphertext 102*c*-3 required to generate the third shared secret key K3 102*k*-3. Other benefits are achieved as well for the system 200*c* in FIG. 2*c* without departing from the scope of the present disclosure.

FIG. 3

FIG. 3 is a flow chart illustrating exemplary steps for (i) a server conducting a key encapsulation mechanism to mutually derive a first symmetric ciphering key, and (ii) the server conducting symmetric ciphering using the derived first symmetric ciphering key, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

FIG. 3 depicts exemplary steps for a server 111 to conduct steps 208 through 212 in order (i) to conduct a first key encapsulation mechanism (KEM) with device 101 in order to mutually derive a first shared secret K1 **102*k*-1 and (ii) generate a symmetric ciphertext for device 101 using the first shared secret key. The steps 208 through 212 were also depicted and described above in connection with FIG. 2*a*. At step 208, server 111 can generate a random number M1 208*a* for input into the first KEM encapsulation (ENCAPS) 103*k* function. Random number M1 208*a* can comprise a message or a number that's used with KEM ENCAPS 103*k* in order to generate the first shared secret key K1 102*k*-1. For some embodiments, the value M1 208*a* could include additional data that is not random and a portion of M1 208*a* could be a random number. Note the value M1 208*a* is not transmitted as plaintext to device 101. In exemplary embodiments, a server 111 can use a hardware random number generator 128 depicted and described in connection with FIG. 10 below in order to generate the random number M1 208*a*. A random number M1 208*a* can also be generated by server 111 with a hardware random number generator 128 using input of data or measurements from at least one transducer within server 111, including a transducer within the processor 111*p***.

The first shared secret key K1 **102*k*-1 can comprise a shared secret key for both the device 101 and server 111 to conduct a first HMAC-based key derivation function or hash-based key derivation function (HKDF) 210*a* in order to derive a first symmetric ciphering key S1 210*b* and a first MAC key MAC1 210*c*. As contemplated throughout the present disclosure, a HKDF can also use secure hash algorithms such as SHA-256, SHA-3, etc. in order to generate symmetric ciphering keys, MAC keys, initialization vectors, etc. with shared secret keys. Note the first symmetric ciphering key S1 210*b* could comprise two values or two portions, where a first value or portion is used by server 111 for encryption (and decryption by device 101) and a second value or portion is used by device 101 for encryption (and decryption by server 111). Likewise, a first MAC key MAC1 201*c* could comprise two values, where a first value is used by server 111 for message authentication and generation of tag values for messages sent by server 111 and a second value is used by device 101 for message authentication and generation of tag values for messages sent by device 101**.

Value M1 **208*a* can be input into the first KEM ENCAPS 103*k* function or step. The following example within FIG. 3 will follow the steps for the Kyber algorithm within the PQ-Crystals project and proposal submitted to NIST, but other and different cryptographic algorithms could be utilized as well. In an exemplary embodiment, the PQC KEM ENCAPS 103*k* function could follow the KEM steps specified by the Kyber algorithm. In the paper "CRYSTALS—Kyber: a CCA-secure module-lattice-based KEM" (referred to herein as Kyber paper), the message "m" can be the value M1 208*a* which is 256 bits in length for this example. The step 103***k* depicted in FIG. 3 can comprise the function/step of "Kyber.Encaps" in the Kyber paper with the first device ephemeral public key ePK-1.device 101*h*-1. The KEM parameters 101*f*-*x* could be both (i) received in message 202 from device 101 and (ii) correspond to a row from Table 1 of the Kyber paper such as Kyber768. The output of KEM ENCAPS 103*k* and "Kyber.Encaps" can be the value "c" in the Kyber paper or the first asymmetric ciphertext C1 102*c*-1 in FIG. 3. The length of "c" and the first asymmetric ciphertext C1 102*c*-1 can be an exemplary 1152 bytes, for parameters 101*f*-*x* which specify an example parameter set of Kyber768.

As depicted in FIG. 3, the output of KEM ENCAPS 103*k* and "Kyber.Encaps" can also be the first shared secret K in the Kyber paper or the first shared secret key K1 102*k*-1 in FIG. 3. Note that other PQC KEM algorithms such as, but not limited to, BIKE and SIKE can be used to derive a first shared secret key K1 102*k*-1, which could correspond to a key K. For SIKE, the value M1 208*a* could be combined with the first device ephemeral public key ePK-1.device 101*h*-1, or substituted by the first device ephemeral public key ePK-1.device 101*h*-1. For the use of SIKE, server 111 could also conduct a KeyGen function 103*q* to derive a server ephemeral PKI key pair for parameters 101*f*-*x*. For the use of SIKE, server 111 could use (i) the derived server ephemeral private key with the first device ephemeral public key ePK-1.device 101*h*-1 and (ii) the KEM ENCAPS 103*k* function to derive the first shared secret key K1 102*k*-1. In other words, and also as described in FIG. 1 above, the first KEM 103*k*/101*j* could be conducted by server 111 with a first device ephemeral public key ePK-1.device 101*h*-1 and KEM parameters 101*f*-*x* that support any of lattice, code-based, or SIKE based algorithms without departing from the scope of the present disclosure.

At step 210, server 111 can use a HMAC-based key derivation function or a hash-based key derivation function (HKDF) 210*a* with at least the first shared secret key K1 102*k*-1 output from KEM ENCAPS function 103*k* in order to generate both (i) a first symmetric ciphering key of S1 210*b* and a first message authentication code (MAC) key MAC1 210*c*. Note that in some exemplary embodiments, additional data 210*d* mutually shared between device 101 and server 111 besides the first shared secret key K1 102*k*-1 can also be input into the HKDF 210*a* in a step 210 in order to generate S1 210*b* and MAC1 210*c*. The additional data 210*d* depicted in FIG. 2*a* for input into HKDF 210*a* can comprise data from the message 202, such as, but not limited to, the device ephemeral public key ePK.device 101*h* from device 101, device extensions 101*g*, parameters 101*f* and 101*f*-*x*, the ransom number random 1 202*a*. The additional data 210*d* could also include metadata 205*a* and/or the first asymmetric ciphertext C1 102*c*-1 from a message 213. In general, the additional data 210*d* can comprise data mutually shared between device 101 and server 111 before a message 225 which is not secret (e.g. data other than the first shared secret key K1 102*k*-1). The HKDF 210*a* could be included in cryptographic algorithms 103*s* for server 111, as depicted and described in connection with FIG. 1 above.

Although not depicted in FIG. 3, the additional data 210*d* input into HKDF 210*a* with the first shared secret key K1 102*k*-1 could include strings or values specified in parameters 103*x* and 101*x* for a secure session between device 101 and server 111. In other words, strings, values or numbers mutually shared between device 101 and server 111 before a message 202 from device (such as values specified in standards for a secure session) could also be input into the HKDF 210*a* along with the first shared secret key K1 102*k*-1. In a first example, the strings, values, or numbers mutually shared between device 101 and server 111 for data 210*d* before a message 202 from device 101 could be stored in both cryptographic algorithms 101*s* and cryptographic algorithms 103*s*. In a second example, the strings, values, or numbers mutually shared between device 101 and server 111 before a message 202 from device 101 could be stored in both cryptographic parameters 101*x* and cryptographic parameters 103*x*. In a third example, the additional data 210*d* could include metadata 205*a* or portions of metadata 205*a*, where metadata 205*a* can be transmitted as plaintext for a message 213 sent by server 111 and received by device 101.

Other data from a message 202 can be used as data 210*d* for input into a HKDF 210*a*, in addition to the first shared secret key K1 102*k*-1, without departing from the scope of the present disclosure, such as, but not limited to, (i) a network ID 103*a* or a server ID 111*a* that can be included in a message 202, as well as (ii) portions plaintext metadata that could be included in a first message 202. For other embodiments, the input of additional data 210*d* from a message 202 into a HKDF 210*a* besides K1 102*k*-1 could be omitted, and S1 210*b* and MAC1 210*c* could be derived from K1 102*k*-*a* using the HKDF 210*a*. A HKDF 210*a* could also derive additional keys besides S1 210*b* and MAC1 210*c*, such as, but not limited to an initialization vector for both a server 111 and a device 101. An initialization vector output from the HKDF 210*a* could be used as a parameter for the generation of the first symmetric ciphertext symm-C1 102*s*-1 by server 111 in a step 212 and decryption of the first symmetric ciphertext symm-C1 102*s*-1 by device 101 in a step 215.

In addition, although a single HDKF 210*a* is depicted in FIG. 3, a step 210 by server 111 and a corresponding step 214 by device 101 could use multiple different HKDF 210*a* in sequence to derive different keys for symmetric encryption 212*a* by server 111 and symmetric decryption 215*a* (depicted in FIG. 4 below), such as a first HKDF 210*a* to derive the mutually shared symmetric ciphering key S1 210*b*, a second HKDF 210*a* to derive the MAC key MAC1 210*c*, and a third HKDF 210*a* to derive an initialization vector. Further, although a single HDKF 210*a* is depicted in FIG. 3, a step 210 by device 101 could use multiple different HKDF 210*a* in sequence to derive different keys for encryption by device 101, such as a first HKDF 210*a* to derive the a shared symmetric ciphering key S1 210*b* for device 101, a second HKDF 210*a* to derive a MAC key MAC1 210*c* for device 101, and a third HKDF 210*a* to derive an initialization vector for device 101. Each of the different HKDF 210*a* described in this paragraph can use different data mutually shared between device 101 and the server 111, and each of the different HKDF 210*a* described in this paragraph can also use the first shared secret key K1 102*k*-1. Server 111 and device 101 can use the operations described in this paragraph to mutually derive each of the first symmetric ciphering key S1 210*b* and MAC key MAC1 210*c* and an initialization vector or nonce for use with symmetric encryption 212*a* and symmetric decryption 215*a* (depicted in FIG. 4).

A step 210 can also include server 111 calculating two values for the first symmetric ciphering key S1 210*b*, where a first S1 210*b*-1 can be for use by server 111 for symmetric encryption of plaintext data into symmetric ciphertext such as symm-C1 102*s*-1 sent to device 101. A second S1 210*b*-2 can be for use by server 111 for symmetric decryption of symmetric ciphertext data such as symm-C2 102*s*-2 from device 101 into plaintext data in a step 226 below. The first S1 **210*b*-1 can be used by server 111 to encrypt data using the key "S1" for device 101 in a message 213 (e.g. symm-C1 102*s*-1), and the second S1 210*b*-2 can be used by server 111 to decrypt data using the key "S1" received from device 101 in a message 225 (e.g. symm-C2 102*s*-2). The first S1 210*b*-1 can be referred to as a first portion of S1 210*b* and the second S1 210*b*-2 can be referred to as a second portion of S1 210*b***.

In a step 214 below for device 101, the device 101 could also likewise derive two different values for the key S1 comprising the first S1 **210*b*-1 for decrypting data in a message 213 (e.g. symm-C1 102*s*-1) using "S1" and the second S1 210*b*-2 for encrypting data sent to server 111 in a message 225 (e.g. symm-C2 102*s*-2). Likewise, server 111 in a step 214 can generate two values for MAC key MAC1 210*c*, where the first MAC1 210*c*-1 is used by server 111 to generate MAC codes sent to device 101 (e.g. with symm-C1 102*s*-1) and the second MAC1 210*c*-2 is used by server 111 to verify MAC codes received from device 101 (e.g. with symm-C2 102*s*-2 in a step 226). A device 101 can likewise use the HKDF 210*a* to generate all of the same first S1 210*b*-1, the second S2 210*b*-2, the first MAC1 210*c*-1 and the second MAC 210*c*-2**.

Note that the embodiments described in paragraph above also apply to the generation of (i) two different values for the second symmetric ciphering key S2 **221*b* (a first S2 for encryption by server 111 and a second S2 for decryption by server 111), and (ii) two different values for the second MAC key MAC2 221*c* (a first MAC2 for generating MAC codes and a second MAC2 for verifying MAC codes). Likewise, the embodiments described in paragraph above also apply to the generation of (i) two different values for the third symmetric ciphering key S3 228*b* (a first S2 for encryption by server 111 and a second S2 for decryption by server 111), and (ii) two different values for the second MAC key MAC2 228*c*** (a first MAC2 for generating MAC codes and a second MAC2 for verifying MAC codes).

At step 211, server 111 can select and process a plaintext **211*a* for encryption into a first symmetric ciphertext symm-C1 102*s*-1. A step 211 is also depicted and described in connection with FIG. 2*a* above. Note that the first asymmetric ciphertext C1 102*c*-1 could be previously output from the KEM ENCAPS function 103*k* (where device 101 uses the first asymmetric ciphertext C1 102*c*-1 for the first KEM 103*k*/101*j*). In exemplary embodiments the data or values for the plaintext 211*a* selected in a step 211 can include at least (i) the server certificate cert.server 103*c* selected by a network 103 in a step 205 above, (ii) server extensions 103*g* from a step 205, (iii) the server digital signature for a "CertificateVerify" value 207*c* from a step 207, (iv) the first server ephemeral public key ePK.server 103*h*, and (v) parameters 103*f*-*y* for the first server ephemeral public key ePK.server 103*h*. Note the server certificate cert.server 103*c* can include at least (i) the server public key PK.server 103*d***, (ii) parameters for digital signatures, and (iii) a digital signature from a certificate issuer.

At step 212, server 111 can use symmetric encryption **212*a* with the plaintext 211*a* from a step 211 in order to generate the first symmetric ciphertext symm-C1 102*s*-1. A step 212 is also depicted and described in connection with FIG. 2*a* above. The symmetric encryption 212*a* can be included within cryptographic algorithms 103*s* for server 111. The symmetric encryption 212*a* can include input of the parameters specified in metadata 205*a* from a step 205 in FIG. 2*a* above and the symmetric ciphering key S1 210*b* and MAC key MAC1 210*c* for server 111 from a step 210 above. In a step 212, server 111 can also use an initialization vector for the symmetric encryption 212*a*, where the initialization vector (IV) can be included with metadata 205*a*. Note that a HKDF 210*a* could also derive the initialization vector for use by server 111 with symmetric encryption 212*a*, and the resulting initialization vector could either be (i) included with plaintext metadata 205*a*, or (ii) omitted from plaintext metadata 205*a* and device 101 could mutually derive the same initialization vector using the HDKF 210*a* in a step 214** below.

As depicted in FIG. 3, the "MAC values" can be generated in a step 212 from the use of the MAC key MAC1 **210*c*. The MAC values could be generated from the use of a MAC algorithm equivalent to MAC algorithm 253*a* in a step 253 from FIG. 7*a* below. Or, the MAC values could be generated by the symmetric encryption 212*a*, where symmetric encryption 212*a* could include a mode that generates MAC values from the MAC key MAC1 210*c*. The MAC values as contemplated herein can be over the symmetric ciphertext symm-C1 102*s*-1 as opposed to the plaintext 211*a*, which represents operation of a step 212 (and equivalent encryption steps below) as "encrypt-then-MAC". In addition, the symmetric encryption below for steps 223, 224, 267, and 270 can use the corresponding MAC keys and MAC values depicted for the steps in the equivalent manner as described within this paragraph for generating MAC values for symmetric ciphertext. The resulting first symmetric ciphertext symm-C1 102*s*-1 and MAC values could be included in the response second message 213 sent or transmitted from server 111 to device 101 as depicted in FIG. 2*a*** above.

Within FIG. 3, each of the depicted steps 208 through 212 as described above can comprise computer executable instructions stored within RAM memory **111*m*. Associated data and values for input into and output from the computer executable instructions could be stored in RAM memory 111*m* as well, such as M1 208*a*, the first asymmetric ciphertext C1 102*c*-1, the shared data 210*d*, the first shared secret key K1 102*k*-1, and the keys S3 210*b* and MAC3 210*c*. Plaintext 211*a*, metadata 205*a*, the depicted IV, and the first symmetric ciphertext symm-C1 102*s*-1 can be stored in RAM memory 111*m* as well. RAM memory 111*m* is depicted and described in connection with FIG. 1 above and FIG. 11 below. The computer executable instructions could be stored in RAM memory 111*m* during operation of server 111 including when the server 111 performs the steps depicted in FIG. 2*a*** above.

Some of the depicted data processed by the computer executable instructions may also be stored in nonvolatile or storage memory **111*b*, such as, but not limited to, the server static private key SK.server 103*d*, Server Extensions 103*g*, and the server certificate cert.server 103*c*. The processor 111*p* or a processor system including processor 111*p* could execute the computer executable instructions in order use the input data and output data depicted and described for a server 111 in FIG. 3. The RAM memory 111*m* and the storage memory 111*b* can be connected to the processor 111*p* via a system bus 111*c***, which can include a memory bus.

FIG. 4

FIG. 4 is a flow chart illustrating exemplary steps for a device conducting (i) a key encapsulation mechanism to mutually derive the first symmetric ciphering key, (ii) symmetric ciphering using the derived first symmetric ciphering key, in accordance with exemplary embodiments. FIG. 4 depicts exemplary steps for a device 101 to (i) conduct the first key encapsulation mechanism (KEM) with first server 111 in order to mutually derive the first shared secret K1 **102*k*-1 in a step 214 and (ii) process the first symmetric ciphertext symm-C1 102*s*-1 using the first shared secret key in order to read the plaintext 211***a* in a step 215. The steps 214 and 215 were also depicted and described above in connection with FIG. 2*a*.

A step 214 can comprise a KEM decapsulation (DECAPS) step by device 101 in order to mutually derive the first shared secret K1 102*k*-1. The following example within FIG. 4 will follow the steps for the Kyber algorithm within the PQ-Crystals project and proposal submitted to NIST, but other and different cryptographic algorithms could be utilized as well. In an exemplary embodiment, the PQC KEM DECAPS 101*j* function could follow the KEM steps specified by the Kyber algorithm. In the paper "CRYSTALS—Kyber: a CCA-secure module-lattice-based KEM" (referred to herein as Kyber paper), the ciphertext can be the received first asymmetric ciphertext C1 102*c*-1 from a message 213.

The KEM DECAPS 101*j* function depicted in FIG. 4 can comprise the function/step of "Kyber.Decaps" in the Kyber paper with the private key eSK.device 101*i* and the first asymmetric ciphertext C1 102*c*-1. The first device ephemeral private key eSK-1.device 101*i*-1 could be derived by device 101 along with ePK-1.device 101*h*-1 in a step 201*e* as described in FIG. 2*a* above. The KEM parameters 101*f-x* could be both (i) sent by device 101 in message 202 to first server 111 and (ii) correspond to a row from Table 1 of the Kyber paper, such as Kyber768. The length of "c" and the first asymmetric ciphertext C1 102*c*-1 can be an exemplary 1152 bytes, for KEM parameters 101*f-x* which specify an example parameter set of Kyber768. The output of KEM DECAPS 101*j* and "Kyber.Decaps" can be the first shared secret key K1 102*k*-1, which is also described as a key K in the Kyber paper. Note that other PQC KEM algorithms such as, but not limited to, BIKE and SIKE can be used to derive the first shared secret key K1 102*k*-1, which could correspond to a key K. In other words, and also as described in FIG. 1 above, the first KEM 103*k*/101*j* could be conducted by device 101 with a device ephemeral private key eSK-1.device 101*i*-1 and KEM parameters 101*f-x* that support any of lattice, multivariate, or SIKE based algorithms without departing from the scope of the present disclosure.

At step 214, device 101 can use a HMAC-based Extract-and-Expand Key Derivation Function (HKDF) 210*a* with at least the first shared secret key K1 102*k*-1 output from KEM DECAPS function 101*j* in order to mutually derive both (i) the first symmetric ciphering key of S1 210*b* and the first message authentication code (MAC) key MAC1 210*c* for the device 101. The first server 111 can mutually derive the same first symmetric ciphering key S1 210*b* and MAC key MAC1 210*c* in a step 210 as depicted and described in connection with FIG. 3 above and also in FIG. 2*a*. In other words, the value of S1 210*b* calculated by both device 101 and first server 111 can be equal, and also the value of MAC1 210*c* calculated by both device 101 and first server 111 can be equal as well.

Note that in some exemplary embodiments, additional shared data 210*d* mutually shared between device 101 and first server 111 besides the first shared secret key K1 102*k*-1 can also be input into the HKDF 210*a* in a step 214 in order to generate S1 210*b* and MAC1 210*c*. As depicted in FIG. 4, the additional shared data 210*d* input into HKDF 210*a* can comprise data from the message 202, such as, but not limited to, the first device ephemeral public key ePK-1.device 101*h*-1 from device 101, device extensions 101*g*, parameters 101*f* and 101*f-x*, and the first asymmetric ciphertext C1 102*c*-1. The HKDF 210*a* could be included in cryptographic algorithms 101*s* for device 101, as depicted and described in connection with FIG. 1 above. Data from message 213 from server 111 could also be included as additional shared data 210*d* input into HKDF 210*a*, including metadata 205*a* and/or the first asymmetric ciphertext C1 102*c*-1. In general, the additional shared data 210*d* can comprise data mutually shared between device 101 and server 111 before a message 225 which is not secret (e.g. data other than the first shared secret key K1 102*k*-1).

As depicted in FIG. 4, the additional shared data 210*d* input into HKDF 210*a* with the first shared secret key K1 102*k*-1 could include strings or values specified in parameters 103*x* and 101*x* for a secure session between device 101 and first server 111. In other words, strings, values or numbers mutually shared between device 101 and first server 111 before a message 202 from device (such as values specified in standards for a secure session) could be input into the HKDF 210*a* in a step 214 by device 101 with the first shared secret key K1 102*k*-1.

Other data from a message 202 and/or message 213 can be used as shared data 210*d* for input into a HKDF 210*a*, in addition to the first shared secret key K1 102*k*-1, without departing from the scope of the present disclosure, such as, but not limited to, (i) a network ID 103*a* or a server ID 111*a* that can be included in a message 202, as well as (ii) portions of metadata 205*a*. For other embodiments, the input of additional data 210*d* from a message 202 into a HKDF 210*a* in a step 214 besides K1 102*k*-1 could be omitted, and S1 210*b* and MAC1 210*c* could be derived from K1 102*k*-1 using the HKDF 210*a*. In summary, both device 101 and first server 111 can select identical information or bytes, as well as identical sequence of bytes for the additional information from message 202 and/or message 213 as data 210*d* for input into HKDF 210*a* in order for both device 101 and first server 111 to mutually derive the same values for S1 210*b* and MAC1 210*c*. A HKDF 210*a* in a step 214 for device 101 and step 210 for first server 111 could also derive additional keys besides S1 210*b* and MAC1 210*c*, such as, but not limited to an initialization vector (IV) for both a first server 111 and a device 101. As discussed above with a step 210, the key S1 210*b* could comprise a first key S1 210*b*-1 for encryption by a device 101 (and decryption by a first server 111), and a second key S1 210*b*-2 for encryption by a first server 111 (and decryption by a device 101).

At step 215, device 101 can use symmetric decryption 215*a* with the first symmetric ciphertext symm-C1 102*s*-1 received in message 213 in FIG. 2*a* above in order to read the plaintext 211*a*. A step 215 is also depicted and described in connection with FIG. 2*a* above. The symmetric decryption 215*a* can be included within cryptographic algorithms 101*s* for device 101. The symmetric decryption 215*a* can include input of the parameters specified in metadata 205*a* from a message 213 and the symmetric ciphering key S1 210*b* and MAC key MAC1 210*c* from a step 214 above.

The depiction of "MAC values" in FIG. 4 represents the MAC values for the first symmetric ciphertext symm-C1 102*s*-1 can be both (i) received with the first symmetric ciphertext symm-C1 102*s*-1 and (ii) generated in a step 215 from the use of the MAC key MAC1 210*c*. The MAC values could be generated from the use of a MAC algorithm equivalent to MAC algorithm 253*a* in a step 253 from FIG. 7*a* below. Or, the MAC values could be generated by the symmetric decryption 215*a*, where symmetric decryption 215*a* could include a mode that generates MAC values from the MAC key MAC1 210*c*. In a step 215, device 101 could compare the received MAC values from the first symmetric ciphertext symm-C1 with the MAC values generated by device 101 in a step 215. If the generated and received MAC values are equal, then the first symmetric ciphertext symm- C1 102_s_-1 has been received with message integrity. The MAC values as contemplated herein can be over the symmetric ciphertext symm-C1 102_s_-1 as opposed to the plaintext 211_a_, which represents the corresponding operation of a step 212 by server 111 above as "encrypt-then-MAC". In addition, the symmetric decryption below for steps 226, 228, 271, and 273 can use the corresponding MAC keys and MAC values depicted for the steps in the equivalent manner as described within this paragraph for generating and verifying MAC values for symmetric ciphertext.

In a step 215, device 101 can also use an initialization vector for the symmetric decryption 215_a_, where the initialization vector can be included with metadata 205_a_. Note that a HKDF 210_a_ could also derive the initialization vector for use by device 101 with symmetric decryption 215_a_, and the resulting initialization vector could either be (i) included with plaintext metadata 205_a_, or (ii) omitted from plaintext metadata 205_a_ and device 101 could mutually derive the same initialization vector using the HDKF 210_a_ from a step 214 above. The resulting plaintext 211_a_ from a step 215 can be stored by device 101 in memory 101_m_ and also be used with a digital signature verification step 217 by device 101 as described above in FIG. 2_a_. The plaintext data 211_a_ from a step 215 can be the same as plaintext 211_a_ processed by a first server 111 as described for a step 211 above in FIG. 3 and also FIG. 2_a_.

Within FIG. 4, both of the depicted steps 214 and 215 as described above can comprise computer executable instructions stored within RAM memory within device memory 101_m_ as depicted and described in connection with FIG. 1 above and also FIG. 11 below. The computer executable instructions could be stored in RAM memory during operation of device 101 including when the device performs the steps depicted in FIG. 2_a_ above. Associated data and values for input into and output from the computer executable instructions could be stored device memory as well, such as the first asymmetric ciphertext C1 102_c_-1, the shared data 210_d_, the first shared secret key K1 102_k_-1, and the keys S3 210_b_ and MAC3 210_c_. Plaintext 211_a_, metadata 205_a_, the depicted IV, and the first symmetric ciphertext symm-C1 102_s_-1 can be stored in RAM memory 101_m_ as well.

Some of the depicted data processed by the computer executable instructions may also be stored in nonvolatile or storage memory within device memory 101_bb_ (depicted and described in connection with FIG. 11 below), such as, but not limited to, the KEM DECAPS function 101_j_, the symmetric decryption algorithm 215_a_, and the HKDF algorithm for HKDF 210_a_. The processor 101_p_ could execute the computer executable instructions in order use the input data and output data depicted and described for a device 101 in FIG. 4. The RAM memory and the storage memory for device memory 101_m_ can be connected to the processor 101_p_ via a system bus 101_t_.

FIG. 5

FIG. 5 is a flow chart illustrating exemplary steps for (i) a device conducting a key encapsulation mechanism to mutually derive a second symmetric ciphering key, (ii) the device conducting symmetric ciphering using the derived second symmetric ciphering key, and (iii) the device and a server conducting symmetric ciphering of asymmetric ciphertext with the first symmetric ciphering key, in accordance with exemplary embodiments. As depicted in FIG. 5, a device 101 can conduct a second KEM 101_k_/103_j_ in a step 220 using both (i) the server ephemeral public key ePK.server 103_h_ received in the first symmetric ciphertext symm-C1 102_s_-1 (or as plaintext in a message 213), and (ii) the KEM parameters 103_f-y_ from server 111 in the response second message 213. The output of the second KEM 101_k_/103_j_ can include a second shared secret key of K2 102_k_-2 and a second asymmetric ciphertext C2 102_c_-2. Device 101 can then in steps 222 and 223 generate a third symmetric ciphertext using at least the second shared secret key of K2 102_k_-2. As depicted in FIG. 5, a server 111 can conduct the second KEM 101_k_/103_j_ in a step 225 using (i) the server ephemeral private key eSK.server 103_i_ from a step 204, (ii) the second asymmetric ciphertext C2 102_c_-2 received from a message 225, and (ii) the KEM parameters 103_f-y_ transmitted by server 111 in the response second message 213. The output of the second KEM 101_k_/103_j_ can include a second shared secret key of K2 102_k_-2. Server 111 can then in step 226 decrypt the third symmetric ciphertext symm-C3 102_s_-3 using at least the second shared secret key of K2 102_k_-2.

At step 220 in FIG. 5, device 101 can use the derived or generated a random number M2 219_a_ from a step 219 depicted and described in connection with FIG. 2_a_ above. The random number M2 219_a_ can be for use in a second KEM 101_k_/103_j_ between server 111 and device 101. Random number M2 219_a_ could include some data or bits that are not random, such as deterministically calculated, but in exemplary embodiments at least some data or bits within both M1 208_a_ and M2 219_a_ are at least pseudo-random numbers or values. A random number M2 219_a_ can be generated by device 101 with a hardware random number generator using input of data or measurements from at least one transducer within device 101, including a transducer within the processor 101_p_. At step 220, device 101 can use both (i) the received server ephemeral public key of ePK.server 103_h_ from message 213 and (ii) the specified subset of parameters 103_f-y_ for the server ephemeral public key and the second KEM 101_k_/103_j_ in order to generate both (x) a second asymmetric ciphertext C2 102_c_-2 and (y) a second shared secret key K2 102_k_-2. At step 220, device 101 can use a KEM ENCAPS function 101_k_ with both (i) and (ii) from the previous sentence in order to generate both (x) an asymmetric ciphertext C2 102_c_-2 and (y) the second shared secret key K2 102_k_-2. A summary of the step 220 by device 101 with a KEM ENCAPS function 101_k_ was also depicted and described in connection with FIG. 1 and FIG. 2_a_ above. A device 101 can use both cryptographic algorithms 101_s_ and cryptographic parameters 101_x_ in order to conduct the step 220.

At step 221, device 101 can use a hash-based key derivation function or an HMAC-based Extract-and-Expand Key Derivation Function (HKDF) 221_a_ with at least the second shared secret key K2 102_k_-2 output from KEM ENCAPS function 101_k_ in order to generate both (i) a second symmetric ciphering key of S2 221_b_ and a second message authentication code (MAC) key MAC2 221_c_. Note that in some exemplary embodiments, additional data mutually shared between device 101 and server 111 besides the second shared secret key K2 102_k_-2 can also be input into the HKDF 221_a_ in a step 221 in order to generate S2 221_b_ and MAC2 221_c_. In preferred embodiments as depicted in FIG. 5, the first shared secret key K1 102_k_-1 generated in a step 214 in FIG. 4 and FIG. 2_a_ can also be input into the HKDF 221_a_.

For a step 221, other data input into HKDF 221_a_ besides shared secret keys K2 and/or K1 can include data from the message 213, such as, but not limited to, the server ephemeral public key ePK.server 103_h_ from server 111, server extensions 103_g_, and/or parameters 103_f-y_. Although not depicted in FIG. 5, the data for message 202 and also metadata 205_a_ input into the HKDF 221_a_ in FIG. 4 above could also be input into HKDF 221*a* in FIG. 5. For other embodiments, the input of (i) the first shared secret key K1 102*k*-1 and/or (ii) data from message 202 and 213 could be omitted from inclusion in the calculation of HKDF 221*a*, and the keys S2 221*b* and MAC2 221*c* could be derived from the second shared secret key K2 102*k*-2 from a step 220.

At step 222, device 101 can select and process a plaintext 222*a* for encryption into a third symmetric ciphertext symm-C3 102*s*-3. A step 222 is also depicted and described in connection with FIG. 2*a* above. In exemplary embodiments the data or values for the plaintext 222*a* selected in a step 222 can include at least a secure hash value 222*b* over the data previously communicated between device 101 and server 111 in messages 202 and 205. Additional data mutually shared between device 101 and server 111 outside of messages 202 and 205 could be included in the generation of the secure hash value 222*b*. For some exemplary embodiments, such as with the last sentence of the paragraph above (where the first shared secret key K1 102*k*-1 was omitted from input into HKDF 221*a*), then the secure hash value 222*b* can also be over the first shared secret key K1 102*k*-1. As depicted in FIG. 6 below, the plaintext 222*a* can correspond to a "Client Finished" message in a handshake for an initial secure session 250. Note that plaintext 222*a* for a step 222 could include data generated by a device 101 for a server 111 in addition to a "Client Finished" message. The additional data for plaintext 222*a* could include an HTTP request, XML data, a JSON message, or other application data from the device 101 to server 111.

At step 223, device 101 can use symmetric encryption 223*a* with the plaintext 222*a* from a step 222 in order to generate the third symmetric ciphertext symm-C3 102*s*-3. A step 223 is also depicted and described in connection with FIG. 2*a* above. The symmetric encryption 223*a* can be included within cryptographic algorithms 101*s* for device 101. The symmetric encryption 223*a* can include input of (i) the parameters 103*g*-1 in message 213 (or in metadata 205*a* from a message 213) above and (ii) the symmetric ciphering key S2 221*b* and MAC key MAC2 221*c* from a step 221 above. In a step 223, device 101 can also use an initialization vector for the symmetric encryption 222*a*, where the initialization vector can be either (i) included with metadata for a message 225 below, or (ii) mutually derived with server 111 using the second KEM 101*k*/103*j* and HKDF 221*a*. After steps 220 through 223 in FIG. 5, device 101 can include the second asymmetric ciphertext C2 102*c*-2 and the third symmetric ciphertext symm-C3 102*s*-3 in the message 225 depicted in FIG. 2*a* and transmitted to server 111. For some embodiments, such as "Option (Y)" depicted and described in connection with FIG. 2*a*, the message 225 can include the second symmetric ciphertext symm-C2 102*c*-2 (which symmetrically encrypts the first asymmetric ciphertext C1 102*c*-1) and the third symmetric ciphertext symm-C3 102*s*-3.

At step 224, device 101 can use symmetric encryption 212*a* with input of the plaintext value of the second asymmetric ciphertext C2 102*c*-2 output from a KEM ENCAPS 101*j* in step 220. The plaintext value of the second asymmetric ciphertext C2 102*c*-2 can be the string of bits resulting from asymmetric encryption of data according to the KEM specified by KEM parameters 103*f-y* in step 220. The output of symmetric encryption 212*a* can comprise a "double encrypted" second symmetric ciphertext symm-C2 102*s*-2. The symmetric encryption 212*a* can be included within cryptographic algorithms 101*s* for device 101 and be equivalent for the symmetric encryption 212*a* used by server 111 in a step 212 above in FIG. 3. The symmetric encryption 212*a* can include input of (i) parameters or plaintext metadata such as from metadata 205*a* in a message 213 above in FIG. 2*a* and (ii) the first symmetric ciphering key S1 210*b* and MAC key MAC1 210*c* from a step 214 above in FIG. 4 for device 101. In a step 224, device 101 can also use an initialization vector for the symmetric encryption 212*a*, where the initialization vector can be either (i) included with metadata 205*a* in message 213, or (ii) mutually derived with server 111 using the HKDF 210*a* in a step 214. The second symmetric ciphertext symm-C2 102*s*-2 output from a step 224 could be included in the message 225, as depicted and described in connection with FIG. 2*a*.

Note that for some exemplary embodiments, the use of "double encryption" and symmetric ciphering key S1 210*b* could be omitted from a step 224, but the MAC key MAC1 210*c* could be included in the depicted step 224, such that MAC codes could be generated for the second asymmetric ciphertext C2 102*c*-2. In other words, as an alternative embodiment to the depiction of a second symmetric ciphertext symm-C2 102*s*-1 within FIG. 2*a*, for the transfer of the second asymmetric ciphertext C2 102*c*-2, the data for a message 225 could comprise "({C2 {K2 102*k*-2}}MAC1 210*c*) 102*s*-2', where 102*s*-2' indicates that symmetric encryption is omitted. MAC values generated by device 101 with at least the MAC key MAC1 210*c* in a step 224 can be included with the message 225. The MAC values for the second asymmetric ciphertext C2 102*c*-2 could be generated by a MAC algorithm such as, but not limited to, Poly1305. Or the tag values generated by a symmetric encryption step 212*a* with the MAC key MAC1 210*b* could be used and the symmetric encryption omitted. At step 226, server 111 can use symmetric decryption 215*a* with input of the "double encrypted" second symmetric ciphertext symm-C2 102*s*-2 received in a message 225.

Symmetric decryption 215*a* for a server 111 in a step 226 can used the same algorithm and be equivalent to the symmetric decryption 215*a* for a device 101 in a step 215 depicted and described in connection with FIG. 4 above. The output of symmetric decryption 215*a* can comprise the plaintext value of the second asymmetric ciphertext C2 102*c*-2 for input into KEM DECAPS 103*j* in step 227 by server 111 below in FIG. 6 and also in FIG. 2*a* above. The plaintext value of the second asymmetric ciphertext C2 102*c*-2 can be the string of bits resulting from asymmetric encryption output by device 101 in a step 220 (e.g. raw asymmetrically ciphered data without any symmetric ciphering). The symmetric decryption 215*a* can be included within cryptographic algorithms 103*s* for server 111. The symmetric decryption 215*a* can include input of (i) parameters or plaintext metadata such as from metadata 205*a* in a message 213 above in FIG. 2*a* (and also the same as used by device 101 in a step 224) and (ii) the symmetric ciphering key S1 210*b* and MAC key MAC1 210*c* from a step 209 above in FIG. 3 for server 111. In a step 226, server 111 can also use an initialization vector for the symmetric decryption 215*a*, where the initialization vector can be either (i) included with metadata in message 225, or (ii) mutually derived with device 101 using the HKDF 210*a* in a step 209.

Note that for some exemplary embodiments, the use of "double encryption" and symmetric ciphering key S1 210*b* could be omitted from a step 226, but the MAC key MAC1 210*c* could be included, such that MAC values could be verified for the second symmetric ciphertext symm-C2 102*s*-2. In other words, as an alternative embodiment to the depiction of a second symmetric ciphertext symm-C2 102*s*-1 within FIG. 2*a*, for the transfer of the second asymmetric ciphertext C2 102*c*-2, the data for a message

225 could comprise "({C2 {K2 102*k*-2}}MAC1 210*c*) 102*s*-2', where 102*s*-2' indicates that symmetric encryption is omitted. MAC values generated by device 101 with at least the MAC key MAC1 210*c* in a step 224 can be included with the message 225. Server 111 could conduct the step 226 with the MAC key MAC1 210*c* generated in a step 210 in order to verify the MAC values over the second asymmetric ciphertext C2 102*c*-2.

Within FIG. 5, each of the depicted steps 220 through 224 as described above can comprise computer executable instructions stored within RAM memory within device memory 101*m* as depicted and described in connection with FIG. 1 above and FIG. 11 below. The computer executable instructions could be stored in RAM memory during operation of device 101 including when the device performs the steps depicted in FIG. 2*a* above. Some of the depicted data processed by the computer executable instructions may also be stored in nonvolatile or storage memory within device memory 101*bb* (depicted and described in connection with FIG. 11 below), such as, but not limited to, the KEM ENCAPS function 101*k*, the symmetric encryption algorithm 223*a*, HKDF 221*a*, and the associated parameters. The processor 101*p* could execute the computer executable instructions in order use the input data and output data depicted and described for a device 101 in FIG. 5. The RAM memory and the storage memory for device memory 101*m* can be connected to the processor 101*p* via a system bus 101*t*.

FIG. 6

FIG. 6 is a flow chart illustrating exemplary steps for (i) a server conducting a key encapsulation mechanism to mutually derive the second symmetric ciphering key, (ii) the server conducting symmetric ciphering using the derived second symmetric ciphering key, and (iii) a device and the server mutually deriving a pre-shared secret key for session resumption, in accordance with exemplary embodiments. Server 111 can receive the message 225 from device 101 as depicted and described in connection with FIG. 2*a* and conduct a series of steps in order to process the message and securely send application data from the server to the device.

For embodiments depicted and described in connection with FIG. 2*a*, the server 111 could first conduct a step 226 depicted and described in connection with FIG. 2*a* and FIG. 5 to convert the second symmetric ciphertext symm-C2 102*s*-2 in order to read the second asymmetric ciphertext C2 102*c*-2. At step 227, server 111 can use (i) the specified KEM parameters 103*f-y* transmitted in message 213 along with (ii) cryptographic algorithms 103*s* to conduct the KEM DECAPS 103*j* function with the received second asymmetric ciphertext C2 102*c*-2. The server 111 can use the first server ephemeral private key of eSK.server 103*i* with the KEM DECAPS 103*j* and the received second asymmetric ciphertext C2 102*c*-2 in order to generate the second shared secret key K2 102*k*-2. The corresponding steps 220 and 221 for device 101 is also depicted and described in connection with FIG. 2*a* and FIG. 5 above. Note that for some PQC algorithms, the KEM DECAPS 103*j* function could fail for a small frequency of messages 225, such as less than one failure per million or billion KEM messages, and if a step 227 fails, then server 111 could send device 101 an error message.

At step 227 as depicted in FIG. 5, server 111 can include both (i) the HKDF 221*a* used by device 101 in a step 221, and (ii) the exact same input into the HKDF 221*a* for data input into HKDF 221*a* in order to generate the second symmetric ciphering key S2 221*b* and second MAC key MAC2 221*c*. In preferred exemplary embodiments where the mutual shared derivation of S2 and MAC2 by device 101 and server 111 are the same values for both sides, then server 111 should use the exact same input into HKDF 221*a* as used by device 101, which could be specified by both cryptographic algorithms 103*s* for server 111 and cryptographic algorithms 101*s* for device 101.

In a step 227, server 111 can use a hash-based key derivation function or an HMAC-based Extract-and-Expand Key Derivation Function (HKDF) 221*a* with at least the second shared secret key K2 102*k*-2 output from KEM DECAPS function 103*j* in order to generate both (i) a second symmetric ciphering key of S2 221*b* and a second message authentication code (MAC) key MAC2 221*c*. As depicted in FIG. 6, in preferred embodiments, the first shared secret key K1 102*k*-1 generated in a step 210 in FIG. 3 and FIG. 2*a* can also be input into the HKDF 221*a*.

In this manner and by including the first shared secret key K1 102*k*-1 as input into HKDF 221*a*, the symmetric ciphering key S2 and MAC key MAC2 can be mutually derived with device 101 more securely by including input from two separate shared secrets (e.g. K1 and K2, which can also be derived by separate KEM algorithms), compared to deriving the key S2 and MAC2 using only a single KEM algorithm (e.g. using either (i) K2 only or (ii) a single KEM for K1 and K2). In other words, the combination of K1 using a first KEM 103*k*/101*j* and K2 using a second KEM 101*k*/103*j* for HKDF 221*a* provides security equal to at least the stronger of the first KEM (for KEM ENCAPS 103*k*) and the second KEM (for KEM ENCAPS 101*k*). In exemplary embodiments, the parameters for the first KEM 103*k*/101*j* comprise a completely different type of KEM (e.g. lattice, code-based, or SIKE) than the type for the second KEM 101*k*/103*j* (e.g. lattice, code-based, or SIKE). Examples of types of algorithms are included in the Wikipedia summary for the NIST PQC project.

For a step 227, other shared data 221*d* input into HKDF 221*a*, besides shared secret keys K2 and/or K1, can include data from the message 213, such as, but not limited to, the server ephemeral public key ePK.server 103*h* from server 111, server extensions 103*g*, and/or parameters 103*f-y*. The shared data 221*d* for server 111 in a step 227 can comprise the same data for shared data 221*d* used by device 101 in a step 221 described above in FIG. 5. The shared data 221*d* could include data from message 202 and also metadata 205*a* input into the HKDF 210*a* above could also be input into HKDF 221*a* in FIG. 6. For other embodiments, the input of (i) the first shared secret key K1 102*k*-1 and/or (ii) data from message 202 and 213 could be omitted from inclusion in the calculation of HKDF 221*a*, and the keys S2 221*b* and MAC2 221*c* could be derived from the second shared secret key K2 102*k*-2 from a step 220.

At step 228, server 111 can use symmetric decryption 228*a* with the third symmetric ciphertext symm-C3 102*s*-3 received in message 225 in FIG. 2*a* above in order to read the plaintext 222*a*. A step 228 is also depicted and described in connection with FIG. 2*a* above. The symmetric decryption 228*a* can be included within cryptographic algorithms 103*s* for server 111. The symmetric decryption 228*a* can include input of the parameters specified in metadata 205*a* from a message 213 and the second symmetric ciphering key S2 221*b* and MAC key MAC2 221*c* from a step 227 above for server 111. Or, the symmetric decryption 228*a* can include input of the parameters specified in metadata from a message 225 generated by device 101.

In a step 228, server 111 can also use an initialization vector or nonce for the symmetric decryption 228*a*, where the initialization vector can be included with metadata. Note that a HKDF 221*a* in a step 227 could also derive the initialization vector for use by device 101 and server 111 with symmetric decryption 228*a*, and the resulting initialization vector could either be (i) included with plaintext metadata in a message 225, or (ii) omitted from plaintext metadata in a message 225 and server 111 could mutually derive the same initialization vector using the HDKF 221*a* from a step 227 above.

The resulting plaintext 222*a* from a step 228 can include a secure hash value 222*b*, which can be the same secure hash value 222*b* processed by device 101 in a step 222 above. For some exemplary embodiments, where the first shared secret key K1 102*k*-1 was omitted from input into HKDF 221*a*, then the secure hash value 222*b* can also be over at least the first shared secret key K1 102*k*-1. In exemplary embodiments, the plaintext 222*a* includes data for a "Client Finished" message. In a step 228, server 111 can calculate the secure hash value 222*b* over the same data from message 202 and 213 used by device 101 for generation of the secure hash value 222*b* in the message 225. If the calculated value 222*b* matches the received value 222*b*, then server 111 can consider the handshake for the secure session successfully completed.

At step 230, server 111 can generate or derive a "pre-shared" secret key (PSK) for device 101 and server 111 based on prior steps and the set of messages 202, 213, and 225, where the steps and messages before a step 230 are depicted and described in connection with FIG. 2*a* above. Although the "pre-shared" secret key (PSK) was not shared between device 101 and server 111 before the first "Client Hello 1" message in FIG. 2*a*, the PSK would be considered "pre-shared" before a second "Client Hello 2" message in (i) a secure session resumption 251*a* depicted in FIG. 2*b* and described above or (ii) a secure session resumption 251*b* depicted in FIG. 2*c* and described above. In other words, a first secure session established using the messages "Client Hello 1" 202 through "Server Finished 1" 233 in FIG. 2*a* above could be used to establish a PSK mutually shared between device 101 and server 111, where the PSK can be used to secure resumption or continuation of the first secure session. In this manner, a PSK can be (i) mutually generated or derived by both nodes during a first handshake and initial secure session 250, and (ii) subsequently used by both a device 101 and server 111 in a resumed session 251*a* in FIG. 2*b* or resumed session 251*b* in FIG. 2*c*. The PSK can both reduce the number of steps required to establish both encrypted and authenticated communications in session resumption 251 after a period of time transpires between the first handshake and initial secure session 250 and the session resumption 251 in FIG. 2*a*.

At step 230 server 111 can use at least the first shared secret key of K1 102*k*-1 from a step 209, the second shared secret key K2 102*k*-2 from a step 227, and additional data 230*d* with a HKDF 230*a* in order to generate the "pre-shared" secret key (PSK) 230-1 for use with session resumption 251 depicted and described in connection with FIG. 2*a* above. The additional data 230*d* can include plaintext data transmitted in the first message 202, the response second message 213, the third message 225, and/or the fourth message 235 depicted and described in connection with FIG. 2*a*. A protocol for the First Handshake and Initial Secure Session 250 in FIG. 2*a*, such as TLS, SSH, Wireguard etc., could specify some text values outside of the message flow between device 101 and server 111 for use as input of additional data 230*d* in a step 230 with a HKDF 230*a* to generate a PSK 230-1.

In exemplary embodiments, at least the first shared secret key of K1 102*k*-1 and the second shared secret key K2 102*k*-2 are used in a step 230 with a HDKF 230*a* to generate or derive the "pre-shared" secret key (PSK) 230-1 for use with session resumption 251. Since a server 111 may generate multiple different PSK for different devices 101 over time, an example of the specific PSK for device 101 resulting from the first session 250 is depicted with the designation of "PSK 230-1" in FIG. 6. A second PSK for either device 101 or a different device would have the designation of "PSK 230-2."

At step 231, server 111 can generate an identity or identifier for the PSK 230-1 of PSK-ID 231-1. The PSK-ID 231-1 can be unique for the PSK 230-1 and also with sufficient information entropy and "randomness" to not feasibly be guessed by a potential attacker. As one example, the PSK-ID 231-1 could be a secure hash value over the PSK 203-1, such as the SHA3-256 value of the PSK 230-1. Other possibilities exist as well for the generation of an identity of PSK-ID 231-1 for PSK 230-1 by server 111 or network 103 without departing from the scope of the present disclosure. A network 103 and/or server 111 in a step 231 could also store both the PSK 230-1 generated from a step 230 and the PSK-ID 231-1 in a network database 103*db*, as depicted in FIG. 2*a* above. A network database 103*db* could record a plurality of PSK and PSK-ID values, such that both the PSK and PSK-ID would be available for use in subsequent communications with device 101 and other devices, including the session resumption 251*a* depicted in FIG. 2*a*.

At step 236, device 101 can mutually generate or derive the "pre-shared" secret key (PSK) for device 101 and server 111 based on prior steps and the set of messages 202, 213, and 225, the steps and messages before a step 236 are depicted and described in connection with FIG. 2*a* above. At step 236 device 101 can use at least the first shared secret key of K1 102*k*-1 from a step 214, the second shared secret key K2 102*k*-2 from a step 220, and additional data 230*d* with a HKDF 230*a* in order to mutually derive the "pre-shared" secret key (PSK) 230-1 for use with session resumption 251 depicted and described in connection with FIG. 2*a* above. The additional data 230*d* can include plaintext data transmitted in the first message 202, the response second message 213, the third message 225, and/or the fourth message 235 depicted and described in connection with FIG. 2*a*. A protocol for the First Handshake and Initial Secure Session 250 in FIG. 2*a*, such as TLS, SSH, Wireguard etc., could specify some text values outside of the message flow between device 101 and server 111 for use as input of additional data 230*d* in a step 236 with a HKDF 230*a* to generate a PSK 230-1. In any case, the additional data 230*d* input into a HKDF 230*a* by a device 101 in a step 236 can be the same as the additional data 230*d* input into a HKDF 230*a* by a server 111 in a step 230.

In exemplary embodiments, the device 101 and the server 111 use the exact same data 230*d* as input into the HKDF 230*a*, along with the first shared secret key of K1 102*k*-1 from a step 214 and the second shared secret key K2 102*k*-2 from a step 220 in order to mutually derive the same value for the PSK 230-1. In addition, the sequence of bits for the data input into the HKDF 230*a* for device 101 and server 111 are the same, in order to ensure both device 101 and server 111 mutually derive the same value for PSK 230-1. In general, and for all HKDF described herein, the server 111 and device 101 input the same sequence of values for input into a HKDF in order to mutually derive the same keys.

In exemplary embodiments, at least the first shared secret key of K1 102*k*-1 and the second shared secret key K2

102*k*-2 are used in a step 236 with a HDKF 230*a* to generate or derive the "pre-shared" secret key (PSK) 230-1 for use with session resumption 251. As depicted for a step 236 in FIG. 6, additional mutually shared data 230*d* can be input as well. FIG. 6 also depicts that device 101 can receive an identity or identification information for the PSK 230-1 of PSK-ID 231-1 in a message 233, where the message 233 is depicted and described in connection with FIG. 2*a* above. In exemplary embodiments, the PSK-ID 231-1 in a message 233 is received within a fourth symmetric ciphertext symm-C4 102*s*-4. In a step 236, device 101 can then store the PSK 230-1 along with the identifier of PSK-ID 231-1 in memory 101*m*. Device 101 can use either or both of RAM memory and nonvolatile storage memory 101*bb* to store the PSK 230-1 along with the identifier of PSK-ID 231-1 in a step 236. In exemplary embodiments, the PSK 230-1 is stored by device 101 in the same physical memory as PSK-ID 231-1 in a step 236.

Within FIG. 6, each of the depicted steps 227 and 228 and 230 as described above can comprise computer executable instructions stored within RAM memory 111*m* as depicted and described in connection with FIG. 1 above and FIG. 11 below. The computer executable instructions could be stored in RAM memory 111*m* during operation of server 111 including when the server 111 performs the steps depicted in FIG. 2*a* above. Some of the depicted data processed by the computer executable instructions may also be stored in nonvolatile or storage memory 111*b*, such as, but not limited to, the KEM DECAPS function 103*j*, HKDF 221*a*, the symmetric decryption algorithm 228*a*, the HKDF 230*a*, and the associated parameters. The processor 111*p* or a processor system including processor 111*p* could execute the computer executable instructions in order use the input data and output data depicted and described for a server 111 in FIG. 6. The RAM memory 111*m* and the storage memory 111*b* can be connected to the processor 111*p* via a system bus 111*c*.

Within FIG. 6, the depicted step 236 as described above can comprise computer executable instructions stored within RAM memory within device memory 101*m* as depicted and described in connection with FIG. 1 above and FIG. 11 below. The computer executable instructions could be stored in RAM memory during operation of device 101 including when the device performs the steps depicted in FIG. 2*a* above. Some of the depicted data processed by the computer executable instructions may also be stored in nonvolatile or storage memory within device memory 101*bb* (depicted and described in connection with FIG. 11 below), such as, but not limited to, the HKDF 230*a*, and the associated parameters. The processor 101*p* could execute the computer executable instructions in order use the input data and output data depicted and described for a device 101 in FIG. 6. The RAM memory and the storage memory 101*bb* for device memory can be connected to the processor 101*p* via a system bus 101*t*.

FIG. 7*a*

FIG. 7*a* is a flow chart illustrating exemplary steps for a device and a server (i) mutually generating a third symmetric ciphering key using a "pre-shared" secret key (PSK) and (ii) mutually generating a message authentication code (MAC) value, the server generating a fifth symmetric ciphertext using the third symmetric ciphering key, and the device decrypting the fifth symmetric ciphertext using the third symmetric ciphering key, in accordance with exemplary embodiments.

A step 252 for device 101 to mutually generate a third symmetric ciphering key using a "pre-shared" secret key (PSK) was also depicted and described above in FIG. 2*b* and FIG. 2*c*. Before conducting the step 252, device 101 can store PSK 230-1 and PSK-ID 231-1 in memory. The PSK 230-1 could be derived in a step 230 by device 101 and the PSK-ID 231-1 could be received by device 101 in a fourth symmetric ciphertext symm-C4 102*s*-4. At step 252, device 101 can use the PSK 230-1 for the PSK-ID 231-1 selected in a step 201*d'* (depicted and described in connection with in FIG. 2*b* and FIG. 2*c* above) to generate a third symmetric ciphering key S3 252*b* and a third MAC key MAC3 252*c*. Note that the PSK 230-1 can be stored by device 101 in a step 236. At step 252, device 101 can generate a second random number 252*a* for use in the resumed session 251. At step 252, device 101 can use at least the PSK 230-1 and additional data 252*d* with a HKDF 252*h* in order to generate the third symmetric ciphering key S3 252*b* and a third MAC key MAC3 252*c*.

In addition, at step 252, device 101 can use the PSK 230-1, the second random number 252*a*, and additional data 252*d* with a HKDF 252*h* in order to generate the third symmetric ciphering key S3 252*b* and a third MAC key MAC3 252*c*. The additional data 252*d* in a step 252 could be mutually shared data between device 101 and server 111, such as any of the plaintext in a message 254 (for resumed session 251*a* in FIG. 2*b*) or message 254' (for resumed session 251*b* in FIG. 2*c*). The additional data 252*d* could also include data specified by the protocol for secure sessions and session resumption used by device 101 and server 111', such as text or numeric values stored with cryptographic algorithms 101*s* for device 101. The benefits of including the second random number 252*a* as input into the HKDF 252*h* include an increase of information entropy for the calculation of the third symmetric ciphering key S3 252*b* and a third MAC key MAC3 252*c*. Further, the inclusion of the second random number 252*a* as input into the HKDF 252*h* ensures (for device 101) that the server 111' receiving the second random number 252*a* also has access to PSK 230-1 for network 103.

A step 252 by server 111' can be equivalent or the same as a step 252 conducted by device 101, in order use the PSK 230-1 and mutually derive with device 101 the third symmetric ciphering key S3 252*b* and a third MAC key MAC3 252*c*. A step 252 by server 111 was also depicted and described in connection with FIG. 2*b* and FIG. 2*c* above. At step 252, server 111' can use the second random number 252*a* received from a message 254 or 254' (in FIG. 2*a* and FIG. 2*b*) with a HKDF 252*h*. At step 252, server 111' can use at least the PSK 230-1 and additional data 252*d* with a HKDF 252*h* in order to mutually derive the third symmetric ciphering key S3 252*b* and a third MAC key MAC3 252*c*. For some embodiments, the second random number 252*a* can be omitted by server 111' and device 101 for input into HKDF 252*h*. A nonce or initialization vector could also be generated in a step 252. In addition, the third symmetric ciphering key S3 252*b* could comprise a first portion S3 252*b*-1 for decryption by server 111' and a second portion S3 252*b*-2 for encryption by server 111'. Likewise, the third MAC key MAC3 252*c* can comprise two portions, where a first portion is for verification of MAC or tag values received from device 101 and a second portion is for generation of MAC values or tag values by server 111'

At step 253, device 101 can select data for generation of MAC values in order send data to server in an authenticated manner with message integrity. A step 253 for device 101 was also depicted and described in connection with FIG. 2*b* and FIG. 2*c* above. The selected data in a step 253 can comprise the identity for network 103*a* (such as, but not limited to a domain name), an identity of the PSK, which is PSK-ID 231-1 stored by device 101 in a step 235 above in FIG. 2*a*, the device extensions 101*g*' selected from a step 201*d*' above in FIG. 2*b* and FIG. 2*c*, and the second random number random 2 252*a* from a step 252 in FIG. 2*b* and FIG. 2*c*. Additional data could be selected in a step 253 for the generation of MAC values. Parameters from device extensions 110*g* or 101*g*' could also be selected in a step 253 for the generation of MAC values, or the parameters could be specified in a protocol for resuming the secure session. Device 101 could select a MAC algorithm 253*a* in a step 253, such as examples of Poly1305, HMAC algorithm, or AES with a mode such as CGM (to generate MAC values but not encrypt). Other possibilities exist as well for a MAC algorithm 253*a* used in a step 253 and for the generation of MAC values herein without departing from the scope of the present disclosure. At step 253, device 101 can input the selected data into the MAC algorithm 253*a* along with parameters and the third MAC key MAC3 252*c* generated in a step 252 in order to generate the MAC value tag1 253*b*. As depicted for step 253 in FIG. 7*a*, the device 101 can also input an initialization vector or nonce value generated by a step 252 for device 101 into the MAC algorithm 253*a*.

Server 111' can also conduct a step 253 in order to generate the same tag value tag1 253*b*. A step 253 for server 111' was also depicted and described in connection with FIG. 2*b* and FIG. 2*c* above. A step 253 by server 111 can be performed by selecting data for internal generation of MAC values in order to verify data from device 101 in an authenticated manner with message integrity. The selected data in a step 253 can be received in a message 254 or 254' (in FIG. 2*b* and FIG. 2*c*) and comprise (i) a network identity of 103*a*, (ii) the identity of the PSK, which is PSK-ID 231-1, (iii) the device extensions 101*g*', and (iv) the second random number random 2 252*a*. For some embodiments, the inclusion of a second random number 2 252*a* could be omitted from a message 254 and also omitted from a step 253 for both device 101 and server 111'. Both device 101 and server 111' can select the same data in a step 253 for input into a MAC algorithm 253*a*.

Additional data could be selected in a step 253 for the generation of MAC values. Parameters from device extensions 101*g* or 101*g*' could also be selected in a step 253 for the generation of MAC values, or the parameters could be specified in a protocol for resuming the secure session. Server 111' could select the same MAC algorithm 253*a* as device 101 in a step 253, such as examples of Poly1305, HMAC algorithm, or AES with a mode such as CGM (to generate MAC values but not encrypt). Other possibilities exist as well for a MAC algorithm 253*a* used in a step 253 and for the generation of MAC values herein without departing from the scope of the present disclosure. At step 253, server 111' can input the selected data into the MAC algorithm 253*a* along with parameters and the third MAC key MAC3 252*c* generated by server 111' in a step 252 in order to generate the MAC value of tag1 253*b*. As depicted for step 253 in FIG. 7*a*, the server 111' can also input an initialization vector or nonce value generated by a step 252 for server 111' into the MAC algorithm 253*a*.

FIG. 7*a* also depicts the server 111' generating a fifth symmetric ciphertext symm-C5 102*s*-5 using the third symmetric ciphering key S3 252*b* in a step 267. The use and operation of a step 267 is also depicted and described in connection with FIG. 2*c* above. At step 267, server 111' can use symmetric encryption 267*a* with the third asymmetric ciphertext C3 102*c*-3 from a step 209' above in FIG. 2*c* in order to generate a fifth symmetric ciphertext symm-C5 102*s*-5. The symmetric encryption 267*a* can be included within server cryptographic algorithms 103*s* for server 111'. The symmetric encryption 267*a* can correspond to the symmetric decryption 271*a* used by a device 101 in a step 271 also depicted in FIG. 7*a*. The symmetric encryption 267*a* can include input of at least (i) parameters or metadata from a message 254', and (ii) the symmetric ciphering key S3 252*b* and MAC key MAC3 252*c* from a step 252 above for server 111'.

A step 267 can also include server 111' processing metadata from message 254', where metadata can include plaintext data to conduct symmetric encryption 267*a* such as handshake headers, an initialization vector, an identity of the symmetric ciphering key to use, etc. Note that the output of the step 267 can comprise a "double encrypted" third ciphertext C3 102*c*-3, where (i) the first layer of encryption can be via asymmetric encryption via the third KEM 101*k*'/103*j*' using the second device ephemeral public key ePK-2.device 101*h*-2, and (ii) the second layer of encryption can be via symmetric encryption 267*a* of the third asymmetric ciphertext C3 102*c*-3 using keys S3 224*b* and MAC3 224*c*.

For some exemplary embodiments, a step 267 can be omitted and the third asymmetric ciphertext C3 102*c*-3 could be transmitted without the additional layer of symmetric encryption from a step 267. In other words, the data depicted as transmitted in a message 261' in FIG. 2*c* regarding the third asymmetric ciphertext C3 102*c*-3 could be "C3 102*c*-3" instead of the depicted value of "symm-C5 102*s*-5 ({C3 102*c*-3}S3 252*b*)."

Although the ciphertext from the party conducting an ENCAPS function is normally secure with the first level of asymmetric encryption, additional levels of security could be obtained for the system 200*c* in FIG. 2*c* by server 111' conducting a step 267 to "double encrypt" the third asymmetric ciphertext C3 102*c*-3 output from KEM ENCAPS 103*k*' with the second device ephemeral public key ePK-2.device 101*h*-2 also using symmetric encryption. In other words, by using "double encryption" via the fifth symmetric ciphertext symm-C5 102*s*-5, an attacker would need to break at least both symmetric encryption 267*a* and asymmetric encryption from KEM ENCAPS 103*k*' in order to determine K3 102*k*-3. Without "double encryption", an attacker would need to break only asymmetric encryption from KEM ENCAPS 103*k*' in order to determine K3 102*k*-3. In addition, the use of a "double encrypted" third asymmetric ciphertext C3 102*c*-3 by server 111' increases resistance to an attacker substituting a fake or fraudulent third asymmetric ciphertext C3 102*c*-3, if the attacker was able to obtain the second device ephemeral public key ePK-2.device 101*h*-2.

Or, in some embodiments where the third asymmetric ciphertext C3 102*c*-3 is not "double encrypted, (i) the fifth symmetric ciphertext symm-C5 102*c*-5 could omit the use of the symmetric ciphering key S3 252*b* by server 111' in a step 267 and (ii) the third asymmetric ciphertext C3 102*c*-3 could be processed in a step 267*a* during a step 267 with only the third MAC key MAC3 252*c*. In other words, the third MAC key MAC3 252*c* could be used with a MAC algorithm equivalent to MAC algorithm 253*a* in step 253 above in order to generate MAC values. For these embodiments, the MAC values transmitted by server 111' along with the third asymmetric ciphertext C3 102*c*-3 could be verified by device 101 using the MAC key MAC3 252*c* derived by device 101 in a step 252. In other words, a third asymmetric ciphertext C3 102*c*-3 in a message 261' depicted and described in connection with FIG. 2*c* above could comprise a third asymmetric ciphertext C3 102*c*-3 with MAC values generated using the third MAC key MAC3 252*c*, such that device 101 could verify the third asymmetric ciphertext C3 102*c*-3 was generated by server 111 that (i) conducted the KEM ENCAPS 103*k*' with the second device ephemeral public key ePK-2.device 101*h*-2 and (ii) operates with at least the PSK 230-1 (where the third MAC key MAC3 252*c* is derived from PSK 230-1).

At step 271, device 101 can use symmetric decryption 271*a* with the fifth symmetric ciphertext symm-C5 102*s*-5 received in message 261' in FIG. 2*c* above in order to read the third asymmetric ciphertext C3 102*c*-3. A step 271 is also depicted and described in connection with FIG. 2*c* above. The symmetric decryption 271*a* can be included within cryptographic algorithms 101*s* for device 101. The symmetric decryption 271*a* can include input of the parameters specified in metadata from a message 254' and the symmetric ciphering key S3 252*b* and MAC key MAC3 252*c* from a step 252 above. The output of a step 271 by device 101 can be a plaintext value of the third asymmetric ciphertext C3 102*c*-3 for use with a KEM DECAPS 101*j*'. For the embodiment described in the paragraph above, the use of a symmetric ciphering key S3 252*b* could be omitted and the step 271 could use the MAC key MAC3 252*c* in order to verify a MAC value in message 261' for the third asymmetric ciphertext C3 102*c*-3.

In a step 271, device 101 can also use an initialization vector for the symmetric decryption 271*a*, where the initialization vector can be included with message 261' in FIG. 2*c*. Note that a HKDF 252*a* could also derive the initialization vector for use by device 101 with symmetric decryption 271*a*, and the resulting initialization vector could either be (i) included with plaintext metadata in a message 261', or (ii) omitted from message 261' and device 101 could mutually derive the same initialization vector using the HDKF 252*a* from a step 252 above. The resulting plaintext comprising the third asymmetric ciphertext C3 102*s*-3 can be stored by device 101 in RAM memory 101*m* and also used with a step 214' as depicted and described in connection with FIG. 2*c* above.

FIG. 7*b*

FIG. 7*b* is a flow chart illustrating exemplary steps for a device and a server (i) mutually generating a fourth symmetric ciphering key using a third shared secret key and (ii) mutually generating a message authentication code (MAC) value, the server generating a sixth symmetric ciphertext using the fourth symmetric ciphering key, and the device decrypting the sixth symmetric ciphertext using the fourth symmetric ciphering key, in accordance with exemplary embodiments.

At step 268, server 111' can use (i) the PSK 230-1 for the PSK-ID 231-1 and (ii) the third shared secret key K3 102*k*-3 generated in a step 209' above in order to generate a fourth symmetric ciphering key S4 268*b* and a fourth MAC key MAC4 268*c*. Note that the PSK 230-1 can be stored by server 111' in a step 230. Exemplary details for a step 268 by server 111' are also depicted and described in connection with FIG. 2*c* above. At step 268, server 111' can use at least the PSK 230-1, the third shared secret key K3 102*k*-3 generated in a step 209', and additional data 268*d* with a HKDF 268*a* in order to generate the fourth symmetric ciphering key S4 268*b* and a fourth MAC key MAC4 268*c*. A nonce or initialization vector could also be generated in a step 268 by the HKDF 268*a*.

Additional data 268*d* can comprise data that is mutually shared between device 101 and server 111'. The additional data can include random2 252*a* from device 101 and a random number from server 111', where random number from server 111' can be included in plaintext 258*a* in a message 261' in FIG. 2*c*. The additional data 268*d* does not need to be secret data, such as the third shared secret key K3 102*k*-3, and the additional data 268*d* can comprise data that is publicly shared, such as either (i) transmitted across IP network 107 or (ii) specified in a protocol for secure sessions used by device 101 and server 111'. In general, as contemplated herein, the shared data 210*d* for HDKF 210*a* and the shared data 221*d* for HKDF 221*a* can also comprise data that is publicly shared according to the sentence above. The shared data 210*d* and 221*d* does not need to be secret data, where the secret data can comprise shared secret keys resulting from KEM.

For a step 268, the fourth symmetric ciphering key S4 268*b* could comprise a first portion S4 268*b*-1 for encryption by server 111' and a second portion S4 268*b*-2 for decryption by server 111'. Likewise, the fourth MAC key MAC4 268*c* can comprise two portions, where a first portion is for generation of MAC or tag values by server 111' and a second portion is for verification of MAC values or tag values received by server 111'. For some embodiments, the inclusion of the PSK 230-1 in a step 268 by device 101 and server 111' could be omitted from input into HKDF 268*a*, and the minimum input necessary for a HKDF 268*a* can comprise the third shared secret key K3 102*k*-3.

At step 268, device 101 can use (i) the PSK 230-1 for the PSK-ID 231-1 read from a step 201*d*' in FIG. 2*c* and (ii) the third shared secret key K3 102*k*-3 generated in a step 214' above in order to mutually derive the fourth symmetric ciphering key S4 268*b* and a fourth MAC key MAC4 268*c*. Note that the PSK 230-1 can be stored by device 101 in a step 236. Exemplary details for a step 268 by device 101 are also depicted and described in connection with FIG. 2*c* above. At step 268, device 101 can use at least the PSK 230-1, the third shared secret key K3 102*k*-3 generated in a step 214' additional data 268*d* with a HKDF 268*a* in order to generate the fourth symmetric ciphering key S4 268*b* and a fourth MAC key MAC4 268*c*. The additional data can include random2 252*a* from device 101 and a random number from server 111', where random number from server 111' can be included in plaintext 258*a*. A nonce or initialization vector could also be generated in a step 268 by the HKDF 268*a*.

In addition for a step 268, the fourth symmetric ciphering key S4 268*b* could comprise a first portion S4 268*b*-1 for decryption by device 101 and a second portion S4 268*b*-2 for encryption by device 101. Likewise, the fourth MAC key MAC4 268*c* can comprise two portions, where a first portion is for generation of MAC or tag values by device 101 and a second portion is for verification of MAC values or tag values received by device 101. In preferred embodiments, both device 101 and server 111' input the exact same values and sequence of bits into HKDF 268*a* in order to mutually derive the same keys S4 268*b* and MAC4 268*c*.

FIG. 7*b* also depicts device 101 and server 111' mutually generating a message authentication code (MAC) value in a step 269. A step 269 was also depicted and described in connection with FIG. 2*c* above. At step 269 server 111' and device 101 can generate a second MAC value or tag 2 269*b*. The plaintext for use in a step 269 can be the plaintext data 258*a* selected in a step 258 by server 111' in FIG. 2*c* above. Parameters from device extensions 101*g* or 101*g*' could also be selected in a step 269 for the generation of MAC values, or the parameters could be specified in a protocol for resuming the secure session. Server 111' could select a MAC algorithm 269*a* in a step 269, such as examples of Poly1305, HMAC algorithm, or AES with a mode such as CGM (to generate MAC values but not encrypt). Other possibilities exist as well for a MAC algorithm 269*a* used in a step 269 and for the generation of MAC values herein without departing from the scope of the present disclosure. At step 269, server 111' can input the plaintext data 258*a* into the MAC algorithm 269*a* along with parameters and the fourth MAC key MAC3 268*c* generated in a step 268 in order to generate the second MAC value tag2 269*b*. A step 269 by device 101 and server 111' can include a nonce or initialization vector generated in a step 268. Or, the nonce could be transmitted by server 111' to device 101 in a message 261' in FIG. 2*c*.

At step 269 device 101 can use the step 269 depicted and described in FIG. 7*b* for device 101 to generate the second MAC value or tag 2 269*b*. Note that the step 269 by both device 101 and server 111' can be the same, since both device 101 and server 111' should each internally generate the same MAC value tag2 269*b*. The plaintext for use in a step 269 can be the plaintext data 258*a* received in a message 261' by device 101. Parameters from device extensions 101*g* or 101*g'* could also be selected in a step 269 for the generation of MAC values, or the parameters could be specified in a protocol for resuming the secure session. Device 101 could select a MAC algorithm 269*a* in a step 269, such as examples of Poly1305, HMAC algorithm, or AES with a mode such as CGM (to generate MAC values but not encrypt). Other possibilities exist as well for a MAC algorithm 269*a* used in a step 269 and for the generation of MAC values herein without departing from the scope of the present disclosure. At step 269, device 101 can input the plaintext data 258*a* into the MAC algorithm 269*a* along with parameters and the third MAC key MAC3 268*c* generated in a step 268 in order to generate the second MAC value tag2 269*b*.

FIG. 7*b* depicts the server 111' generating a sixth symmetric ciphertext symm-C6 102*s*-6 using the fourth symmetric ciphering key S4 268*b* and fourth MAC key MAC4 268*c* in a step 270. At step 270, server 111' can use symmetric encryption 270*a* with the plaintext server hello data 259*a* from a step 259 for a resumed session 251*b* in FIG. 2*c* above, in order to generate the sixth symmetric ciphertext symm-C6 102*s*-6. A step 270 is also depicted and described in connection with FIG. 2*c* above. The symmetric encryption 270*a* can be included within cryptographic algorithms 103*s* for server 111'. The symmetric encryption 270*a* can include input of at least (i) the parameters or metadata mutually shared between device 101 and server 111', and (ii) the fourth symmetric ciphering key S4 268*b* and MAC key MAC4 268*c* from a step 268 above. Step 270 can include the input of an initialization vector or nonce, and also include an output of a MAC value or tag for the sixth symmetric ciphertext symm-C6 102*s*-6, where the MAC value or tag for sixth symmetric ciphertext symm-C6 102*s*-6 is generated using the MAC key MAC4 268*c* from a step 268 above.

FIG. 7*b* depicts the device 101 decrypting the sixth symmetric ciphertext symm-C6 102*s*-6 using the fourth symmetric ciphering key S4 268*b* and fourth MAC key MAC4 268*c* in a step 273. At step 273, device 101 can use symmetric decryption 273*a* with the received sixth symmetric ciphertext symm-C6 102*s*-6 from a message 261' in order to read the plaintext server hello data 259*a*. A step 273 is also depicted and described in connection with FIG. 2*c* above. The symmetric decryption 273*a* can be included within cryptographic algorithms 101*s* for device 101. The symmetric decryption 273*a* can include input of at least (i) the parameters or metadata mutually shared by device 101 and server 111', and (ii) the fourth symmetric ciphering key S4 268*b* and MAC key MAC4 268*c* from a step 268 above. Step 273 can include the input of an initialization vector or nonce, and also include an output of a MAC value or tag for the sixth symmetric ciphertext symm-C6 102*s*-6, where the MAC value or tag for the sixth symmetric ciphertext symm-C6 102*s*-6 is generated using the MAC key MAC4 268*c* from a step 268 above. Device 101 can compare the received tag value with the calculated tag value using MAC4 268*c* in order to verify the message integrity for the sixth symmetric ciphertext symm-C6 102*s*-6. Device 101 can then process the plaintext server hello data 259*a*, such using the data in order to generate a second "Client Finished" message 264' as depicted and described in connection with FIG. 2*c* above.

FIG. 8

FIG. 8 is an illustration of (i) an exemplary set of cryptographic parameters for a key encapsulation mechanism (KEM) stored and used by a device and a server, and (ii) conducting two KEM for the cryptographic parameters in accordance with exemplary embodiments. As depicted and described above in connection with FIG. 1, a device 101 can store a set of cryptographic parameters 101*x* for conducting supported key encapsulation mechanisms (KEM), and a server 111 can also store a set of cryptographic parameters 103*x* for conducting supported KEM. The cryptographic parameters can specify sets of values for cryptographic algorithms that are supported by device 101 and network 103 or server 111 in order to support the systems and methods depicted herein. Cryptographic parameters 101*x* and 103*x* or subsets thereof can be recorded in nonvolatile memory in each of device 101, and server 111 or network 103. Cryptographic parameters 101*x* and 103*x* can include values for an identification for a collection or subset of a KEM set identifier 801, a key length 802, a type or name 803, and a secure hash algorithm 804. The depicted parameters in FIG. 8 focus on parameters relevant to conducting a KEM, and different parameters could be used for symmetric ciphering algorithms and also digital signature algorithms.

As contemplated herein, when a selected set of cryptographic parameters such as using the words or description "parameters 101*f*" or "cryptographic parameters 101*f*" can specify a set of rows in the parameters for FIG. 8. An individual row of parameters or values can specify sufficient information such that both (i) a device 101 and a server 111 can conduct a KEM.KeyGen function to generate a PKI key pair, and (ii) using the PKI keys to conduct either KEM ENCAPS or KEM DECAPS functions (such as those depicted and described in connection with FIG. 1). KEM parameters ID 801 can be an identity for a row or set of values for cryptographic parameters 101*x* and 103*x*. PK key length 802 could represent the length of a public key in bits or bytes. Cryptographic parameters 101*x* and 103*x* could include the length of a private key in bits or bytes as well.

The type or name 803 for a set of cryptographic parameters can specify the cryptographic algorithms to use with PKI keys, such as the exemplary names for post-quantum cryptography cryptographic algorithms. The field of post-quantum cryptography continues to develop with proposed algorithms currently undergoing revisions for standardization as of November 2021. In general, the leading candidates for post-quantum cryptography key encapsulation mechanisms propose using (i) lattice-based cryptography, (ii) code-based cryptography, or (iii) Supersingular elliptic curve isogeny cryptography (SIKE), as described by the Wikipedia PQC article.

Hash algorithm 804 in cryptographic parameters 101*x* and 103*x* can be the name of a secure hash algorithm, such as the exemplary SHA-256 algorithm depicted, which may also be referred to as "SHA-2". Hash algorithm 804 can also be used in a hash-based key derivation function within the KEM ENCAPS and KEM DECAPS function to generate keys K1 102*k*-1 and K2 102*k*-2.

Although not depicted in FIG. 8, settings or parameters for a symmetric ciphering algorithms can specify (i) the identity or name of a symmetric ciphering algorithm such as "AES", "AES-SIV", 3DES, Blowfish, etc., and (ii) settings for the symmetric ciphering algorithm. Other possibilities exist as well for data within cryptographic parameters, such as the specification of point compression, encoding rules such as distinguished encoding rules (DER), ASN or CSN syntax notation, padding rules, byte or bit orders such as big endian, little endian, etc.

The specific steps, calculations, and logic for a key encapsulation mechanism (KEM) can be specified according to the name 803. In general a key encapsulation mechanism or key exchange specified by a name 803 can comprise using a public key from a remote entity and a local private key in order to derive a shared secret. The key encapsulation mechanism could also comprise (i) encrypting a message "m" or random number for deriving a symmetric ciphering key (or value for the key) with a public key and (ii) decrypting the message "m" or random number for deriving the symmetric ciphering key (or value for the key) with a corresponding private key. Note the name 803 can support different types. In exemplary embodiments depicted in FIG. 8, a first KEM 103*k*/101*j* specified by device 101 for the first device ephemeral public key ePK-1.device 101*h*-1 with the KEM parameters 101*f*-*x* and ID 801 of "3" can support a type of "Kyber" (where a different type would be "SIKE" for the ID of "4" in parameters 101*f*).

FIG. 8 also depicts and exemplary mutual negotiation of parameters for a first KEM 103*k* (ENCAPS) and 101*j* (DECAPS), and herein referred to as "KEM 103*k*/101*j*", and a second KEM 101*k* (ENCAPS) and 103*j* (DECAPS). Note that both the first KEM 103*k*/101*j* and second KEM 101*k*/103*j* can use a different type of KEM (e.g. completely different algorithm such as a first type based on lattices and a second type based on SIKE, etc.) For some exemplary embodiments (not depicted in FIG. 8), the first KEM 103*k*/101*j* and second KEM 101*k*/103*j* could use the same type or name 803 for the algorithm of the KEM. For example, the first KEM 103*k*/101*j* could use KEM parameters 101*f*-*x* that specifies an exemplary name 803 of "Kyber-1024" and the second KEM 101*k*/103*j* could also use the same KEM parameters 101*f*-*x* that specifies the same exemplary name 803 of "Kyber-1024". For the embodiment described in the previous sentence, the KEM parameters 103*f*-*y* from FIG. 2*a* would be the same as KEM parameters 101*f*-*x* But, in preferred exemplary embodiments, the first KEM 103*k*/101*j* can use a first type (e.g. lattice based) that is completely different than a second type for the second KEM 101*k*/103*j* (e.g. code-based or SIKE). In this manner, the security of a system 200*a* for application data can be at least as strong as the stronger of the type for the first KEM 103*k*/101*j* and the second KEM 101*k*/103*j*.

As depicted in FIG. 8, device 101 in a step 201*d* from FIG. 2*a* can select a set of supported cryptographic KEM parameters 101*f*, which can comprise a list of all parameters supported by device 101 for conducting both a first KEM 103*k*/101*j* and a second KEM 101*k*/103*j*. The set of supported cryptographic KEM parameters 101*f* could be recorded or stored in device 101 in nonvolatile memory during a device configuration step 201*b*. In exemplary embodiments, this set of supported cryptographic KEM parameters 101*f* comprises at least two rows with distinct KEM parameter identities 801. Each KEM parameter ID 801 could be designated a unique byte code for a field in specifications or standards for a secure session between device 101 and server 111. For the depicted parameters 101*f* in FIG. 8, device 101 could support an exemplary list of KEM parameters IDs 801 of "1" through "4". Other possibilities exist as well for parameters 101*f* supported by device 101 without departing from the scope of the present disclosure.

In addition, device 101 in a step 201*d* from FIG. 2*a* can select a specific set of cryptographic KEM parameters 101*f*-*x* from parameters 101*f*, where the specific set of parameters 101*f*-*x* can be used to derive the first device ephemeral public key ePK-1.device 101*h*-1. As depicted and described in connection with FIG. 2*a*, both the selected set of cryptographic KEM parameters 101*f* and the specific KEM parameters 101*f*-*x* for ePK-1.device 101*h*-1 can be included in a message 202 in FIG. 2*a* above. For the exemplary embodiment depicted in FIG. 8, the KEM parameters 101*f*-*x* can be a subset of parameters 101*f* and could have and ID 801 of "3".

As depicted in FIG. 8, server 111 can store a set of supported cryptographic KEM parameters 103*f* in storage memory 111*b* during a server configuration step 201*c*. The KEM parameters 103*f* can comprise a list of all parameters supported by server 111 for conducting both a first KEM 103*k*/101*j* and a second KEM 101*k*/103*j*. In exemplary embodiments, this set of supported cryptographic KEM parameters 103*f* comprises at least two rows with distinct KEM parameter identities 801. For the depicted parameters 103*f* in FIG. 8, server 111 could support an exemplary list of KEM parameters IDs 801 of "3" through "6". In preferred exemplary embodiments, the received and specified KEM parameters 101*f*-*x* can match a row or KEM parameters ID 801 for KEM parameters 103*f*.

As described in a step 203*b* in FIG. 2*a*, a server 111 can select a row or set of KEM parameters 103*f*-*y* that matches all of the following conditions: (i) is supported by the received KEM parameters 101*f*, (ii) is supported by the stored KEM parameters 103*f*, (iii) is different than the specified and received KEM parameters 101*f*-*x* for ePK-1.device 101*h*-1, and (iv) KEM parameters 103*f*-*y* use a different type than KEM parameters 101*f*-*x* (e.g. different algorithm such as code-based if 101*f*-*x* specifies lattice-based, etc.). For the exemplary data depicted in FIG. 8, a server 111 can select the row with ID 801 of "4" for KEM parameters 103*f*-*y*, which meets all of the criteria (i) through (iv) from the above sentence. All of KEM parameters 101*f*, 103*f*, 101*f*-*x* and 103*f*-*y* could represent different data or values than that depicted in FIG. 8 without departing from the scope of the present disclosure, such as including or specifying different KEM mechanisms and parameters. But in preferred exemplary embodiments, the parameters 103*f*-*y* for the second KEM 101*k*/103*j* support all of the criteria for (i) through (iv) as described in this paragraph.

For other exemplary embodiments, such as for devices 101 with more restricted memories that can support a single KEM algorithms such as a single row in the table depicted in FIG. 8, then both the first KEM 103*k*/101*j* and the second KEM 101*k*/103*j* could be conducted with the same KEM parameters. In other words, for the embodiment described in this paragraph, the parameters 101*f*, 101*f*-x, and 103*f*-*y* could be the same and use the same values and settings for both the first KEM 103*k*/101*j* and the second KEM 101*k*/103*j*. In other words, as one example for the embodiment within this paragraph, both parameters 101*f*-*x* and 103*f*-*y* could support the same KEM algorithm such as Kyber768.

FIG. 8 also depicts the use of (i) first KEM parameters 101*f-x* for a first KEM 103*k*/101*j* and (ii) second KEM parameters 103*f-y* for a second KEM 101*k*/103*j*. The depiction in FIG. 8 provides additional details showing the formatting and use of KEM parameters with PKI keys and ENCAPS and DECAPS functions. A device 101 can select first KEM parameters 101*f-x* as a subset of KEM parameters 101*f* stored within device 101. The first KEM parameters 101*f-x* can be used with the KEM KeyGen function to generate a first device ephemeral public key ePK-1.device 101*h*-1-*x* and first device ephemeral private key eSK-1.device 101*i*-1. The first KEM 103*k*/101*j* can comprise server 111 KEM ENCAPS 103*k* and device 101 KEM DECAPS 101*j* using the first KEM parameters 101*f-x*.

A server 111 can select second KEM parameters 103*f-y* as a subset of KEM parameters 103*f* stored within server 111, and also preferably matching all of the conditions (i) through (iv) for a step 203*b* described three paragraphs above. The selected second KEM parameters 103*f-y* from a step 203*b* can be used with the KEM KeyGen function to generate a server ephemeral public key ePK.server 103*h* and server ephemeral private key eSK.server 103*i*. The second KEM 101*k*/103*j* can comprise server 111 KEM DECAPS 103*j* and device 101 KEM ENCAPS 101*j* using the second KEM parameters 103*f-y*.

FIG. 9*a*

FIG. 9*a* is a flow chart illustrating exemplary steps for a device to use multiple key encapsulation mechanisms (KEM) and resume a secure session with a "pre-shared" secret key, in accordance with exemplary embodiments. The steps and components depicted in FIG. 9*a* for a device 101 are also depicted and described in connection with FIG. 2*a*, FIG. 2*b*, and additional Figures above. The steps and data for device 101 to securely conduct multiple different KEM and resume a secure session can comprise (i) a first portion depicted in FIG. 9*a* and also (ii) a continuing, second portion depicted in FIG. 9*b* below. Note that some steps can be conducted in a different order or sequence than depicted in FIG. 9*a* and also FIG. 9*b* below. As one example, a step 223 below could be conducted before a step 224, and other possibilities exist as well for the sequence of some steps without departing from the scope of the present disclosure.

Device 101 can use the device hardware or electrical component depicted for device 101 in FIG. 1 and FIG. 11 in order to conduct the steps in FIG. 9*a*. Note that a device 101 can conduct the additional steps as depicted in FIG. 2*a*, FIG. 2*b*, and additional Figures above. FIG. 9*a* provides a summary of the primary steps for a preferred embodiment where a device 101 can (i) use multiple KEM (e.g. ENCAPS and DECAPS) and parameters for multiple different KEM with a server 111 and (ii) securely resume a session from a mutually derived "pre-shared" secret key.

At step 201*b*, device 101 can store in nonvolatile memory for device memory 101*m* both (i) device KEM parameters 101*f* and (ii) cryptographic algorithms 101*s*. Note that the server KEM parameters 103*f* can be stored within server 111, and the device and server KEM parameters 101*f* and 103*f* can have a common subset comprising a first KEM algorithm 803 with ID 801 and a second KEM algorithm 803 with a different ID 801 as depicted and described in connection with FIG. 8. The device KEM parameters 101*f* can be a subset of cryptographic parameters 101*x*. The data stored in device 101 can be stored during a configuration step for device 101. An example of the device KEM parameters 101*f* are depicted and described in connection with FIG. 8 above (with the data depicted as "in 202", which is a message generated by device 101 in FIG. 2*a*).

At step 201*d*, device 101 can select (i) server ID 111*a* and/or a network ID 103*a*, and (ii) a first subset 101*f-x* of KEM parameters 101*f*, which can comprise a first KEM algorithm 803 with ID 801. As contemplated herein, the first subset 101*f-x* of the device KEM parameters 101*f* can be referred to as KEM parameters 101*f-x*. The KEM parameters 101*f-x* can specify a first type of KEM algorithm (e.g. lattice-based, code-based, or SIKE), such as, but not limited to, the KEM parameter 101*f-x* depicted FIG. 8. The KEM parameters 101*f-x* can be selected in a step 201*d* based on device 101 anticipating or previously storing that server 111 supports the KEM parameters 101*f-x* in order to conduct a first KEM 805 as depicted and described in connection with FIG. 8.

At step 201*e*, device 101 can generate an ephemeral private key 101*h*-1 and ephemeral public key 101*i*-1 using the first subset 101*f-x* of KEM parameters 101*f* (or a first KEM algorithm), which are also referred to herein as KEM parameters 101*f-x*. At step 201*e*, device 101 can use a PQC.KeyGen function 101*q* to generate a device ephemeral PKI key pair comprising a device ephemeral public key ePK-1.device 101*h*-1 and a device ephemeral private key eSK-1.device 101*i*-1. The algorithm used to generate the ephemeral PKI key pair can be specified in KEM parameters 101*f-x* selected by device 101 in a step 201*d* above.

At step 202, device 101 can send a first message 202 to a server 111, wherein message 202 includes at least (i) the first set of KEM parameters 101*f*, (ii) the device ephemeral public key ePK-1.device 101*h*-1-*x*, and (iii) the selected subset 101*f-x* of KEM parameters 101*f-x* for the ephemeral public key 101*h-x*. The selected subset of KEM parameters 101*f-x* sent in a first message 202 can comprise an identity or identifier for a first KEM algorithm of KEM parameters 101*f-x*, such as a name or code 801 for the first KEM algorithm. A message 202 from device 101 to server 111 is depicted and described in connection with FIG. 2*a* above. Additional data could be included in a message 202, such as device extensions 101*g*, which could specify additional cryptographic parameters and settings supported by device 101. The message 202 could comprise a "Client Hello" message and also include an identity of network 103 or server 111 (or an IP address), such that the message 202 could be routed to server 111.

At step 213, device 101 can receive a second message 213, wherein message 213 includes at least (i) a first asymmetric ciphertext C1 102*c*-1 for the first subset 101*f-x* (or first KEM algorithm) of KEM parameters 101*f*, and a first symmetric ciphertext symm-C1 102*s*-1. A message 213 from the server 111 is depicted and described in connection with FIG. 2*a* above. Additional data could be included in a second message 213 as well, such as metadata 205*a* that can specify symmetric ciphering algorithms and a HKDF 210*a* for device 101 to use in order to process the data in message 213. The server 111 could conduct the steps 203*a* through 212 in FIG. 2*a* and additional Figures above in order to generate the message 213. Note that a server ephemeral public key of ePK.server 103*h* can be included within the first symmetric ciphertext symm-C1 102*s*-1.

At step 214, device 101 can generate a first shared secret key K1 102*k*-1 with (i) KEM DECAPS 101*j* and the first asymmetric ciphertext C1 102*c*-1 and (ii) device ephemeral private key eSK-1.device 101*i*-1 and the first subset 101*f-x* (or first KEM algorithm) of KEM parameters 101*f* A step 214 is depicted and described in connection with FIG. 2*a* above and also FIG. 4. The device 101 can use the device ephemeral private key of eSK-1.device 101*i*-1 with the KEM DECAPS 101*j* and the received first asymmetric ciphertext 102*c*-1 in order to generate the first shared secret key K1 102*k*-1. A step 214 can also include device 101 using a HKDF 210*a* with at least the first shared secret key K1 102*k*-1 to generate a symmetric ciphering key S1 210*b* and MAC key MAC1 210*c*.

At step 215, device 101 can decrypt the first symmetric ciphertext symm-C1 102*s*-1 using the first shared secret key K1 102*k*-1. A step 215 is depicted and described in connection with FIG. 2*a* above and also FIG. 4. At step 215, device 101 can use (i) a symmetric ciphering algorithm 215*a* from cryptographic algorithms 101*s* supporting the device extensions 110*g* and specified in metadata 205*c*, (ii) the symmetric ciphering key S1 210*b* from the HKDF 210*a* in a step 214, in order to convert the first symmetric ciphertext symm-C1 102*s*-1 into a plaintext 211*a*. The symmetric decryption 215*a* can include input of the parameters specified in metadata 205*a* from a message 213 and the symmetric ciphering key S1 210*b* and MAC key MAC1 210*c* from a step 214 above. In a step 215, device 101 can also use an initialization vector for the symmetric decryption 215*a*, where the initialization vector can be included with metadata 205*a* (or derived from HKDF 210*a* in step 214). Plaintext 211*a* can include at least a server ephemeral public key ePK.server 103*h* and KEM parameters 103*f-x* for the ePK.server 103*h*. KEM parameters 101*f-x* selected by device 101 in a step 201*d* can be referred to as a first subset 101*f-x* of device KEM parameters 101*f* KEM parameters 103*f-y* in plaintext 211*a* can be referred to as a second subset of device KEM parameters 101*f*.

In exemplary embodiments, the first subset 101*f-x* (or first KEM algorithm) of KEM parameters 101*f* in message 202 can specify a first type of KEM algorithm (e.g. lattice-based, code-based, or SIKE), such as, but not limited to, the KEM parameter 101*f-x* depicted FIG. 8. In exemplary embodiments, the second subset 103*f-y* (or second KEM algorithm) of KEM parameters 101*f* received in message 213 can specify a second type of KEM algorithm (e.g. lattice-based, code-based, or SIKE, but also different than the first type for KEM parameters 101*f-x* in message 202 above). An exemplary KEM parameters 103*f-y* according to this exemplary embodiment is depicted and described in connection with FIG. 8 above. Other embodiments, such as for devices with more restricted memory or processing resources or lower security requirements, then the first subset 101*f-x* and second subset 103*f-x* can specify the same KEM algorithm, such as a single row for KEM parameters 101*f* in FIG. 8.

At step 220, device 101 can generate (i) a second shared secret key K2 102*k*-2 and a second asymmetric ciphertext C2 102*c*-2 using (ii) KEM ENCAPS 101*k* and the server ephemeral public key ePK.server 103*h* and the second subset 103*f-y* of KEM parameters 101*f* A step 220 is depicted and described in connection with FIG. 2*a* and also FIG. 5. At step 220, device 101 can use both (i) the received server ephemeral public key of ePK.server 103*h* from message 213 and (ii) the specified subset of parameters 103*f-y* (or second KEM algorithm) for the server ephemeral public key and the second KEM 101*k*/103*j* in order to generate both (x) a second asymmetric ciphertext C2 102*c*-2 and (y) a second shared secret key K2 102*k*-2. At step 220, device 101 can use a KEM ENCAPS function 101*k* with both (i) and (ii) from the previous sentence in order to generate both (x) the asymmetric ciphertext C2 102*c*-2 and (y) the second shared secret key K2 102*k*-2.

After step 220, and as depicted and described in connection with FIG. 2*a* and FIG. 5, a device 101 can use a step 221 with a HKDF 221*a* with at least the second shared secret key K2 102*k*-2 to generate a second symmetric ciphering key S2 221*b* and MAC key MAC2 221*c*. Note that in exemplary embodiments, the HKDF 221*a* can receive input of both the first shared secret key K1 102*k*-1 from a step 214 and the second shared secret key K2 102*k*-2 from a step 220.

In a step 224, the second asymmetric ciphertext C2 102*c*-2 could also be encrypted into a "double encrypted" second symmetric ciphertext symm-C2 102*s*-2, where device 101 encrypts the second asymmetric ciphertext C2 102*c*-2 using the mutually shared symmetric ciphering key S1 210*b* and MAC key MAC1 210*c* from a step 214. As depicted in FIG. 4 above, device 101 can (i) derive the mutually shared symmetric ciphering key S1 210*b* and MAC key MAC1 210*c* using a step 214 and then (ii) encrypt the second asymmetric ciphertext C2 102*c*-2 into a "double encrypted" second symmetric ciphertext symm-C2 102*s*-2 using a step 224 from FIG. 5.

Although not depicted in FIG. 9*a*, for some embodiments the use of a "double encrypted" second asymmetric ciphertext C2 102*c*-2 (in the form of the second symmetric ciphertext symm-C2 102*s*-2) could be omitted and a step 224 could be skipped. For these embodiments, then a second asymmetric ciphertext C2 102*c*-2 could be transmitted without adding symmetric encryption and the second asymmetric ciphertext C2 102*c*-2 could be included in a message 225 below. In addition, for these embodiments and as described above, the second asymmetric ciphertext C2 102*c*-2 could include a MAC value generated by device 101 with the MAC key MAC1 210*b* and a MAC algorithm, equivalent to a MAC algorithm 253 depicted in FIG. 7*a* above.

At step 223, device 101 can use (i) a symmetric ciphering algorithm 223*a* from cryptographic algorithms 101*s* supporting the metadata 205*a*, (ii) the symmetric ciphering key S2 221*b* from the HKDF 221*a* in a step 221 (after step 220 above), and (iii) plaintext data such as for a "Client Finished" and/or application data to generate the third symmetric ciphertext symm-C3 102*s*-3. The use an operation of a step 223 is depicted and described in connection with FIG. 2*a* and also FIG. 5. The symmetric encryption 223*a* can include input of the symmetric ciphering key S2 221*b* and MAC key MAC2 221*c* from a step 221 above. As depicted in FIG. 9*a*, the steps and messages for device 101 to conduct a resumed secure session 251 with server 111 continues in FIG. 10*b* below.

FIG. 9*b*

FIG. 9*b* is a flow chart illustrating exemplary steps for a device to conduct multiple key encapsulation mechanisms (KEM) and resume a secure session with a "pre-shared" secret key, in accordance with exemplary embodiments. The steps and components depicted in FIG. 9*b* for a device 101 are also depicted and described in connection with FIG. 2*a*, FIG. 2*b*, and additional Figures above. The steps and data for device 101 to securely conduct multiple KEM and resume a secure session can comprise (i) a first portion depicted in FIG. 9*a* above and also (ii) a continuing, second portion depicted in FIG. 9*b* herein.

After steps 223 and 224 above, device 101 can send or transmit a third message 225 to server 111, wherein the third message 225 includes at least the second symmetric ciphertext symm-C2 102*s*-2 and third symmetric ciphertext symm-C3 102*s*-3. Device 101 can use a network interface 101*r* such as a radio to transmit the message 225. An exemplary message 225 is also depicted and described in connection with FIG. 2*a* above. Although not depicted in FIG. 9*b*, server 111 can conduct the series of steps depicted and described in connection with FIG. 2*a* in order to process the message 225.

Device 111 can then receive from server 111 a fourth symmetric ciphertext C4 102s-4 in a fourth message 233. A message 233 is also depicted and described in connection with FIG. 2a above. Device 101 can conduct a step 234 in order to decrypt the fourth symmetric ciphertext symm-C4 102s-4 using at least S2 221b in order to read a PSK-ID 231-1. The plaintext from a fourth symmetric ciphertext symm-C4 102s-4 can include additional data, including server application data or a "server finished" message. The plaintext read from decrypting the fourth symmetric ciphertext symm-C4 102s-4 can include the plaintext value of the PSK-ID 231-1, which can be used as an identity for a "pre-shared" secret key for a resumed session 251.

At step 236, device 101 can use at least the first shared secret key of K1 102k-1 and the second shared secret key K2 102k-2 with a HKDF 230a in order to generate the "pre-shared" secret key (PSK) 230-1 for use with session resumption 251. A step 236 is also depicted and described in connection with FIG. 2a and FIG. 6 above. The PSK 230-1 can be mutually derived with a server 111 using a step 236, where the server 111 conducts the corresponding step 230. Device 101 can store both the PSK 230-1 from a step 236 and the PSK-ID 231-1 from a step 234 in device memory, for subsequent use with a resumed session 251. Although not depicted in FIG. 9b, device 101 could then transmit and received encrypted application data with server 111. Device 101 and server 111 could then close the first session. The series of steps 201d through 236 in FIGS. 9a and 9b can comprise a first session 250 for device 101.

After a time interval 240, device 101 may select to conduct a resumed session 251a with network 103. Device 101 could conduct a step 252, where a step 252 is depicted and described in connection with FIG. 2b and FIG. 7a above. In step 252, device 101 could generate a random number 252a for use with the resumed session 251a. In step 252, device 101 can generate a third symmetric ciphering key S3 252b and third MAC key MAC3 252c using HKDF 252h with PSK 230-1 and the random number 252a.

At step 253, device 101 can select data for generation of MAC values in order send data to server in an authenticated manner with message integrity. Exemplary details for a step 253 by device 101 are also depicted and described in connection with FIG. 7a above. The selected data in a step 253 can comprise the identity of the PSK, which is PSK-ID 231-1 stored in a step 235 above, the device extensions 101g' selected from a step 201d' above, and the second random number random 2 252a from a step 252. At step 253, device 101 can input the selected data into the MAC algorithm 253a along with parameters and the third MAC key MAC3 252c generated in a step 252 in order to generate the MAC value tag1 253b.

Device 101 can send a message 254 to network 103 for resumption 251a, wherein message 254 includes at least PSK-ID 231-1, device extensions 110g', the random number 252a, and the MAC value tag1 253b. Device extensions 110g' can be selected and processed in a step 201d' by device 101, as depicted and described in connection with FIG. 2b above. The device extensions 110g' can be extensions for a resumed session 251a. The message 254 can comprise the equivalent of a "Client Hello" message for secure protocol, with information for conducting a resumed session 251a.

Device 101 can receive a message 261 from network 103, wherein message 261 includes plaintext 258a, a tag2 253c over plaintext 258a, and a sixth symmetric ciphertext symm-C6 102s-6. A message 261 is depicted and described in connection with FIG. 2b above. Device 101 can then conduct steps 253' and 262 in order to verify tag2 253c over plaintext 258a with the third MAC key MAC3 252c generated by device 101 in a step 252 above. At step 253' device 101 can use the step 253 depicted and described in FIG. 7a for device 101 to generate the MAC value or tag 2 253c. The plaintext for use in a step 253' can be the plaintext data 258a received in a message 261. At step 262, device 101 can compare the generated MAC value of tag2 253c from a step 253' by device 101 with the received MAC value of tag2 253c from message 261. If the generated MAC value of tag2 253c from a step 253' by device 101 is equal to or the same as the received MAC value of tag2 253c from message 261, then the device 101 can verify and authenticate that the plaintext data 258a in message 261 was transmitted by the network 103, where the network 103 also stores and operates with the PSK 230-1 derived or generated by device 101 in step 236.

Device 101 can then conduct a step 263 to decrypt the sixth symmetric ciphertext symm-C6 102s-6 using the third symmetric ciphering key S3 252b from a step 252. Device 101 can read a plaintext server hello 259a from a step 263. Although not depicted in FIG. 9b, device 101 could conduct and additional series of steps to transmit and receive encrypted and authenticated data with network 103 after the step 263.

FIG. 10a

FIG. 10a is a flow chart illustrating exemplary steps for a server to conduct multiple key encapsulation mechanisms (KEM) and resume a secure session with a "pre-shared" secret key, in accordance with exemplary embodiments. The steps and components depicted in FIG. 10a for a server 111 are also depicted and described in connection with FIG. 2a, FIG. 2b, and additional Figures above. The steps and data for server 111 to securely conduct multiple KEM and resume a secure session can comprise (i) a first portion depicted in FIG. 10a and also (ii) a continuing, second portion depicted in FIG. 10b below.

Server 111 can use the server hardware depicted for server 111 in FIG. 1 and FIG. 11 in order to conduct the steps in FIG. 10a. Note that a server 111 can conduct the additional steps as depicted in FIG. 2a, FIG. 2b, and additional Figures above. FIG. 10a provides a summary of the primary steps for a preferred embodiment where a server 111 can (i) use multiple types of KEM algorithms or parameters for multiple different KEM with a device 101 and (ii) securely resume a session from a mutually derived "pre-shared" secret key. Note that some steps can be conducted in a different order or sequence than depicted in FIG. 10a and also FIG. 10b below. As one example, a step 209 below could be conducted before a step 204, and other possibilities exist as well for the sequence of some steps without departing from the scope of the present disclosure.

Server 111 can receive a first message 202 from a device 101, wherein message 202 includes at least (i) first KEM parameters 101f-x, and (ii) a first device ephemeral public key ePK-1.device 101h-1 for KEM parameters 101f-x. As depicted and described for a message 202 in FIG. 2a, the message 202 can also include device KEM parameters 101f, where an example of KEM parameters 101f are also depicted and described in connection with FIG. 8.

Although not depicted in FIG. 10a, server 111 could conduct a step 203b using the device KEM parameters 101f, the server KEM parameters 103f, and the received device KEM parameters 101f-x for ePK-1.device 101h-1 in order to select server KEM parameters 103f-y as a subset of server KEM parameters 103f. At step 204, server 111 can use a KeyGen function to generate an ephemeral server public key ePK.server 103*h* and a corresponding server private key eSK.server 103*i* for a second set of KEM parameters 103*f-y*.

At step 209, server 111 can use both (i) the received device ephemeral public key of ePK-1.device 101*h*-1 and (ii) the specified subset of KEM parameters 101*f-x* for the device ephemeral public key and the first KEM 103*k*/101*j* in order to generate both (x) a first asymmetric ciphertext C1 102*c*-1 and (y) a first shared secret key K1 102*k*-1. A step 209 by server 111 is depicted and described in connection with FIG. 2*a* and FIG. 4 above.

At step 210, server 111 can use a hash-based key derivation function or an HMAC-based Extract-and-Expand Key Derivation Function (HKDF) 210*a* (depicted and described in FIG. 3 above) with at least the first shared secret key K1 102*k*-1 output from KEM ENCAPS function 103*k* in step 209 in order to generate both (i) a first symmetric ciphering key of S1 210*b* and (ii) a first message authentication code (MAC) key MAC1 210*c*. Additional mutually shared data 210*d* for both device 101 and server 111 could be input into HKDF 210*a* in a step 210 in order to derive both (i) (i) a first symmetric ciphering key of S1 210*b* and (ii) a first message authentication code (MAC) key MAC1 210.

At step 212 server 111 can encrypt at least ePK.server 103*h* using S1 210*b* to generate the first symmetric ciphertext symm-C1 102*s*-1. A step 212 is depicted and described in connection with FIG. 2*a* above. The encryption step 212 can also include encrypting additional data for a Server Hello 1 message 213, such as server extensions 103*g*, a server digital certificate 103*c*, KEM parameters 103*f-y* for the server ephemeral public key ePK.server 103*h*, and a server digital signature for a "CertificateVerify" value 207*c*. Server 111 can then send to device 101 (*i*) the first asymmetric ciphertext C1 102*c*-1, and (ii) the first symmetric ciphertext symm-C1 102*s*-1 in a message 213. The message 213 is also depicted and described in connection with FIG. 2*a* above, and the message 213 can comprise a second message in a first session 250.

Server 111 can then receive a third message 225 from device 101, wherein the third message 225 includes a second symmetric ciphertext symm-C2 102*s*-2 and third symmetric ciphertext symm-C3 102*s*-3. For some embodiments, the second symmetric ciphertext symm-C2 102*s*-2 can omit "double encryption" of a second asymmetric ciphertext C2 102*c*-2, and message 225 can include the second asymmetric ciphertext C2 102*c*-2 with a MAC value using MAC1 210*c*. For embodiments with the a second symmetric ciphertext symm-C2 102*s*-2 in a message 225, in a step 226 server 111 can decrypt the second symmetric ciphertext symm-C2 102*s*-2 using at least S1 210*b* to read a plaintext second asymmetric ciphertext C2 102*c*-2. The step 226 is also depicted and described in connection with FIG. 2*a* and FIG. 5 above.

At step 227, server 111 can generate a second shared secret key K2 102*k*-2 with (i) KEM DECAPS 103*j* and the second ciphertext C2 102*c*-2 from step 226 and (ii) the server private key eSK.server 103*i*-1 and KEM parameters 103*f-y*. In step 227, server 111 can generate a second symmetric ciphering key S2 221*b* and a second MAC key MAC2 221*c* using at least (i) the first shared secret key K1 102*k*-1 from a step 210 and (ii) the second shared secret key K2 102*k*-2 from the KEM DECAPS 103*j* and (iii) the HKDF 221*a*. A step 227 is also depicted and described in connection with FIG. 2*a* and FIG. 6 above. Although not depicted in FIG. 9*a*, additional shared data 221*d* that is mutually shared between device 101 and server 111 can also optionally be input into the HKDF 221*a*.

At step 230, server 111 can generate a "pre-shared" secret key PSK 230-1 for a resumed session 251 with device 101 as depicted and described in connection with FIG. 2*a* and FIG. 6 above. An HKDF 230*a* can be used with at least the (i) the first shared secret key K1 102*k*-1 from a step 210 and (ii) the second shared secret key K2 102*k*-2 from the KEM DECAPS 103*j*. The HKDF 230*a* can include additional data 230*d* that is mutually shared between device 101 and server 111. At step 231 server 111 can generate a unique identity or identifier for PSK 230-1 of PSK-ID 231-1. Server 111 can then store the PSK 230-1 and PSK-ID 231-1 in a network database 103*d* for subsequent use by either server 111 or a different server 111' in order to conduct a resumed session 251 with device 101. As depicted in FIG. 10*a*, the steps and messages for server 111 to conduct a resumed secure session 251 with device 101 continues in FIG. 10*b* below.

FIG. 10*b*

FIG. 10*b* is a flow chart illustrating exemplary steps for a server to conduct multiple key encapsulation mechanisms (KEM) and resume a secure session with a "pre-shared" secret key, in accordance with exemplary embodiments. The steps and components depicted in FIG. 10*b* for a server 111 are also depicted and described in connection with FIG. 2*a*, FIG. 2*b*, and additional Figures above. The steps and data for server 111 to securely conduct multiple KEM and resume a secure session can comprise (i) a first portion depicted in FIG. 10*a* above and also (ii) a continuing, second portion depicted in FIG. 10*b* herein.

Server 111 can use the server hardware depicted for server 111 in FIG. 1 and FIG. 11 in order to conduct the steps in FIG. 10*b*. Note that a server 111 can conduct the additional steps as depicted in FIG. 2*a*, FIG. 2*b*, and additional Figures above. FIG. 10*a* provides a summary of the primary steps for a preferred embodiment where a server 111 can (i) use multiple KEM algorithms or parameters for different KEM (including ENCAPS and DECAPS) with a device 101 and (ii) securely resume a session from a mutually derived "pre-shared" secret key 230-1. Note that some steps can be conducted in a different order or sequence than depicted in FIG. 10*a* above and also FIG. 10*b* herein. As one example, a step 253' below could be conducted before a step 256, and other possibilities exist as well for the sequence of some steps without departing from the scope of the present disclosure.

At step 232, server 111 can encrypt at least the PSK-ID 231-1 into a fourth symmetric ciphertext symm-C4 102*s*-4 using at least the second symmetric ciphering key S2 221*b* derived from a step 227. A step 232 is also depicted and described in connection with FIG. 2*a* above. At step 232, server 111 can select a plaintext comprising at least the PSK-ID 231-1 from a step 231 for encryption into the fourth symmetric ciphertext symm-C4 102*s*-4. The plaintext selected in a step 232 could also include additional data for device 101, such as the "application data" depicted in FIG. 2*a* within a message 233. The plaintext selected in a step 232 could also include a secure hash value for a "server finished" field within the message 233, similar to the "client finished" hash value 222*b* in a step 228 in FIG. 6. The encryption in a step 232 with keys S2 221*b* and MAC key 221*c* can be equivalent to a step 228 by server 111 depicted in FIG. 5 above, except using the keys for symmetric encryption and MAC value generation instead of symmetric decryption and MAC value verification. The output from the encryption and MAC value generation in a step 232 can comprise the fourth symmetric ciphertext symm-C4 102*s*-4.

Server 111 can then send device 101 a message 233 comprising (i) the fourth symmetric ciphertext C4 102*s*-4 from the step 232 above. A message 233 is also depicted and described in connection with FIG. 2*a* above. Although not depicted in FIG. 10*b*, server 111 could then continue the first session 250 by sending and receiving encrypted and authenticated application data in a step 237*b*, where a step 237*b* is depicted and described in connection with FIG. 2*a*. At the conclusion of a step 237*b*, server 111 can then close or finish the first session 250 with a message 238 as depicted and described in connection with FIG. 2*a* above.

After a period of time 240*a* as depicted and described in connection with FIG. 2*a*, server 111 can then receive a message 254 from a device 101 for resumption 251*a*, wherein message 254 includes at least PSK-ID 231-1, a random number 252*a*, and a MAC value tag1 253*b*. The message 254 is depicted and described in connection with FIG. 2*c* above. Additional data could be included in a message 254, such as device extensions 101*g*' for a resumed session 251*a*. Although not depicted in FIG. 10*b*, the message received by server 111 could be a message 254' as depicted and described in connection with FIG. 2*c*, where the message 254 could also include a second device ephemeral public key ePK-2.device 101*h*-2.

Although not depicted in FIG. 10*b*, server 111 can conduct a step 255 from FIG. 2*c* to use the received PSK-ID 231-1 from the message 254 to securely query the network database 103*db* for the corresponding PSK 230-1. At step 252, server 111 can generate a third symmetric ciphering key S3 252*b* and third MAC key MAC3 252*c* using HKDF 252*h* with at least PSK 230-1 and random number 252*a*. A step 252 for server 111 is also depicted and described in connection with FIG. 2*b* and FIG. 7*a* above. The HKDF 252*h* can include additional data 252*d* that is mutually shared between device 101 and server 111.

At step 253, server 111 can generate a value tag1 253*b* using MAC3 252*c* and plaintext from message 254, such as the PSK-ID 231-2. A step 253 for server 111 is also depicted and described in connection with FIG. 2*b* and FIG. 7*a* above. At step 256, the generated value tag1 253*b* can be compared with received tag1 253*b* in order to authenticate and verify the message 254 was transmitted by device 101.

Although not depicted in FIG. 10*b*, server 111 could conduct a step 258 in order to select a plaintext 258*a* for a response message 261 from server 111 to device 101. The step 258 was depicted and described in connection with FIG. 2*b* above. Server 111 can then conduct a step 253' to generate value tag2 253*c* using MAC3 252*c* and plaintext 258*a* for a response message 261. A step 253' for server 111 is also depicted and described in connection with FIG. 2*b* above. The step 253' can correspond to the step 253 for server 111 depicted and described in connection with FIG. 7*a*, except using plaintext 258*a* for input into the MAC algorithm 253*a*. At step 253', server 111' can input the plaintext data 258*a* into the MAC algorithm 253*a* along with parameters and the third MAC key MAC3 252*c* generated in a step 252 in order to generate the second MAC value tag2 253*c*. In this manner, a step 253' can be used for verification of the plaintext 258*a* from server 111 in a subsequent message 261.

Although not depicted in FIG. 10*b*, server 111 could conduct a step 259 in order to select server hello data 259*a* for a response message 261 from server 111 to device 101. The step 259 and server hello data 259*a* was depicted and described in connection with FIG. 2*b* above. At step 260, server 111 can encrypt server hello data 259*a* using the third symmetric ciphering key S3 252*b* from a step 252 to create a sixth symmetric ciphertext symm-C6 102*s*-6. The step 260 by server 111 is also depicted and described in connection with FIG. 2*b* above. Server 111' can then use the network interface 111*d* to transmit or send the second "Server Hello" message 261 to device 101, where the message 261 can include at least plaintext data 258*a*, the second MAC value of the tag2 253*c*, and the sixth symmetric ciphertext symm-C6 102*s*-6 as encrypted server hello data 259*a*.

For some embodiments, a different server 111' than server 111 in network 103 can conduct the series of steps 254 through 261 in FIG. 10*b*, such as if network 103 uses a load balancer and the message 254 is received by the server 111' and the message 202 is received by a server 111. Or, if server 111 receives both the message 202 and message 254, then a server 111 could conduct all of the steps and send/receive all of the messages described in FIG. 10*a* and FIG. 10*b*.

FIG. 11

FIG. 11 is a graphical illustration of hardware, firmware, and software components for a server and a device, in accordance with exemplary embodiments. FIG. 11 is illustrated to include several components that can be common within a server 111 and a device 101. Server 111 can include or operate with server hardware 111*h* and the device 101 can include or operate with device hardware 101*u*. Server 111 may consist of multiple electrical components in order to communicate with a plurality of devices 101 over time. In exemplary embodiments and as depicted in FIG. 11, server 111 can include a server identity 111*a*, a processor 111*p* (depicted as "CPU 111*p*"), random access memory (RAM) 111*m*, storage memory 111*b* (depicted as "nonvolatile memory 111*b*"), a Wide Area Network (WAN) interface 111*d*-1, a LAN interface 111*d*-2, a system bus 111*c*, and a user interface (UI) 111*y*.

Server identity 111*a* could comprise a preferably unique alpha-numeric or hexadecimal identifier for server 111, such as an Ethernet MAC address, a domain name service (DNS) name, a Uniform Resource Locator (URL), an owner interface identifier in an IPv6 network, a serial number, an IP address, or other sequence of digits to uniquely identify each of the many different possible nodes for a server 111 connected to an IP network 107. Server identity 111*a* can preferably be recorded in a non-volatile memory and recorded by a network 103 upon configuration of a server 111, such as during a configuration step 201*c* depicted and described in connection with FIG. 2*a* above. Server identity 111*a* may also be a number or string to identify an instance of server 111 running in a cloud or virtual networking environment. For some embodiments, server identity 111*a* can be the same as network identity 103*a*.

In exemplary embodiments, server 111 can operate with multiple different server identities 111*a*, such as a server identity 111*a* comprising a DNS name and a second server identity 111*a* comprising an IP address and a port number. A third server identity 111*a* could comprise an MAC address for WAN interface 111*d*-1. A fourth server identity 111*a* can comprise an identifier for an instance of a virtual machine operating in a cloud networking environment. A different server 111 could be associated with a different IP address and port number or a different MAC address for WAN interface 111*d*-1. In exemplary embodiments, (i) a server 111 with a server identity 111*a* can operate with a first Internet Protocol address and port (IP:port) number with a first set of server extensions 103*g* and (ii) a second or different server 111 with a second server identity 111*a* can operate with a second IP:port number and a second set of server extensions 103*g*. Other possibilities exist as well for the use of a plurality of different server identities 111*a* without departing from the scope of the present disclosure.

The CPU 111*p* can comprise a general purpose processor appropriate for higher processing power requirements for a server 111, and may operate with multiple different processor cores. CPU 111*p* can comprise a processor for server 111 such as an ARM® based processor or an Intel® based processor such as belonging to the XEON® family of processors, and other possibilities exist as well. For some exemplary embodiments, the CPU 111*p* can be based on a processor using the RISC-V architecture. CPU 111*p* can utilize bus 111*c* to fetch instructions from RAM 111*m* and operate on the instruction. CPU 111*p* can include components such as registers, accumulators, and logic elements to add, subtract, multiply, and divide numerical values and record the results in RAM 111*m* or storage memory 111*b*, and also write the values to an external interface such as WAN interface 111*d*-1 and/or LAN interface 111*d*-2. In exemplary embodiments, CPU 111*p* can perform the mathematical calculations for KEM DECAPS 103*j*, KEM ENCAPS 103*k*, symmetric ciphering, etc. depicted and described in connection with in FIG. 1, FIG. 2*a*, etc., above. A CPU 111*p* could also comprise a "system on a chip" (SOC) with a plurality of cores, including examples of the Amazon Graviton family of processors such as the Graviton 2 or the Apple "M" family of processors such as the M1 MAX, M2, etc.

For servers 111 operating as a virtual machine or a container such as, but not limited to, within Docker or Kubernetes, the server 111 could be allocated a portion of a physical processor CPU 111*p* from a host operating system in order for the server 111 to conduct processing and computational steps as contemplated herein. The portion of a physical processor CPU 111*p* for the server 111 could comprise different embodiments without departing from the scope of the present disclosure. A CPU 111*p* for a server 111 could comprise a "time slice" of a physical SOC within a physical host server (such as repeated brief periods of time on the order of milliseconds or less for CPU 111*p*) that is shared with other processes or virtual machines running on the host. The CPU 111*p* for a server 111 could comprise a dedicated (for a period of time) processing core of a physical SOC within a physical host server. Or, the CPU 111*p* for a server could comprise a combination of the allocation of resources from a physical SOC within a physical host server as described in the previous two sentences.

CPU 111*p* can also include a secure processing environment (SPE) 111*u* in order to conduct post-quantum cryptography (PQC) key encapsulation mechanism (KEM) operations and algorithms, such as, but not limited to, (i) conducting KEM ENCAPS function 103*k* depicted and described in connection with FIG. 1 above and (ii) conducting HKDF function 210*a* in order to derive first shared secret key K1 102*k*-1. SPE 111*u* can comprise a dedicated area of silicon or transistors within CPU 111*p* in order to isolate the PQC KEM operations from other programs or software operated by CPU 111*p*, including many processes or programs running operating system 111*g*. SPE 111*u* could contain RAM memory equivalent to RAM 111*m* and nonvolatile memory equivalent to storage memory 111*b*, as well as a separately functioning processor on a smaller scale than CPU 111*p*, such as possibly a dedicated processor core within CPU 111*p*. SPE 111*u* can comprise a "secure enclave" or a "secure environment", based on the manufacturer of CPU 111*p*. In some exemplary embodiments, an SPE 111*u* can be omitted and the CPU 111*p* can conduct PQC KEM and general cryptographic calculations without an SPE 111*u*.

A processor 111*p* for server 111 could include a hardware random number generator 128. The hardware random number generator 128 can use a sensor such as a sensor in server 111 to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number can also be used to generate the value M1 208*a* as a random number for the KEM ENCAPS function 103*k* in a step 208 above. Other random numbers used by a server 111 herein can be generated with hardware random number generator 128.

RAM 111*m* may comprise a random access memory for server 111. RAM 111*m* can be a volatile memory providing rapid read/write memory access to CPU 111*p*. RAM 111*m* could be located on a separate integrated circuit in server 111 or located within CPU 111*p*. The RAM 111*m* can include data recorded in server 111 for the operation when communicating with a plurality of devices 101 or a device 101. RAM 111*m* may be connected to CPU 111*p* using a system bus 111*c* which could comprise a memory bus, such as supporting DDR5 RAM memory and other possibilities exist as well. As depicted and described in connection with FIG. 1 above, RAM 111*m* could also include an operating system 111*g*, or components of an operating system 111*g* such as a kernel, and other components of operating system 111*g*, such as some supporting libraries could be stored within storage memory 111*b*. In other words, although operating system (OS) 111*g* is depicted in FIG. 11 as being stored within nonvolatile memory 111*b*, some portions of OS 111*g* could be stored within RAM when server 111 operates (such as the kernel), and other portions could be stored in nonvolatile memory 111*b*, such as device drivers.

The system bus 111*c* may be any of several types of bus structures including a memory bus or memory controller, a peripheral bus, and a local bus using any of a variety of bus architectures including a data bus. System bus 111*c* connects components within server 111 as illustrated in FIG. 11, such as transferring electrical signals between the components illustrated. Server 111 can include multiple different versions of bus 111*c* to connect different components, including a first system bus 111*c* between CPU 111*p* and RAM 111*m* (which could be a memory bus), and a second system bus 111*c* between CPU 111*p* and WAN interface 111*d*-1 or LAN interface 111*d*-2, which could be an I2C bus, an SPI bus, a PCI bus, or similar data busses.

In exemplary embodiments, RAM 111*m* operating with server 111 can record values and algorithmic steps or computer instructions for securely conducting a post-quantum cryptography (PQC) key encapsulation mechanisms (KEM). RAM 111*m* may also store the value M1 208*a* from a step 208 above in FIG. 1. RAM 111*m* may store the computer executable instructions for conducting the steps and associated variables and values or constants for steps 203*a*, 203*b*, 204, 205, 208, 209, 206, 207, 210, 211, 212, 226, 227, 228, 229, 230, 231, 232, 255, 252, 253, 256, 257, 258, 253', 259, 260, 266, 203*a'*, 208', 209', 267, 268, 269, and 270 which are depicted and described in connection with FIGS. 2*a* through 2*c* above and also previous Figures herein. A select portion of the above steps are depicted in FIG. 11 above for RAM 111*m* memory in server 111, although data for all of the above steps could be stored in RAM 111*m* during a first session 250 and a resumed session 251. The exemplary steps depicted in RAM 111*m* listed in the above sentence can comprise computer executable instructions for the processor CPU **111*p* as well as memory cells for storing constants and variables associated with conducting the computer executable instructions. The computer executable instructions for the different steps can be stored in storage memory 111*b* when the server 111 is powered off or in an extended sleep state (such as greater than 10 seconds). The computer executable instructions can be moved by an OS 111*g* from the storage memory 111*b* to the RAM 111*m* during a boot process or a process for the server 111 to begin supporting communications with at least one device 101**.

Note that the associated data or values for the steps can also be stored within RAM **111*m* for a period of time to both conduct the step and use the resulting data in subsequent steps. As one example, in a step 210 to conduct a hash based key derivation function (HKDF) 210*a* (depicted and described in connection with FIG. 3 above), the output from a step 209 comprising a first shared secret key K1 102*k*-1 can be stored in RAM 111*m* and be input into the HKDF 210*a*. In other words and as one example, the depiction of a step 210 in RAM 111*m* can include both (i) the computer executable instructions to conduct the step and (ii) the data or values associated with the step such as the first shared secret key K1 102*k*-1 generated or processed by the step. Consequently, a step depicted in RAM 111*m* can include all of the associated data and instructions or logic to conduct the step, where details for the steps are depicted in the Figures above. The output of the HKDF 210*a* can comprise the first shared symmetric ciphering key S1 210*b* and MAC key MAC1 210*c*, which could also be stored within RAM 111*m* and within physical memory associated with a step 210 allocated to RAM 111*m***.

As another example for RAM **111*m* within server 111 or allocated to server 111, RAM 111*m* could store both computer executable instructions and associated values for a step 227 as depicted in FIG. 5 above. The step 227 within RAM could include the data from message 213, the first shared secret key K1 102*k*-1, the second shared secret key K2 102*k*-2 (received from a message 225 from device 101), and the HDKF 221*a*, as well as the second symmetric ciphering key S2 221*b* and MAC key MAC2 221*c*. For some data within RAM 111*m* for step 227, the depicted data for a step 227 or recited data from the previous sentence could comprise a pointer within RAM 111*m* for a step 227, such that the data could be recorded or stored within RAM 111*m* in a different location within RAM 111*m* than the memory allocated to data for step 227 within RAM 111*m*. For embodiments where CPU 111*p* includes an SPE 111*u*, then the data for step 227 (as well as similar steps for processing KEM functions or processing with symmetric ciphering keys and MAC keys) could be stored within RAM memory within the SPE 111*u* instead of general RAM 111*m* for the server 111 or 111'**.

Nonvolatile memory 111b or "storage memory" **111*b* (which can also be referred to herein as "memory 111*b*") within server 111 can comprise a non-volatile memory for long-term storage of data, including times when server 111 may be powered off or within an extended sleep state such as a sleep state longer than a few seconds. Memory 111*b* may be a NAND flash memory or a NOR flash memory and record firmware for server 111, such as a bootloader program and OS 111*g*. Memory 111*b* can record long-term and non-volatile storage of data or files for server 111. In an exemplary embodiment, OS 111*g* is recorded in memory 111*b* when server 111 is powered off, and portions of memory 111*b* are moved by CPU 111*p* into RAM 111*m* using a boot loader when server 111** powers on.

Memory **111*b* (i) can be integrated with CPU 111*p* into a single integrated circuit (potentially as a "system on a chip"), or (ii) operate as a separate integrated circuit or a removable card or "disk", such as a solid state drive (SSD). Storage memory 111*b* can also comprise a plurality of spinning hard disk drives in a redundant array of independent disks (RAID) configuration. Memory 111*b* may also be referred to as "server storage" and can include exemplary file systems of FAT16, FAT 32, NTFS, ext3, ext4, UDF, or similar file systems. As contemplated herein, the terms "memory 111*b*", "storage memory 111*b*", and "nonvolatile memory 111*b*" can be considered equivalent. As depicted in FIG. 11, non-volatile memory 111*b* can record cryptographic algorithms 103*s*, cryptographic parameters 103*x*, server PQC KEM parameters 103*f*, and at least one server identity of 111*a***.

When server 111 is powered off, nonvolatile memory **111*b* can store an operating system (OS) 101*g* from a step 201*c*. When server 111 is powered on, RAM memory 111*m* could store portions of the OS 101*g*. The operating system (OS) 111*g* can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 111*b*, etc. The operating system 111*g* may include timers and schedulers for managing the access of software to hardware resources within server 111, where the hardware resources managed by OS 111*g* can include CPU 111*p*, RAM 111*m*, nonvolatile memory 111*b*, and system bus 111*c*, and well as connections to the IP network 107 via a WAN interface 111*d*-1 and also the network database 103*db* via LAN interface 111*d*-2. The operating system shown of 111*g* can be appropriate for a higher power computing device with more memory and CPU resources (compared to a device 101). Example operating systems 111*g* for a server 111** includes Linux or Windows® Server, and other possibilities exist as well.

As depicted in FIG. 11, OS **111*g* in FIG. 11 can contain algorithms, programs, or computer executable instructions (by processor 111*p* or SPE 111*u*) for conducting both (i) a first secure session 250 with the device 101 and (ii) a resumed session 251. Example steps depicted include the steps to process the transmission of a message 213 and send a message 233. An OS 111*g* can include algorithms for the server 111 to conduct a step 203*a* for processing a message 202 from device 101, where the message 202 and steps 203*a* is depicted and described in connection with FIG. 2*a* above. An OS 111*g* could also store server extensions 103*g*. An OS 111*g* can also include the executable instructions for processor 111*p* to send messages, such as but not limited to, a message 213 as depicted and described above in connection with FIG. 2*a*. In other words, OS 111*g* can include libraries and drivers such that the message 213 could be assembled based on the output and data from the series of steps 203*a* through 212 depicted and described in connection with FIG. 2*a*, and then the OS 111*g* could write the data for message 213 via the system bus 111*c* to the WAN interface 111*d*-1, where the WAN interface 111*d*-1 can subsequently transmit the message 213 to the IP network 107. Equivalent steps by OS 111*g* could be taken to receive message 225**.

An OS **111*g* can also include the executable instructions for processor 111*p* to receive messages such as, but not limited to, a message 254 and 254' as depicted and described above in connection with FIG. 2*b* and FIG. 2*c*. In other words, OS 111*g* can include libraries and drivers such that the message 254 could be received from the IP network 107 using the WAN interface 111*d*-1 and system bus 111*c*. The OS 111***g* could parse the data received in a message 254 and store contents from the message 254 in RAM 111*m* such that the server 111 could conduct the subsequent steps using the data from the message 254. The OS 111*g* could write data from the message 254 to RAM 111*m*, and then the computer executable steps in RAM 111*m* such as associated with steps 255 through 260 could process the data from a message 254. The receipt of a message 254 and then steps 255 through 260 using the data from a message 254 is also depicted and described in connection with FIG. 2*b* above.

Server 111 can include a WAN interface 111*d*-1 to communicate with IP network 107 and a plurality of devices 101, as depicted in FIG. 1 above (where FIG. 1 depicts a single device 101). WAN interface 111*d*-1 can comprise either a wired connection such as Ethernet or a wireless connection. For wireless configurations of server 111, then WAN interface 111*d*-1 can comprise a radio, which could connect with an antenna in order to transmit and receive radio frequency signals. For a wireless configuration of server 111, WAN interface 111*d*-1 within server 111 can provide connectivity to an IP network 107 through 3GPP standards such as 3G, 4G, 4G LTE, and 5G networks, or subsequent and similar standards.

Server 111 may also operate a LAN interface 111*d*-2, where LAN interface 111*d*-2 can be used to connect and communicate with other servers in a network 103, such as a network database 103*db* through private network. LAN interface 111*d*-2 can comprise a physical interface connected to system bus 111*c* for server 111. In exemplary embodiments, LAN interface 111*d*-2 can comprise an Ethernet or fiber optic physical connection. In other words, (i) LAN interface 111*d*-2 can connect server 111 to private network (which could comprise an IP network with private IP addresses that are not globally routable), and (ii) WAN interface 111*d*-1 can comprise an interface for communicating with a plurality of devices 101 through potentially insecure networks such as the globally routable public Internet. The use of a separate WAN interface 111*d*-1 and LAN interface 111*d*-2 can increase the security of operation for server 111. However, the use of separate physical interfaces for LAN interface 111*d*-2 and WAN interface 111*d*-1 can be omitted, and a single physical interface such as Ethernet or fiber-optic could be used by server 111 to communicate with both devices 101 and at least a device 101.

Server 111 may also optionally include user interface Illy which may include one or more sub-servers for receiving inputs and/or one or more sub-servers for conveying outputs. User interfaces are known in the art and may be simple for many servers 111 such as a few LED lights or and LCD display, and thus user interfaces are not described in detail here. User interface 111*y* could comprise a touch screen or screen display with keyboard and mouse, if server 111 has sophisticated interaction with a user, such as a network administrator. Server 111 can optionally omit a user interface 111*y*, if no user input or display is required for establishing communications within a network 103 and/or IP network 107.

Although not depicted in FIG. 11, server 111 can include other components to support operation, such as a clock, power source or power connection, antennas, etc. Other possibilities exist as well for hardware and electrical components operating in a server 111 without departing from the scope of the present disclosure. Using the electrical components depicted in FIG. 11, a server 111 could send and receive the data 106 in FIG. 1 in an encrypted and secure manner after conducting the authenticated PQC KEM steps as contemplated herein, in order to conduct secure communications with a plurality of devices 101. Using the electrical components depicted in FIG. 11, a server 111 could conduct both a first session 250 depicted and described in connection with FIG. 2*a* and a resumed session 251 depicted and described in connection with FIG. 2*b* and FIG. 2*c*.

Device 101 may consist of multiple electrical components in order to communicate with a plurality of servers 111 or servers 111' over time. In exemplary embodiments and as depicted in FIG. 11, device 101 with device hardware 101*u* can include a device identity 101*aa*, a processor 101*p* (depicted as "CPU 101*p*"), random access memory (RAM) 101*m*, storage memory 101*bb* (depicted as "nonvolatile memory 101*bb*, a network interface 101*r* (which could comprise a radio), a system bus 101*t*, and a user interface (UI) 101*w*. For some embodiments, a device 101 could also comprise a server for "server to server" communications, where the server as a device 101 operates in a "client mode" and the server as device 101 initiates the first session 250 with a message 202 in FIG. 2*a*.

Device identity 101*aa* could comprise a preferably unique alpha-numeric or hexadecimal identifier for device 101, such as an Ethernet MAC address, a domain name service (DNS) name, a subscriber permanent identifier (SUPI), an international mobile subscriber identity (IMSI), a network access identifier (NAI), an owner interface identifier in an IPv6 network, a serial number, an IP address, or other sequence of digits to uniquely identify each of the many different possible devices for a device 101 connected to an IP network 107. Device identity 101*aa* can preferably be recorded in a non-volatile memory and recorded by a device 101 upon configuration of a device 101, such as during a configuration step 201*b* depicted and described in connection with FIG. 2*a* above. For embodiments where device 101 operates as a server, then the device identity 101*aa* could also comprise a server identity 111*a* depicted and described for a server 111 above.

In exemplary embodiments, device 101 can operate with multiple different device identities 111*a*, such as a first device identity 101*aa* comprising device name within a device certificate 101*c* and a second device identity 101*aa* comprising a SUPI for use with a radio for network interface 101*r*. A third device identity 101*aa* could comprise an MAC address for network interface 101*r*. Different devices 101 could be associated with different device identities 101*aa*. Other possibilities exist as well for the use of a plurality of different device identities 101*aa* without departing from the scope of the present disclosure.

The CPU 101*p* can comprise a general purpose processor appropriate for lower processing power requirements for a device 101 compared to a server 111 with CPU 101*p*, and may operate with multiple different processor cores. CPU 101*p* can comprise a processor for device 101 such as an ARM® based processor or an Intel® based processor such as belonging to the ATOM® family of processors, and other possibilities exist as well. For some exemplary embodiments, the CPU 101*p* can be based on a processor using the RISC-V architecture. CPU 101*p* can utilize bus 111*c* to fetch instructions from RAM 101*m* and operate on the instruction. CPU 101*p* can include components such as registers, accumulators, and logic elements to add, subtract, multiply, and divide numerical values and record the results in RAM 101*m* or storage memory 101*bb*, and also write the values to an external interface such as network interface 101*r*. In exemplary embodiments, CPU 101*p* can perform the mathematical calculations for KEM DECAPS 101*j*, KEM ENCAPS 101*k*, symmetric ciphering, etc. depicted and described in connection with in FIG. 1, FIG. 2*a*, etc., above. A CPU 101*p* could also comprise a "system on a chip" (SOC) with a plurality of cores, including examples of the Apple "M" family of processors such as the M1 MAX, M2, etc. For embodiments where device 101 operates as a server, then the CPU 101*p* could also function as a CPU 111*p* for a server 111 depicted and described for a server 111 above.

For device 101 operating as a server, then the device 101 could also operate as a virtual machine or a container such as, but not limited to, within Docker or Kubernetes. The device 101 could be allocated a portion of a physical processor CPU 101*p* from a host operating system in order for the device 101 to conduct processing and computational steps as contemplated herein. The portion of a physical processor CPU 101*p* for the device 101 could comprise different embodiments without departing from the scope of the present disclosure. A CPU 101*p* for a device 101 could comprise a "time slice" of a physical SOC within a physical host computing device (such as repeated brief periods of time on the order of milliseconds or less for CPU 101*p*) that is shared with other processes or virtual machines running on the host. The CPU 101*p* for a device 101 could comprise a dedicated (for a period of time) processing core of a physical SOC within a physical host server. Or, the CPU 101*p* for a device 101 could comprise a combination of the allocation of resources from a physical SOC within a physical host computing device as described in the previous two sentences.

CPU 101*p* can also include a secure processing environment (SPE) or tamper resistant secure hardware (TRSH) 113 described for device 101 in FIG. 1 above. The SPE or TRSH conduct post-quantum cryptography (PQC) key encapsulation mechanism (KEM) operations and algorithms, such as, but not limited to, (i) conducting KEM ENCAPS function 101*k* depicted and described in connection with FIG. 1 above and (ii) conducting HKDF function 210*a* in order to derive first shared secret key K1 102*k*-1. SPE or TRSH 113 can comprise a dedicated area of silicon or transistors within CPU 101*p* in order to isolate the PQC KEM operations from other programs or software operated by CPU 101*p*, including many processes or programs running operating system 101*g*. SPE 111*u* could contain RAM 101*m*' memory equivalent to RAM 101*m* and nonvolatile memory equivalent to storage memory 101*bb*, as well as a separately functioning processor on a smaller scale than CPU 101*p*, such as possibly a dedicated processor core within CPU 101*p*. SPE or TRSH 113 can comprise a "secure enclave" or a "secure environment", based on the manufacturer of CPU 101*p*. In some exemplary embodiments, an SPE or TRSH 113 can be omitted and the CPU 101*p* can conduct PQC KEM and general cryptographic calculations without an SPE or TRSH 113.

A processor 101*p* for device 101 could include a hardware random number generator 128. The hardware random number generator 128 can use a sensor such as a sensor 101*y* in device 101 to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number can also be used to generate the value M2 219*a* as a random number for the KEM ENCAPS function 101*k* in a step 219 above. The hardware random number generator in CPU 101*p* can also be used to derive device ephemeral public keys ePK.device 101*h*. Other random numbers used by a device 101 for conducting or processing a first session 250 and a resumed session 251 can be generated with hardware random number generator 128.

RAM 101*m* may comprise a random access memory for device 101. RAM 101*m* can be a volatile memory providing rapid read/write memory access to CPU 101*p*. RAM 101*m* could be located on a separate integrated circuit in device 101 or located within CPU 101*p*. The RAM 101*m* can include data recorded in device 101 for the operation when communicating with a server 111 or 111'. RAM 101*m* may be connected to CPU 101*p* using a system bus 101*t* which could comprise a memory bus, such as supporting DDR5 RAM memory and other possibilities exist as well. Although not depicted in FIG. 11, RAM 101*m* could also include an operating system 101*gg*, or components of an operating system 101*gg* such as a kernel, and other components of operating system 101*gg*, and some supporting libraries could be stored within nonvolatile memory. In other words, although operating system (OS) 101*gg* is depicted in FIG. 11 as being stored within nonvolatile memory 101*bb*, some portions of OS 101*gg* could be stored within RAM when device 101 operates (such as the kernel), and other portions could be stored in nonvolatile memory 101*bb*, such as device drivers.

The system bus 101*t* may be any of several types of bus structures including a memory bus or memory controller, a peripheral bus, and a local bus using any of a variety of bus architectures including a data bus. System bus 101*t* connects electrical components within device 101 as illustrated in FIG. 11, such as transferring electrical signals between the components illustrated. Device 101 can include multiple different versions of bus 101*t* to connect different components, including a first system bus 101*t* between CPU 101*t* and RAM 101*m* (which could be a memory bus), and a second system bus 101*t* between CPU 101*p* and network interface 101*r*, which could be an I2C bus, an SPI bus, a PCI bus, or similar data busses.

In exemplary embodiments, RAM 101*m* operating with device 101 can record values and algorithmic steps or computer instructions for securely conducting a post-quantum cryptography (PQC) key encapsulation mechanisms (KEM). RAM 101*m* may also store the value M2 219*a* from a step 208 above in FIG. 1. RAM 101*m* may store the computer executable instructions for conducting the steps and associated variables and values or constants for steps 201*d*, 201*e*, 201*f*, 214, 215, 216, 217, 218, 219, 220, 221, 222, 223, 224, 234, 235, 236, 237*a*, 201*d*', 201*e*', 252, 253, 201*f*, 271, 214', 268, 269, 272, and 273 which are depicted and described in connection with FIGS. 2*a* through 2*c* above and also previous Figures herein. A select portion of the above steps are depicted in FIG. 11 above for RAM 101*m* memory in device 101, although data for all of the above steps could be stored in RAM 101*m* during a first session 250 and a resumed session 251. The exemplary steps depicted in RAM 101*m* listed in the above sentence can comprise computer executable instructions for the processor CPU 101*p* as well as memory cells for storing constants and variables associated with conducting the computer executable instructions. The computer executable instructions for the different steps can be stored in storage memory 101*bb* when the device 101 is powered off or in an extended sleep state (such as greater than an hour). The computer executable instructions can be moved by an OS 101*gg* from the storage memory 101*bb* to the RAM 101*m* during a boot process or a process for the device 101 to begin supporting communications with at least one device 101.

Note that the associated data or values for the steps can also be stored within RAM 101*m* for a period of time to both conduct the step and use the resulting data in subsequent steps. As one example, in a step 252 to conduct a hash based key derivation function (HKDF) 252*h* (depicted and described in connection with FIG. 7*a* above), the output from a step 230 comprising PSK 230-1 can be stored in RAM 101*m* and be input into the HKDF 252*h*. In other words and as one example, the depiction of a step 252 in RAM 101*m* can include both (i) the computer executable instructions to conduct the step and (ii) the data or values associated with the step such as the PSK 230-1 processed by the step. Consequently, a step depicted in RAM 101*m* can include all of the associated data and instructions or logic to conduct the step, where details for the steps are depicted in the Figures above. The output of the HKDF 252*h* can comprise the third shared symmetric ciphering key S3 252*b* and MAC key MAC3 252*c*, which could also be stored within RAM 101*m* and within physical memory associated with a step 252 allocated to RAM 101*m*.

As another example for RAM 101*m* within device 101 or allocated to device 101, RAM 101*m* could store both computer executable instructions and associated values for steps 220 and 221 as depicted in FIG. 5 above. The steps 220 and 221 within RAM 101*m* could include the data for message 213, the first shared secret key K1 102*k*-1, the second shared secret key K2 102*k*-2, and the HDKF 221*a*, as well as the second symmetric ciphering key S2 221*b* and MAC key MAC2 221*c*. For some data within RAM 101*m* for steps 220 and 221, the depicted data for steps 220 and 221 or recited data from the previous sentence could comprise a pointer within RAM 101*m* for steps 220 and 221, such that the data could be recorded or stored within RAM 101*m* in a different location within RAM 101*m* than the memory allocated to data for steps 220 and 221 within RAM 101*m*. For embodiments where CPU 101*p* includes a SPE or TRSH 113, then the data for steps 220 and 221 (as well as similar steps for processing KEM functions or processing with symmetric ciphering keys and MAC keys) could be stored within RAM 101*m*' within the SPE or TRSH 113 instead of general RAM 101*m* for the device 101.

Nonvolatile memory 101*bb* or "storage memory" 101*bb* (which can also be referred to herein as "memory 101*bb*") within device 101 can comprise a non-volatile memory for long-term storage of data, including times when device 101 may be powered off or within an extended sleep state such as a sleep state longer than several minutes. Memory 101*bb* may be a NAND flash memory or a NOR flash memory and record firmware for device 101, such as a bootloader program and OS 101*gg*. Memory 101*bb* can record long-term and non-volatile storage of data or files for device 101. In an exemplary embodiment, OS 101*gg* is recorded in memory 101*bb* when device 101 is powered off, and portions of memory 101*bb* are moved by CPU 101*p* into RAM 101*m* using a boot loader when device 101 powers on.

Memory 101*bb* (i) can be integrated with CPU 101*p* into a single integrated circuit (potentially as a "system on a chip"), or (ii) operate as a separate integrated circuit or a removable card or "disk", such as a solid state drive (SSD). Storage memory 101*bb* can also comprise a plurality of spinning hard disk drives in a redundant array of independent disks (RAID) configuration. Memory 101*bb* may also be referred to as "device storage" and can include exemplary file systems of FAT16, FAT 32, NTFS, ext3, ext4, UDF, or similar file systems. As contemplated herein, the terms "memory 101*bb*", "storage memory 101*bb*", and "nonvolatile memory 101*bb*" can be considered equivalent. As depicted in FIG. 11, non-volatile memory 101*bb* can record cryptographic algorithms 101*s*, cryptographic parameters 101*x*, device PQC KEM parameters 101*f*, and at least one device identity of 101*aa*.

When device 101 is powered off, nonvolatile memory 101*b* can store an operating system (OS) 101*g* from a step 201*b*. When device 101 is powered on, RAM memory 101*m* could store portions of the OS 101*gg*. The operating system (OS) 101*gg* can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 101*bb*, etc. The operating system 101*gg* may include timers and schedulers for managing the access of software to hardware resources within device 101, where the hardware resources managed by OS 101*gg* can include CPU 101*p*, RAM 101*m*, nonvolatile memory 101*bb*, and system bus 101*t*, and well as connections to the IP network 107 via a network interface 101*r*. The operating system shown of 101*gg* can be appropriate for lower power computing device with less memory and CPU resources (compared to a server 111). Example operating systems 101*gg* for a device 101 includes Linux or Android, and other possibilities exist as well.

As depicted in FIG. 11, OS 101*gg* in FIG. 11 can contain algorithms, programs, or computer executable instructions (by processor 101*p* or SPE 113) for conducting both (i) a first secure session 250 with the server 111 and (ii) a resumed session 251. Example steps depicted within OS 101*gg* include the steps to process the transmission of a message 202 and process and select device extensions 101*g*. An OS 101*gg* can include algorithms for the device 101 to conduct a step 201*d* for processing a message 202 from device 101, where the message 202 and steps 201*d* is depicted and described in connection with FIG. 2*a* above. An OS 101*gg* could also store and process device extensions 101*g*. An OS 101*gg* can also include the executable instructions for processor 101*p* to send messages, such as but not limited to, a message 225 as depicted and described above in connection with FIG. 2*a* and a message 254 as depicted and described above in connection with FIG. 2*b*. In other words, OS 101*gg* can include libraries and drivers such that the message 254 could be assembled based on the output and data from the series of steps 201*d*' through 201*f* depicted and described in connection with FIG. 2*b*, and then the OS 101*gg* could write the data for message 254 via the system bus 101*t* to the network interface 101*r*, where the network interface 101*r* can subsequently transmit the message 254 to the IP network 107 and server 111'.

An OS 101*gg* can also include the executable instructions for device 101 to receive messages such as, but not limited to, a message 261 and 261' as depicted and described above in connection with FIG. 2*b* and FIG. 2*c*. In other words, OS 101*gg* can include libraries and drivers such that the message 261 could be received from the IP network 107 using the network interface 101*r* and system bus 101*t*. The OS 101*gg* could parse the data received in a message 261 and store contents from the message 261 in RAM 101*m* such that the device 101 could conduct the subsequent steps using the data from the message 261. The OS 101*gg* could write data from the message 261 to RAM 101*m*, and then the computer executable steps in RAM 101*m* such as associated with steps 253', 262, and 263 could process the data from a message 261. The receipt of a message 261 and then steps 253', 262, and 263 using the data from a message 261 is also depicted and described in connection with FIG. 2*b* above.

Device 101 can include a network interface 101*r* to communicate with IP network 107 and a plurality of networks 103, as depicted in FIG. 1 above (where FIG. 1 depicts a single network 103). Network interface 101*r* can comprise either a wired connection such as Ethernet or a wireless connection. For wireless configurations of device 101, then network interface 101*r* can comprise a radio, which could connect with an antenna in order to transmit and receive radio frequency signals from base stations or Wi-Fi access points. For wired configurations of device 101, such as if device 101 is a server, router, or a fixed location computing device, then device 101 could include a wired configuration for network interface 101*r*, such as Ethernet, fiber optic, or a coaxial cable connection. Device 101 may also optionally include user interface 101*w* which was also depicted and described in connection with FIG. 1 above. Device 101 can optionally omit a user interface 101*w*, if no user input or display is required for establishing communications within a network 103 and/or IP network 107.

Although not depicted in FIG. 11, device 101 can include other components to support operation, such as a clock, power source or power connection, antennas, etc. Other possibilities exist as well for hardware and electrical components operating in a device 101 without departing from the scope of the present disclosure. Using the electrical components depicted in FIG. 11, a device 101 could send and receive the data 106 in FIG. 1 in an encrypted and secure manner after conducting the authenticated PQC KEM steps as contemplated herein, in order to conduct secure communications with a plurality of networks 103. Using the electrical components depicted in FIG. 11, a device 101 could conduct both a first session 250 depicted and described in connection with FIG. 2*a* and a resumed session 251 depicted and described in connection with FIG. 2*b* and FIG. 2*c*.

CONCLUSION

Various exemplary embodiments have been described above. Those skilled in the art will understand, however, that changes and modifications may be made to those examples without departing from the scope of the claims.

The invention claimed is:

1. A server for securely communicating with a device, the server comprising:

a nonvolatile memory configured to store a plurality of key encapsulation mechanism (KEM) algorithms comprising a first KEM algorithm and a second KEM algorithm;

a network interface configured to:

a) receive a first message for a secure session comprising (i) a device ephemeral public key for the first KEM algorithm, and (ii) an identifier for the second KEM algorithm;

b) transmit a second message comprising (i) a first asymmetric ciphertext and (ii) a first symmetric ciphertext of at least a server public key for the second KEM algorithm, wherein the first symmetric ciphertext is encrypted with an first encryption key S1;

c) receive a third message comprising a second symmetric ciphertext, wherein the second symmetric ciphertext is decrypted with the key S1, and wherein the plaintext of the second symmetric ciphertext comprises a second asymmetric ciphertext for the second KEM algorithm;

d) transmit a fourth message comprising a third symmetric ciphertext of an identity (PSK-ID) of a "pre-shared" secret key (PSK), wherein the third symmetric ciphertext is encrypted with a second encryption key S2; and e) receive a fifth message for a resumption of a secure session, the fifth message comprising the identity (PSK-ID), a random number generated by the device, and a first message authentication code (MAC) tag value;

at least one processor configured to:

a) generate the first asymmetric ciphertext and a first shared secret K1 with a KEM encapsulation (ENCAPS) function for (i) the device ephemeral public key and (ii) the first KEM algorithm;

b) derive the first encryption key S1 using the first shared secret K1;

c) derive the server public key and a corresponding server private key for the second KEM algorithm;

d) generate a second shared secret K2 with a KEM decapsulation (DECAPS) function with (i) the second asymmetric ciphertext, (ii) the server private key, and (iii) the second KEM algorithm;

e) derive both the second encryption key S2 and the PSK using the first shared secret K1 and the second shared secret K2;

f) select the PSK using the identity (PSK-ID);

g) derive a second MAC tag value using the fifth message and the PSK;

h) compare the first MAC tag value and the second MAC tag value, wherein application data for the resumption of the secure session is encrypted using the PSK if the first MAC tag value and the second MAC tag value are the same.

2. The server of claim 1, wherein the at least one processor derives the encryption key S2 using at least the K1 and the K2 with one of (i) a HMAC-based Extract-and-Expand Key Derivation Function (HKDF) and (ii) a hash-based key derivation function.

3. The server of claim 2, wherein the at least one processor derives a message authentication code (MAC) key and an initialization vector for the third symmetric ciphertext.

4. The server of claim 1, wherein the at least one processor derives the PSK using at least plaintext data from the first message and the second message with one of a HKDF and a hash-based key derivation function.

5. The server of claim 1, wherein the at least one processor derives the second MAC tag value from a MAC algorithm with (i) data from the fifth message and (ii) a MAC key, and wherein the MAC key is derived using the PSK.

6. The server of claim 1, wherein the at least one processor (i) encrypts application data for the resumption of the secure session using a third encryption key S3 and (ii) generates the third encryption key S3 using the PSK and the random number with one of a HKDF and a hash-based key derivation function.

7. The server of claim 1, wherein the first KEM algorithm comprises a first algorithm type for lattice-based cryptography and the second KEM algorithm comprises a second algorithm type for code-based cryptography.

8. The server of claim 1, wherein the first KEM algorithm comprises a first algorithm type for code-based cryptography and the second KEM algorithm comprises a second algorithm type for lattice-based cryptography.

9. The server of claim 1, wherein the server public key comprises a server static public key, wherein a plaintext for the first symmetric ciphertext includes a server certificate with the server static public key and an identity for the second KEM algorithm.

10. The server of claim 1, wherein the server public key comprises a server ephemeral public key, and wherein a plaintext for the first symmetric ciphertext includes a server digital signature over at least the server ephemeral public key and the device ephemeral public key.

11. The server of claim 1, wherein the device comprises one of a personal computer, a laptop computer, a mobile handset, a router, and a second server.

* * * * *